US012704188B2

(12) United States Patent
Sato et al.

(10) Patent No.: US 12,704,188 B2
(45) Date of Patent: Aug. 11, 2026

(54) VALVE DEVICE

(71) Applicant: DENSO CORPORATION, Kariya-city (JP)

(72) Inventors: Shingo Sato, Kariya-city (JP); Yuto Sato, Kariya-city (JP); Masato Ichikawa, Kariya-city (JP); Akihiko Goto, Kariya-city (JP); Tadashi Ikemoto, Kariya-city (JP); Ryo Nomura, Kariya-city (JP); Ryuki Tsuji, Kariya-city (JP); Takahito Suzuki, Kariya-city (JP); Shogo Kanzaki, Kariya-city (JP)

(73) Assignee: DENSO CORPORATION, Kariya-city (JP)

( * ) Notice: Subject to any disclaimer, the term of this patent is extended or adjusted under 35 U.S.C. 154(b) by 6 days.

(21) Appl. No.: 18/776,311

(22) Filed: Jul. 18, 2024

(65) Prior Publication Data

US 2024/0369145 A1 Nov. 7, 2024

Related U.S. Application Data

(60) Continuation of application No. 18/240,390, filed on Aug. 31, 2023, now Pat. No. 12,078,253, which is a (Continued)

(30) Foreign Application Priority Data

May 31, 2018 (JP) ................................ 2018-105458
Dec. 13, 2018 (JP) ................................ 2018-233919

(51) Int. Cl.
*F16K 27/04* (2006.01)
*F16K 11/076* (2006.01)
(Continued)

(52) U.S. Cl.
CPC .......... *F16K 11/076* (2013.01); *F16K 27/041* (2013.01); *F16K 27/067* (2013.01); (Continued)

(58) Field of Classification Search
None
See application file for complete search history.

(56) References Cited

U.S. PATENT DOCUMENTS 2,578,396 A 12/1951 Brown
2,781,054 A 2/1957 Neumann
(Continued)

FOREIGN PATENT DOCUMENTS

CN 101944797 1/2011
CN 104995437 10/2015
(Continued)

*Primary Examiner* — Matthew W Jellett
(74) *Attorney, Agent, or Firm* — Nixon & Vanderhye P.C.

(57) ABSTRACT

A housing has a housing main body and an outlet port. The housing main body includes a cylindrical housing inner wall that defines an internal space therein. The outlet port fluidly connects the internal space and an outside of the housing main body to each other. The valve has a valve body rotatable about an rotation axis along a rotation axis of the cylindrical housing inner wall. The valve is configured to selectively open and close the outlet port depending on a rotation position of the valve. The housing inner wall is formed such that a distance between the housing inner wall and the axis of the housing inner wall varies in a circumferential direction.

11 Claims, 123 Drawing Sheets

Related U.S. Application Data continuation of application No. 18/081,982, filed on Dec. 15, 2022, now Pat. No. 11,788,634, which is a continuation of application No. 17/718,407, filed on Apr. 12, 2022, now Pat. No. 11,560,958, which is a division of application No. 17/105,878, filed on Nov. 27, 2020, now Pat. No. 11,333,258, which is a continuation of application No. PCT/JP2019/021179, filed on May 29, 2019.

(51) Int. Cl.

| | |
|---|---|
| ***F16K 27/06*** | (2006.01) |
| ***F16K 31/04*** | (2006.01) |
| *F01P 3/02* | (2006.01) |
| *F01P 5/10* | (2006.01) |
| *F01P 7/14* | (2006.01) |

(52) U.S. Cl.

CPC .............. *F16K 31/041* (2013.01); *F01P 3/02* (2013.01); *F01P 5/10* (2013.01); *F01P 7/14* (2013.01); *F01P 2007/146* (2013.01)

(56) References Cited

U.S. PATENT DOCUMENTS

| | | | | |
|---|---|---|---|---|
| 4,655,252 | A | 4/1987 | Krumhansl | |
| 7,168,397 | B2 * | 1/2007 | Chanfreau | B60H 1/00485 123/41.01 |
| 7,891,376 | B2 * | 2/2011 | Neuhauser | F16K 1/446 137/312 |
| 7,963,455 | B2 * | 6/2011 | Heldberg | F16K 11/0873 236/93 R |
| 8,596,302 | B2 * | 12/2013 | Fontenit | F16K 1/446 137/637.2 |
| 8,671,982 | B2 * | 3/2014 | Stoermer | F16K 11/0856 123/41.1 |
| 8,695,542 | B2 | 4/2014 | Vacca et al. | |
| 9,017,460 | B2 * | 4/2015 | Minato | F16K 1/00 96/147 |
| 9,670,825 | B2 * | 6/2017 | Murakami | F01P 3/20 |
| 11,333,258 | B2 | 5/2022 | Sato et al. | |
| 11,560,958 | B2 | 1/2023 | Sato et al. | |
| 11,572,958 | B2 | 2/2023 | Nomura | |
| 11,788,634 | B2 | 10/2023 | Sato et al. | |
| 2001/0008277 | A1 | 7/2001 | Roszkowski et al. | |
| 2007/0252015 | A1 | 11/2007 | Norris et al. | |
| 2010/0320698 | A1 | 12/2010 | Shimomura et al. | |
| 2011/0198525 | A1 | 8/2011 | Yu | |
| 2012/0089316 | A1 | 4/2012 | Cleeves | |
| 2013/0045078 | A1 | 2/2013 | Boldt | |
| 2015/0204248 | A1 | 7/2015 | Takeda | |
| 2016/0003126 | A1 * | 1/2016 | Carns | F16K 5/0605 251/304 |
| 2017/0009894 | A1 | 1/2017 | Seko et al. | |
| 2017/0067665 | A1 | 3/2017 | Whitmore et al. | |
| 2017/0089482 | A1 * | 3/2017 | Dieterich | F16K 11/0856 |
| 2018/0051610 | A1 | 2/2018 | Thomas | |
| 2018/0051815 | A1 | 2/2018 | Murakami | |
| 2018/0066758 | A1 | 3/2018 | Yumisashi et al. | |
| 2018/0149073 | A1 | 5/2018 | Shen et al. | |
| 2018/0230891 | A1 | 8/2018 | Sato | |
| 2019/0003370 | A1 | 1/2019 | Nomura et al. | |
| 2019/0017612 | A1 | 1/2019 | Ikemoto | |
| 2019/0211738 | A1 | 7/2019 | Yoshimura et al. | |
| 2019/0219179 | A1 | 7/2019 | Sato | |
| 2020/0109787 | A1 | 4/2020 | Tsuji | |
| 2020/0109788 | A1 | 4/2020 | Ikemoto | |
| 2020/0114725 | A1 | 4/2020 | Kanzaki | |
| 2020/0149462 | A1 | 5/2020 | Kanzaki | |
| 2020/0158248 | A1 | 5/2020 | Kanzaki | |
| 2020/0300154 | A1 | 9/2020 | Ikemoto | |
| 2020/0300375 | A1 | 9/2020 | Ikemoto et al. | |
| 2020/0318751 | A1 | 10/2020 | Tanaka | |
| 2020/0362747 | A1 | 11/2020 | Sano et al. | |
| 2020/0393052 | A1 | 12/2020 | Suzuki | |
| 2021/0080014 | A1 | 3/2021 | Sato et al. | |
| 2021/0140360 | A1 | 5/2021 | Kanzaki | |
| 2021/0140554 | A1 | 5/2021 | Kanzaki | |
| 2021/0140555 | A1 | 5/2021 | Nomura | |
| 2022/0243830 | A1 | 8/2022 | Sato et al. | |
| 2023/0050115 | A1 | 2/2023 | Takagi | |
| 2023/0110298 | A1 | 4/2023 | Sato et al. | |
| 2023/0407977 | A1 | 12/2023 | Sato et al. | |

FOREIGN PATENT DOCUMENTS

| | | |
|---|---|---|
| DE | 10 2017 004 458 | 11/2017 |
| EP | 1 923 611 | 5/2008 |
| GB | 2 199 119 | 6/1988 |
| JP | 2000-249235 | 9/2000 |
| JP | 2003314934 | 11/2003 |
| JP | 2015-059615 A | 3/2015 |
| JP | 2015-197132 | 11/2015 |
| JP | 2017-003064 | 1/2017 |
| JP | 2018-105458 | 7/2018 |
| JP | 2018-233919 | 12/2018 |
| WO | 2019/230749 | 12/2019 |

* cited by examiner 515
50
517
513
511
514
512
52
202
534
291
821
84
516
536
535
830
Sc1
256
255
254
80
81
216
Axr1
240
240
21
20
Sc1
2
830
201
232
209
233
296
826

513 50 511
A1
540 540 540
516 52 512
12 11
534 532
531
254 252
251
20
34 21
342 30
Axr1, Axs1 31
332 32
240 240
33
233 231 2
68 632 201 633 63 631 209

RADIATOR OPENING PORTION
HEATER OPENING PORTION
DEVICE OPENING PORTION
COUNTERPART SIDE OPENING PORTION (SEAL OPENING PORTION)

SUMMER MODE
WINTER MODE

Pr-5 Pr-4 Pr-3 Pr-2 Pr-1 Pr0 Pr1 Pr2 Pr3 Pr4 Pr5 Pr6 Pr7 Pr8 Pr9 Pr10
ROTATION POSITION

OTHER SIDE
ROTATION DIRECTION
ONE SIDE

VALVE DEVICE

CROSS REFERENCE TO RELATED APPLICATIONS

This application is a continuation of U.S. application Ser. No. 18/240,390, filed Aug. 31, 2023, which is a continuation of U.S. application Ser. No. 18/081,982, filed Dec. 15, 2022, now U.S. Pat. No. 11,788,634 issued on Oct. 17, 2023, which is a continuation of U.S. application Ser. No. 17/718,407, filed Apr. 12, 2022, now U.S. Pat. No. 11,560,958 issued on Jan. 24, 2023, which is a divisional of U.S. application Ser. No. 17/105,878, filed Nov. 27, 2020, now U.S. Pat. No. 11,333,258 issued on May 17, 2022, which is a continuation application of International Patent Application No. PCT/JP2019/021179 filed on May 29, 2019, which designated the U.S. and claims the benefit of priority from Japanese Patent Application No. 2018-105458 filed on May 31, 2018 and Japanese Patent Application No. 2018-233919 filed on Dec. 13, 2018. The entire disclosures of all of the above applications are incorporated herein by reference.

TECHNICAL FIELD

The present disclosure relates to a valve device.

BACKGROUND ART

In the related art, a valve device having a rotating valve body is known.

SUMMARY

One aspect of the present disclosure is a valve device capable of controlling coolant water for a heating element of a vehicle. The valve device includes a housing and a valve.

The housing has a housing main body and a port. The housing main body includes a cylindrical housing inner wall that defines an internal space therein. The port fluidly connects the internal space and an outside of the housing main body to each other.

The valve has a valve body and a valve body opening portion. The valve body is rotatable about an rotation axis along a rotation axis of the cylindrical housing inner wall. The valve body opening portion is formed to fluidly connect an outer circumferential wall and an inner circumferential wall of the valve. The valve is configured to selectively open and close the port depending on a rotation position of the valve.

The housing inner wall is formed such that a distance between the housing inner wall and the axis of the housing inner wall varies in a circumferential direction.

BRIEF DESCRIPTION OF DRAWINGS

The above-described object, other objects, features, and advantages of the present disclosure will become more apparent from the following detailed description with reference to the accompanying drawings. In the drawings.

FIG. 3 is viewed in a direction of an arrow VIII.

FIG. 3 is viewed in a direction of an arrow IX.

FIG. 42 is viewed in a direction of an arrow XLVII.

FIG. 61 is viewed in a direction of an arrow LXII.

FIG. 61 is viewed in a direction of an arrow LXIII.

FIG. 61 is viewed in a direction of an arrow LXIV.

FIG. 61 is viewed in a direction of the arrow LXV.

FIG. 62 is viewed in a direction of an arrow LXVI.

FIG. 81 is viewed in a direction of an arrow LXXXII.

FIG. 88 is viewed in a direction of an arrow LXXXIX.

FIG. 90 is viewed in a direction of the arrow XCI.

FIG. 90 is viewed in a direction of an arrow XCII.

FIG. 90 is viewed in a direction of an arrow XCIII.

FIG. 90 is viewed in a direction of an arrow XCIV.

FIG. 93 is viewed in a direction of the arrow XCV.

FIG. 120 is a view illustrating a housing of a valve device of a twenty-first embodiment.

FIG. 121 is a perspective view illustrating the housing of the valve device of the twenty-first embodiment.

FIG. 122 is a view illustrating a relationship between a rotation position of a valve body and an overlapping ratio of a valve body opening portion and a port in a valve device of a twenty-second embodiment.

FIG. 123 is a view illustrating a relationship between a rotation position of a valve body and an overlapping ratio of a valve body opening portion and a port in a valve device of a twenty-third embodiment.

FIG. 124 is a view illustrating a relationship between a rotation position of a valve body and an opening degree of a port in a valve device of a twenty-fourth embodiment.

FIG. 125 is a view illustrating a relationship between the rotation position of the valve body and an overlapping ratio of a valve body opening portion and the port in the valve device of the twenty-fourth embodiment.

FIG. 126 is a cross-sectional view illustrating a shaft seal portion and the vicinity of a valve device of a twenty-fifth embodiment.

FIG. 127 is a schematic view illustrating a cooling system adopting a valve device of a twenty-sixth embodiment.

DESCRIPTION OF EMBODIMENTS

Figure 1:
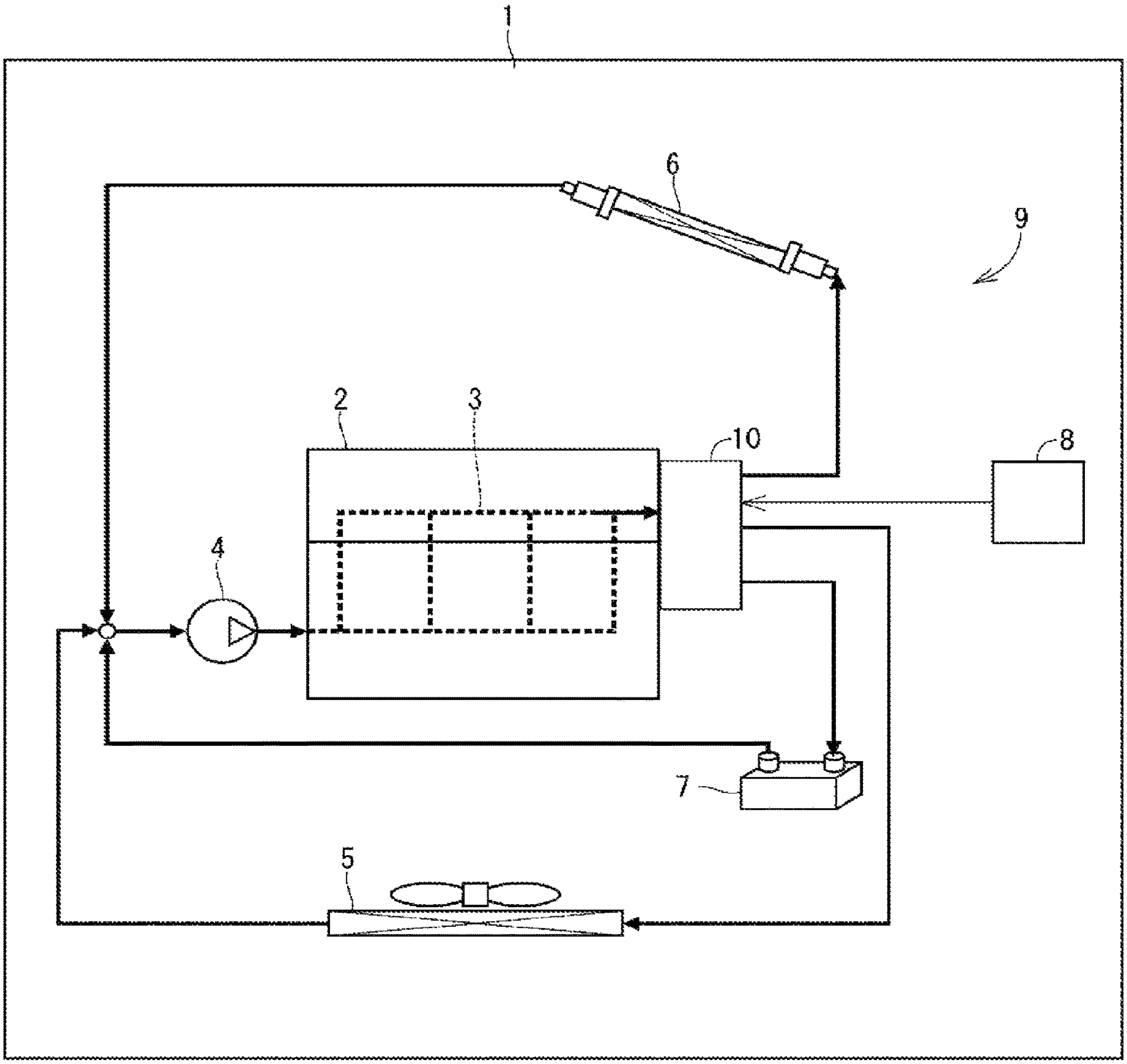
FIG. 1 is a schematic view illustrating a cooling system adopting a valve device of a first embodiment.

To begin with, a relevant technology will be described first only for understanding the following embodiments. In a typical valve device, the inner wall of the housing that defines an internal space has a cylindrical shape. The valve that is rotatably disposed in the internal space has also an outer circumferential wall with a cylindrical shape.

Therefore, a distance between the outer circumferential wall and the inner wall of the housing has a constant valve in the circumferential direction, that is, the entire circumferential area of the valve and the housing are constant. Thus, when foreign matter in coolant water in the internal space enters the gap between the outer circumferential wall of the valve and the inner wall of the housing, it is difficult to discharge the foreign matter even when the valve rotates. Thus, the foreign matter may stay in the gap. If the foreign matter stays in the gap, malfunction may occur in the valve. Furthermore, load torque for driving the valve or a pressure drop resistance may increase.

An objective of the present disclosure is to provide a valve device capable of preventing malfunction in a valve.

As described above, one aspect of the present disclosure is a valve device capable of controlling coolant water for a heating element of a vehicle. The valve device includes a housing and a valve.

The housing has a housing main body and a port. The housing main body includes a cylindrical housing inner wall that defines an internal space therein. The port fluidly connects the internal space and an outside of the housing main body to each other.

The valve has a valve body and a valve body opening portion. The valve body is rotatable about an rotation axis along a rotation axis of the cylindrical housing inner wall. The valve body opening portion is formed to fluidly connect an outer circumferential wall and an inner circumferential wall of the valve. The valve is configured to selectively open and close the port depending on a rotation position of the valve.

The housing inner wall is formed such that a distance between the housing inner wall and the axis of the housing inner wall varies in a circumferential direction.

Accordingly, when the shape of the outer circumferential wall of the valve body is circular in a cross-section perpendicular to the rotation axis of the valve body, a distance between the outer circumferential wall of the valve body and the housing inner wall varies in the circumferential direction. That is, the distance between the outer circumferential wall of the valve body and the housing inner wall is not constant in the circumferential direction. A gap between the outer circumferential wall of the valve body and the housing inner wall has a large portion and a small portion in the circumferential direction. In this manner, even when the foreign substance in the coolant water of the internal space enters the gap between the outer circumferential wall of the valve body and the housing inner wall, the foreign substance moves to the large gap in accordance with rotation of the valve body. Accordingly, the foreign substance can be easily discharged from the gap. Therefore, it is possible to prevent an operation failure of the valve body which would be caused by the foreign substance staying in the gap between the outer circumferential wall of the valve body and the housing inner wall. In addition, it is possible to prevent an increase in load torques for driving the valve body and an increase in pressure loss resistance.

Hereinafter, a valve device according to multiple embodiments will be described with reference to the drawings. In the multiple embodiments, the same reference numerals will be assigned to substantially the same configuration elements, and description thereof will be omitted. In addition, substantially the same configuration elements in the multiple embodiments have the same or similar operational effects.

First Embodiment

A valve device and a cooling system according to a first embodiment are illustrated in FIG. 1. A valve device 10 is applied to a cooling system 9 of a vehicle 1. The vehicle 1 is equipped with an internal combustion engine (hereinafter, referred to as an “engine”) 2 serving as a heating element, a cooling system 9, a heater 6, and a device 7.

<Cooling System>

The cooling system 9 includes a valve device 10, a water pump 4, a radiator 5, and an electronic control unit (hereinafter, referred to as an “ECU”) 8. The water pump 4 pumps coolant water toward a water jacket 3 of the engine 2. For example, the valve device 10 is provided in an outlet of the water jacket 3, and adjusts a flow rate of the coolant water to be supplied to the radiator 5, the heater 6, and the device 7.

The radiator 5 is a heat exchanger, and exchanges heat between the coolant water and the air to lower a temperature of the coolant water. The heater 6 and the device 7 are provided between a valve device 10 and the water pump 4. Here, for example, the device 7 includes an oil cooler, an EGR cooler, or an automatic transmission fluid (ATF) cooler.

Heat is exchanged between the air and the coolant water inside the vehicle 1, when the coolant water flows to the heater 6. When the coolant water flows to the device 7, the heat is exchanged between a fluid (oil or EGR gas) flowing through the device 7 and the coolant water. The ECU 8 can control an operation of the valve device 10 and, and can control the flow rate of the coolant water to be supplied to the radiator 5, the heater 6, and device 7.

<The valve Device>

Figure 3:
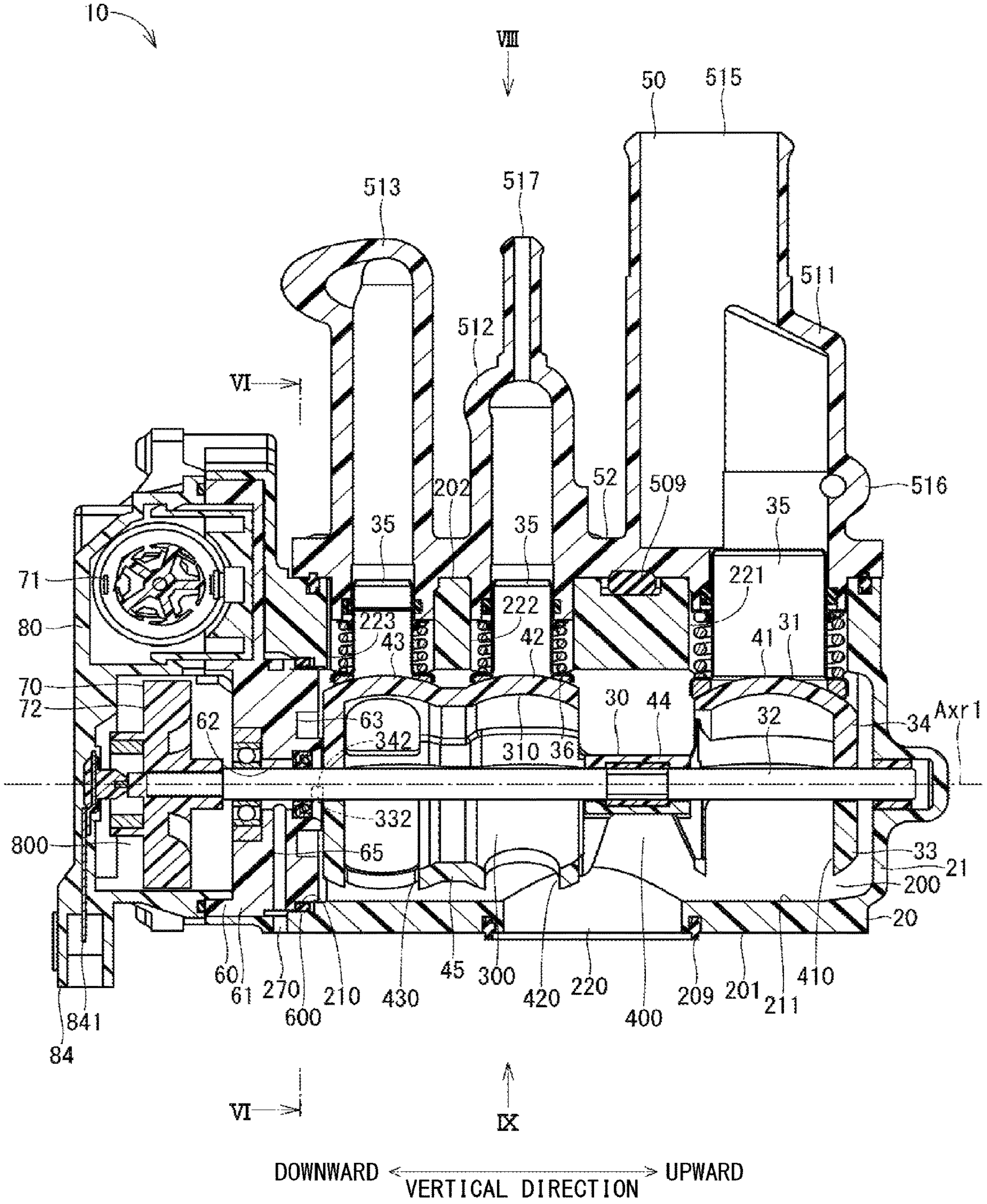
FIG. 3 is a cross-sectional view illustrating the valve device of the first embodiment.

As illustrated in FIG. 3, the valve device 10 includes a housing 20, a valve 30, a seal unit 35, a pipe member 50, a partition wall portion 60, a drive unit 70, and a drive unit cover 80.

The housing 20 includes a housing main body 21. For example, the housing main body 21 is formed of a resin, and internally forms an internal space 200. A planar attachment surface 201 is formed on an outer wall of the housing main body 21. A planar pipe attachment surface 202 is formed on an outer wall on a side opposite to the attachment surface 201 of the housing main body 21. The attachment surface 201 is formed to be substantially parallel to the pipe attachment surface 202.

The housing main body 21 is a portion of the housing 20, and means a portion forming the internal space 200. Therefore, fastening portions 231 to 233, housing-side fixing portions 251 to 256, a housing connection portion 259, and housing-side cover fixing portions 291 to 296, (to be described later) are portions forming the housing 20, and are formed as portions different from the housing main body 21.

A housing opening portion 210 for connecting the internal space 200 and the outside of the housing main body 21 to each other is formed in the housing main body 21. The housing main body 21 has a cylindrical housing inner wall 211 whose one end is connected to the housing opening portion 210 to form the internal space 200. The housing inner wall 211 is formed so that an axis thereof is substantially parallel to the attachment surface 201 and the pipe attachment surface 202.

The housing opening portion 210 is formed on one end side in a longitudinal direction of the housing main body 21, the other end side in the longitudinal direction is a closed surface.

The housing 20 has an inlet port 220 which is open on the attachment surface 201 and which connects the internal space 200 and the outside of the housing main body 21 to each other. An opening of the inlet port 220 on the attachment surface 201 has a circular shape. The inlet port 220 corresponds to a “port” or a “first port”. The housing 20 has outlet ports 221, 222, and 223 which are open on the pipe attachment surface 202 and which connect the internal space 200 and the outside of the housing main body 21 to each other. The outlet ports 221, 222, and 223 correspond to a “port” or a “second port”.

An opening of the inlet port 220 is formed in a portion of the housing inner wall 211 which faces a portion where openings of the outlet ports 221 to 223 are formed.

Figure 8:
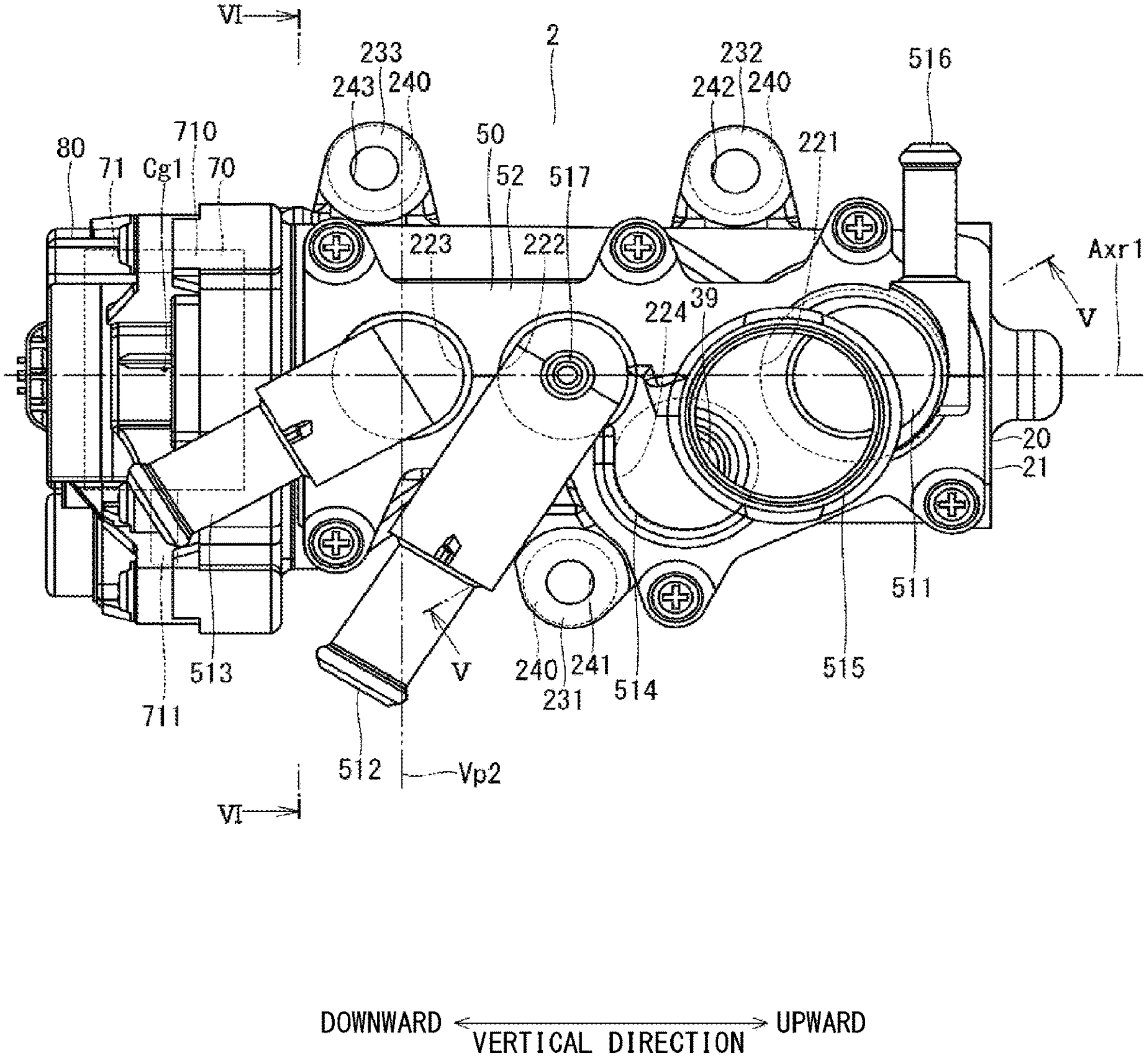
FIG. 8 is a view when

As illustrated in FIG. 8, the housing 20 has a relief port 224 which is open on the pipe attachment surface 202 and which connects the internal space 200 and the outside of the housing main body 21 to each other.

Figure 9:
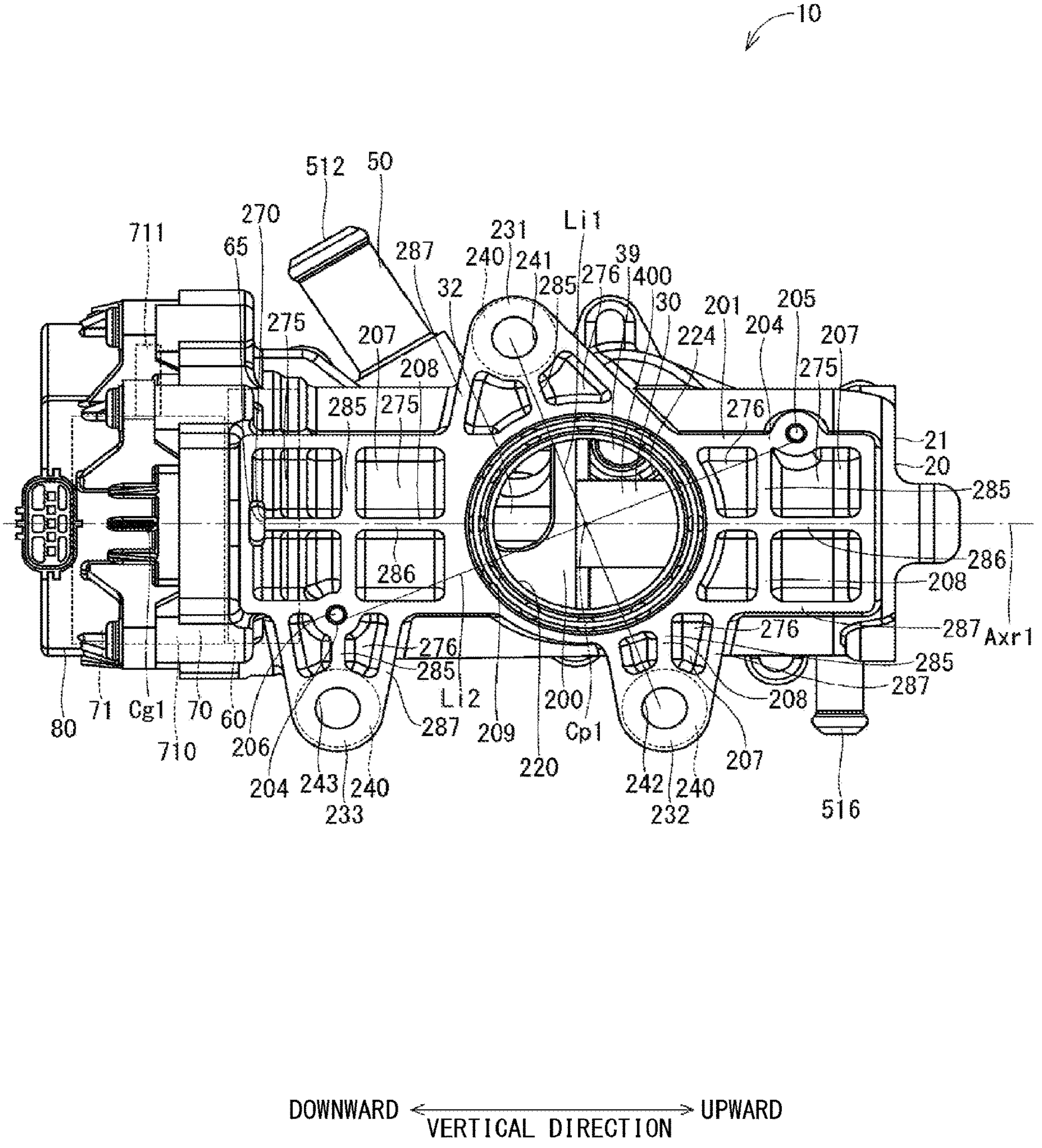
FIG. 9 is a view when

When viewed in an axial direction of the inlet port 220, the inlet port 220 and the relief port 224 partially overlap with each other (refer to FIG. 9).

Outlet ports 221, 222, and 223 are formed to be aligned in this order from an end portion on a side opposite to the housing opening portion 210 of the housing main body 21 toward the housing opening portion 210 side. An inner diameter of the outlet port 221 is larger than an inner diameter of the outlet ports 222 and 223.

The valve 30 has a valve body 31 and a shaft 32. For example, the valve body 31 is formed of a resin. The valve body 31 is provided to be rotatable around a rotation axis Axr1 in the internal space 200. The rotation axis Axr1 is set to be substantially parallel to an axis of the housing inner wall 211. The valve body 31 includes a first divided body 33 and a second divided body 34 which is divided into two in a virtual plane Vp1 including the rotation axis Axr1. The first divided body 33 and the second divided body 34 are joined to each other on respective joint surfaces (refer to FIG. 6).

The valve body 31 has the ball valves 41, 42, and 43, a cylindrical connection portion 44, and a cylindrical valve connection portion 45. The ball valves 41, 42, and 43 respectively correspond to a "first ball valve", a "second ball valve", and a "third ball valve". The cylindrical connection portion 44 and the cylindrical valve connection portion 45 correspond to a "cylindrical portion". Each of the ball valves 41, 42, and 43 is formed in a substantially spherical shape, and internally forms a valve body internal flow channel 300. An outer circumferential wall of the ball valves 41, 42, and 43 is formed in a spherical shape which projects outside in the radial direction of the rotation axis Axr1. An inner circumferential wall of the ball valves 41, 42, and 43 is formed in a spherical shape to be recessed outside in the radial direction of the rotation axis Axr1.

The cylindrical connection portion 44 is formed in a cylindrical shape to connect the ball valve 41 and the ball valve 42 to each other. The cylindrical valve connection portion 45 is formed in a cylindrical shape to connect the ball valve 42 and the ball valve 43 to each other. The cylindrical valve connection portion 45 internally forms the valve body internal flow channel 300. The ball valve 41, the cylindrical connection portion 44, the ball valve 42, the cylindrical valve connection portion 45, and the ball valve 43 are integrally formed in this order.

The valve body opening portions 410, 420, and 430 which connect the valve body internal flow channel 300 and the outside of the valve body 31 to each other are formed in each of the ball valves 41, 42, and 43. An inter-valve space 400 is formed between the ball valve 41 and the ball valve 42 outside in a radial direction of the cylindrical connection portion 44. The inter-valve space 400 communicates with each of the valve body internal flow channels 300 of the ball valves 41 and 42.

In a direction of the rotation axis Axr1, the valve body 31 is provided in the internal space 200 so that the valve body opening portion 410 corresponds to a position of the outlet port 221, the inter-valve space 400 corresponds to a position of the inlet port 220, the valve body opening portion 420 corresponds to positions of the outlet port 222 and the inlet port 220, and the valve body opening portion 430 corresponds to a position of the outlet port 223.

For example, the shaft 32 is formed of metal in a rod shape, and is provided on the rotation axis Axr1. The shaft 32 is provided integrally with the valve body 31. The shaft 32 is rotatable around the rotation axis Axr1 together with the valve body 31.

For example, the shaft 32 is formed of stainless steel such as a SUS 430 system.

As illustrated in FIG. 3, the rotation axis Axr1 is set to extend from the outside of the housing main body 21 to the outside of the drive unit cover 80. That is, the rotation axis Axr1 is defined as a straight line that exists not only in the internal space 200 but also outside the housing main body 21. The shaft 32 is provided on the rotation axis Axr1 so that an axis thereof extends along the rotation axis Axr1.

The valve body 31 is provided in the internal space 200 to be rotatable around the rotation axis Axr1. The shaft 32 is provided on a straight line along the rotation axis Axr1. That is, the shaft 32 is provided in at least a portion of the rotation axis Axr1.

As illustrated in FIG. 3, according to the present embodiment, the shaft 32 extends from the outside of a first outermost end surface 301 which is one end surface in the direction of the rotation axis Axr1 of the valve body 31 to the outside of a second outermost end surface 302 which is the other end surface after passing through the valve body internal flow channel 300 which is the inside of the valve body 31.

In contrast, according to another embodiment, the shaft 32 may extend from the outside of the first outermost end surface 301 of the valve body 31 to an inner wall of the valve body 31, and may be provided not to project to the valve body internal flow channel 300. That is, the shaft 32 may not exist inside the valve body internal flow channel 300 or inside the internal space 200, and may be provided at any desired position with respect to the valve body 31 as long as the shaft 32 is provided on a straight line along the rotation axis Axr1.

For example, the pipe member 50 is formed of a resin. As illustrated in FIGS. 3 and 8, the pipe member 50 has pipe portions 511 to 517 and a pipe coupling portion 52. The pipe portions 511 to 517 are respectively formed in a cylindrical shape. The pipe portion 511 is provided so that one end is located inside the outlet port 221. The pipe portion 512 is provided so that one end is located inside the outlet port 222. The pipe portion 513 is provided so that one end is located inside the outlet port 223. The pipe portion 514 is provided so that one end corresponds to a position of the relief port 224.

The pipe portion 515 is provided so that one end is connected to the pipe portion 511 and the pipe portion 514. The pipe portion 516 is provided so that one end is connected to the pipe portion 511. The pipe portion 517 is provided so that one end is connected to the pipe portion 512.

The pipe coupling portion 52 is formed so that one end sides of the pipe portions 511 to 515 are coupled with each other. The pipe member 50 is fixed to the housing main body 21 so that the pipe coupling portion 52 comes into contact with the pipe attachment surface 202. A gasket 509 capable of holding a portion between the pipe member 50 and the housing main body 21 in a liquid-tight manner is provided between the pipe coupling portion 52 and the pipe attachment surface 202.

The other end of the pipe portions 511, 514, and 515 is connected to the radiator 5 via a hose. The other end of the pipe portion 512 is connected to the heater 6 via a hose. The other end of the pipe portion 513 is connected to the device 7 via a hose. The other end of the pipe portion 516 is connected to a reservoir tank (not illustrated) via a hose. The other end of the pipe portion 517 is connected to a throttle (not illustrated) via a hose.

Figure 4:
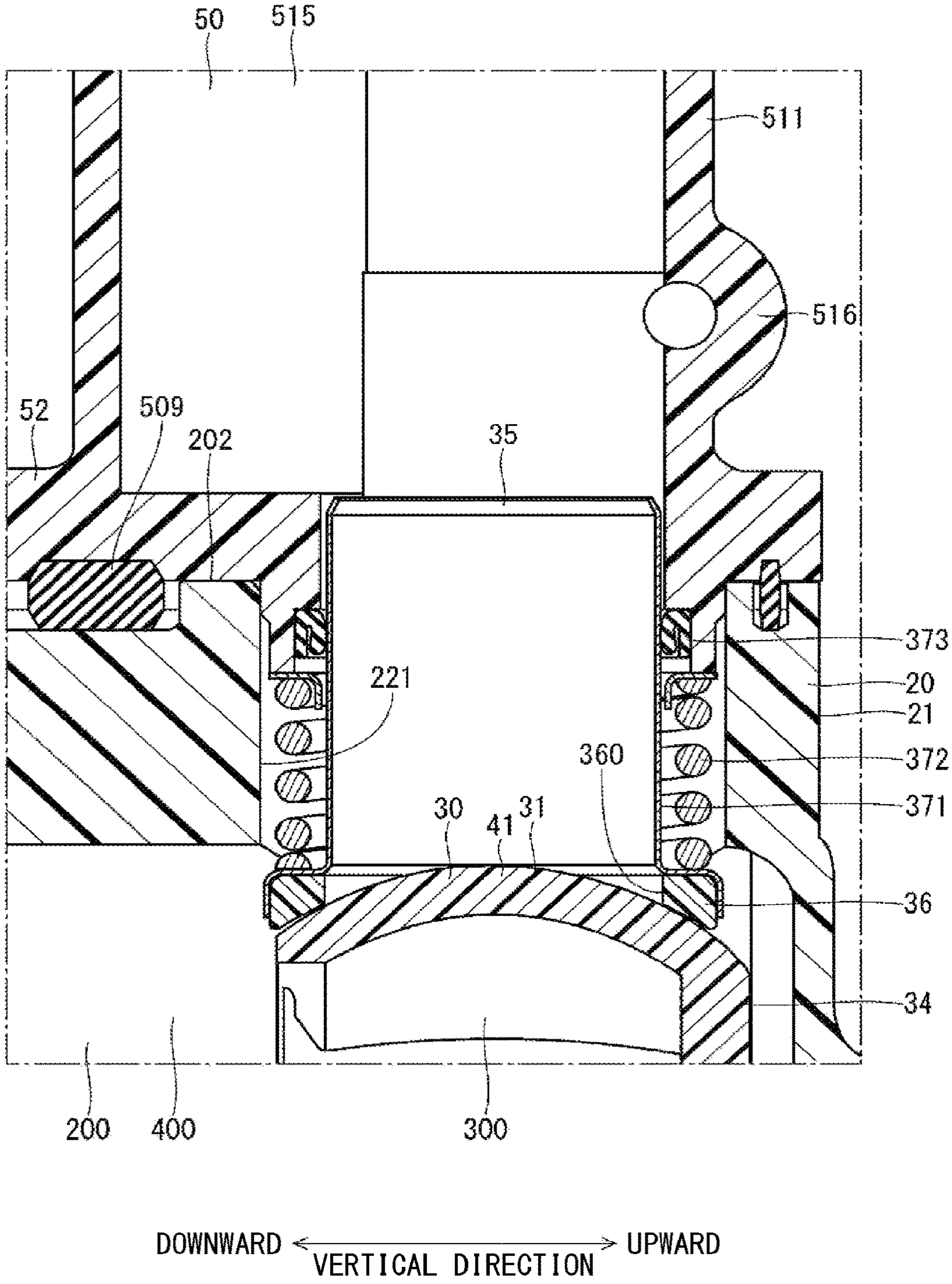
FIG. 4 is a cross-sectional view illustrating the vicinity of a seal unit of the valve device of the first embodiment.

The seal unit 35 is provided in each of the outlet ports 221, 222, and 223. As illustrated in FIG. 4, the seal unit 35 has a valve seal 36, a sleeve 371, a spring 372, and a seal member 373. For example, the valve seal 36 is formed of a resin in a substantially annular shape, and internally has a seal opening portion 360. One surface of the valve seal 36 is provided to come into contact with the outer circumferential wall of the valve body 31, and the valve seal 36 can hold a portion formed with the outer circumferential wall of the valve body 31 in a liquid-tight manner.

For example, the valve seal 36 is formed of a material obtained by mixing polytetrafluoroethylene (PTFE) with graphite of 14% and carbon fiber (CF) of 1%. Therefore, compared to the valve body 31, the valve seal 36 is configured to have a low friction coefficient and improved abrasion resistance, improved compressive strength, and improved creep resistance.

For example, the sleeve 371 is formed of metal in a cylindrical shape, and one end thereof holds the valve seal 36. The other end of the sleeve 371 is located inside one end of the pipe portion 511. The spring 372 is provided between one end of the sleeve 371 and one end of the pipe portion 511, and biases the valve seal 36 against the valve body 31 side together with the sleeve 371. For example, the seal member 373 is formed of rubber in an annular shape, is provided between one end of the pipe portion 511 and the outer circumferential wall of the sleeve 371, and can hold a portion between the pipe portion 511 and the sleeve 371 in a liquid-tight manner.

For example, the sleeves 371 are formed of stainless steel, such as SUS 430. Therefore, corrosion resistance of the sleeve 371 is relatively excellent. In addition, since the SUS 430 has satisfactory press workability, the sleeve 371 can be easily subjected to press work.

The seal unit 35 provided in the outlet ports 222 and 223 has a configuration the same as that of the seal unit 35 provided in the outlet port 221, and thus, description thereof will be omitted. Each of three seal units 35 is assembled to one end of the pipe portions 511, 512, and 513.

The sleeve 371, the spring 372, and the valve seal 36 of the seal unit 35 provided in the outlet ports 222 and 223 have an outer diameter smaller than an outer diameter of the sleeve 371, the spring 372, and the valve seal 36 of the seal unit 35 provided in the outlet port 221. Here, a spring load of the spring 372 of each seal unit 35 provided in the outlet ports 221 to 223 is set to a load that satisfies a required leakage amount for sealing by compressing the valve seal 36. With regard to the springs 372 of the respective seal units 35 provided in the outlet ports 221 to 223, leakage targets are different from each other depending on sizes, and body sizes are different from each other. Accordingly, spring constants are different from each other depending on sizes.

For example, the spring 372 is formed of stainless steel such as SUS 316. Therefore, the spring 372 has a satisfactory spring property and excellent corrosion resistance. In this manner, stress corrosion cracking of the spring 372 can be prevented.

For example, the partition wall portion 60 is formed of a resin. The partition wall portion 60 is formed separately from the housing main body 21. The partition wall portion 60 has a partition wall portion main body 61. The partition wall portion main body 61 is formed in a substantially disc shape. The partition wall portion 60 is provided in the housing main body 21 so that the partition wall portion main body 61 closes the housing opening portion 210. The partition wall portion 60 has a shaft insertion hole 62 penetrating a center of the partition wall portion main body 61 in a plate thickness direction. The valve 30 is provided so that one end of the shaft 32 is inserted into the shaft insertion hole 62. In the shaft 32, one end is borne by the partition wall portion main body 61, and the other end is borne by the housing main body 21.

The drive unit cover 80 is provided on a side opposite to the internal space 200 with respect to the partition wall portion 60, and forms a drive unit space 800 with the partition wall portion 60.

The drive unit 70 is provided in the drive unit space 800, and can rotatably drive the valve body 31 via one end of the shaft 32. The drive unit 70 has a motor 71 and a gear portion 72. The gear portion 72 is connected to one end of the shaft 32. When the ECU 8 controls power supplied to the motor 71, a driving force of the motor 71 is transmitted to the shaft 32 via the gear portion 72. In this manner, the valve body 31 is driven to rotate.

Figure 5:
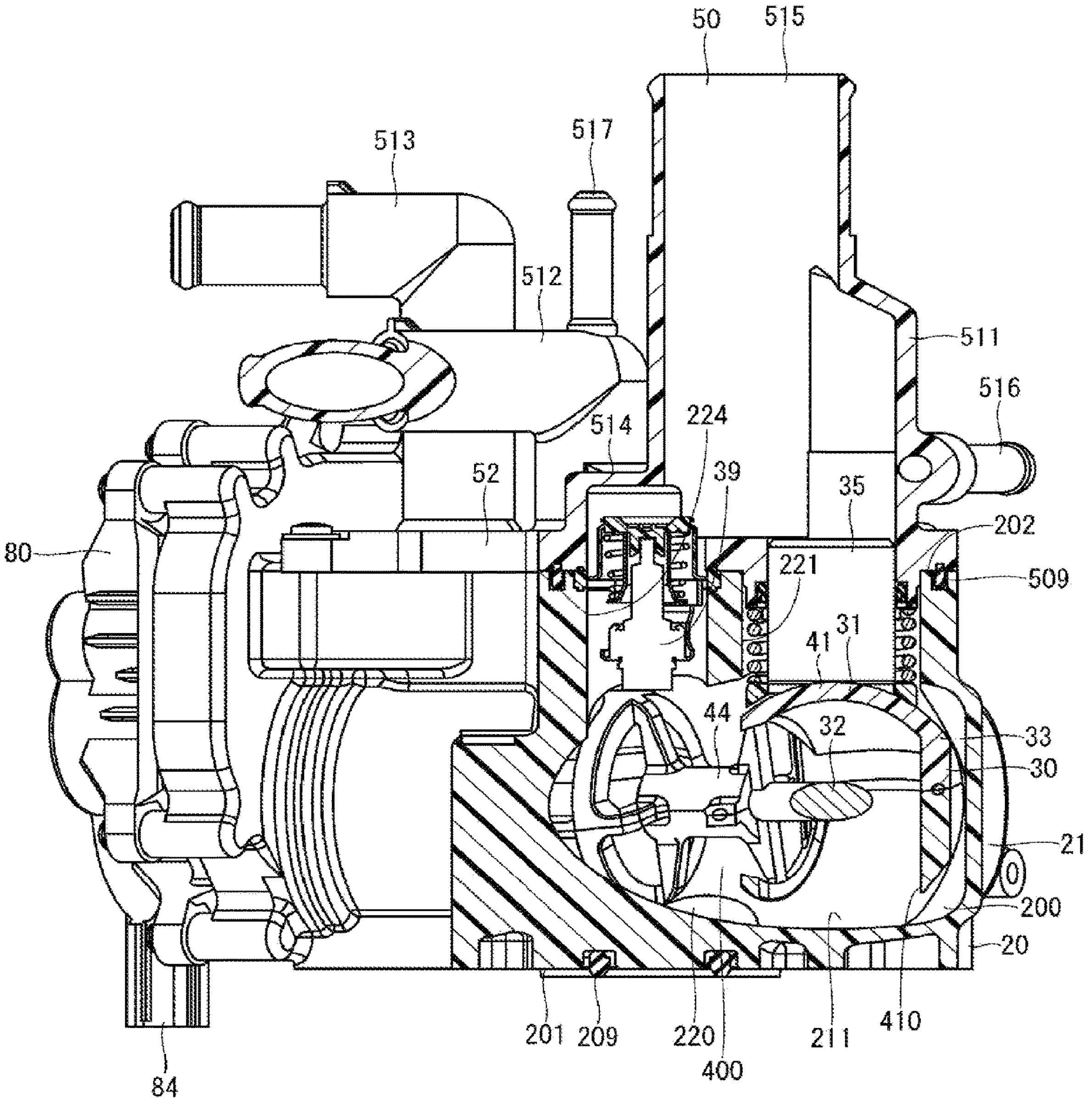
FIG. 5 is a cross-sectional perspective view illustrating the valve device of the first embodiment.

As illustrated in FIG. 5, a relief valve 39 is provided in the relief port 224. When a predetermined condition, for example, a temperature of the coolant water is equal to or higher than a predetermined temperature, the relief valve 39 is opened, and allows communication between the internal space 200 and the outside of the housing main body 21, that is, the internal space of the pipe portion 515 via the relief port 224. When the temperature of the coolant water is lower than the predetermined temperature, the relief valve 39 blocks the above-described communication.

As illustrated in FIG. 5, the relief valve 39 is provided at a position facing the inlet port 220 across the inter-valve space 400. That is, the relief valve 39 is provided at a position visible from the inlet port 220. More specifically, at least a portion of the relief valve 39 is visible when viewed in the axial direction of the inlet port 220.

Therefore, the coolant water flowing into the internal space 200 from the inlet port 220 can directly come into contact with the relief valve 39, and the relief valve 39 can be quickly opened in accordance with the temperature of the coolant water.

Figure 6:
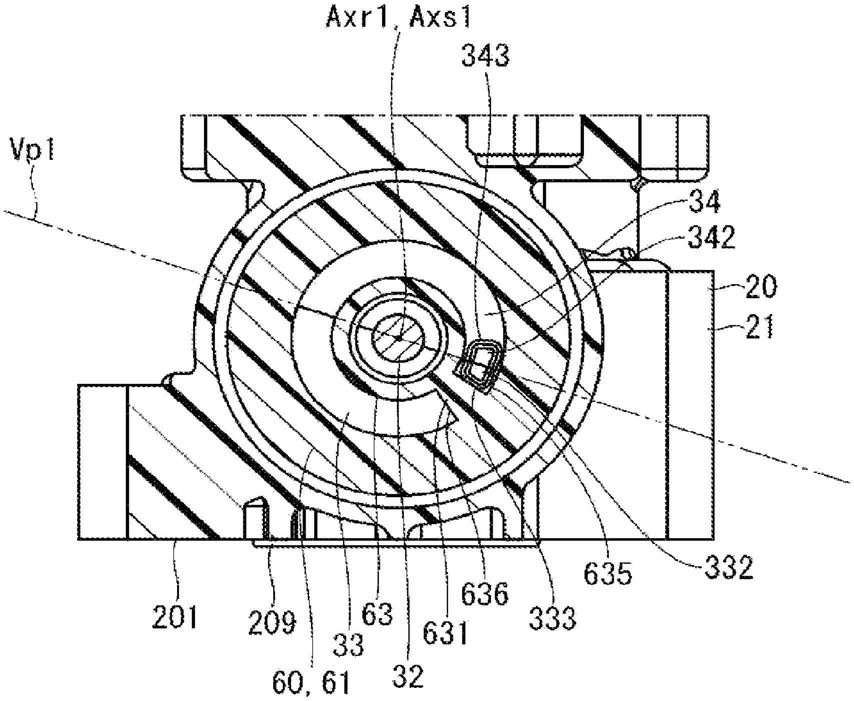
FIG. 6 is a cross-sectional view taken along line VI-VI in FIG. 3.

As illustrated in FIGS. 3 and 6, the partition wall portion 60 has a C-shaped restriction recess portion 63 recessed from the surface on the internal space 200 side of the partition wall portion main body 61 to the drive unit 70 side. A restriction portion 631 is formed between end portions in the circumferential direction of the restriction recess portion 63. As illustrated in FIGS. 3 and 6, the valve body 31 has a first restriction projection portion 332 and a second restriction projection portion 342 which extend from an end surface of the drive unit 70 side to the restriction recess portion 63 side, and each tip portion of which is located inside the restriction recess portion 63. Therefore, the rotation of the valve body 31 is restricted when the first restriction projection portion 332 comes into contact with the restriction portion 631 and when the second restriction projection portion 342 comes into contact with the restriction portion 631. That is, the valve body 31 is rotatable in a range from a position where the first restriction projection portion 332 comes into contact with the restriction portion 631 to a position where the second restriction projection portion 342 comes into contact with the restriction portion 631.

The valve device 10 is attached to the engine 2 so that the inlet port 220 is connected to an outlet of water jacket 3. Therefore, the coolant water flowing into the internal space 200 from the inlet port 220 flows into the valve body internal flow channel 300 via the inter-valve space 400. In addition, when the valve body opening portions 430, 420, and 410 overlap with the respective seal opening portions 360 due to the rotation of the valve body 31, the coolant water flows to the device 7, the heater 6, and the radiator 5 from the valve body internal flow channel 300 through the valve body opening portions 430, 420, and 410 in accordance with an overlapping area thereof.

The ECU 8 controls an operation of the motor 71, and controls a rotation position of the valve body 31. In this manner, the coolant water flows to the device 7, and the heat can be exchanged in the device 7. Accordingly, engine oil or EGR gas can be cooled to improve fuel consumption. The coolant water flows to the heater 6, and the heat can be exchanged between the air and the coolant water inside the vehicle 1. Accordingly, the inside of the vehicle 1 can be warmed.

Figure 7:
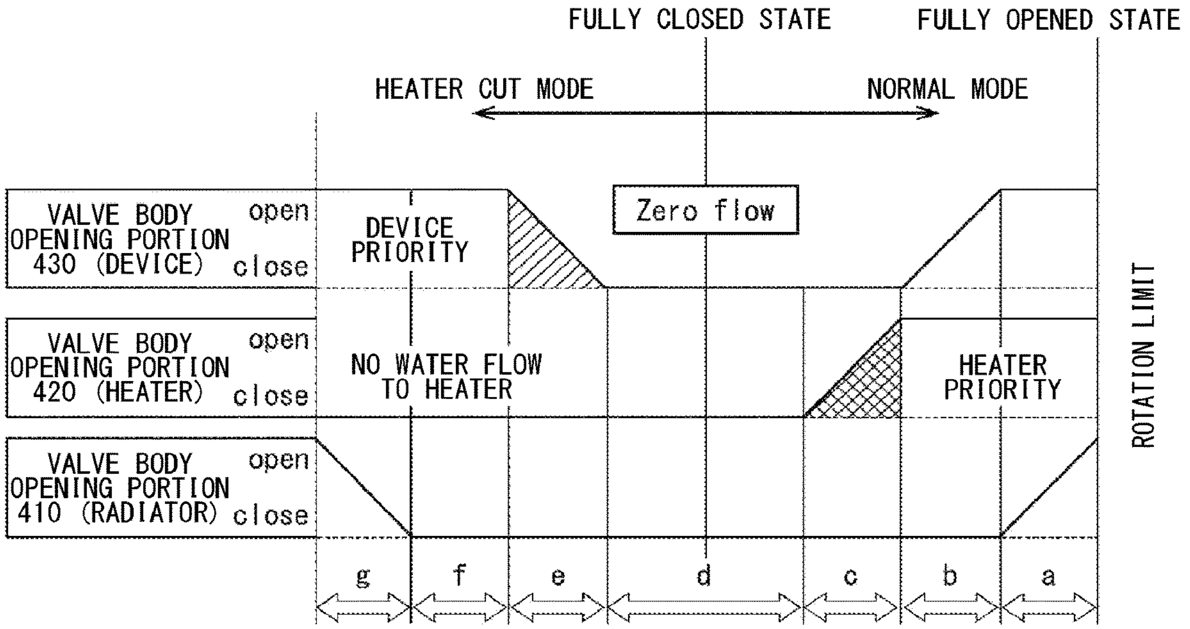
FIG. 7 is a view illustrating a relationship between a rotation position of a valve body and opening and closing states of a valve body opening portion of the valve device of the first embodiment.

FIG. 7 is a view illustrating a relationship between a rotation position (horizontal axis) of the valve body 31 and opening and closing states (vertical axis) of the valve body opening portions 430, 420, and 410, that is, an overlapping area between the valve body opening portions 430, 420, and 410 and the respective seal opening portions 360. The overlapping area between the valve body opening portions 430, 420, and 410 and the respective seal opening portions 360 corresponds to a flow channel area of the coolant water flowing to the device 7, the heater 6, and the radiator 5.

The ECU 8 rotates the valve body 31 by selecting a "normal mode" used when there is a request (heater request) to flow the coolant water to the heater 6 and a "heater cut mode" used when there is no heater request. The "normal mode" and the "heater cut mode" are partitioned from each other in a region (region d) in which all of the valve body opening portions 430, 420, and 410 are closed by the outer circumferential wall of the valve body 31 (fully closed state: refer to FIG. 3) and the flow rate of the coolant water flowing to the device 7, the heater 6, and the radiator 5 becomes zero. In the region d, the coolant water flowing to the device 7, the heater 6, and the radiator 5 is blocked.

In the "normal mode", the highest priority is given to the coolant flowing to the heater 6. In FIG. 7, when the valve body 31 is rotated in a rightward moving direction from the region d, the rotation position of the valve body 31 is shifted to a region (region c) adjacent to the region d. In the region c, the valve body opening portion 420 starts to be opened, and the coolant water starts to flow to the heater 6. When the valve body 31 is further rotated, the valve body opening portion 420 is fully opened, and the rotation position of the valve body 31 is shifted to a region (region b) adjacent to the region c. In the region b, the valve body opening portion 430 starts to be opened, and the coolant water starts to flow to the device 7. When the valve body 31 is further rotated, the valve body opening portion 430 is fully opened, and the rotation position of the valve body 31 is shifted to a region (region a) adjacent to the region b. In the region a, the valve body opening portion 410 starts to be opened, and the coolant water starts to flow to the radiator 5. When the valve body 31 is further rotated, the valve body opening portion 410 is fully opened (fully opened state). The rotation position of the valve body 31 in which the valve body opening portion 410 is fully opened corresponds to a rotation limit of the valve body 31. At this time, the first restriction projection portion 332 comes into contact with the restriction portion 631 (refer to FIG. 6).

In the "heater cut mode", the water coolant does not flow to the heater 6, and the priority is given to the coolant flowing to the device 7 rather than the radiator 5. In FIG. 7, when the valve body 31 is rotated in a leftward moving direction from the region d, the rotation position is shifted to a region (region e) adjacent to the region d. In the region e, the valve body opening portion 430 starts to be opened, and the coolant water starts to flow to the device 7. When the valve body 31 is further rotated, the valve body opening portion 430 is fully opened, and the rotation position of the valve body 31 is shifted to a region (region f) adjacent to the region e. In the region f, only the valve body opening portion 430 is opened, and the coolant water flows only to the device 7. When the valve body 31 is further rotated, the rotation position of the valve body 31 is shifted to a region (region g) adjacent to the region f. In the region g, the valve body opening portion 410 starts to be opened, and the coolant water starts to flow to the radiator 5. When the valve body 31 is further rotated, the valve body opening portion 410 is fully opened. The ECU 8 drives the valve body 31 to rotate, based on the "normal mode" and the "heater cut mode" illustrated in FIG. 7. In this manner, the ECU 8 can compatibly achieve improved fuel consumption and air conditioning performance.

Figure 2:
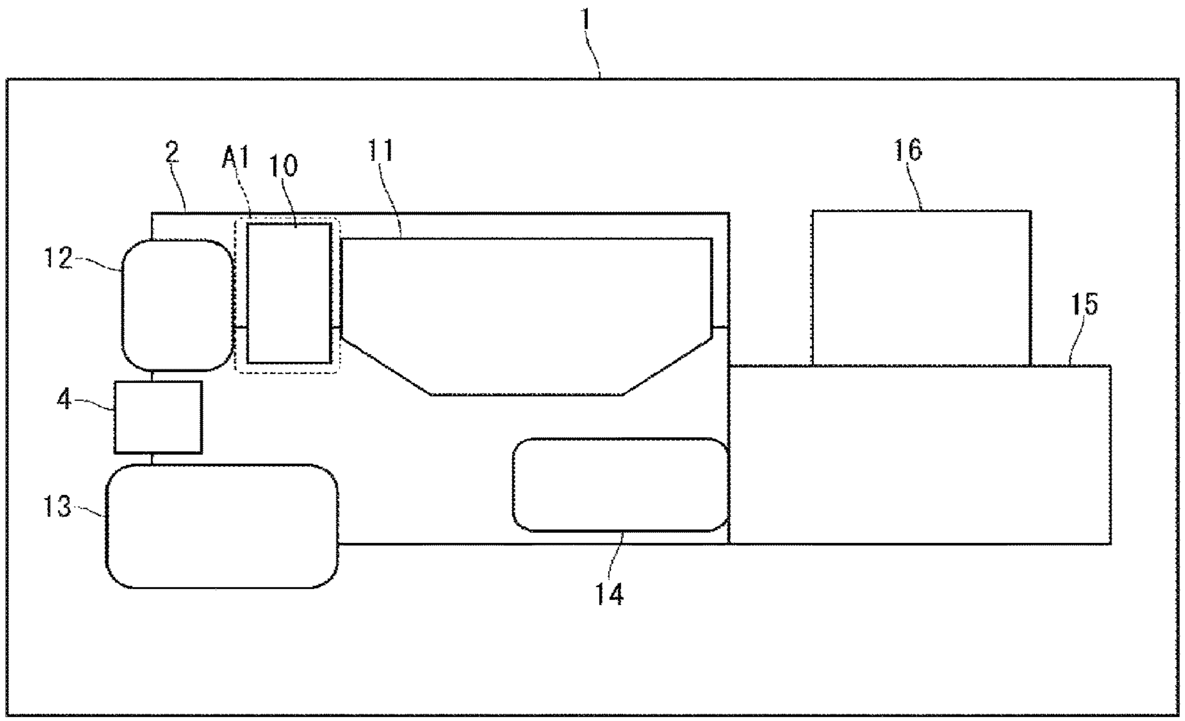
FIG. 2 is a schematic view illustrating disposition in a vehicle of the valve device of the first embodiment.

As illustrated in FIG. 2, an intake manifold 11, an alternator 12, a water pump 4, a compressor 13, a starter 14, and a transmission 15 are assembled to the engine 2. The valve device 10 is attached to engine 2 in a narrow space A1 between the alternator 12 and the intake manifold 11. The valve device 10 is attached to the engine 2 so that the drive unit 70 side faces downward in a vertical direction. Therefore, the air such as vapor generated in the internal space 200 moves upward in the vertical direction, and is discharged to the reservoir tank via the pipe portion 516.

As illustrated in FIG. 2, the narrow space A1 in which the valve device 10 is disposed is formed between the alternator 12 and the intake manifold 11 which are attached to the engine 2 to be aligned in a horizontal direction. The compressor 13 is disposed on a lower side of the narrow space A1 in the vertical direction. Therefore, the valve device 10 provided in the narrow space A1 is in a state of being surrounded by the alternator 12, the intake manifold 11, and the compressor 13.

<1-2> Housing Fastening Hole

Figure 10:
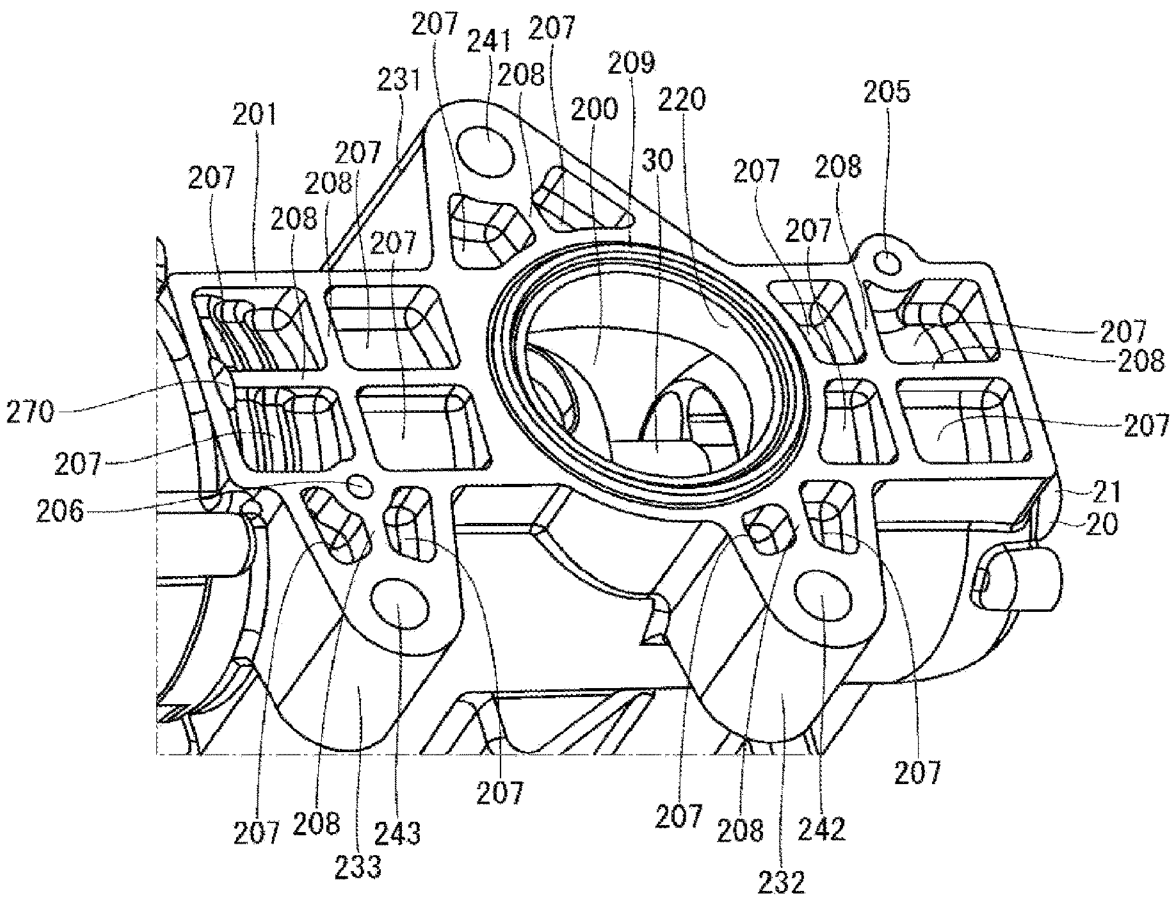
FIG. 10 is a perspective view illustrating a part of the valve device of the first embodiment.

As illustrated in FIGS. 8, 9, and 10, the housing 20 has fastening portions 231, 232, and 233 formed integrally with the housing main body 21. The fastening portions 231, 232, and 233 are formed to project in an extending direction of the attachment surface 201 from an end portion on the attachment surface 201 side of the housing main body 21. The housing 20 has fastening holes 241, 242, and 243 formed corresponding to the respective fastening portions 231, 232, and 233. The fastening holes 241, 242, and 243 respectively correspond to a "first fastening hole", a "second fastening hole", and a "third fastening hole".

A fastening member 240 is inserted into the fastening holes 241, 242, and 243 to fasten the engine 2. In this manner, the valve device 10 is attached to the engine 2. An annular rubber port seal member 209 is provided outside in the radial direction of the inlet port 220 of the attachment surface 201. In a state where the valve device 10 is attached to the engine 2, the port seal member 209 is brought into a state of being compressed by an axial force of the fastening member 240. In this manner, the port seal member 209 holds a portion between the attachment surface 201 and the engine 2 in a liquid-tight manner, and can prevent a leakage of the coolant water from the inlet port 220 via the portion between the attachment surface 201 and the engine 2.

For example, the port seal member 209 is formed of rubber such as ethylene-propylene-diene terpolymer (EPDM). Therefore, the cost can be reduced. For example, the port seal member 209 may be formed of H-NBR. In this case, oil resistance of the port seal member 209 can be improved. For example, the port seal member 209 may be formed of FKM. In this case, water resistance and heat resistance of the port seal member 209 can be improved. Therefore, the port seal member 209 is preferably adopted as an engine component which is likely to be affected by heat.

As illustrated in FIGS. 9 and 10, the fastening hole 241 is formed outside in the radial direction of the opening of the inlet port 220 on the attachment surface 201. The fastening hole 242 is formed to interpose the opening of the inlet port 220 with the fastening hole 241. The fastening hole 243 is formed on the drive unit 70 side with respect to the fastening holes 241 and 242.

<1-2>

As described above, according to the present embodiment, the valve device 10 can control the coolant water of the engine 2 of the vehicle 1, and includes the housing 20, the valve 30, the partition wall portion 60, and the drive unit 70.

The housing 20 has the housing main body 21 which internally forms the internal space 200, the attachment surface 201 formed on the outer wall of the housing main body 21 and facing the engine 2 in a state of being attached to the engine 2, the inlet port 220 which is open on the attachment surface 201 and which connects the internal space 200 and the outside of the housing main body 21 to each other, the multiple fastening portions (231, 232, and 233) formed integrally with the housing main body 21, and the multiple fastening holes (241, 242, and 243) formed corresponding to each of the multiple fastening portions.

The valve 30 has the valve body 31 which is rotatable around the rotation axis Axr1 inside the internal space 200, the valve body internal flow channel 300 formed inside the valve body 31 and capable of communicating with the inlet port 220, and the shaft 32 provided on the rotation axis Axr1.

The partition wall portion 60 partitions the internal space 200 and the outside of the housing main body 21 from each other.

The drive unit 70 is provided on the side opposite to the internal space 200 with respect to the partition wall portion 60, and can drive the valve body 31 to rotate via the shaft 32.

The housing main body 21 is fixed to the engine 2 by fastening members 240 screwed to the engine 2 through the fastening holes (241, 242, and 243).

The fastening hole includes the first fastening hole (241) formed outside in the radial direction of the opening of the inlet port 220, the second fastening hole (242) formed to interpose the opening of the inlet port 220 with the first fastening hole, and the third fastening hole (243) formed on the drive unit 70 side with respect to the first fastening hole and the second fastening hole.

As in the third fastening hole (243), the first fastening hole (241) is formed on the drive unit 70 side from the center of the inlet port 220.

Therefore, in a case where the port seal member 209 made of an annular elastic member is provided around the inlet port 220, when the housing main body 21 is fixed to the engine 2 by fastening member 240 passing through the fastening holes 241 and fastening holes 242, the port seal member 209 can be compressed in a balanced manner. In this manner, a sealing property around the inlet port 220 can be effectively ensured.

The fastening portion 233 is fixed to the engine 2 by the fastening member 240 passing through the fastening hole 243. Accordingly, it is possible to prevent the influence of vibrations of the engine 2 on the drive unit 70.

<1-2-1>

A center Cp1 of the opening of the inlet port 220 is located on a first straight line Li1 which is a straight line connecting the fastening hole 241 and the fastening hole 242 to each other.

Therefore, the port seal member 209 can be compressed in the more balanced manner.

According to the present embodiment, the first straight line Li1 connects the center of the fastening hole 241 and the center of the fastening hole 242 to each other. According to another embodiments, the first straight line Li1 may connect any desired point other than the center of the fastening hole 241 and any desired point other than the center of the fastening hole 242 to each other.

<1-2-2>

A distance between the center Cp1 of the opening of the inlet port 220 and the fastening hole 241 is the same as a distance between the center Cp1 of the opening of the inlet port 220 and the fastening hole 242.

The fastening hole 241 and the fastening hole 242 face each other across the inlet port 220.

Therefore, the port seal member 209 can be compressed in the more balanced manner.

<1-2-3>

The distance between the fastening hole 243 and the drive unit 70 is shorter than the distance between the fastening hole 243 and the center Cp1 of the opening of the inlet port 220.

Therefore, it is possible to further prevent the influence of the vibrations of the engine 2 on the drive unit 70.

<1-2-4>

The fastening hole 243 is formed so that the center is located on the drive unit 70 side with respect to a virtual plane Vp2 passing through the center of the outlet port 223 and orthogonal to the rotation axis Axr1 (refer to FIG. 8). When viewed in the axial direction of the fastening hole 243, the motor 71 is provided so that a center of gravity Cg1 is located on the fastening hole 243 side with respect to the rotation axis Axr1 (refer to FIGS. 8 and 9).

Therefore, it is possible to further prevent the influence of the vibrations of the engine 2 on the drive unit 70.

<1-3>

The fastening hole 241 and the fastening hole 242 are formed to be point-symmetrical with respect to the center Cp1 of the opening of the inlet port 220.

The fastening hole 241 and the fastening hole 242 are concentric with each other.

Therefore, the port seal member 209 can be compressed in the more balanced manner.

<1-3-1>

The fastening hole 241 and the fastening hole 242 which are point-symmetrical with respect to the center Cp1 of the opening of the inlet port 220 are formed so that a straight line perpendicular to an opening surface of the inlet port 220 and passing through the center Cp1 of the opening of the inlet port 220 passes through the rotation axis Axr1.

The fastening hole 241 and the fastening hole 242 which are point-symmetrical with respect to the center Cp1 of the opening of the inlet port 220 are formed so that "the straight line perpendicular to the opening surface of the inlet port 220 and passing through the center Cp1 of the opening of the inlet port 220" passes through the rotation axis Axr1.

Therefore, the port seal member 209 can be compressed in the more balanced manner.

<1-4>

The housing 20 has positioning portions 205 and 206 formed on the attachment surface 201 and capable of positioning the housing main body 21 by engaging with the other member. The positioning portions 205 and 206 are formed to be recessed in a circular shape from the attachment surface 201. The positioning portions 205 and 206 respectively correspond to a "first positioning portion" and a "second positioning portion". In addition, for example, the other member corresponds to a pallet used in a manufacturing process of the valve device 10, or the engine 2 serving as an attachment target of the valve device 10. The positioning portions 205 and 206 are engaged with projections formed on the pallet or the engine 2. In this manner, the housing main body 21 can be located with respect to the pallet or the engine 2.

The positioning portion 205 is formed outside in the radial direction of the opening of the inlet port 220. The positioning portion 206 is formed to interpose the opening of the inlet port 220 with the positioning portion 205.

Therefore, machining accuracy can be improved by accurately positioning the housing main body 21 in the manufacturing process. In addition, when attached to the engine 2, the housing main body 21 can be accurately located, and the coolant water supplied by the valve device 10 can be controlled with high accuracy. In addition, after attached to the engine 2, the position of the housing main body 21 with respect to the engine 2 can be stabilized, and the sealing property of the port seal member 209 can be improved.

<1-4-1>

The positioning portion 205 and the positioning portion 206, are formed so that the second straight line Li2 which is the straight line connecting the positioning portion 205 and the positioning portion 206 to each other is orthogonal to the first straight line Li1 connecting the fastening hole 241 and the fastening hole 242 to each other.

Therefore, the position of the housing main body 21 with respect to the engine 2 can be further stabilized.

<1-4-2>

The center of the first straight line Li1 and the center of the second straight line Li2 coincide with each other.

Therefore, the position of the housing main body 21 with respect to the engine 2 can be further stabilized.

As illustrated in FIG. 9, the attachment surface 201 is formed on a surface opposite to the housing main body 21 and the pipe member 50 of the fastening portion 231 to 233, and includes a substantially rectangular portion, three portions extending in the width direction from the rectangular portion, and a curved portion along an outer periphery of the inlet port 220. The positioning portions 205 and 206 are formed in a substantially rectangular portion of the attachment surface 201. The positioning portions 205 and 206 are stabilized when a distance therebetween is secured. Therefore, the positioning portions 205 and 206 are provided on an outer peripheral portion of the substantially rectangular portion of the attachment surface 201.

<1-5>

The housing 20 has an attachment surface recess portion 207 recessed from the attachment surface 201 to a side opposite to the engine 2.

Therefore, the heat of the engine 2 is insulated by the attachment surface recess portion 207, and it is possible to prevent the influence of the heat transferred from the engine 2 on the drive unit 70.

<1-5-1>

The multiple attachment surface recess portions 207 are formed, and an inter-recess portion rib 208 is formed between the multiple attachment surface recess portions 207.

Therefore, while the heat of the engine 2 is insulated by the attachment surface recess portion 207, a contact area between the attachment surface 201 and the engine 2 can be secured.

As illustrated in FIG. 9, the attachment surface recess portion 207 has a rectangular recess portion 275 having a rectangular shape, and a trapezoidal recess portion 276 having a substantially trapezoidal shape. The inter-recess portion rib 208 has a short direction rib 285 extending in a short direction of the substantially rectangular portion of the attachment surface 201, and a longitudinal direction rib 286 extending in the longitudinal direction.

Two trapezoidal recess portions 276 are formed to be aligned in the short direction on the side opposite to the drive unit 70 with respect to the inlet port 220 of the substantially rectangular portion of the attachment surface 201. Two rectangular recess portions 275 are formed to be aligned in the short direction on the side opposite to the inlet port 220 with respect to the trapezoidal recess portion 276. The short direction rib 285 is formed between the rectangular recess portion 275 and the trapezoidal recess portion 276. The longitudinal direction rib 286 is formed between the two rectangular recess portions 275 and between the two trapezoidal recess portions 276. The trapezoidal recess portion 276 is smaller than the rectangular recess portion 275.

Two rectangular recess portions 275 are formed to be aligned in the short direction on the drive unit 70 side with respect to the inlet port 220 of the substantially rectangular portion of the attachment surface 201. Two rectangular recess portions 275 are formed to be aligned in the short direction on the side opposite to the inlet port 220 with respect to the rectangular recess portion 275. The short direction rib 285 is formed between the rectangular recess portions 275 aligned in the longitudinal direction. The longitudinal direction rib 286 is formed between the rectangular recess portions 275 aligned in the short direction.

The distance between the short direction rib 285 and the inlet port 220 which are formed on the side opposite to the drive unit 70 with respect to the inlet port 220 of the substantially rectangular portion of the attachment surface 201 is shorter than the distance between the short direction rib 285 and the inlet port 220 which are formed on the drive unit 70 side with respect to the inlet port 220 of the substantially rectangular portion of the attachment surface 201.

The trapezoidal recess portions 276 are formed two by two on the attachment surface 201 of the fastening portions 231 to 233. The short direction rib 285 is formed between the two trapezoidal recess portions 276 in the fastening portions 231 to 233.

An outer peripheral rib 287 surrounding the attachment surface recess portion 207 is formed in an outer edge portion of the substantially rectangular portion of the attachment surface 201.

The outer peripheral rib 287 surrounding the attachment surface recess portion 207 is formed in the outer edge portion of the attachment surface 201 of the fastening portions 231 to 233.

The attachment surface recess portions 207 are formed independently of each other, and robustness against the vibrations of the engine 2 can be improved by the inter-recess portion rib 208 between the attachment surface recess portions 207, and the outer peripheral rib 287.

The longitudinal direction rib 286 extends in the direction of the rotation axis Axr1. That is, when viewed in the axial direction of the inlet port 220, the longitudinal direction rib 286 and the rotation axis Axr1 overlap each other (refer to FIG. 9). Therefore, deformation in the direction perpendicular to the attachment surface 201 can be prevented. When the deformation occurs, a component inside the valve device 10 is displaced, the coolant water leakage inside and outside the valve device 10 occurs, thereby causing a possibility that a function of the valve device 10 may be degraded. The present embodiment can prevent the problem.

According to the present embodiment, a size ratio of the attachment surface recess portion 207 to the attachment surface 201 is 50% to 95%.

The attachment surface recess portion 207 is provided on the side opposite to the internal space 200 where the valve 30 is provided. In this manner, a wall surface having no space where the valve 30 is provided has a uniform thickness. Accordingly, space accuracy of the internal space 200 is improved. When the space accuracy of the internal space 200 is satisfactory, wall surface resistance can be reduced, and pressure loss can be reduced.

<1-1-5-1>

The housing main body 21 is formed of a polyphenylene sulfide resin (PPS) containing a filler. More specifically, the housing main body 21 is formed of "PPS-GF50" (PPS: 50%, and glass fiber: 50%). In addition to the glass fiber, carbon fiber, silica, talc, or silicon can be adopted as the filler.

Therefore, heat resistance, water absorption resistance, strength, and dimensional accuracy of the housing main body 21 can be improved.

An occupation ratio of the glass to the resin of the housing main body 21 may fall in a range of 20% to 80%.

The valve body 31, the housing main body 21, and the partition wall portion 60 are all formed of PPS.

The valve body 31, the housing main body 21, and the partition wall portion 60 are formed of the same resin material. In this manner, a linear expansion difference can be eliminated, and rubbing can be reduced. When there is the linear expansion difference between respective members, there is a possibility that the coolant water leakage may occur. The present embodiment can prevent the problem.

The valve body 31, the housing main body 21, and the partition wall portion 60 are formed of PPS. Accordingly, strength, heat resistance, and chemical resistance of the valve body 31, the housing main body 21, and the partition wall portion 60 can be improved.

For example, the pipe member 50 is formed of polyphthalamide (PPA). In this manner, the pipe member 50 can be formed by forcible pulling.

The linear expansion coefficient of the valve body 31, the housing main body 21, and the partition wall portion 60 which are formed of PPS is lower than the linear expansion coefficient of the pipe member 50 which is formed of PPA. Therefore, it is possible to reduce the distortion or the influence on the assembly when the heat is applied. According to another embodiment, the valve body 31, the housing main body 21, and the partition wall portion 60 may be formed of PPA.

<1-6>

As illustrated in FIG. 9, the fastening portion 233 having the fastening hole 243 serving as the third fastening hole is formed at a position adjacent to the partition wall portion 60.

Therefore, the vibrations of the drive unit 70 can be reduced.

<1-7>

As illustrated in FIG. 9, the fastening portions 231, 232, and 233 have the attachment surface 201 on the engine 2 side, and have the attachment surface recess portion 207 recessed from the attachment surface 201 to the side opposite to the engine 2.

Therefore, the fastening portions 231, 232, and 233 can have the uniform thickness. As a result, voids can be prevented from being generated, and it is possible to prevent a decrease in resin strength around collars provided in the fastening holes 241, 242, and 243 of the fastening portions 231, 232, and 233. Furthermore, even when the thin wall around the collar is cracked earlier due to the vibrations from the engine 2, the attachment surface recess portion 207 is present. As a result, it is possible to prevent a possibility that the crack may reach the internal space 200.

<1-8>

As illustrated in FIG. 9, the housing 20 has the positioning portions 205 and 206 formed on the attachment surface 201 and capable of positioning the housing main body 21 by engaging with the other member, and the inter-recess portion rib 208 formed with the multiple attachment surface recess portions 207. The positioning portions 205 and 206 are formed in a lattice point 204 of the inter-recess portion rib 208.

Therefore, the housing main body 21 can be stably located.

<1-9>

As illustrated in FIG. 9, the housing 20 has the positioning portions 205 and 206 formed on the attachment surface 201 and capable of positioning the housing main body 21 by engaging with the other member. In the fastening portions, one (231) is formed on one side in the width direction of the housing main body 21, and two (232 and 233) are formed on the other side in the width direction of the housing main body 21. The positioning portion 205 is formed on one side in the width direction of the housing main body 21 where one fastening portion (231) is formed. The width direction of the housing main body 21 is a direction corresponding to the short direction of the housing main body 21 when the housing main body 21 is viewed in the direction perpendicular to the attachment surface 201.

Therefore, the fourth positioning portion 205 is present on the side where only one of the three fastening portions is present. Therefore, it is possible to ensure a balance in both rightward and leftward directions (width direction) of the housing main body 21.

<1-10>

As illustrated in FIG. 9, the inlet port 220 is formed between the fastening portion 233 farthest away from the inlet port 220 out of the multiple fastening portions and the positioning portion 205.

Therefore, it is possible to further ensure the balance in both rightward and leftward directions (width direction) of the housing main body 21.

<2-1> Drive Unit S/A

Figure 11:
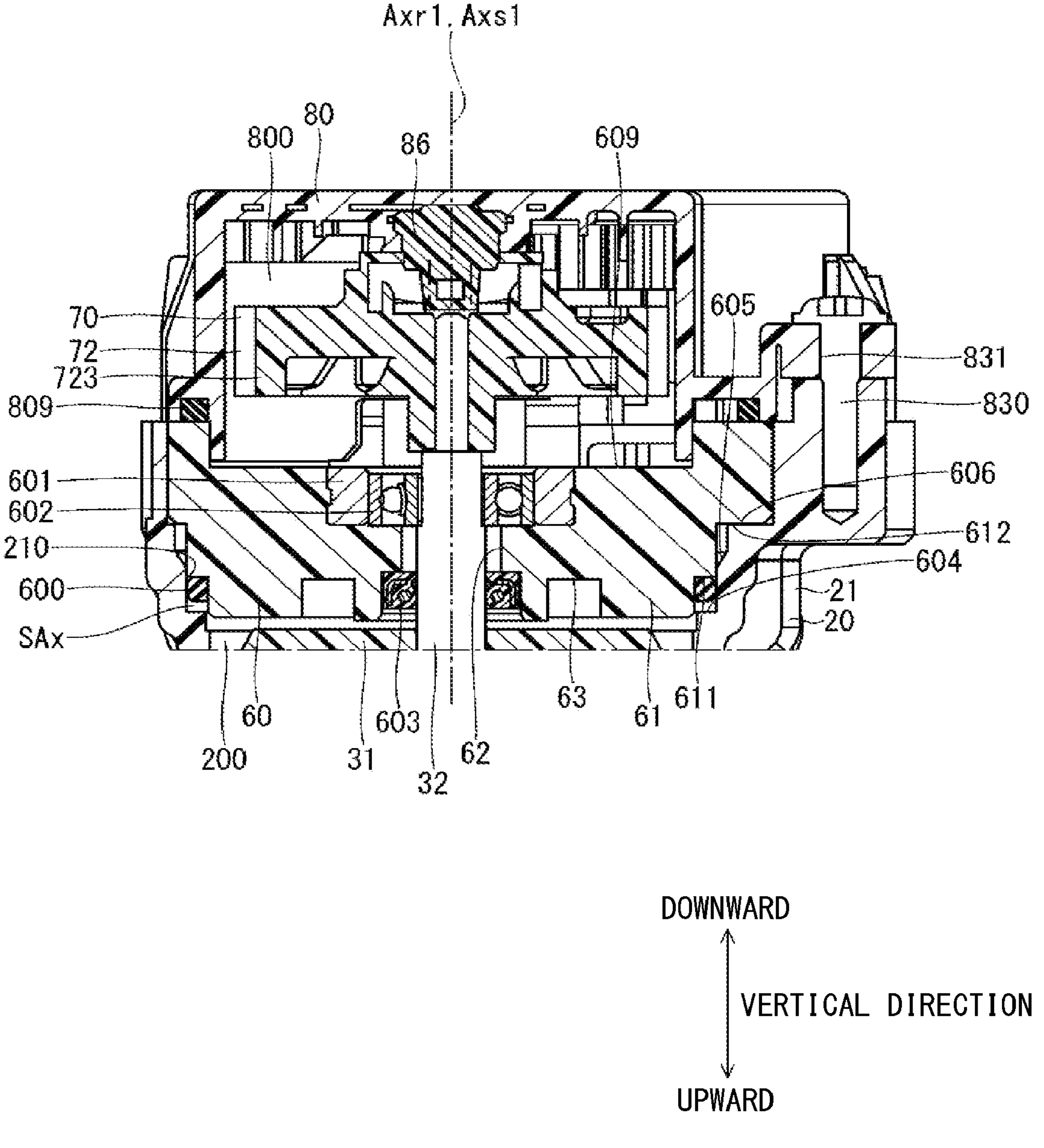
FIG. 11 is a cross-sectional view illustrating the vicinity of a drive unit of the valve device of the first embodiment.

As illustrated in FIG. 11, the partition wall portion 60 is provided in the housing opening portion 210 to partition the internal space 200 and the outside of the housing main body 21 from each other, and can bear the shaft 32. The drive unit cover 80 is provided on the side opposite to the internal space 200 with respect to the partition wall portion 60, and forms the drive unit space 800 with the partition wall portion 60. The drive unit 70 is provided in the drive unit space 800, and can drive the valve body 31 to rotate via the shaft 32.

<2-1>

As described above, according to the present embodiment, the valve device 10 can control the coolant water of the engine 2 of the vehicle 1, and includes the housing 20, the valve 30, the partition wall portion 60, the drive unit cover 80, and the drive unit 70.

The housing 20 has the housing main body 21 which internally forms the internal space 200, the ports (220, 221, 222, and 223) which connect the internal space 200 and the outside of the housing main body 21 to each other, and the housing opening portion 210 which connects the internal space 200 and the outside of the housing main body 21 to each other.

The valve 30 has the valve body 31 rotatable around the rotation axis Axr1 inside the internal space 200, the valve body internal flow channel 300 formed inside the valve body 31, the valve body opening portions (410, 420, and 430) which connect the valve body internal flow channel 300 and the outer side of the valve body 31 to each other, and the shaft 32 provided on the rotation axis Axr1, and can change the communication state between the valve body internal flow channel 300 and the ports (220, 221, 222, and 223) via the valve body opening portions (410, 420, and 430) in accordance with the rotation position of the valve body 31.

The partition wall portion 60 is provided in the housing opening portion 210 to partition the internal space 200 and the outside of the housing main body 21 from each other, and can bear the shaft 32.

The drive unit cover 80 is provided on the side opposite to the internal space 200 with respect to the partition wall portion 60, and forms the drive unit space 800 with the partition wall portion 60.

The drive unit 70 is provided in the drive unit space 800, and can drive the valve body 31 to rotate via the shaft 32.

In the present embodiment, a member such as a joint is unnecessary between the drive unit 70 and the shaft 32. Therefore, the configuration around the drive unit 70 can be simplified.

In addition, as a member for bearing the shaft 32 and a member for accommodating the drive unit 70, the partition wall portion 60 is shared in use. Accordingly, it is possible to improve coaxial accuracy between the drive unit 70 and the valve body 31. The number of members can be reduced.

As illustrated in FIG. 11, the inner portion of the restriction recess portion 63 on the surface of the internal space 200 side of the partition wall portion main body 61 is located on the internal space 200 side slightly from the outer portion of the restriction recess portion 63.

The inner peripheral portion of the housing main body 21 facing the partition wall portion main body 61 has a step shape.

A gap between the partition wall portion main body 61 having the annular seal member 600 and the housing opening portion 210 is formed in a tapered shape. In this manner, the annular seal member 600 can be easily provided in the gap. When engine oil enters the gap, the annular seal member 600 swells, and is cut, thereby causing a possibility that the coolant water may leak. In addition, when the annular seal member 600 is bitten, the annular seal member 600 is cut, and the coolant water leaks, thereby causing a possibility that the engine oil enters the inside of the gap from the outside. According to the present embodiment, this problem can be prevented.

<2-1-1>

The valve device 10 further includes the annular seal member 600 which is provided between the housing opening portion 210 and the partition wall portion 60, and can hold the portion between the housing opening portion 210 and the partition wall portion 60 in a liquid-tight manner. For example, the annular seal member 600 is formed of an elastic member such as rubber in an annular shape.

The inner wall of the housing opening portion 210 is formed in a cylindrical shape. The partition wall portion 60 has the partition wall portion main body 61 located inside the housing opening portion 210 and having the outer wall formed in a cylindrical shape. The annular seal member 600 is provided between the housing opening portion 210 and the partition wall portion main body 61. A difference between the inner diameter of the housing opening portion 210 and the outer diameter of the partition wall portion main body 61 is smaller than a difference between the inner diameter and the outer diameter of the annular seal member 600 in a free state. Therefore, the annular seal member 600 is compressed in the radial direction between the housing opening portion 210 and the partition wall portion main body 61.

As illustrated in FIG. 11, annular opening step surfaces 604, 605, and 606 are formed in the housing opening portion 210. The opening step surfaces 604, 605, and 606 are formed in this order toward the drive unit 70 side from the internal space 200 side in the direction of the rotation axis Axr1. The opening step surfaces 604 and 606 are formed in an annular shape planar shape. The opening step surface 605 is formed in a tapered shape to be closer to the rotation axis Axr1 toward the internal space 200 side from the drive unit 70 side.

Annular partition wall step surfaces 611 and 612 are formed in an outer edge portion of the partition wall portion main body 61. The partition wall step surface 611 is formed in an annular shape planar shape s to face the opening step surface 604. The partition wall step surface 612 is formed in an annular shape planar shape to face the opening step surfaces 605 and 606.

The annular seal member 600 is provided between the opening step surface 604 and the partition wall step surface 611.

<2-2>

The annular seal member 600 is compressed in the radial direction between the housing opening portion 210 and the partition wall portion 60.

Therefore, the shaft 32 is aligned by the annular seal member 600, and positional accuracy of the valve body 31 and detection accuracy of a rotation angle sensor 86 (to be described later) can be improved.

The center of the inner circumferential wall and the center of the outer circumferential wall of the annular seal member 600 coincide with each other. Therefore, the shaft 32 can be effectively aligned by the annular seal member 600.

In addition, it is possible to reduce a force applied in the axial direction of a fixing member 830 (to be described later), and it is possible to reduce the number of fixing members 830.

When a water pressure is applied, a force is applied in a direction in which the partition wall portion main body 61 is pressed up, the drive unit 70 is pressed up. As a result, the fixing member 830 is pressed up. However, according to the present embodiment, the annular seal brings the annular seal member 600 into a tightened state, and the partition wall portion main body 61 is less likely to move due to sliding resistance. Therefore, it is possible to reduce the force applied in the axial direction of the fixing member 830.

<2-2-1>

An axial gap SAx is formed with the housing main body 21 in the axial direction of the annular seal member 600.

Therefore, the annular seal member 600 can be more effectively compressed in the radial direction between the housing opening portion 210 and the partition wall portion 60.

When the axial gap SAx is small, the annular seal member 600 is vertically elongated. In this case, a force is generated in the axial direction of the annular seal member 600. In order to prevent this case, the force needs to be generated only in the radial direction of the annular seal member 600. As a relationship, according to the present embodiment, a cross section taken along a plane including the axis of the annular seal member 600 is set to satisfy the cross-sectional area of the annular seal member 600/the cross-sectional area of the axial gap SAx<1.

<2-3>

The valve device 10 further includes the fixing member 830 that can fix the housing main body 21 and the drive unit cover 80 in a state where the partition wall portion 60 is interposed between the housing main body 21 and the drive unit cover 80.

Therefore, the position of the partition wall portion 60 can be stabilized, and axial accuracy of the valve body 31 can be improved.

According to the present embodiment, an end portion of the shaft 32 on a side opposite to the drive unit 70 is a sliding bearing (refer to FIG. 3). Sliding resistance increases when the axial accuracy is poor. On the other hand, the valve seal 36 is pressed against the valve body 31 by the spring 372. However, when the axial accuracy is satisfactory, it is possible to reduce the force of pressing the valve seal 36 by the spring 372. Furthermore, when the axis is displaced, the coolant water leaks between the valve body 31 and the valve seal 36, and warming-up is delayed, thereby causing a possibility that fuel consumption may be degraded. However, when the axial accuracy is satisfactory, this problem can be prevented.

The partition wall portion 60 and the drive unit cover 80 can be assembled at a time to the housing main body 21. Accordingly, assembly work can be simplified. In addition, it is possible to reduce the number of fixing members.

For example, the fixing member 830 is a screw, and passes through a cover fastening hole 831 formed in the drive unit cover 80, and is screwed into the fastening hole of the housing main body 21. In this manner, the drive unit cover 80 is fixed to the housing main body 21 in a state where the partition wall portion 60 is interposed with the housing main body 21. The multiple cover fastening holes are formed in the drive unit cover 80, the fixing member 830 is inserted into each of the multiple cover fastening holes. An annular rubber cover seal member 809 is provided between the outer edge portion of the drive unit cover 80 and the partition wall portion 60. In this manner, the drive unit space 800 is held in an airtight and liquid-tight manner.

<2-4>

As illustrated in FIG. 11, the partition wall portion 60 has a shaft insertion hole 62 into which one end of the shaft 32 can be inserted. The valve device 10 includes a metal ring 601 which is insert-molded into the partition wall portion 60 in the shaft insertion hole 62. The metal ring 601 is formed of metal in an annular shape, and is provided coaxially with the shaft insertion hole 62. The valve device 10 includes a bearing portion 602 provided inside the metal ring 601 to bear one end of the shaft 32. For example, the bearing portion 602 is a ball bearing, and is press-fitted into the metal ring 601.

Therefore, it is possible to prevent a possibility that the bearing portion 602 may not be held due to the linear expansion difference between the resin (partition wall portion 60) and the metal (bearing portion 602) or resin deterioration. Accordingly, bearing accuracy of the shaft 32 can be maintained.

<2-5>

Figure 12:
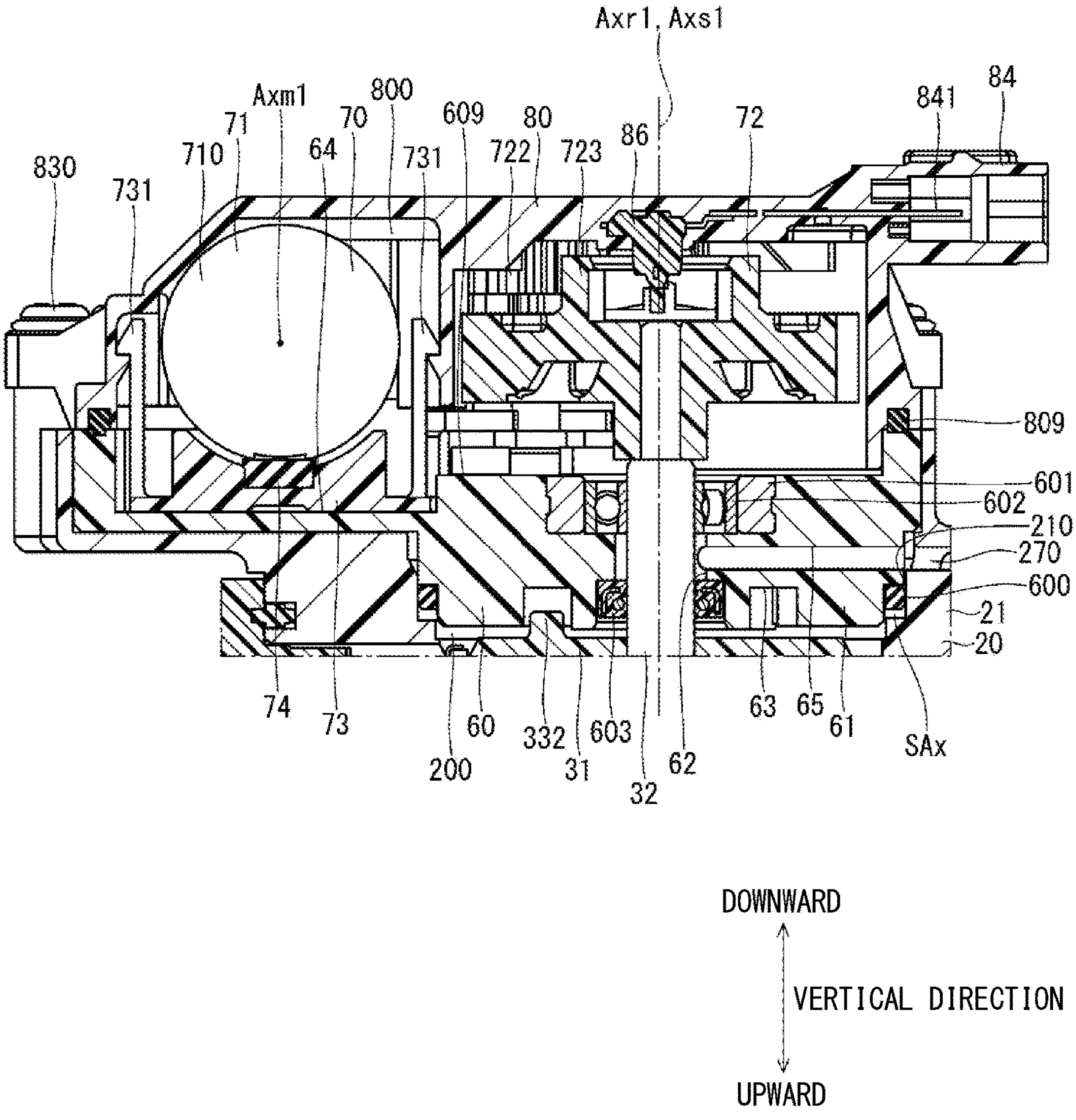
FIG. 12 is a cross-sectional view illustrating the vicinity of the drive unit of the valve device of the first embodiment.

As illustrated in FIG. 12, the partition wall portion 60 has a partition wall recess portion 64 recessed, in a direction away from the drive unit cover 80, from a surface 609 of the partition wall portion 60 that faces the drive unit cover 80 to the side opposite to the drive unit cover 80, outside in the radial direction of the metal ring 601. The surface 609 is a planar portion formed on the same plane as an end surface on the drive unit cover 80 side of the metal ring 601 on the drive unit cover 80 side of the partition wall portion 60.

Figure 13:
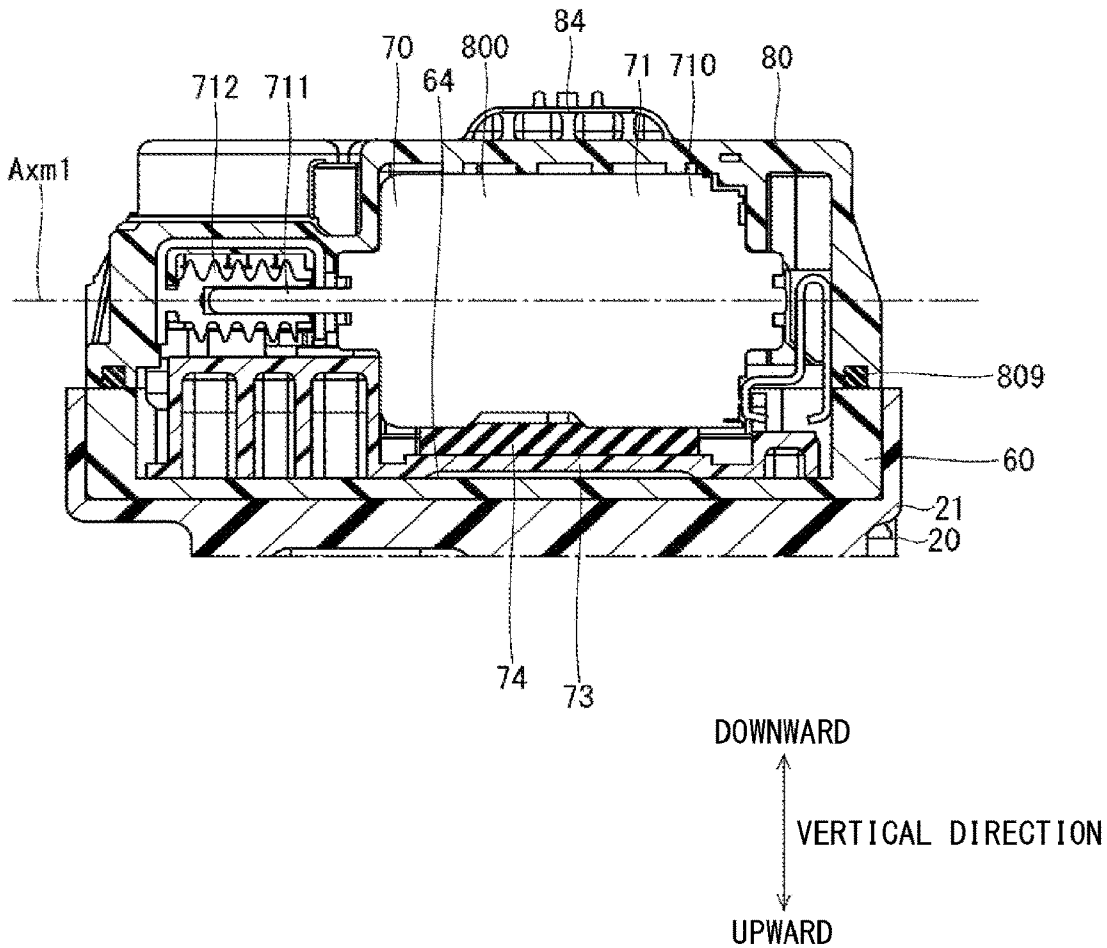
FIG. 13 is a cross-sectional view illustrating the vicinity of the drive unit of the valve device of the first embodiment.
Figure 14:
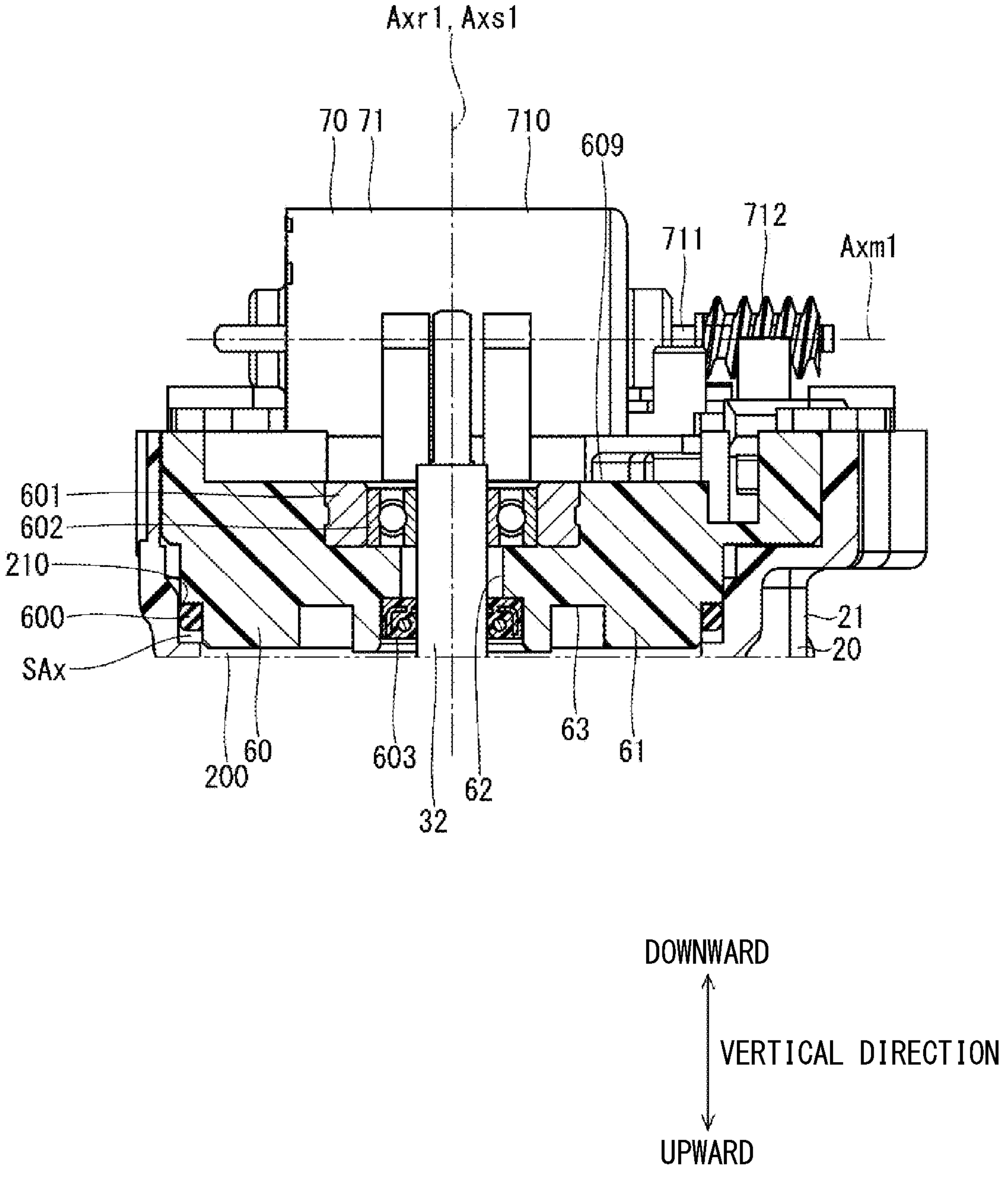
FIG. 14 is a cross-sectional view illustrating the vicinity of the drive unit of the valve device of the first embodiment.

FIG. 11 is a view illustrating a cross section taken along "a plane including the rotation axis Axr1". FIG. 12 is a view illustrating a cross section taken along "a plane including the rotation axis Axr1 and perpendicular to an axis Axm1 of the motor 71". FIG. 13 is a view illustrating a cross section taken along "a plane including the axis Axm1 of the motor 71 and parallel to the rotation axis Axr1". FIG. 14 is a view illustrating a cross section taken along "a plane including the rotation axis Axr1 and parallel to the axis Axm1 of the motor 71".

Therefore, it is possible to prevent sink or warpage during integral molding of the partition wall portion 60, and deformation caused by press-fitting of the bearing portion 602. In this manner, dimensional accuracy of the outer peripheral portion of the partition wall portion 60 can be improved, and the axial accuracy of the valve body 31 can be improved.

<2-6>

As illustrated in FIG. 12, the drive unit 70 has the motor 71 which can drive the shaft 32 to rotate.

<2-7>

As illustrated in FIGS. 12 and 13, the valve device 10 further includes an elastic member 74 provided in a state of being compressed between the motor 71 and the partition wall portion 60. For example, the elastic member 74 is formed of rubber.

Therefore, it is possible to damp the vibrations acting on the motor 71 by using a damper effect of the elastic member 74. It is possible to prevent a contact failure, and it is possible to satisfactorily maintain an operation state of the motor 71.

Due to the vibrations of the motor 71, the partition wall portion 60 moves, and sliding resistance is generated, thereby causing a possibility that the fuel consumption may be degraded. In addition, due to the vibrations of the motor 71, an output of the rotation angle sensor 86 (to be described later) deviates, thereby causing a possibility that the fuel consumption may be degraded. According to the present embodiment, the vibrations of the motor 71 are prevented by the elastic member 74. Therefore, it is possible to prevent the occurrence of the above-described problems.

In addition, assembly work of the motor 71 can be simplified, and the number of components can be reduced.

As illustrated in FIG. 12, the elastic member 74 is provided between the partition wall portion main body 61 and the motor 71, and biases the partition wall portion main body 61 to the internal space 200 side.

Therefore, the elastic member 74 can prevent a possibility that the partition wall portion main body 61 may float due to the applied water pressure of the coolant water on the internal space 200 side. As a result, it is possible to prevent the leakage of the coolant water, and it is possible to prevent overheating of the vehicle 1 which is caused by the leakage.

<2-8>

Figure 15:
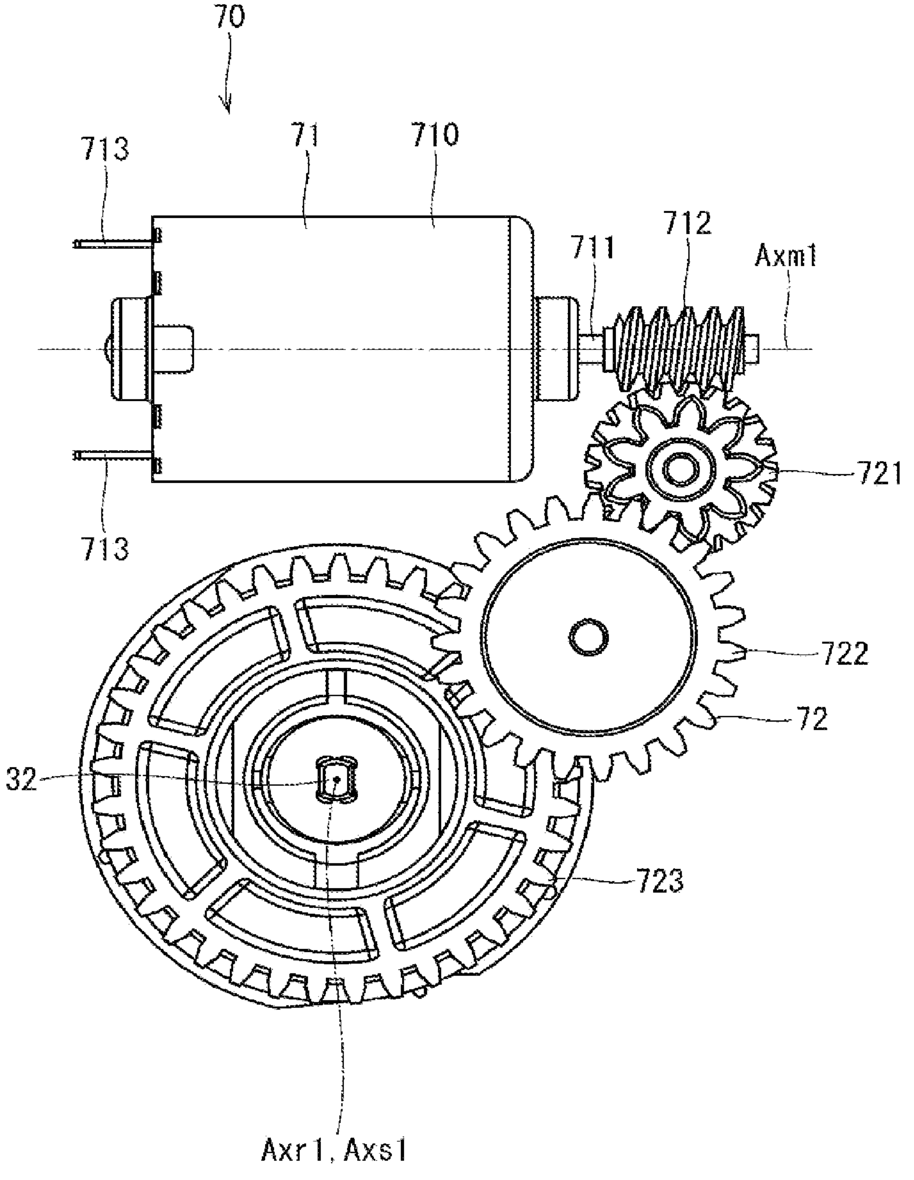
FIG. 15 is a plan view illustrating the drive unit of the valve device of the first embodiment.

As illustrated in FIGS. 14 and 15, the motor 71 is provided so that the axis Axm1 is orthogonal to the axis Axs1 of the shaft 32. More precisely, the axis Axm1 and the axis Axs1 are orthogonal to each other in a relationship of torsion.

Therefore, the pipe member 50 can be more freely mounted.

In addition, a body size in the width direction of the housing main body 21 can be reduced, and the valve device 10 can be mounted in a narrow space.

In addition, electric components around the motor 71 can be located away from the coolant water (internal space 200), and it is possible to reduce possibilities of short-circuit resulting from wetting.

The motor 71 can be located away from the coolant water (internal space 200). Therefore, it is possible to prevent heat damage to the motor 71.

<2-9>

Figure 16:
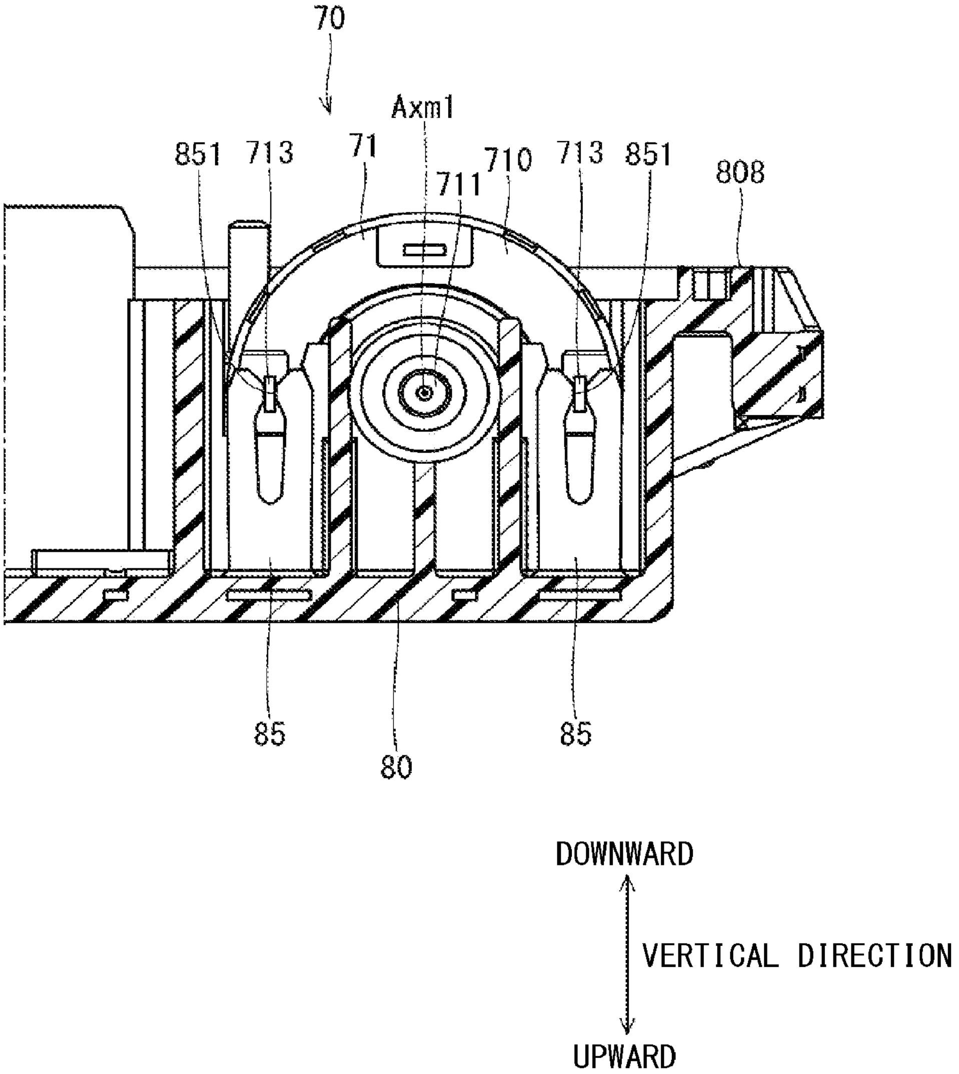
FIG. 16 is a cross-sectional view illustrating the vicinity of the drive unit of the valve device of the first embodiment.

As illustrated in FIGS. 15 and 16, the motor 71 has a motor main body 710, a motor shaft 711, a worm gear 712, and a motor side terminal 713. The motor main body 710 is formed in a substantially cylindrical shape, and internally has a stator, a coil, and a rotor (not illustrated). The motor shaft 711 is provided integrally with the rotor in the rotation axis of the rotor, and one end projects from an end portion of the motor main body 710 in the axial direction. The driving force of the motor 71 is output from the motor shaft 711. The axis Axm1 of the motor 71 coincides with the axis of the motor shaft 711. The motor 71 is provided so that the axis Axm1 is parallel to a surface 808 facing the partition wall portion 60 side of the drive unit cover 80 (refer to FIG. 16).

The worm gear 712 is provided in one end of the motor shaft 711, and is rotatable integrally with the motor shaft 711. For example, the motor side terminal 713 is formed of metal in an elongated plate shape. The motor side terminal 713 projects from an end portion on the side opposite to the worm gear 712 of the motor main body 710, and two motor side terminals 713 are provided to interpose the axis Axm1 of the motor 71 therebetween. The two motor side terminals 713 are provided so that surface directions are parallel to each other. An end portion inside the motor main body 710 of the motor side terminal 713 is electrically connected to a coil.

Figure 17:
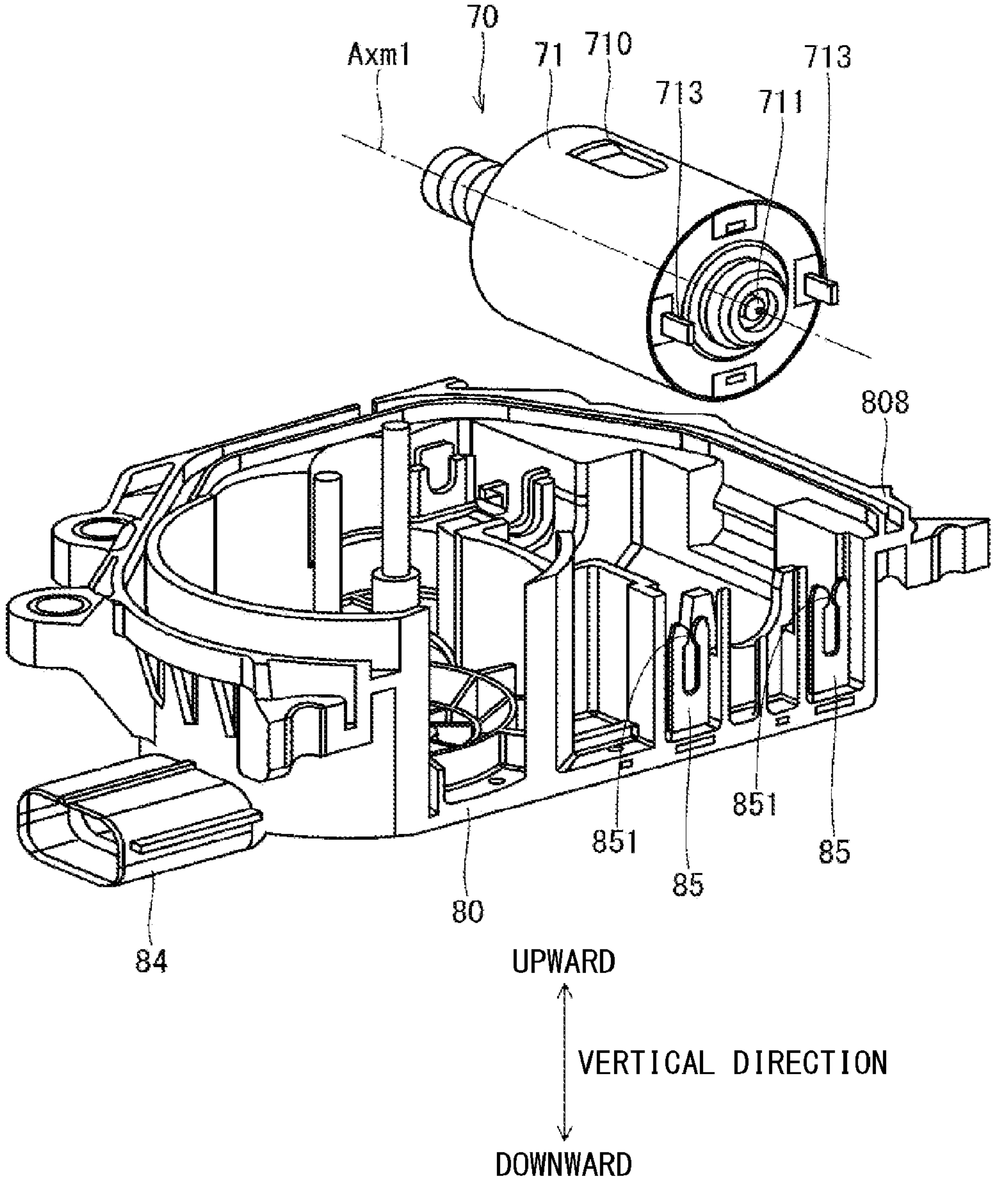
FIG. 17 is an exploded perspective view illustrating a drive unit cover and a part of the drive unit of the valve device of the first embodiment.

As illustrated in FIGS. 16 and 17, the valve device 10 further includes a power supply terminal 85. For example, the power supply terminal 85 is formed of metal in a U-shaped flat plate shape, and an end portion on a terminal opening 851 side is insert-molded into the drive unit cover 80 to face the partition wall portion 60 side. Two power supply terminals 85 are provided to interpose the axis Axm1 of the motor 71 therebetween. The two power supply terminals 85 are provided on the same plane. The two motor side terminals 713 of the motor 71 are respectively fitted to the terminal openings 851 of the two power supply terminals 85, and are electrically connected to the power supply terminal 85.

As illustrated in FIG. 12, the drive unit cover 80 has a connector portion 84. The connector portion 84 internally has a terminal 841. The terminal 841 is electrically connected to the power supply terminal 85. A wire harness (not illustrated) is connected to the connector portion 84. In this manner, power is supplied from a battery of the vehicle 1 via the wire harness, the terminal 841, the power supply terminal 85, and the motor side terminal 713.

The rotation angle sensor 86 is provided on the rotation axis Axr1 of the drive unit cover 80. The rotation angle sensor 86 is electrically connected to the ECU 8 via the terminal 841 and the wire harness. The rotation angle sensor 86 outputs a signal corresponding to a rotation angle of the shaft 32 to the ECU 8. In this manner, the ECU 8 can detect the rotation position of the valve body 31, and can control an operation of the motor 71 in accordance with the rotation position of the valve body 31.

As described above, the valve device 10 includes the U-shaped power supply terminal 85 whose end portion on the opening (terminal opening 851) side is provided in the drive unit cover 80 to face the partition wall portion 60 side and through which the current supplied to the motor 71 flows. The motor 71 has the motor side terminal 713 connected to the opening (terminal opening 851) of the power supply terminal 85 in an end portion in the axial direction, and is disposed so that the axis Axm1 is parallel to the surface 808 of the drive unit cover 80 that faces the partition wall portion 60.

Therefore, the motor 71 can be easily assembled to the drive unit cover 80 in one direction. The number of components can be reduced.

<2-10>

As illustrated in FIG. 15, the gear portion 72 has a first gear 721, a second gear 722, and a third gear 723. The first gear 721 is provided to mesh with the worm gear 712 of the motor 71. The second gear 722 has an outer diameter larger than that of the first gear 721, and is provided to mesh with the first gear 721. The third gear 723 has an outer diameter larger than that of the second gear 722, and is provided in one end of the shaft 32 to mesh with the second gear 722. The third gear 723 is provided coaxially with the shaft 32, and is rotatable integrally with the shaft 32.

The first gear 721, the second gear 722, and the third gear 723 are provided so that the axis is parallel to the axis Axs1 of the shaft 32, that is, so that the axis is orthogonal to the axis Axm1 of the motor 71. The driving force of the motor 71 is transmitted to the shaft 32 via the worm gear 712, the first gear 721, the second gear 722, and the third gear 723.

Figure 18:
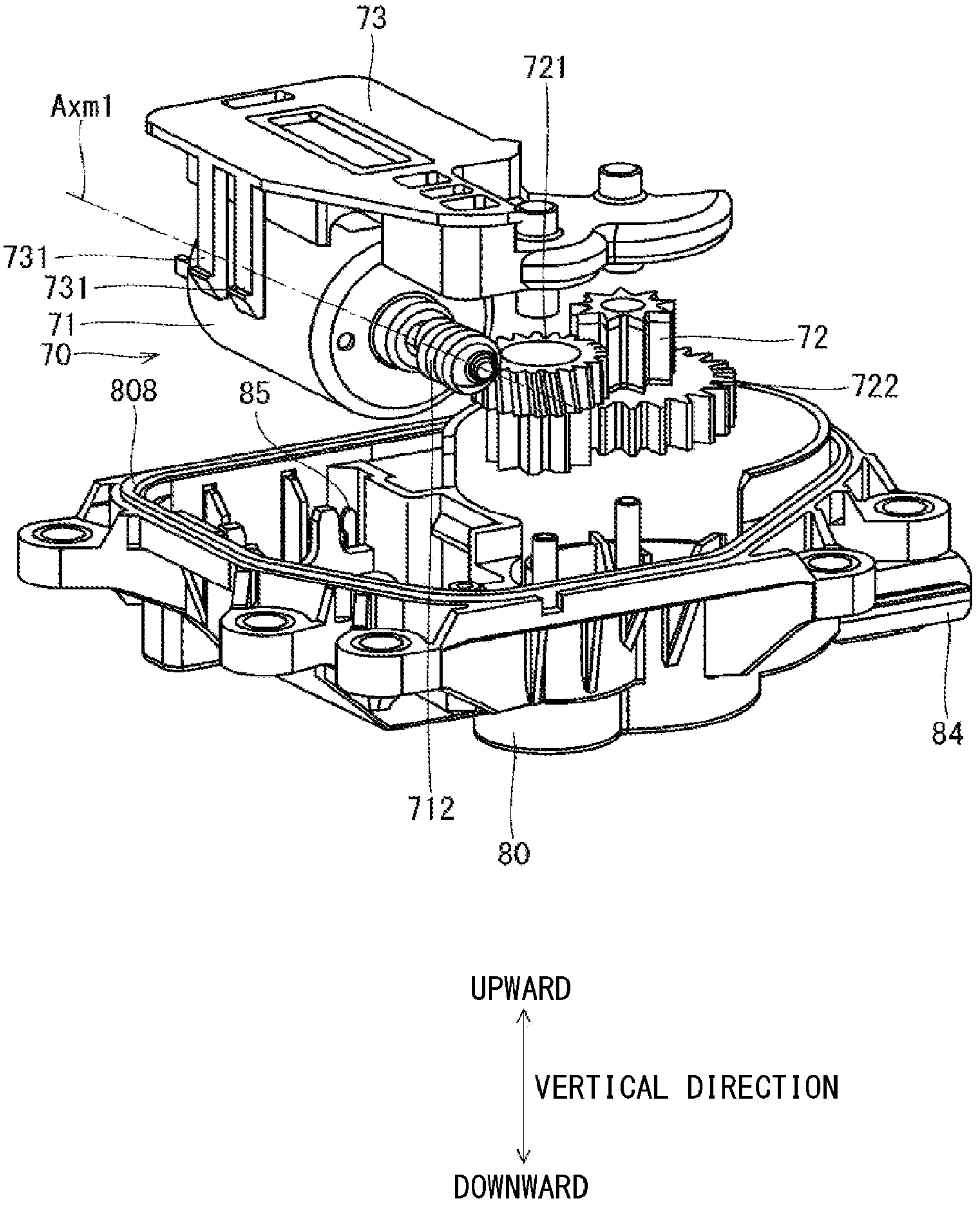
FIG. 18 is an exploded perspective view illustrating the drive unit cover and a part of the drive unit of the valve device of the first embodiment.

As illustrated in FIGS. 12 and 18, the valve device 10 further includes a holding member 73. The holding member 73 has a snap-fit portion 731 which enables snap-fit coupling to the drive unit cover 80. The holding member 73 is snap-fit coupled to the drive unit cover 80 to hold the motor 71, the first gear 721 and second gear 722 of the gear portion 72 with the drive unit cover 80. The elastic member 74 is provided in a compressed state between the motor main body 710 and the holding member 73.

As described above, the drive unit 70 has the gear portion 72 which can transmit the driving force of the motor 71 to the shaft 32. The valve device 10 further includes the holding member 73 that has the snap-fit portion 731 which enables snap-fit coupling to the drive unit cover 80, and that holds the motor 71 and the gear portion 72 with the drive unit cover 80.

Therefore, while the motor 71 and the gear portion 72 are held by the drive unit cover 80, the motor 71 and the gear portion 72 can be assembled to the partition wall portion 60 side. The number of components can be reduced.

<6-7>

As illustrated in FIG. 3, the partition wall portion 60 has a partition wall through-hole 65 which extends outward from the shaft insertion hole 62 and which is open on the outer wall of the partition wall portion main body 61. The housing 20 has a housing through-hole 270 which extends outward from the inner wall of the housing opening portion 210, which is open on the outer wall of the housing main body 21, and which is formed to be capable of communicating with the partition wall through-hole 65.

Therefore, the coolant water flowing toward the drive unit 70 side through the shaft insertion hole 62 from the internal space 200 can flow to the partition wall through-hole 65. In this manner, it is possible to prevent a possibility that the coolant water of the internal space 200 may flow to the drive unit 70 side. The coolant water flowing into the partition wall through-hole 65 is discharged outward from the housing through-hole 270.

According to the present embodiment, the housing through-hole 270 is open on the attachment surface 201. That is, when the valve device 10 is attached to the engine 2, the housing through-hole 270 is in a state of being covered by the engine 2.

Therefore, the coolant water leaking outward from the inside of the valve device 10 via the housing through-hole 270 can be trapped in a portion of the attachment surface 201. As a result, it is possible to prevent a conspicuous leakage of the coolant water.

<6-22>

The housing through-hole 270 is open on the attachment surface 201 side.

Therefore, it is possible to prevent a possibility that external water may enter the inside of the valve device 10 via the housing through-hole 270 and the partition wall through-hole 65.

In a metal member of the power supply terminal 85 provided in the drive unit space 800, a press-punched portion of a plated member is plated later. In this manner, even when the coolant water enters the drive unit space 800, corrosion of the metal member can be prevented, and a conduction failure can be prevented.

The valve device 10 used to control the coolant water of the engine 2 as in the present embodiment is affected by the heat of the coolant water. Therefore, when the thickness of the valve body 31 is not uniform, the expansion coefficients are different from each other depending on the thickness. Accordingly, there is a possibility that the whole valve body 31 may be distorted. Particularly in the present embodiment, the inlet port 220 into which the coolant water flows and a portion of the inner circumferential wall of the valve body 31 face each other. Accordingly, the inner circumferential wall of the valve body 31 has a structure which is likely to receive the influence of the heat.

<3-27>

Therefore, as illustrated in FIG. 3, the valve body 31 is formed so that at least a portion of the inner circumferential wall, which is a facing portion 310 facing the inlet port 220 into which the coolant water flows, is recessed outward. More specifically, the valve body 31 is formed so that at least a portion of the inner circumferential wall, which is the facing portion 310 facing the inlet port 220 into which the coolant water flows via the valve body opening portion 420 of the ball valve 42, is recessed outward.

As described above, when at least the facing portion 310 of the inner circumferential wall of the valve body 31 is recessed and has approximately the uniform thickness, the expansion coefficient of the whole valve body 31 is approximately uniform in the uniform valve body 31. Therefore, the valve body 31 can be prevented from being distorted.

<3-28>

As illustrated in FIG. 3, the valve seal 36 comes into contact with a portion corresponding to at least the facing portion 310 in the outer circumferential wall of the valve body 31. More specifically, the valve seal 36 comes into contact with the portion on the side opposite to at least the facing portion 310 in the outer circumferential wall of the valve body 31.

When the valve body 31 deforms, the sealing property of the valve seal 36 is degraded, and warming-up performance is lowered. However, according to the present embodiment, the above-described configuration can prevent the portion corresponding particularly to the facing portion 310 of the valve body 31 from being distorted. Therefore, the sealing property of the valve seal 36 can be ensured, and thus, the warming-up performance is improved.

<4-6>

The housing 20 has the multiple ports 221 to 223. In a state where the housing main body 21 is attached to the engine 2, the outlet port 222 which is a port connected to the heater 6 of the vehicle 1 is formed not to be located on the uppermost side in the vertical direction out of the multiple ports (refer to FIG. 8).

Therefore, it is possible to prevent a possibility that the air in the coolant water may flow to the heater 6, and it is possible to prevent a possibility that abnormal noise is generated inside a vehicle compartment of the vehicle 1.

Second Embodiment

Figure 19:
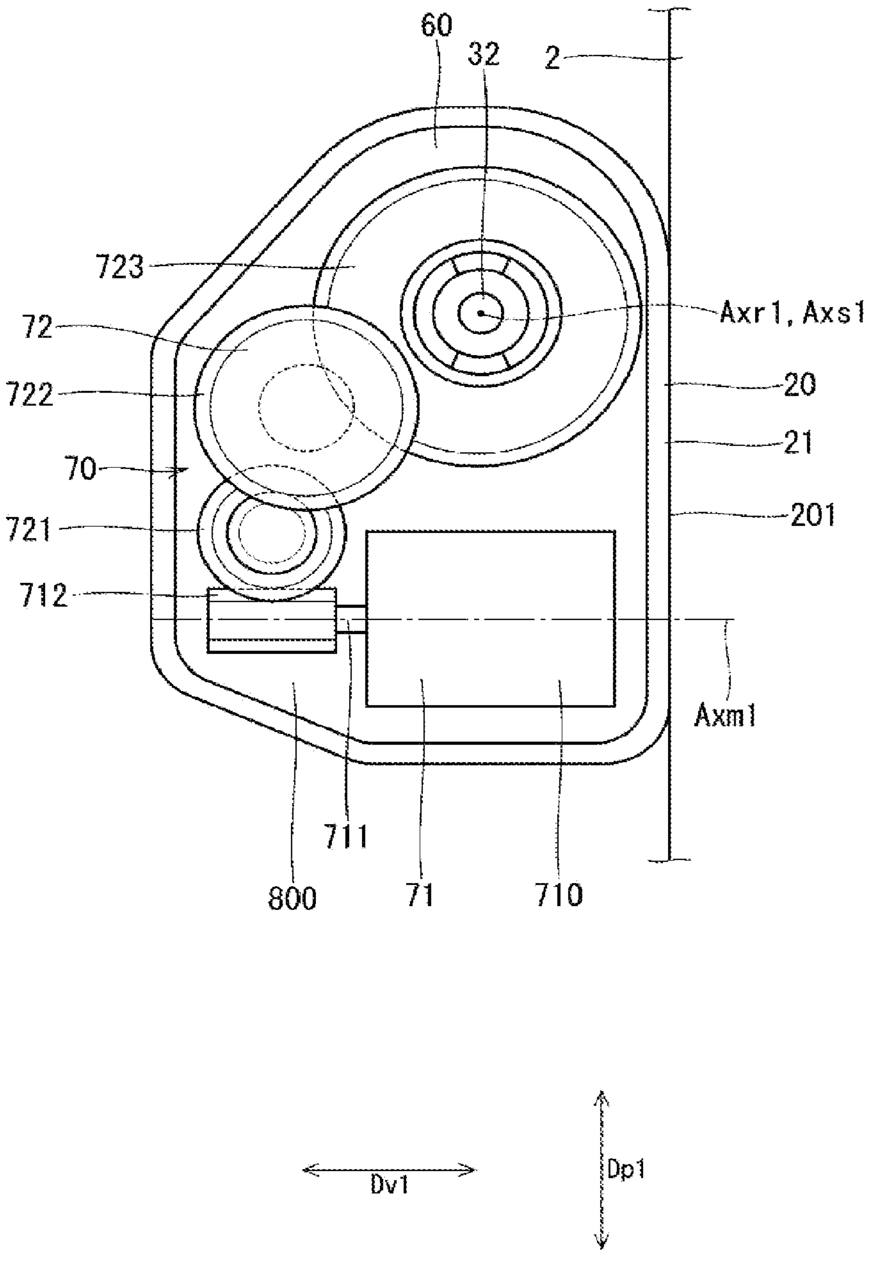
FIG. 19 is a view illustrating a drive unit of a valve device of a second embodiment.

A portion of a valve device according to a second embodiment is illustrated in FIG. 19.

<2-11>

As illustrated in FIG. 19, the motor 71 is provided in the drive unit space 800 so that the motor shaft 711 is perpendicular to the attachment surface 201 of the housing 20, and so that the worm gear 712 faces a side opposite to the attachment surface 201.

As described above, the motor 71 has the motor shaft 711 for outputting the driving force, and the worm gear 712 provided in the tip of the motor shaft 711, and is provided so that the motor shaft 711 is perpendicular to the attachment surface 201, and so that the worm gear 712 faces the side opposite to the attachment surface 201.

Therefore, a gear height can be lowered, and the body size of the drive unit 70 can be reduced.

The motor main body 710 of the motor 71 can be disposed close to the engine 2 (attachment surface 201). Accordingly, vibration resistance of the motor 71 can be improved, the vibrations acting on the motor 71 can be reduced, and robustness against disconnection can be improved.

In addition, as illustrated in FIG. 19, the motor 71 and the gear portion 72 are disposed in the drive unit space 800. In this manner, the width in a direction Dv1 perpendicular to the attachment surface 201 of the drive unit 70 and the drive unit cover 80 can be narrower than the width in a direction Dp1 parallel to the attachment surface 201.

More specifically, as illustrated in FIG. 19, the third gear 723 is disposed outside in the radial direction of the motor main body 710, and the first gear 721 and the second gear 722 are disposed outside in the radial direction of the worm gear 712. In this way, the third gear 723 having the large outer diameter is disposed close to the attachment surface 201, and the first gear 721 and the second gear 722 are disposed in a vacant space outside in the radial direction of the worm gear 712. In this manner, the body size of the drive unit 70 and the drive unit cover 80 can be reduced.

Third Embodiment

Figure 20:
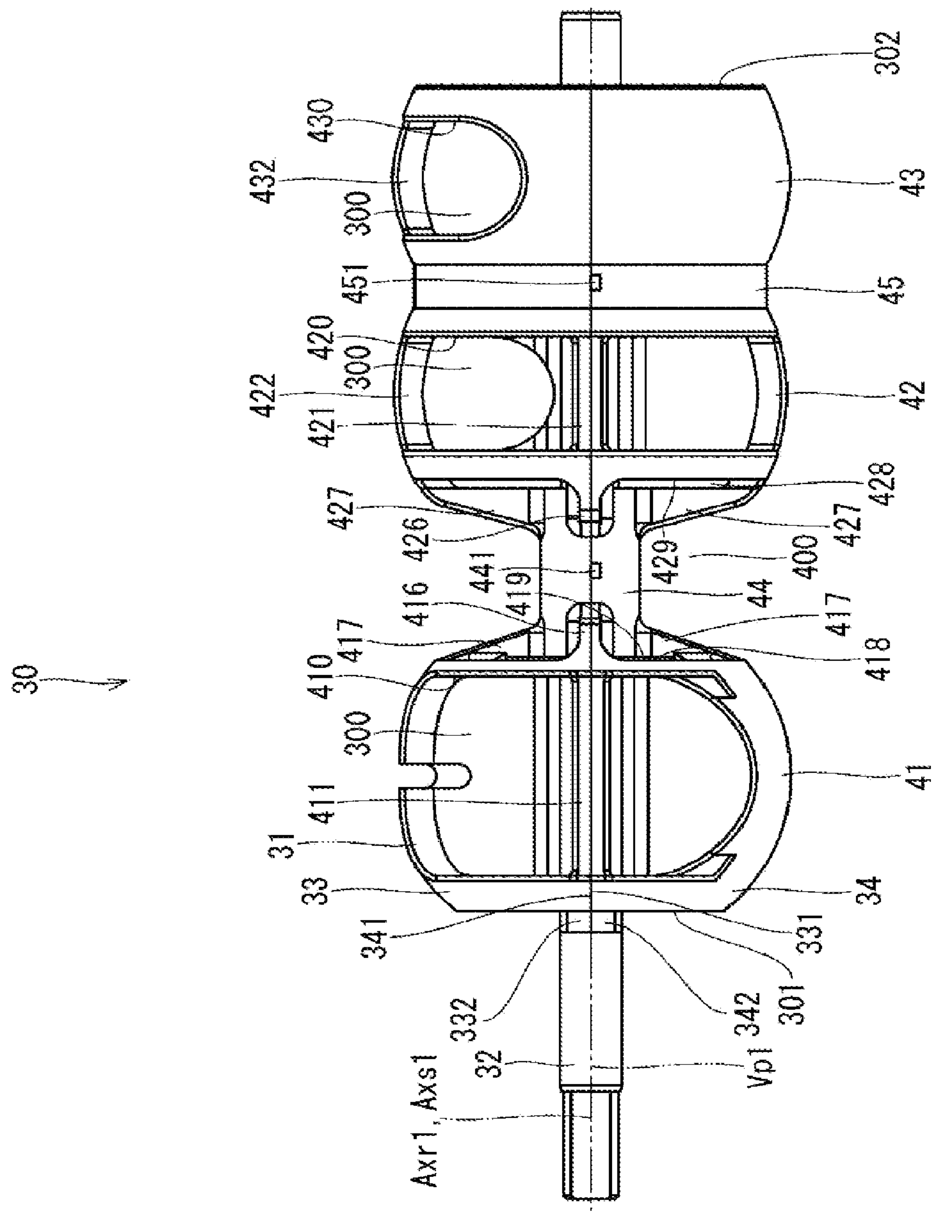
FIG. 20 is a view illustrating a valve of a valve device of a third embodiment.

A portion of a valve device according to a third embodiment is illustrated in FIG. 20.

<3-1> Spherical Valve Body

The third embodiment is different from the first embodiment in disposition of the ball valves 41, 42, and 43 of the valve body 31, the cylindrical connection portion 44, and the cylindrical valve connection portion 45 in the shaft 32. As illustrated in FIG. 20, the ball valve 41, the cylindrical connection portion 44, the ball valve 42, the cylindrical valve connection portion 45, the ball valve 43 are disposed to be aligned in this order from the drive unit 70 side in the direction of the rotation axis Axr1 to the side opposite to the drive unit 70.

According to the present embodiment, the outlet ports 221, 222, and 223 are formed in the housing main body 21 to be aligned in this order from the drive unit 70 side in the direction of the rotation axis Axr1 to the side opposite to the drive unit 70. The ball valves 41, 42, and 43 are respectively provided so that the outlet ports 221, 222, and 223 can be opening and closing.

In the ball valves 41, 42, and 43 of the valve body 31, at least a portion of the outer circumferential wall is formed in a spherical shape, and at least a portion of the inner circumferential wall is formed to be recessed outward.

<3-1>

As described above, according to the present embodiment, the valve device 10 can control the coolant water of the engine 2 of the vehicle 1, and includes the housing 20, the valve 30, and the valve seal 36.

The housing 20 has the ports (220, 221, 222, and 223) which connect the internal space 200 and the outside to each other.

The valve 30 has the valve body 31 rotatable around the rotation axis Axr1 inside the internal space 200, the valve body internal flow channel 300 formed inside the valve body 31, the valve body opening portions (410, 420, and 430) which connect the valve body internal flow channel 300 and the outer side of the valve body 31 to each other, and the shaft 32 provided on the rotation axis Axr1, and can change the communication state between the valve body internal flow channel 300 and the ports (220, 221, 222, and 223) via the valve body opening portions (410, 420, and 430) in accordance with the rotation position of the valve body 31.

The valve seal 36 is formed in an annular shape, provided at a position corresponding to the ports (220, 221, 222, and 223) to be capable of coming into contact with the outer circumferential wall of the valve body 31, internally forms the seal opening portion 360 which can communicate with the valve body opening portions (410, 420, and 430) by the rotation position of the valve body 31, and can hold a portion formed with the outer circumferential wall of the valve body 31 in a liquid-tight manner.

In the valve body 31, at least a portion of the outer circumferential wall is formed in a spherical shape, and at least a portion of the inner circumferential wall is formed to be recessed outward.

Therefore, it is possible to improve molding accuracy of the spherical surface of the outer circumferential wall of the valve body 31. In this manner, it is possible to prevent the leakage of coolant water in the outer circumferential wall of the valve body 31.

In addition, a flow channel area of the valve body internal flow channel 300 can be increased, and water flow resistance can be reduced.

<3-2>

In the ball valves 41, 42, and 43 of the valve body 31, at least a portion of the inner circumferential wall is formed in a spherical shape.

Therefore, at least a portion of the valve body 31 can have approximately the uniform thickness. In this manner, the accuracy of the spherical surface of the outer circumferential wall of the valve body 31 can be further improved, and the flow channel area of the valve body internal flow channel 300 can be further increased.

<3-3>

In the ball valves 41, 42, and 43 of the valve body 31, at least a partial area in the direction of the rotation axis Axr1 and the circumferential direction has a constant thickness between the inner circumferential wall and the outer circumferential wall. That is, the valve body 31 is formed to have the uniform thickness at least in the above-described range.

Therefore, at least a portion of the valve body 31 can have the uniform thickness. In this manner, the accuracy of the spherical surface of the outer circumferential wall of the valve body 31 can be further improved, and the flow channel area of the valve body internal flow channel 300 can be further increased.

<3-4>

In the ball valves 41, 42, and 43 of the valve body 31, a corresponding area corresponding to at least the seal opening portion 360 in the direction of the rotation axis Axr1 and the circumferential direction has a constant thickness between the inner circumferential wall and the outer circumferential wall are the same as each other.

Therefore, the valve body 31 can have the uniform thickness in the above-described range. In this manner, the accuracy of the spherical surface of the outer circumferential wall of the valve body 31 can be further improved, and the sealing property of the valve seal 36 can be improved.

<3-4-1>

In the ball valves 41, 42, and 43 of the valve body 31, when all of the seal opening portions 360 are in a fully closed state where all are closed by the outer circumferential wall of the valve body 31, a corresponding area corresponding to at least the seal opening portion 360 in the direction of the rotation axis Axr1 and the circumferential direction has a constant thickness between the inner circumferential wall and the outer circumferential wall.

The "corresponding area corresponding to the seal opening portion 360" means a range overlapping the projection when the seal opening portion 360 is projected in the axial direction of the valve seal 36.

Therefore, it is possible to further improve the sealing property of the valve seal 36 when being in the fully closed state.

<3-5>

The shaft 32 is formed integrally with the valve body 31 by insert molding.

Therefore, controllability of the valve body 31 can be improved.

In addition, it is possible to reduce the assembly man-hours of the shaft 32.

<3-6>

The valve body 31 has the first divided body 33 and the second divided body 34 which are divided into two in a virtual plane Vp1 including the rotation axis Axr1, and the first divided body 33 and the second divided body 34 are joined to each other by the respective joint surfaces 331 and 341.

Therefore, the valve body 31 can be manufactured with high accuracy by die slide injection (DSI) (to be described later).

<3-7>

Figure 23:
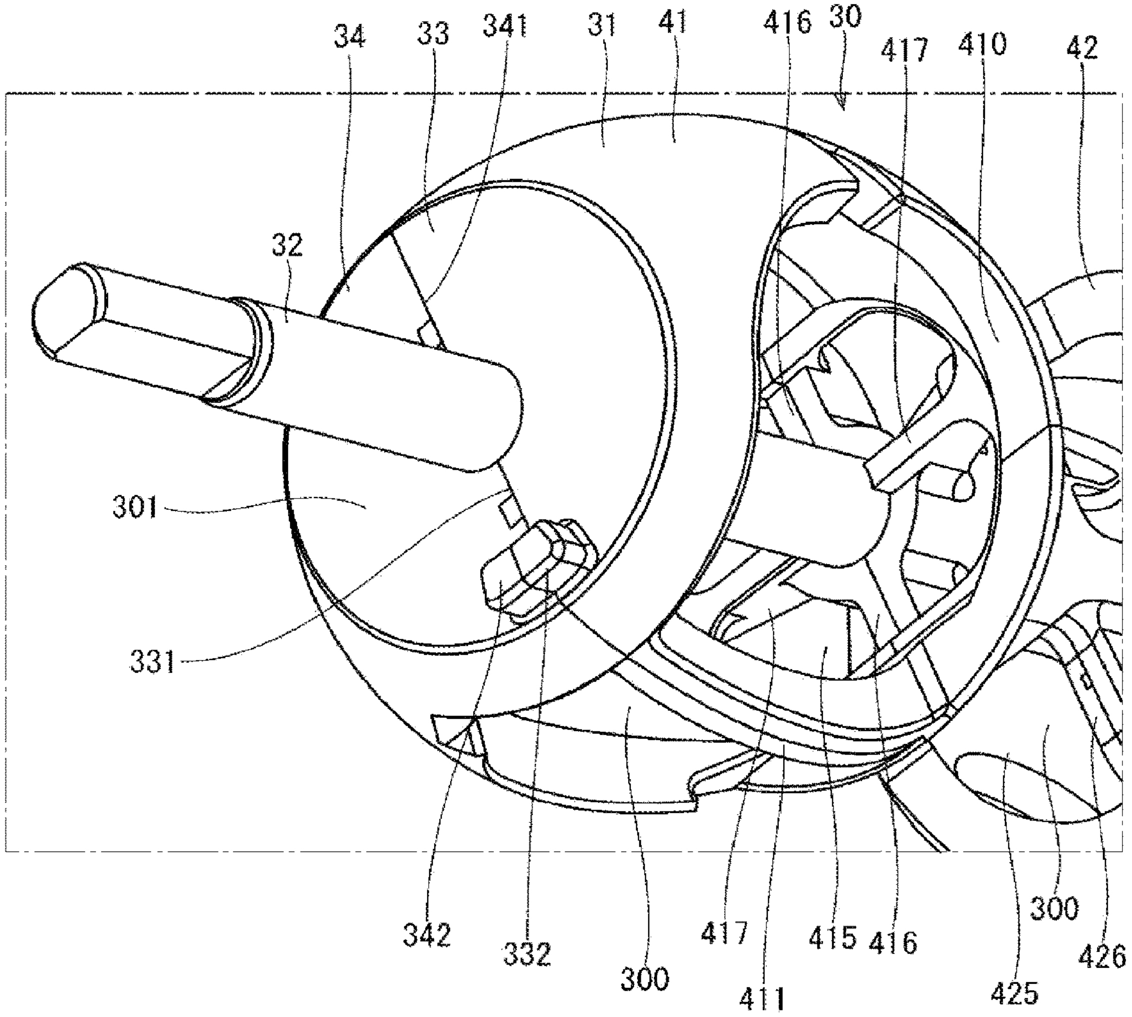
FIG. 23 is a perspective view illustrating the valve of the valve device of the third embodiment.

As illustrated in FIGS. 20 and 23, the first divided body 33 has the first restriction projection portion 332 which extends from the surface on the partition wall portion 60 side to the restriction recess portion 63 side, and the tip portion of which is located in the restriction recess portion 63 (for the restriction recess portion 63, refer to FIGS. 3 and 6). The second divided body 34 has the second restriction projection portion 342 which extends from the surface on the partition wall portion 60 side to the restriction recess portion 63 side, and the tip portion of which is located in the restriction recess portion 63.

Therefore, the first restriction projection portion 332 and the second restriction projection portion 342 come into contact with the restriction portion 631 of the restriction recess portion 63. In this manner, the rotation of the valve body 31 can be restricted. The first restriction projection portion 332 and the second restriction projection portion 342 are respectively formed in the first divided body 33 and the second divided body 34. Accordingly, when the first restriction projection portion 332 and the second restriction projection portion 342 come into contact with the restriction portion 631 of the restriction recess portion 63, it is possible to prevent a possibility that the first divided body 33 and the second divided body 34 are separated (peeled off) from the joint surfaces 331 and 341.

Figure 25:
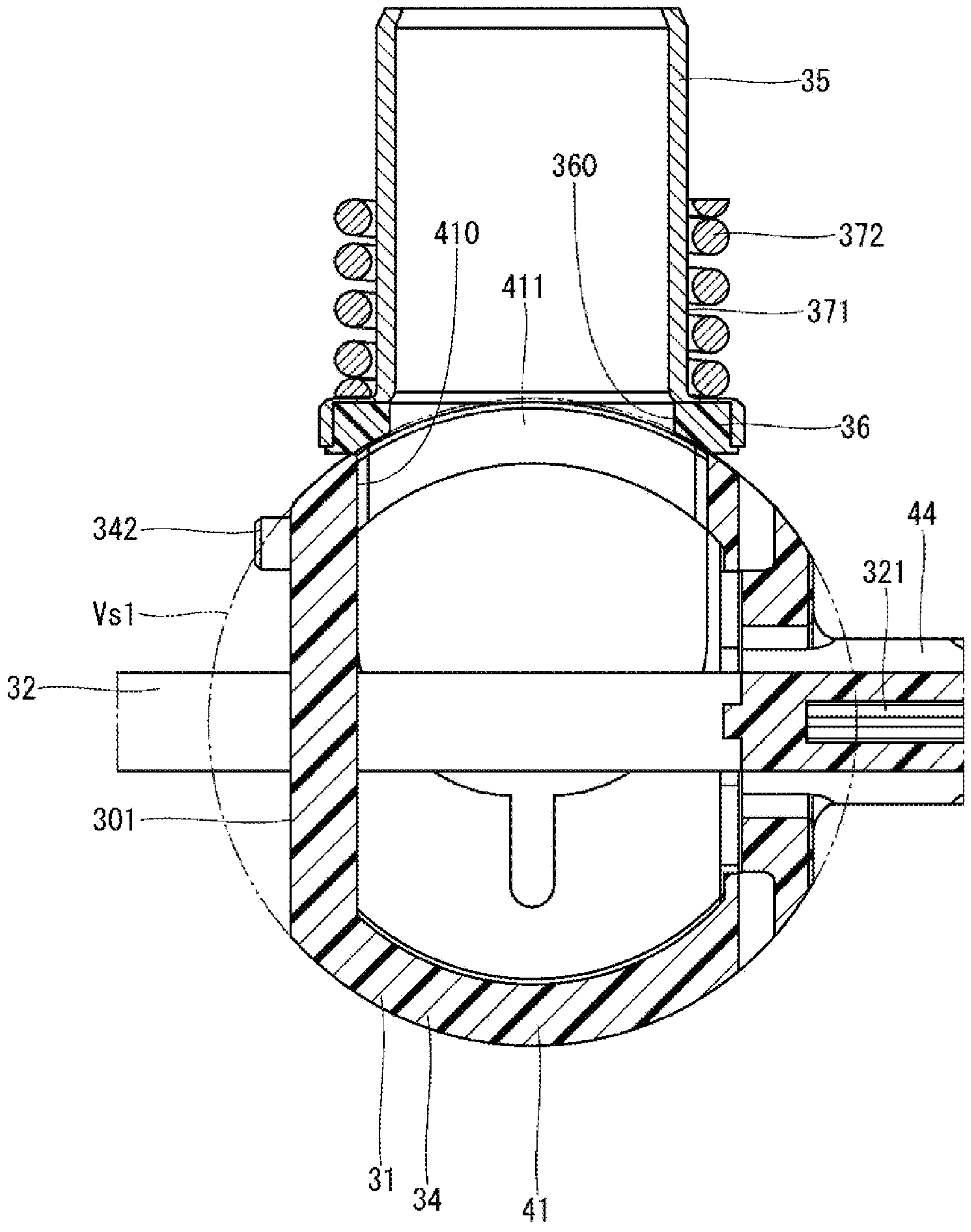
FIG. 25 is a cross-sectional view illustrating a part of the valve and a seal unit of the valve device of the third embodiment.

As illustrated in FIGS. 23 and 25, the first restriction projection portion 332 and the second restriction projection portion 342 are located outside in the radial direction with respect to the center in the radial direction of the first outermost end surface 301. In this manner, the size of the first restriction projection portion 332 and the second restriction projection portion 342 in the circumferential direction can be increased. Accordingly, it is possible to increase strengths of the first restriction projection portion 332 and the second restriction projection portion 342.

As illustrated in FIG. 6, restriction surfaces 635 and 636 are formed on the end surface in the circumferential direction of the restriction recess portion 63 of the restriction portion 631. A projection portion restriction surface 333 which can come into contact with the restriction surface 635 is formed on the end surface in the circumferential direction of the valve body 31 of the first restriction projection portion 332. A projection portion restriction surface 343 which can come into contact with the restriction surface 636 is formed on the end surface in the circumferential direction of the valve body 31 of the second restriction projection portion 342. The rotation of the valve body 31 is restricted when the projection portion restriction surface 333 comes into contact with the restriction surface 635 or when the projection portion restriction surface 343 comes into contact with the restriction surface 636.

As illustrated in FIGS. 23 and 25, a corner portion on the side opposite to the first outermost end surface 301 of the first restriction projection portion 332 and the second restriction projection portion 342 is chamfered to be inclined with respect to the first outermost end surface 301. Therefore, even when foreign substances such as sand are present in the vicinity of the first restriction projection portion 332 and the second restriction projection portion 342 of the restriction recess portion 63, it is possible to prevent a possibility that the foreign substances may be bitten between the corner portion of the first restriction projection portion 332 and the second restriction projection portion 342 and the restriction recess portion 63.

<3-8>

The first restriction projection portion 332 extends to the restriction recess portion 63 side along the joint surface 331. While coming into contact with the first restriction projection portion 332, the second restriction projection portion 342 extends to the restriction recess portion 63 side along the joint surface 331.

Therefore, when the first restriction projection portion 332 and the second restriction projection portion 342 come into contact with the restriction portion 631 of the restriction recess portion 63, it is possible to more effectively prevent a possibility that the first divided body 33 and the second divided body 34 may be separated from the joint surfaces 331 and 341.

<3-9>

Figure 21:
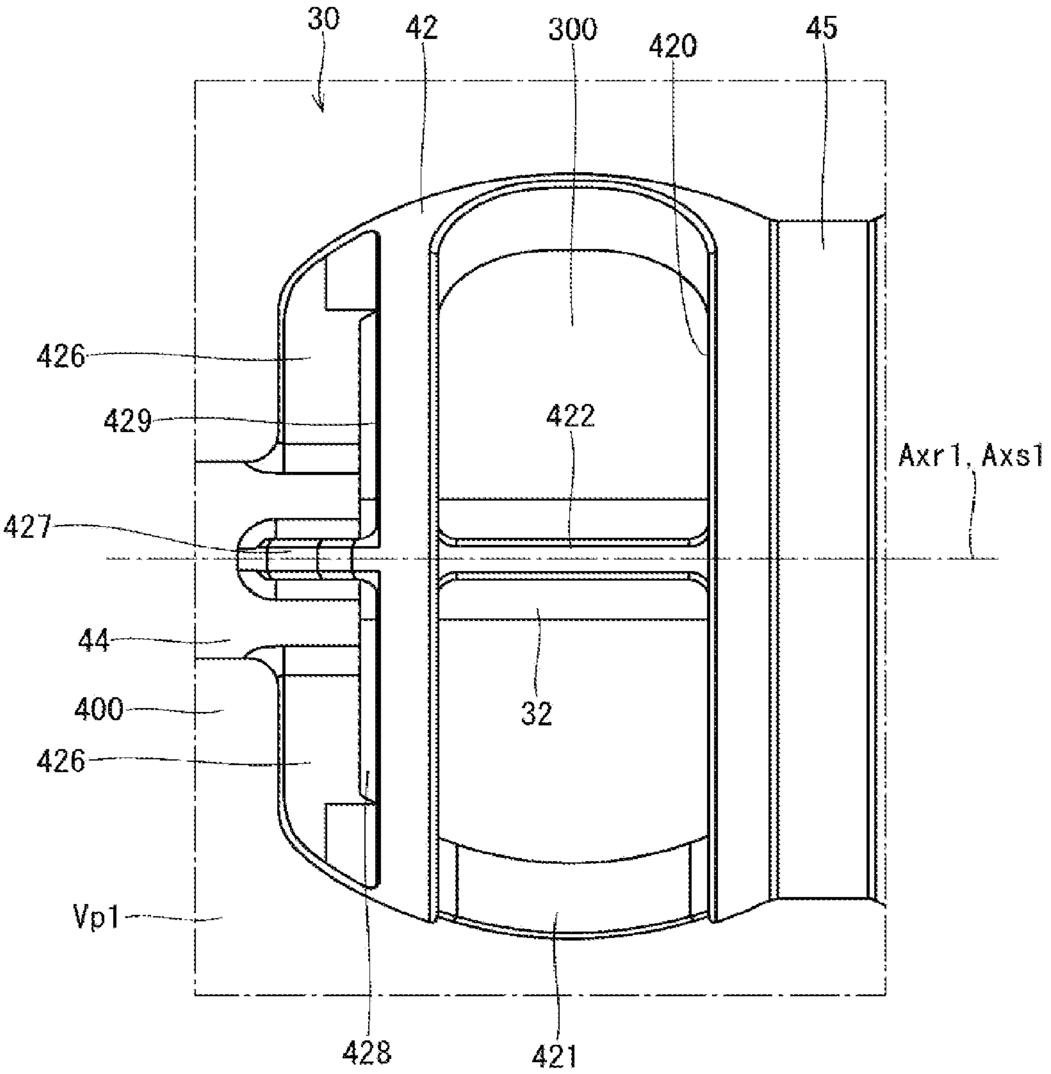
FIG. 21 is a view illustrating a part of the valve of the valve device of the third embodiment.
Figure 22:
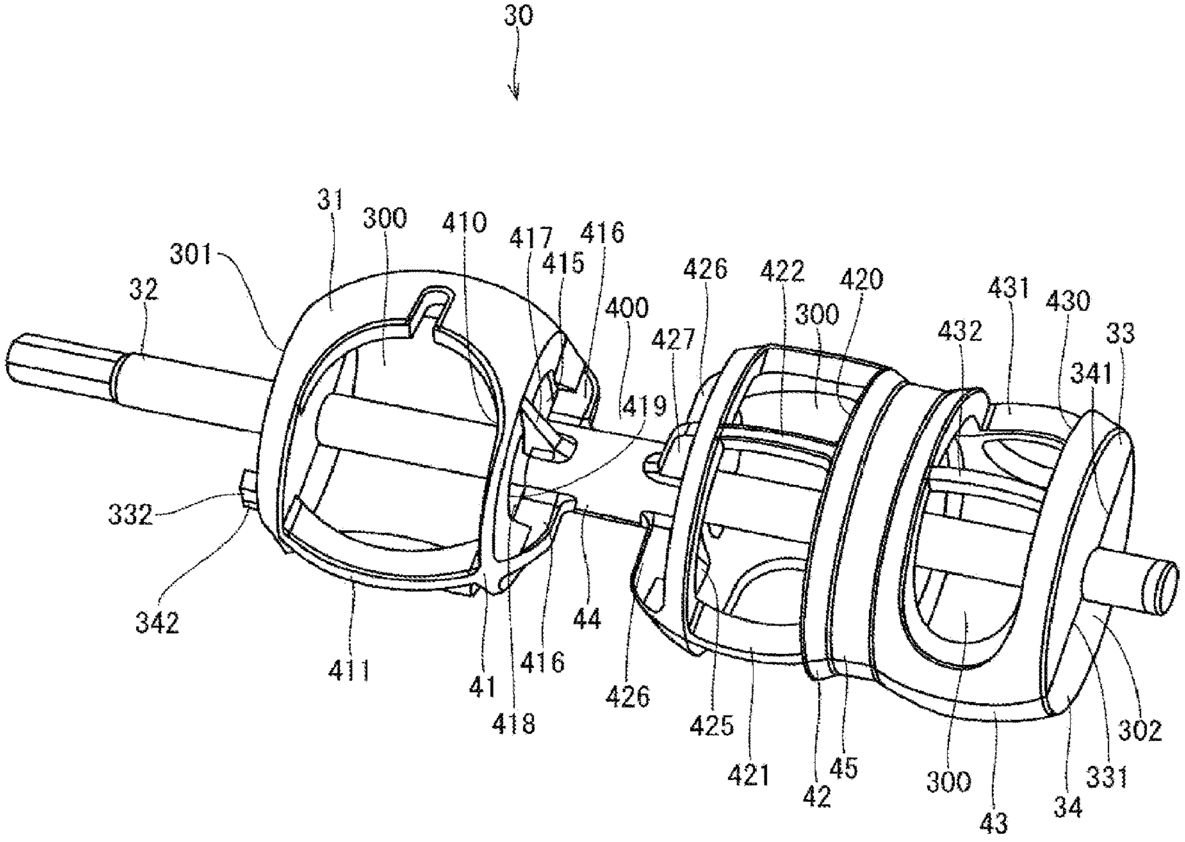
FIG. 22 is a perspective view illustrating the valve of the valve device of the third embodiment.

As illustrated in FIGS. 20, 21, and 22, the valve body 31 has a valve body opening rib 411 that connects an inner edge end of the valve body opening portion 410. The valve body 31 has valve body opening ribs 421 and 422 that connect an inner edge end of the valve body opening portion 420. The valve body 31 has valve body opening ribs 431 and 432 that connect an inner edge end of the valve body opening portion 430. Therefore, it is possible to improve the strength of the valve body opening portions 410, 420, and 430.

The valve body opening ribs 411, 421, and 431 are formed on the virtual plane including the axis Axs1 (rotation axis Axr1) of the shaft 32, that is, on the virtual plane Vp1 including the joint surfaces 331 and 341. That is, the valve body opening ribs 411, 421, and 431 are formed to interpose the joint surfaces 331 and 341 therebetween. The valve body opening ribs 422 and 432 are formed on a virtual plane orthogonal to the virtual plane Vp1 including the axis Axs1 (rotation axis Axr1) of the shaft 32.

Figure 24:
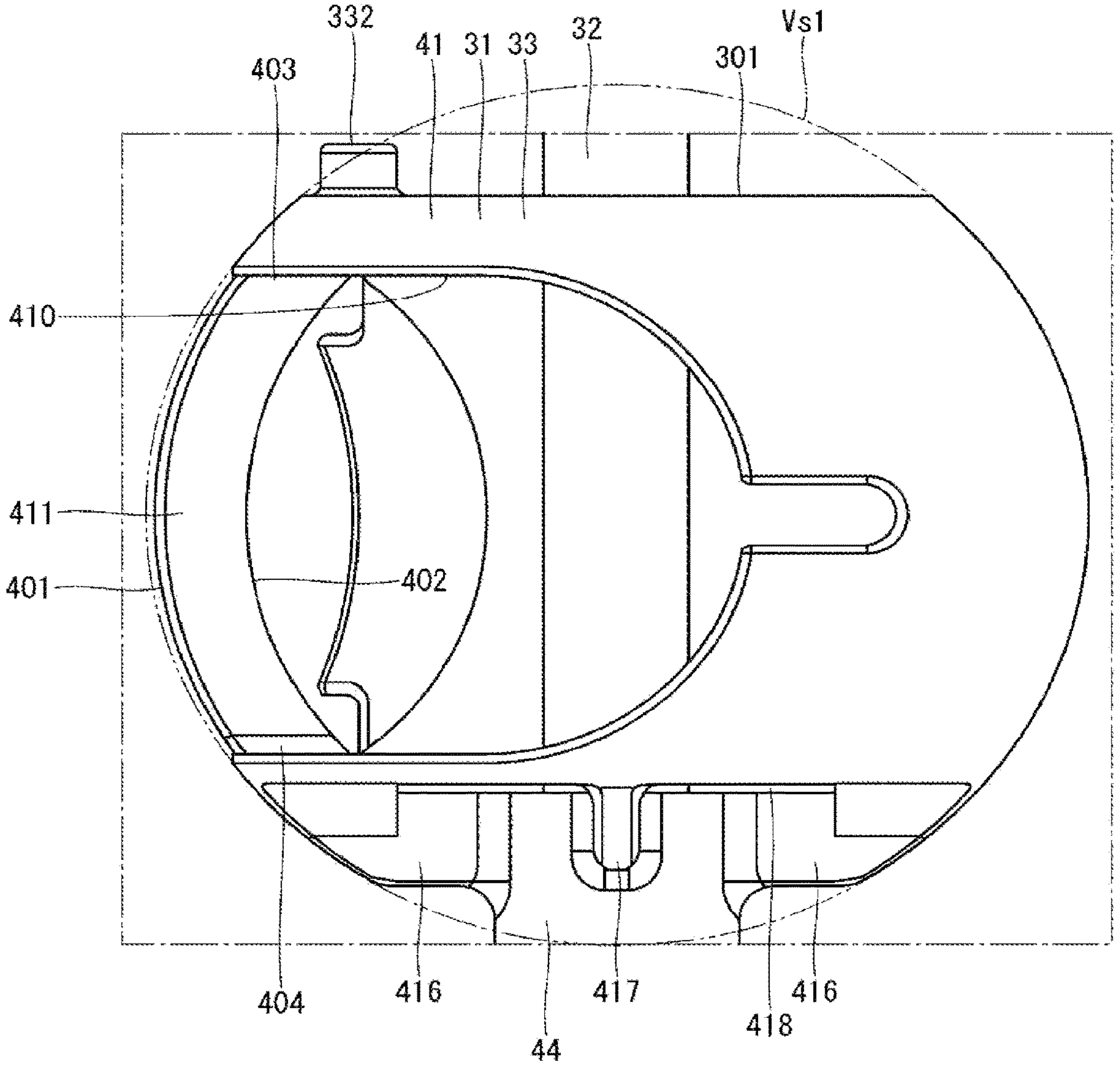
FIG. 24 is a view illustrating a part of the valve of the valve device of the third embodiment.

As illustrated in FIGS. 24 and 25, the valve body opening rib 411 is formed at a position separated inward in the radial direction from the virtual spherical surface Vs1 along the outer circumferential wall of the ball valve 41 of the valve body 31.

The virtual spherical surface Vs1 is a virtual spherical surface including the outer circumferential wall of the ball valve 41.

Therefore, when the valve body 31 rotates, it is possible to prevent a possibility that the sliding resistance may increase due to the valve seal 36 caught on the valve body opening rib 411.

<3-9-1>

As illustrated in FIGS. 24 and 25, the valve body opening ribs 411 are formed in an arc shape at a predetermined distance from the virtual spherical surface Vs1. The valve body opening ribs 421 and 422, and the valve body opening ribs 431 and 432, are formed in an arc shape at a predetermined distance from the virtual spherical surface along the outer circumferential wall of the ball valves 42 and 43.

Therefore, it is possible to prevent an increase in the sliding resistance during the rotation of the valve body 31, and it is possible to increase the flow channel area inside the valve body opening ribs 411, 421, 422, 431, and 432.

As illustrated in FIG. 24, the valve body opening rib 411 is formed in an arc-shaped flat plate shape. In a rib outer edge portion 401 which is an outer portion in the radial direction of the valve body opening rib 411, the distance from the virtual spherical surface Vs1 is constant. In a rib inner edge portion 402 which is an inner portion in the radial direction of the valve body opening rib 411, the distance from the virtual spherical surface Vs1 is constant. A rib end portion 403 which is one end portion of the valve body opening rib 411 is connected to a portion on the side opposite to the cylindrical connection portion 44 in the inner edge end of the valve body opening portion 410. A rib end portion 404 which is the other end of the valve body opening rib 411 is connected to a portion on the cylindrical connection portion 44 side in the inner edge end of the valve body opening portion 410.

<3-11>

Figure 26:
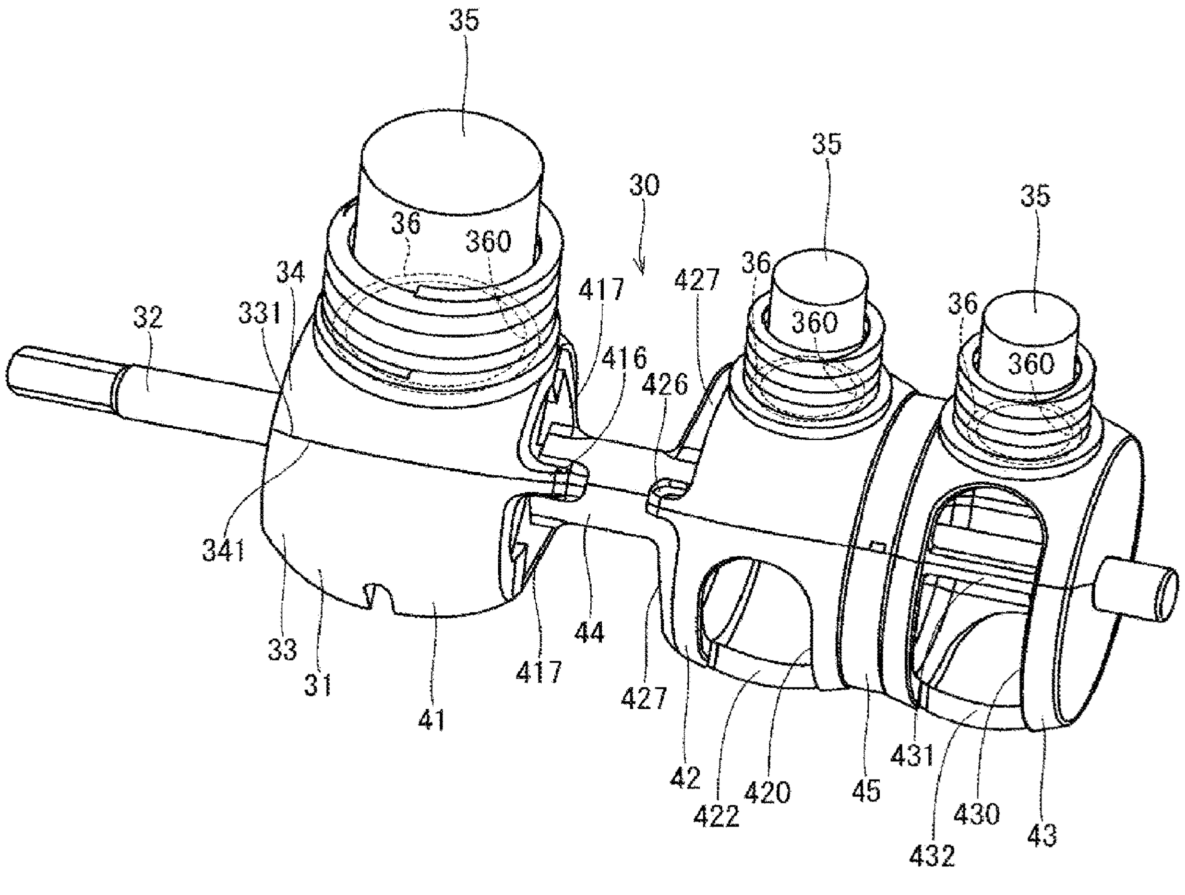
FIG. 26 is a perspective view illustrating the valve and the seal unit of the valve device of the third embodiment.

As illustrated in FIG. 26, the joint surfaces 331 and 341 are located away from the valve seal 36 in a fully closed state where all of the seal opening portions 360 of all of the valve seals 36 are closed by the outer circumferential wall of the valve body 31.

Therefore, a step that can be formed on the outer circumferential wall on the joint surfaces 331 and 341 of the valve body 31 can prevent a possibility that the coolant water may leak from between the valve seal 36 and the outer circumferential wall of the valve body 31, when the valve body 31 is in the fully closed state.

<3-12>

As illustrated in FIG. 20, the valve body 31 has a specific shape portion 441 formed on the joint surfaces 331 and 341 in the cylindrical connection portion 44 and having the outer wall whose curvature is different from the curvature of the outer circumferential wall of the cylindrical connection portion 44. The valve body 31 has a specific shape portion 451 formed on the joint surfaces 331 and 341 in the cylindrical valve connection portion 45 and having the outer wall whose curvature is different from the curvature of the outer circumferential wall of the cylindrical valve connection portion 45.

Therefore, when the valve body 31 rotates, the specific shape portions 441 and 451 and the valve seal 36 do not slide. Accordingly, an operation failure of the valve body 31 can be prevented, and abrasion of the valve seal 36 can be prevented.

<3-12-1>

The specific shape portions 441 and 451 are respectively formed so that the outer wall projects outward from the outer circumferential wall of the cylindrical connection portion 44 and the cylindrical valve connection portion 45.

<3-12-2>

The specific shape portion 441 and 451 may be respectively formed so that the outer wall is recessed inward from the outer circumferential wall of the cylindrical connection portion 44 and the cylindrical valve connection portion 45.

<3-12-3>

The specific shape portions 441 and 451 may be respectively formed so that the outer wall has a planar shape.

As illustrated in FIG. 20, the length of the specific shape portion 441 in the direction of the axis Axs1 of the shaft 32 is approximately $\frac{1}{10}$ of the length of the cylindrical connection portion 44. The length of the specific shape portion 451 in the direction of the axis Axs1 of the shaft 32 is approximately $\frac{1}{3}$ of the length of the cylindrical valve connection portion 45. Therefore, it is possible to prevent an increase in the size of the valve body 31.

<3-13>

As illustrated in FIG. 22, the valve body 31 has an end surface opening portion 415 formed on the end surface in the direction of the rotation axis Axr1 of the ball valve 41 to connect the inter-valve space 400 formed between the ball valve 41 and the ball valve 42 outside in the radial direction of the cylindrical connection portion 44 and the valve body internal flow channel 300 of the ball valve 41 to each other, and an end surface opening portion 425 formed on the end surface in the direction of the rotation axis Axr1 of the ball valve 42 to connect the inter-valve space 400 and the valve body internal flow channel 300 of the ball valve 42 to each other. The end surface opening portions 415 and 425 respectively correspond to a "first end surface opening portion" and a "second end surface opening portion".

The inlet port 220 (refer to FIG. 3) communicates with the inter-valve space 400. Therefore, the coolant water flowing into the internal space 200 from the inlet port 220 can flow into the valve body internal flow channel 300 via the inter-valve space 400 and the end surface opening portions 415 and 425.

The inter-valve space 400 is open over the entire region in the circumferential direction. Therefore, it is possible to reduce the water flow resistance of the coolant water flowing into the internal space 200 from the inlet port 220 and flowing toward the valve body internal flow channel 300.

As illustrated in FIG. 9, in the direction of the rotation axis Axr1, the inter-valve space 400 overlaps the inlet port 220 and the relief port 224. Therefore, the coolant water flowing from the inlet port 220 is likely to flow to the relief port 224. Accordingly, responsiveness of the relief valve 39 can be improved.

As illustrated in FIG. 20, the inter-valve space 400 is formed outside in the radial direction of the cylindrical connection portion 44 having the smallest outer diameter from the first outermost end surface 301 to the second outermost end surface 302 in the axial direction of the valve body 31. The outer diameter of the inter-valve space 400 is smaller than the outer diameter of the end surface opening portions 415 and 425 in the radial direction.

<3-14>

Figure 27:
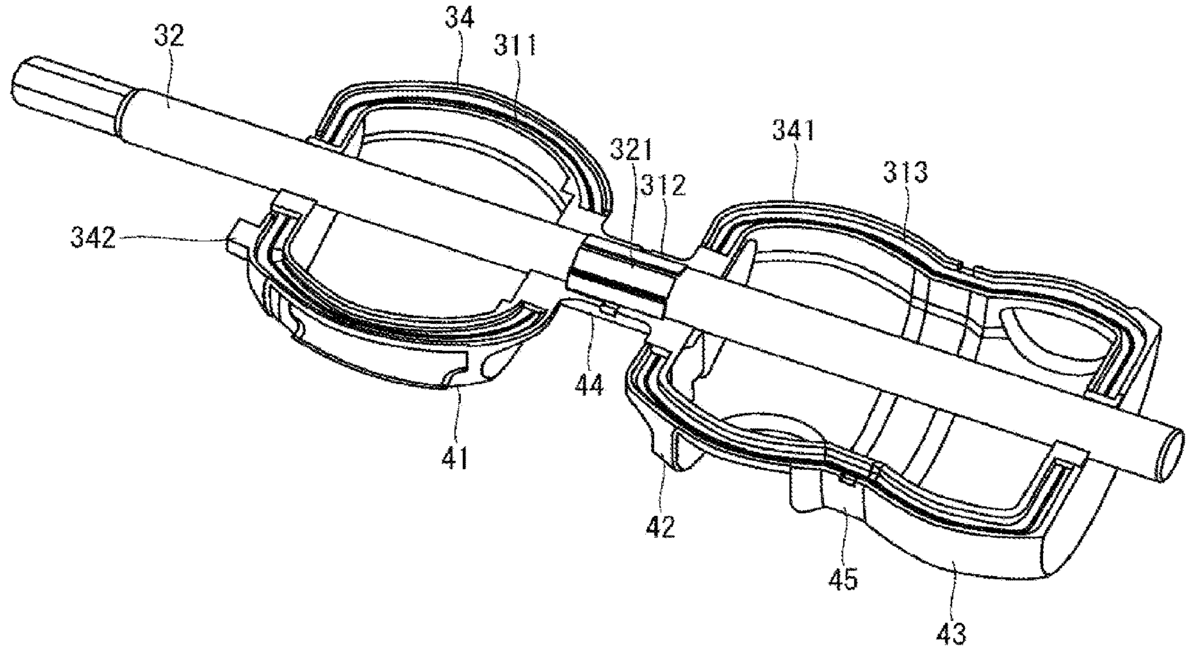
FIG. 27 is a perspective view illustrating a part of the valve of the valve device of the third embodiment.

As illustrated in FIG. 27, the shaft 32 is formed integrally with the valve body 31 by insert molding in the cylindrical connection portion 44. That is, the shaft 32 is welded to the cylindrical connection portion 44, but is not welded to a portion of the valve body 31 other than the cylindrical connection portion 44.

When an insert-molded portion of the shaft 32 is provided in the valve body internal flow channel 300, the flow channel area of the valve body internal flow channel 300 is reduced, thereby causing a possibility that the water flow resistance may increase. However, according to the present embodiment, the insert-molded portion of the shaft 32 is provided in the cylindrical connection portion 44 outside the valve body internal flow channel 300. Therefore, the water flow resistance can be reduced.

<3-15>

As illustrated in FIG. 27, the shaft 32 has a detent portion 321 which can restrict the rotation relative to the cylindrical connection portion 44. The detent portion 321 is formed so that the cross-sectional shape is polygonal. According to the present embodiment, the cross-sectional shape is formed to be a hexagon. Here, for example, six the detent portion 321 are located on the outer circumferential wall of the columnar shaft 32 in the circumferential direction, and are formed in a planar shape by cutting. Therefore, the outer wall of the detent portion 321 is located inside in the radial direction with respect to the outer circumferential wall of the shaft 32. The inner wall of the cylindrical connection portion 44 is formed so that the cross-sectional shape is hexagon to correspond to the shape of the detent portion 321.

Therefore, the relative rotation between the valve body 31 and the shaft 32 can be restricted with a simple configuration.

<3-16>

Figure 28:
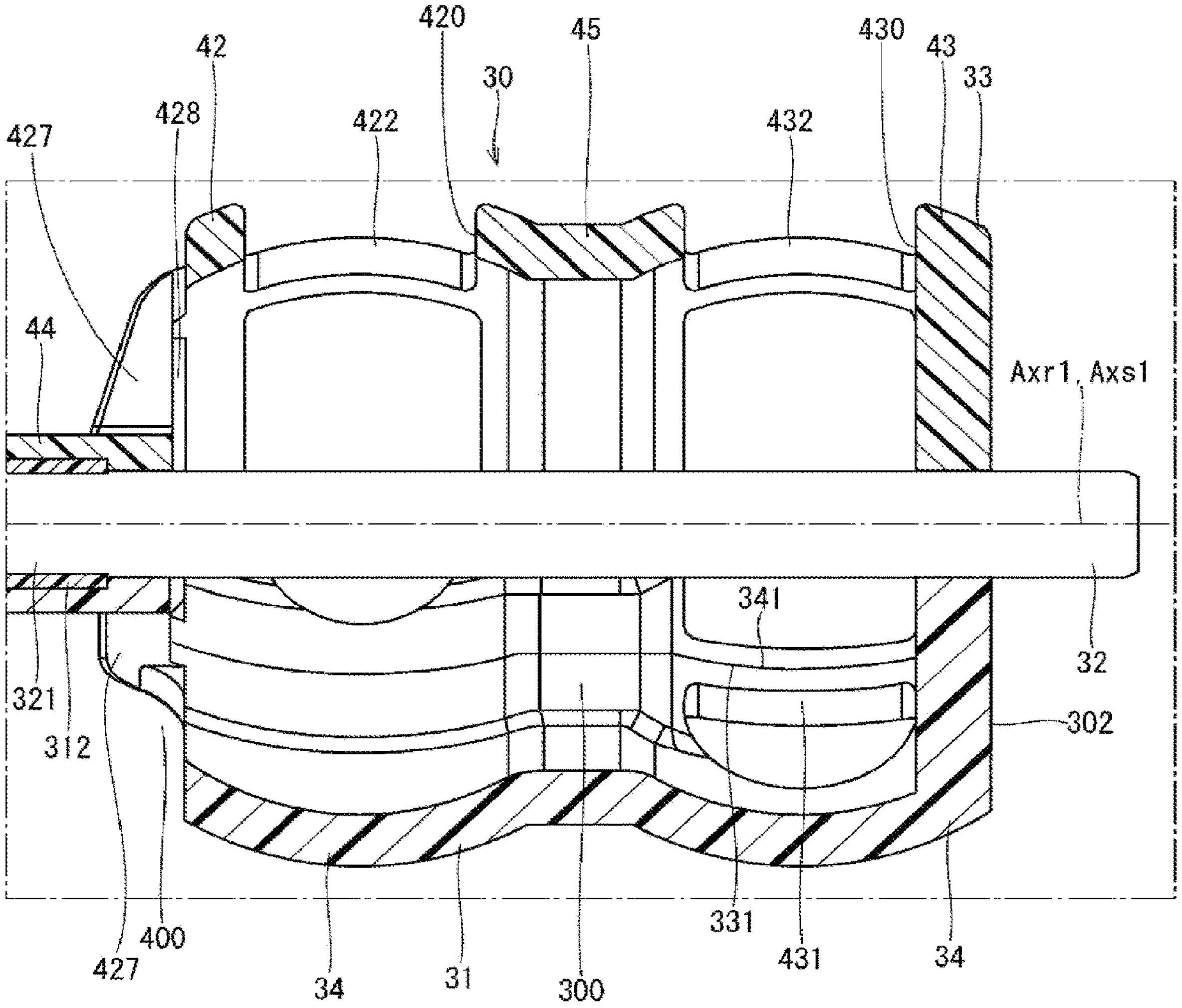
FIG. 28 is a cross-sectional view illustrating a part of the valve of the valve device of the third embodiment.

As illustrated in FIG. 28, the valve body 31 has the cylindrical valve connection portion 45 which is connected to the ball valve 42 on the side opposite to the cylindrical connection portion 44 with respect to the ball valve 42, and in which the outer circumferential wall and the inner circumferential wall are formed in a cylindrical shape to form the valve body internal flow channel 300, and, the ball valve 43 which is connected to the cylindrical valve connection portion 45 on the side opposite to the ball valve 42 with respect to the cylindrical valve connection portion 45, and the outer circumferential wall of which is formed in a spherical shape.

In the cylindrical valve connection portion 45, the outer circumferential wall and the inner circumferential wall are formed in a cylindrical shape. Therefore, the flow channel area of the valve body internal flow channel 300 can be secured therein.

<3-17>

As illustrated in FIG. 20, the outer diameter of the outer circumferential wall of the ball valve 41 is the same as the outer diameter of the outer circumferential wall of the ball valve 43. The outer diameter of the outer circumferential wall of the ball valve 42 and the outer diameter of the outer circumferential wall of the ball valve 41 are the same as the outer diameter of the outer circumferential wall of the ball valve 43.

An area of the first outermost end surface 301 which is an end surface on the side opposite to the ball valve 43 in the direction of the rotation axis Axr1 of the ball valve 41 is different from an area of the second outermost end surface 302 which is an end surface on the side opposite to the ball valve 41 in the direction of the rotation axis Axr1 of the ball valve 43. The area of the second outermost end surface 302 is larger than the area of the first outermost end surface 301. Therefore, the length of the ball valve 43 in the direction of the rotation axis Axr1 is shorter than the length of the ball valve 41.

Therefore, the size in the axial direction of the valve body 31 can be reduced, and the body size of the valve device 10 can be reduced.

<3-18>

As illustrated in FIGS. 20 and 22, the valve body 31 has the valve body opening rib 422 for connecting the inner edge end of the valve body opening portion 420 of the ball valve 42, and the valve body opening rib 432 for connecting the inner edge end of the valve body opening portion 430 of the ball valve 43. The valve body opening rib 422 and the valve body opening rib 432 respectively correspond to a "second valve body opening rib" and a "third valve body opening rib".

The valve body opening rib 422 and the valve body opening rib 432 are formed at the same position in the circumferential direction of the valve body 31. That is, the valve body opening ribs 422 and 432 are formed to be aligned in the direction parallel to the rotation axis Axr1. The valve body opening rib 411 and the valve body opening rib 421 are formed at the same position in the circumferential direction of the valve body 31.

Therefore, it is possible to prevent turbulence of the coolant water flowing around the valve body opening ribs 422 and 432, and the water flow resistance can be reduced.

<3-19>

As illustrated in FIGS. 20, 21, and 22, the valve body 31 has end surface opening ribs 426 and 427 that connect the cylindrical connection portion 44 and the ball valve 41 to each other by straddling the end surface opening portion 415, and end surface opening ribs 416, 417 that connect the cylindrical connection portion 44 and the ball valve 42 to each other by straddling the end surface opening portion 425. The end surface opening ribs 416 and 417 correspond to a "first end surface opening rib", and the end surface opening ribs 426 and 427 correspond to a "second end surface opening rib".

The end surface opening ribs 416 and 426 are respectively formed two by two to interpose the cylindrical connection portion 44 therebetween. The end surface opening ribs 417 and 427 are respectively formed two by two to interpose the cylindrical connection portion 44 therebetween.

The end surface opening ribs 416 and 426 are formed on the virtual plane Vp1. That is, the end surface opening ribs 416 and 426 are formed to interpose the joint surfaces 331 and 341. Therefore, the valve body opening ribs 411 and 421 and the end surface opening ribs 416 and 426 are formed at the same position in the circumferential direction of the valve body 31.

As illustrated in FIG. 21, a start position of the end surface opening ribs 426 and 427 is an outer edge portion of the end surface on the ball valve 41 side of the ball valve 42. An end position of the end surface opening ribs 426 and 427 is the outer circumferential wall of the end portion on the ball valve 42 side of the cylindrical connection portion 44.

As illustrated in FIG. 21, a portion bulging outward most in the radial direction of the valve body opening rib 421 is located outside the outer circumferential wall of the ball valve 42 of the start position of the end surface opening rib 426. The valve body opening rib 411 is provided outside in the radial direction from a linear portion of the end surface opening rib 426.

As illustrated in FIG. 21, in the end surface opening rib 426, a side on the valve body internal flow channel 300 side in the direction of the rotation axis Axr1 is formed in a linear shape. In the end surface opening rib 426, a side on the inter-valve space 400 side in the direction of the rotation axis Axr1 is formed in a curved shape outside in the radial direction of the ball valve 42, and is formed in a linear shape inside in the radial direction.

As illustrated in FIG. 28, in the end surface opening rib 427, a side on the valve body internal flow channel 300 side in the direction of the rotation axis Axr1 is formed in a linear shape. In the end surface opening rib 427, a side on the inter-valve space 400 side in the direction of the rotation axis Axr1 is formed in a curved shape outside in the radial direction of the ball valve 42, and is formed in a linear shape to be inclined with respect to the rotation axis Axr1 inside in the radial direction.

<3-19-1>

As illustrated in FIGS. 20 and 22, the end surface opening rib 417, the end surface opening rib 427, the valve body opening rib 422, and the valve body opening rib 432 are formed at the same position in the circumferential direction of the valve body 31. That is, the end surface opening ribs 417 and 427 and the valve body opening ribs 422 and 432 are formed to be aligned in the direction parallel to the rotation axis Axr1. The end surface opening ribs 417 and 427 and the valve body opening ribs 422 and 432 are formed on the virtual plane including the axis Axs1 (rotation axis Axr1) of the shaft 32 and orthogonal to the virtual plane Vp1.

Therefore, the end surface opening ribs 417 and 427 can prevent the turbulence of the coolant water flowing around the valve body opening ribs 422 and 432, and the water flow resistance can be reduced.

<3-20>

As illustrated in FIGS. 20, 21, and 22, the end surface opening ribs 416 and 417 form a rib end surface gap 418 with a valve end surface 419 which is an end surface in the direction of the rotation axis Axr1 of the ball valve 41. The end surface opening ribs 426 and 427 form a rib end surface gap 428 with a valve end surface 429 which is an end surface in the direction of the rotation axis Axr1 of the ball valve 42. The rib end surface gap 418 corresponds to a "first rib end surface gap", and the rib end surface gap 428 corresponds to a "second rib end surface gap".

As illustrated in FIGS. 20 and 21, when viewed in the direction perpendicular to the rotation axis Axr1, the rib end surface gap 428 can be visually recognized between the end surface opening ribs 426 and 427 and the end surface in the direction of the rotation axis Axr1 of the ball valve 42.

Therefore, the water flow resistance can be reduced in the end surface opening portions 415 and 425.

<3-21>

As illustrated in FIGS. 20 and 22, the end surface opening rib 417 is formed so that the surface on the ball valve 42 side is inclined with respect to the rotation axis Axr1. The end surface opening rib 427 is formed so that the surface on the ball valve 41 side is inclined with respect to the rotation axis Axr1.

Therefore, the water flow resistance around the end surface opening ribs 417 and 427 can be reduced.

Next, a manufacturing method of the valve 30 will be described. According to the present embodiment, the valve 30 is manufactured by using so-called die slide injection (DSI).

Figure 29:
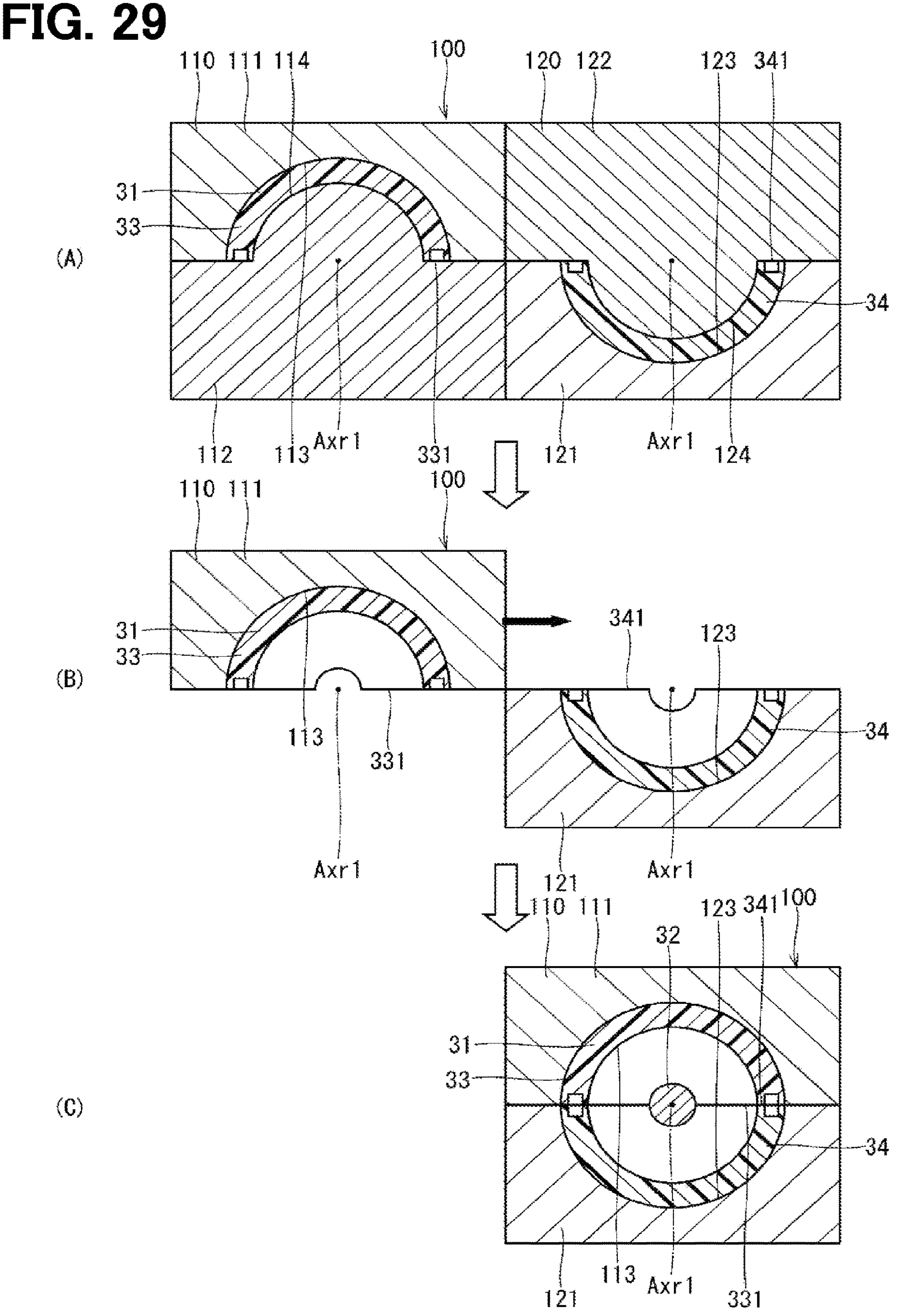
FIG. 29 is a view for describing a manufacturing process of the valve of the valve device of the third embodiment.

As illustrated in FIG. 29, a mold device 100 includes a first mold 110 and a second mold 120. The first mold 110 has a first outer mold 111 and a first inner mold 112. The second mold 120 has a second outer mold 121 and a second inner mold 122.

The first outer mold 111 has a first recess surface 113 recessed in a hemispherical shape from the end surface on the first inner mold 112 side. The first recess surface 113 is formed to correspond to the shape of the outer circumferential wall of the ball valves 41, 42, and 43 on the outer circumferential wall of the first divided body 33.

The first inner mold 112 has a first projection surface 114 projecting in a hemispherical shape from the end surface on the first outer mold 111 side. The first projection surface 114 is formed to correspond to the shape of the inner circumferential wall of the ball valves 41, 42, and 43 on the outer circumferential wall of the first divided body 33. Here, when the first outer mold 111 and the first inner mold 112 come into contact with each other, in at least a partial area of in the direction of the rotation axis Axr1 and the circumferential direction of the valve body 31, the distances between the first recess surface 113 and the first projection surface 114 are set to be the same as each other.

The second outer mold 121 has a second recess surface 123 recessed in a hemispherical shape from the end surface on the second inner mold 122 side. The second recess surface 123 is formed to correspond to the shape of the outer circumferential wall of the ball valves 41, 42, and 43 on the outer circumferential wall of the second divided body 34.

The second inner mold 122 has a second projection surface 124 projecting in a hemispherical shape from the end surface on the second outer mold 121 side. The second projection surface 124 is formed to correspond to the shape of the inner circumferential wall of the ball valves 41, 42, and 43 on the outer circumferential wall of the second divided body 34. Here, when the second outer mold 121 and the second inner mold 122 come into contact with each other, in at least a partial area in the direction of the rotation axis Axr1 and the circumferential direction of the valve body 31, the distances between the second recess surface 123 and the second projection surface 124 are set to be the same as each other.

The manufacturing method of the valve 30 includes the following processes.

<3-22> Manufacturing Method of Spherical Valve Body (First Molding Step)

In a first molding step, the first divided body 33 and the second divided body 34 are respectively resin-molded by the first mold 110 and the second mold 120. Specifically, as illustrated in (A) of FIG. 29, the first outer mold 111 and the first inner mold 112 come into contact with each other. The second outer mold 121 and the second inner mold 122 come into contact with each other. A molten resin is injected between the first recess surface 113 and the first projection surface 114, and between the second recess surface 123 and the second projection surface 171.

Figure 30:
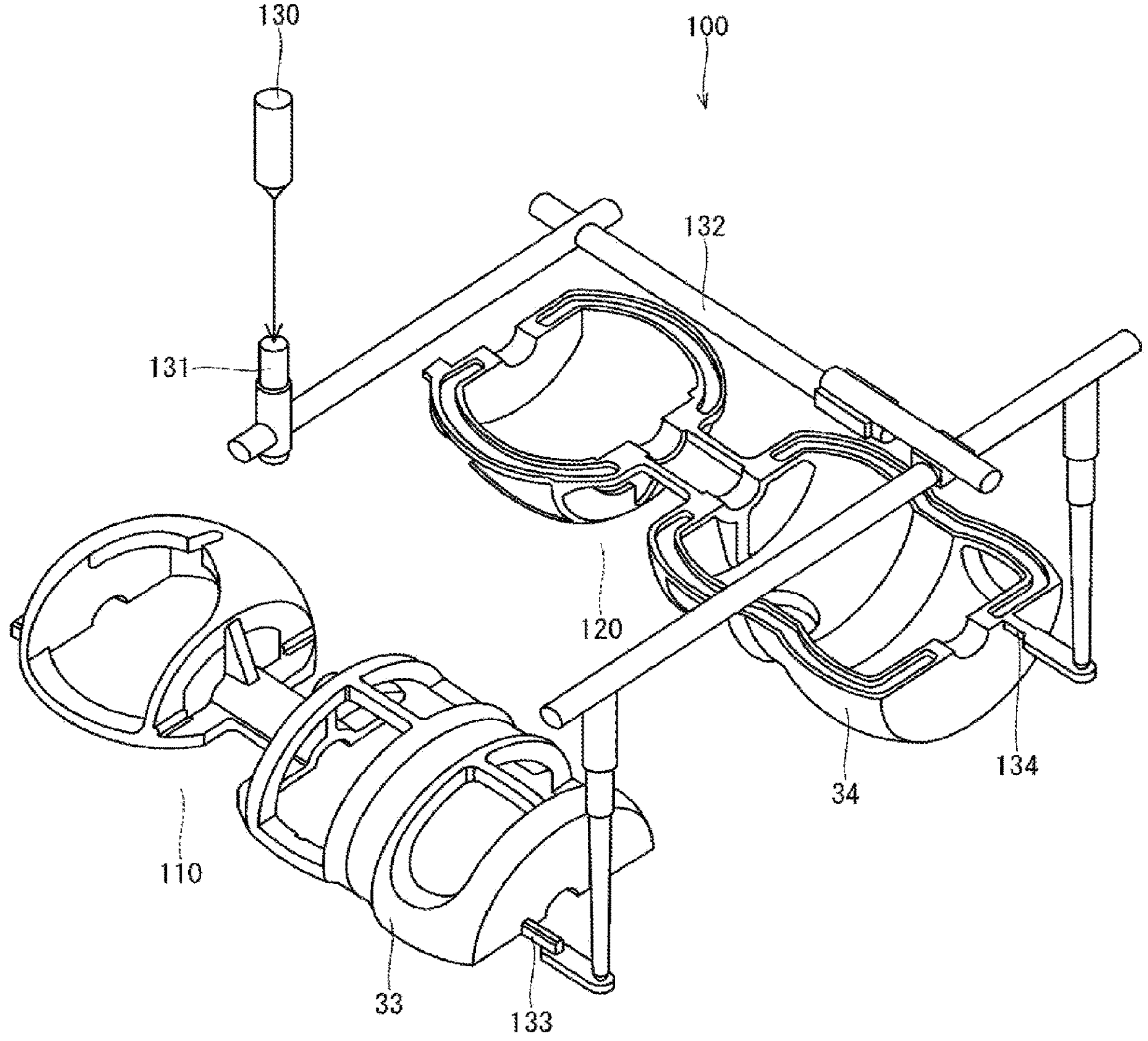
FIG. 30 is a view for describing a manufacturing process of the valve of the valve device of the third embodiment.

As illustrated in FIG. 30, the resin injected from an injection portion 130 of the mold device 100 flows to the first mold 110 and the second mold 120 via a spool 131, a runner 132, and gates 133 and 134. When the first divided body 33 and the second divided body 34 are cooled and solidified, the first molding step is completed.

<3-22-1>

When the first divided body 33 and the second divided body 34 are resin-molded in the first molding step, in at least a partial area in the direction of the rotation axis Axr1 and the circumferential direction, the distance between the first recess surface 113 and the first projection surface 114 and the distance between the second recess surface 123 and the second projection surface 124 are the same as each other.

Therefore, at least a portion of the valve body 31 can have the uniform thickness. In this manner, the accuracy of the spherical surface of the outer circumferential wall of the valve body 31 can be further improved, and the flow channel area of the valve body internal flow channel 300 can be further increased.

<3-23>

(Sliding Step)

In a sliding step after the first molding step, the first divided body 33 or the second divided body 34 is slid together with the first mold 110 or the second mold 120 so that the joint surfaces 331 and 341 of the first divided body 33 and the second divided body 34 face each other. More specifically, as illustrated in (B) in FIG. 29, the first inner mold 112 is removed from the first outer mold 111, the second inner mold 122 is removed from the second outer mold 121, and the first divided body 33 is slid together with the first outer mold 111 so that the joint surfaces 331 and 341 of the first divided body 33 and the second divided body 34 face each other.

The valve 30 can be efficiently manufactured by the sliding step.

<3-24>

(Shaft Setting Step)

In a shaft setting step after the sliding process, the shaft 32 is disposed in the rotation axis Axr1 of the valve body 31. Specifically, as illustrated in (C) of FIG. 29, the shaft 32 is disposed in the rotation axis Axr1 between the first divided body 33 and the second divided body 34.

Therefore, compared to a case where the shaft 32 is assembled after molding the valve body 31, the assembly man-hours of the shaft 32 can be reduced.

<3-22>

(Second Molding Step)

In a second molding step after the shaft disposition step, a resin is injected between a welding portion on the joint surface of the first divided body 33 and a welding portion on the joint surface of the second divided body 34, and the first divided body 33 and the second divided body 34 are welded to each other.

Figure 31:
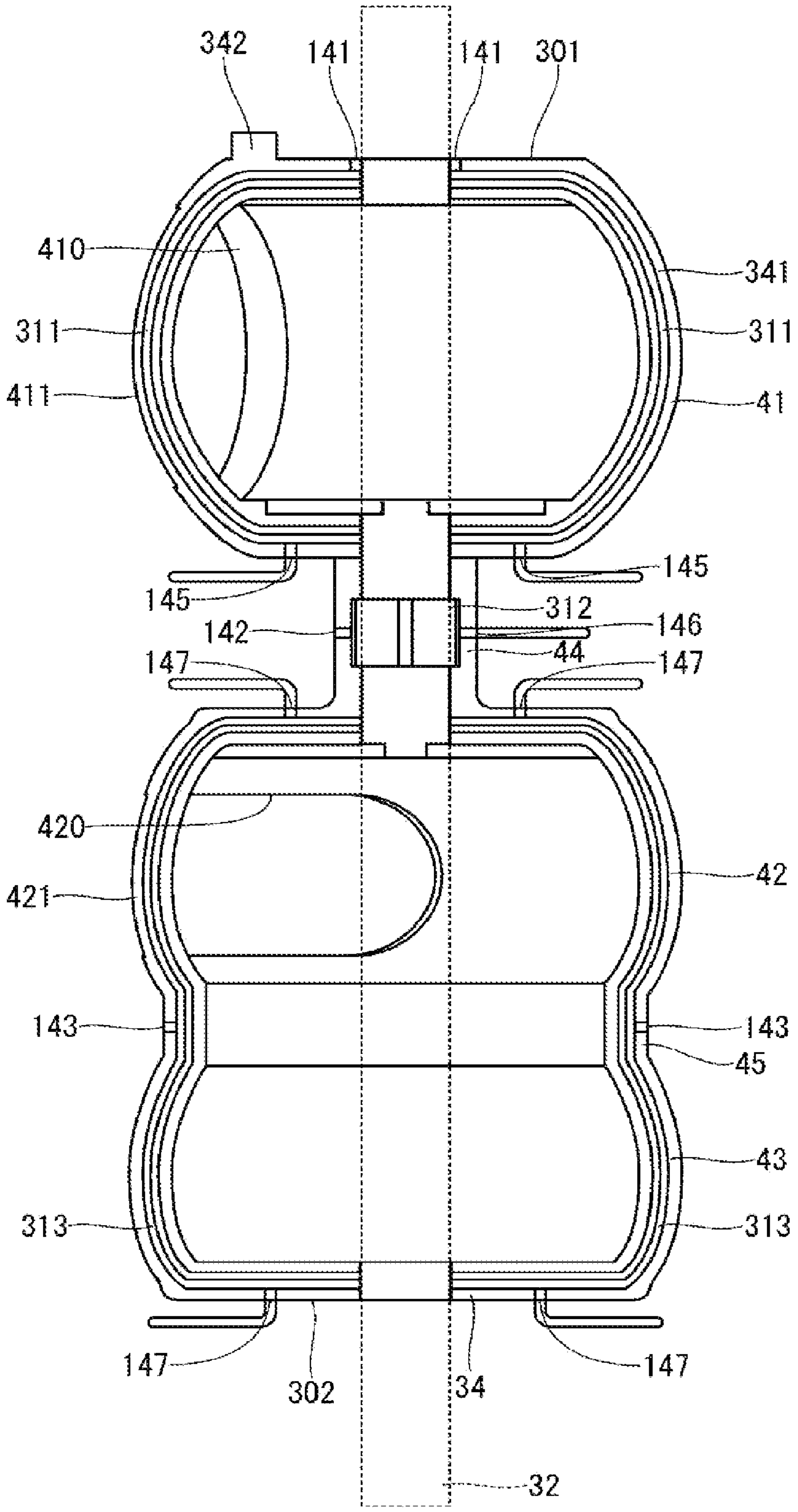
FIG. 31 is a view for describing a manufacturing process of the valve of the valve device of the third embodiment.

As illustrated in FIG. 31, welding portions 311, 312, and 313 are formed on the joint surface 341 of the second divided body 34 after the first molding step. The welding portion 311 is formed in a groove shape to be recessed from the joint surface 341 of the portion corresponding to the ball valve 41 of the second divided body 34. The welding portion 312 is formed in a groove shape to be recessed from the joint surface 341 of the portion corresponding to the cylindrical connection portion 44 of the second divided body 34. The welding portion 313 is formed in a groove shape to be recessed from the joint surface 341 of the portion corresponding to the ball valve 42, the cylindrical valve connection portion 45, and the ball valve 43 of the second divided body 34. As in the second divided body 34, the welding portions 311, 312, and 313 are formed in the first divided body 33.

A gate inlet 141 of the mold device 100 is disposed in one end of the welding portion 311, and a gate outlet 145 is disposed in the other end of the welding portion 311. A gate inlet 142 of the mold device 100 is disposed in one end of the welding portion 312, and a gate outlet 146 is disposed in the other end of the welding portion 312. A gate inlet 143 of the mold device 100 is disposed in the center of the welding portion 313, and a gate outlet 147 is disposed in both ends of the welding portion 313. The gate inlet 142 and the gate outlet 146 are disposed in the center in the axial direction of the cylindrical connection portion 44. The gate inlet 143 is disposed in the center in the axial direction of the cylindrical valve connection portion 45. The gate inlet 141 is disposed on the first outermost end surface 301 of the ball valve 41. The gate outlet 145 is disposed on the end surface on the side opposite to the first outermost end surface 301 of the ball valve 41. The gate outlet 147 is disposed on the second outermost end surface 302 of the ball valve 43 and the end surface on the ball valve 41 side of the ball valve 42.

Figure 32:
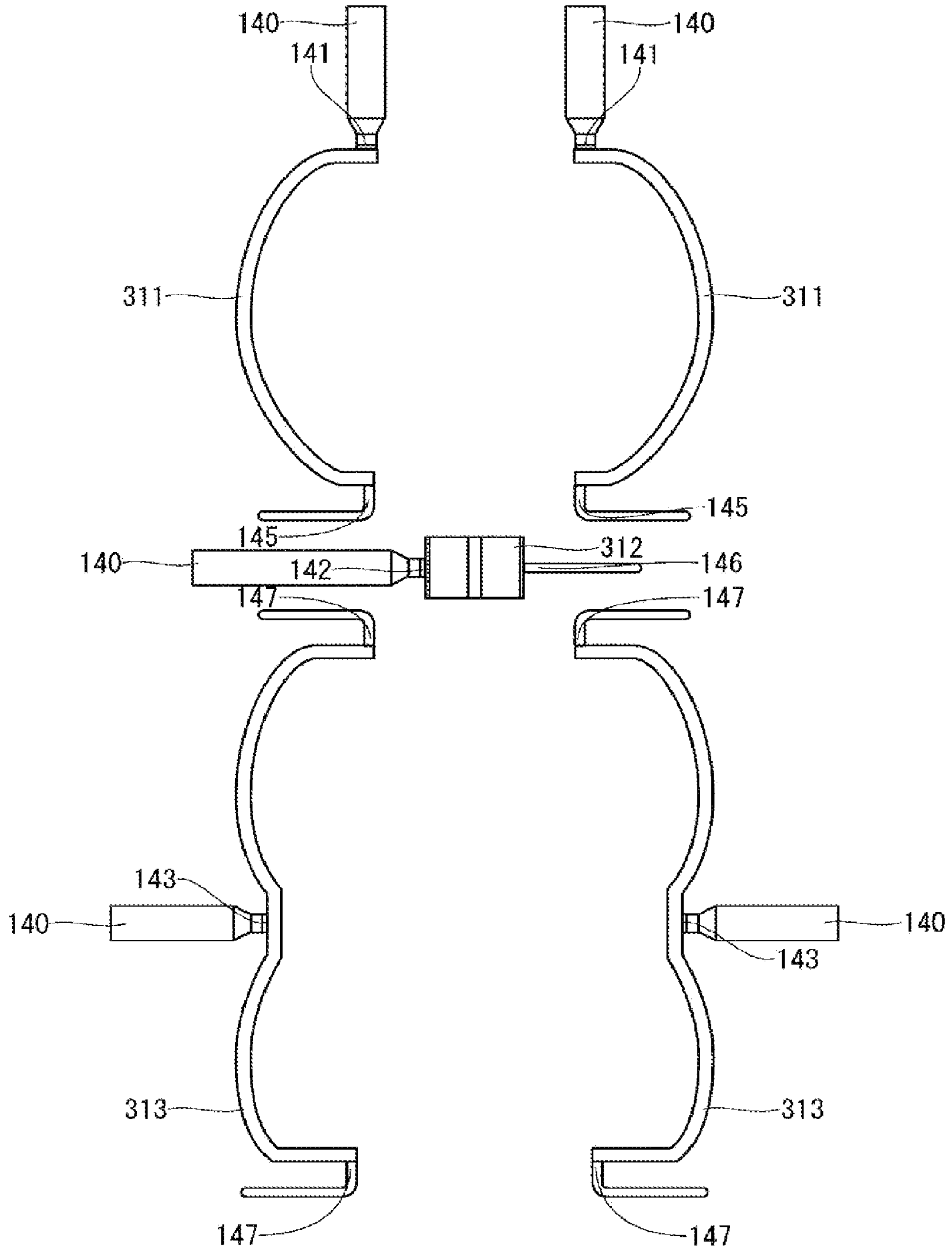
FIG. 32 is a view for describing a manufacturing process of the valve of the valve device of the third embodiment.

As illustrated in FIG. 32, in the second molding step, a molten resin is injected from an injection portion 140 of the mold device 100 to the welding portions 311, 312, and 313 via the gate inlets 141, 142, and 143. The resin flowing into the welding portions 311, 312, and 313 from the gate inlets 141, 142, and 143 flows toward each of the gate outlets 145, 146, and 147, and flows out from the gate outlets 145, 146, and 147. When the resin inside the welding portions 311, 312, and 313 is cooled and solidified, the first divided body 33, the second divided body 34, and the shaft 32 are welded to each other, and the second molding step is completed. The resin remaining at the positions corresponding to the gate inlet 142 and the gate outlet 146 of the cylindrical connection portion 44 of the valve body 31 forms the specific shape portion 441. The resin remaining at the position corresponding to the gate inlet 143 of the cylindrical valve connection portion 45 of the valve body 31 forms the specific shape portion 451.

<3-22>

As described above, according to the present embodiment, there is provided the manufacturing method of the valve 30 having the valve body 31 rotatable around the rotation axis Axr1 and the valve body internal flow channel 300 formed inside the valve body 31. The manufacturing method includes the first molding step and the second molding step.

The valve body 31 has the first divided body 33 and the second divided body 34 in which at least a portion of the outer circumferential wall is formed in a spherical shape, at least a portion of the inner circumferential wall is formed to be recessed outward, and which are divided into two in the virtual plane Vp1 including the rotation axis Axr1. The first divided body 33 and the second divided body 34 are joined to each other by the respective joint surfaces 331 and 341.

In a first molding step, the first divided body 33 and the second divided body 34 are respectively resin-molded by the first mold 110 and the second mold 120.

In the second molding step, the resin is injected between the welding portions (311, 312, and 313) on the joint surface 331 of the first divided body 33 and the welding portions (311, 312, and 313) on the joint surface 341 of the second divided body 34. The first divided body 33 and the second divided body 34 are welded to each other.

Since the valve 30 is manufactured by using the above-described manufacturing method, it is possible to improve the molding accuracy of the spherical surface of the outer circumferential wall of the valve body 31. In this manner, it is possible to prevent the leakage of coolant water in the outer circumferential wall of the valve body 31.

In addition, a flow channel area of the valve body internal flow channel 300 can be increased, and water flow resistance can be reduced.

As described above, according to the present embodiment, the valve 30 is manufactured by die slide injection (DSI). In the DSI molding, the valve body 31 is separated into two. Therefore, compared to a case of a normal manufacturing method in which die cutting is performed in the axial direction of the valve body 31, the number of openings of the valve body 31 can be changed without increasing die cutting directions. As a result, it is possible to cope with a complicated flow diagram. In a case where the valve body 31 is formed integrally, when the number of openings increases, the number of die cutting steps increase.

In the DSI molding, the die cutting direction is the radial direction of the valve body 31. Accordingly, compared to a case of the normal manufacturing method in which the die cutting is performed in the axial direction of the valve body 31, it is possible to prevent deformation caused by the mold rubbing against a surface of products. In addition, since deformation of the surface of the products can be prevented, an improved sealing property is achieved.

Fourth Embodiment

Figure 33:
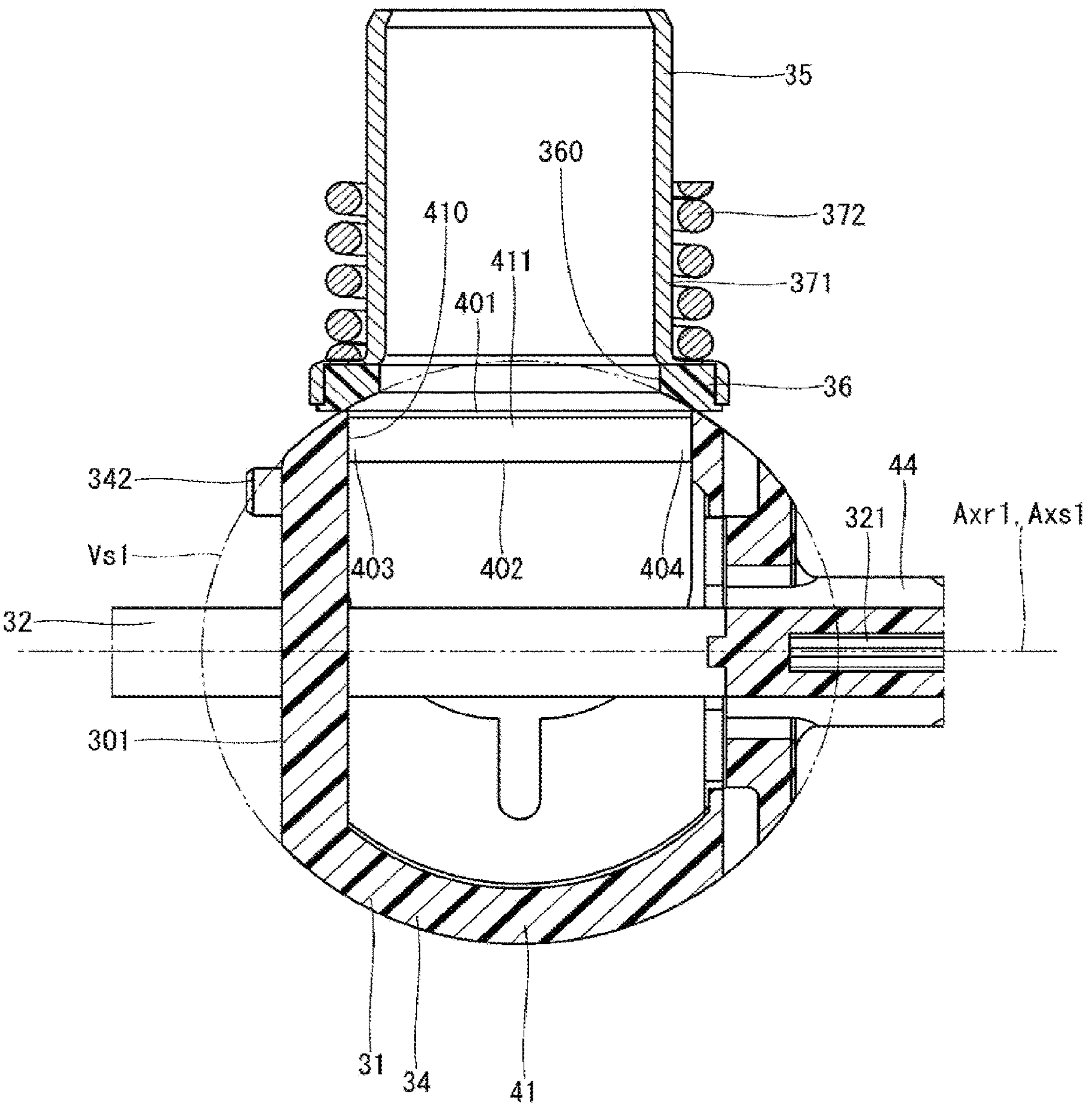
FIG. 33 is a cross-sectional view illustrating a part of a valve and a seal unit of a valve device of a fourth embodiment.

A portion of a valve device according to a fourth embodiment is illustrated in FIG. 33.

<3-10>

As illustrated in FIG. 33, the valve body opening rib 411 is formed in a linear shape at a predetermined distance from the virtual spherical surface Vs1. The valve body opening ribs 421 and 422, and the valve body opening ribs 431 and 432 are also formed in a linear shape at a predetermined distance from the virtual spherical surface along the outer circumferential wall of the ball valves 42 and 43.

Therefore, when the valve body 31 rotates, it is possible to more effectively prevent a possibility that the sliding resistance may increase due to the valve seal 36 caught on the valve body opening rib 411.

As illustrated in FIG. 33, the valve body opening rib 411 is formed in a linear flat plate shape. A rib outer edge portion 401 which is an outer portion in the radial direction of the valve body opening rib 411 is formed in a linear shape to be parallel to the rotation axis Axr1, and the distance from the virtual spherical surface Vs1 is changed in the direction of the rotation axis Axr1. A rib inner edge portion 402 which is an inner portion in the radial direction of the valve body opening rib 411 is formed in a linear shape to be parallel to the rotation axis Axr1, and the distance from the virtual spherical surface Vs1 is changed in the direction of the rotation axis Axr1. A rib end portion 403 which is one end portion of the valve body opening rib 411 is connected to a portion on the side opposite to the cylindrical connection portion 44 in the inner edge end of the valve body opening portion 410. A rib end portion 404 which is the other end of the valve body opening rib 411 is connected to a portion on the cylindrical connection portion 44 side in the inner edge end of the valve body opening portion 410.

As illustrated in FIG. 33, the valve body opening rib 411 is located outside in the radial direction of the ball valve 41 with respect to the second restriction projection portion 342.

Fifth Embodiment

Figure 34:
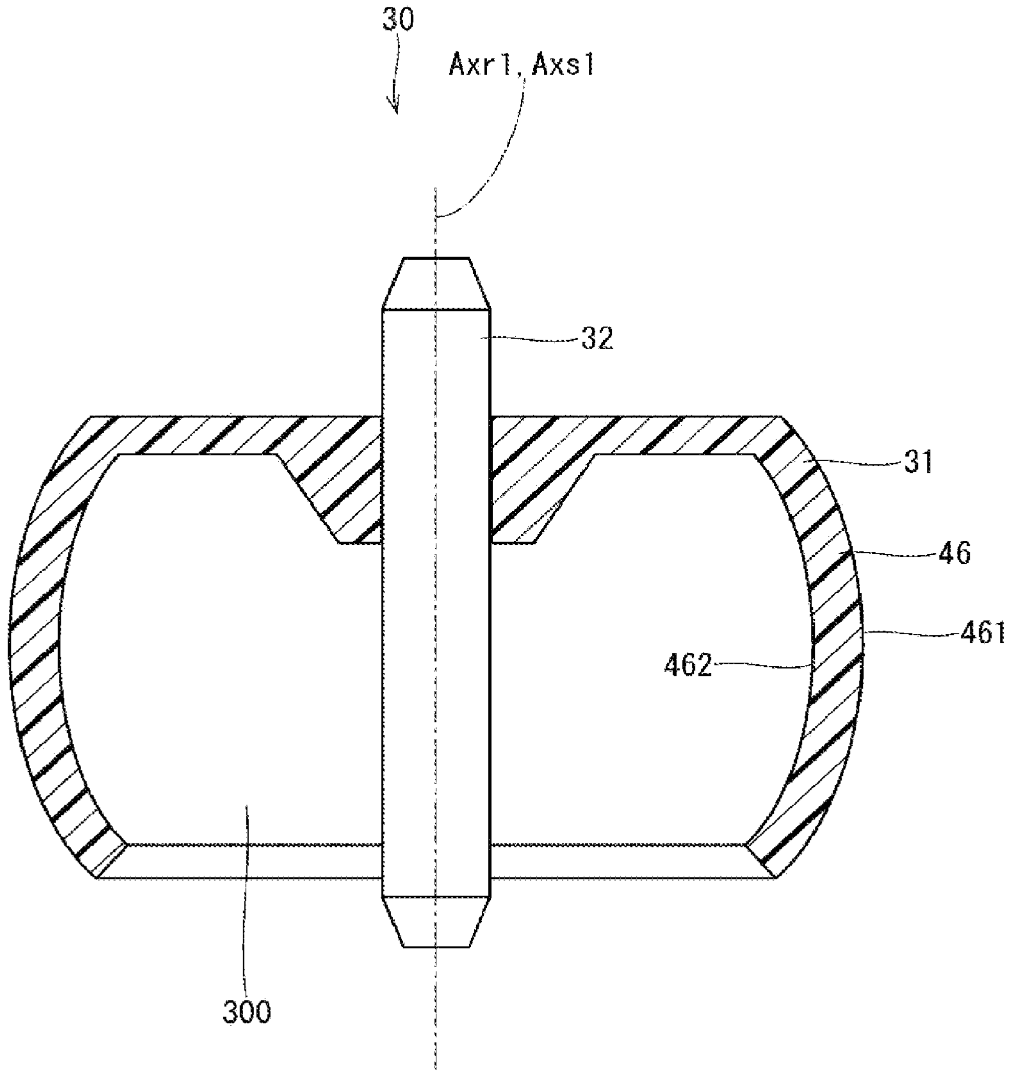
FIG. 34 is a cross-sectional view illustrating a part of a valve of a valve device of a fifth embodiment.

A portion of a valve device according to a fifth embodiment is illustrated in FIG. 34.

The valve body 31 of the valve 30 has a ball valve 46. The shaft 32 is provided on the rotation axis Axr1 of the valve body 31. The ball valve 46 has an outer circumferential wall 461 and an inner circumferential wall 462. The outer circumferential wall 461 is formed in a spherical shape to bulge outward in the radial direction of the ball valve 46. The inner circumferential wall 462 is formed in a spherical shape to be recessed outward in the radial direction of the ball valve 46. Here, in the valve body 31, in at least a partial area in the direction of the rotation axis Axr1 and the circumferential direction, the distances between the outer circumferential wall 461 and the inner circumferential wall 462 are the same as each other. That is, the valve body 31 is formed to have the uniform thickness at least in the above-described range.

Next, a manufacturing method of the valve 30 will be described.

Figure 35:
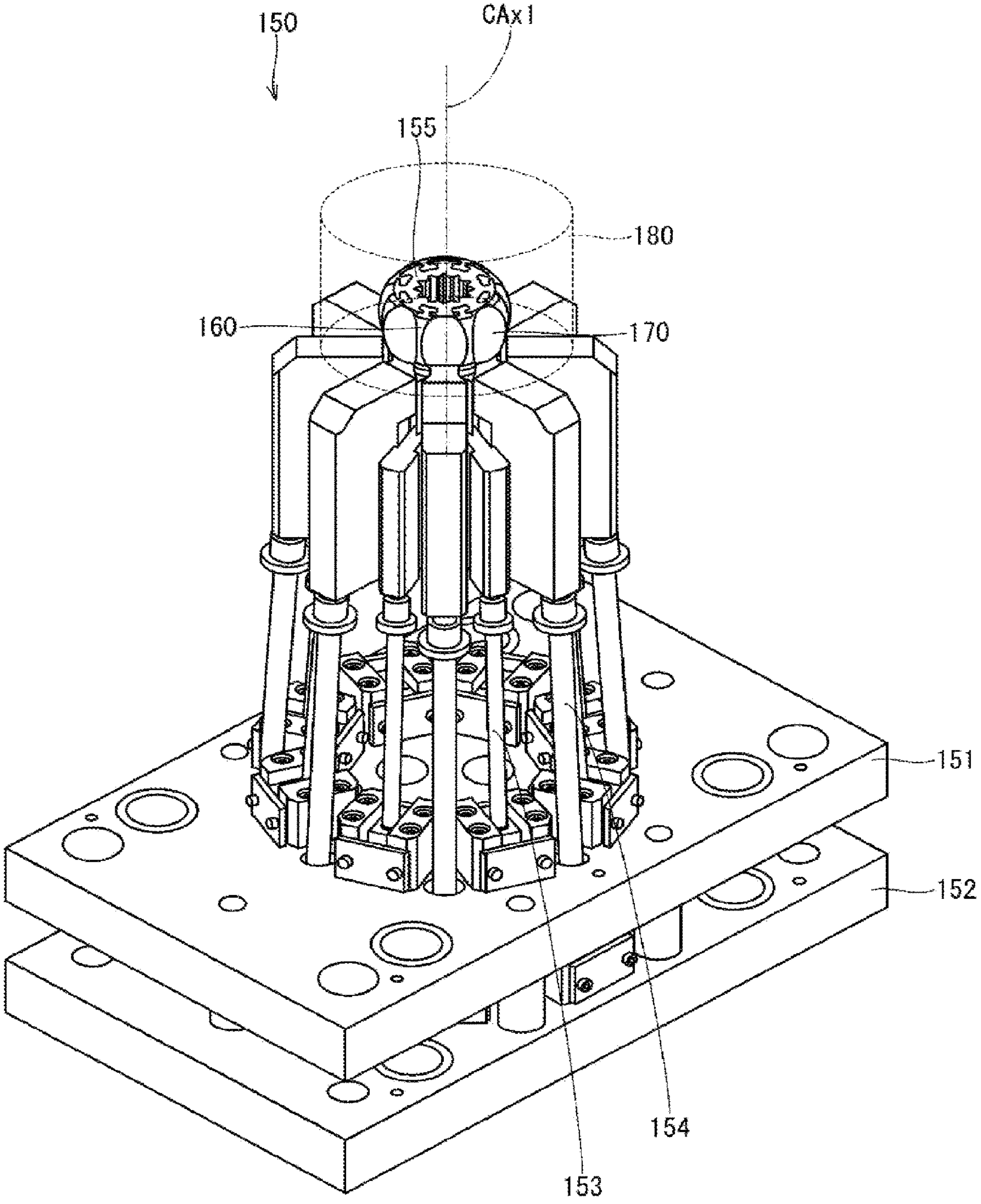
FIG. 35 is a perspective view illustrating a mold device used in a manufacturing process of the valve of the valve device of the fifth embodiment.

As illustrated in FIG. 35, the mold device 150 includes an upper base 151, a lower base 152, an upper support column 153, a lower support column 154, a mold driving body 155, a first inner mold 160, a second inner mold 170, and an outer mold 180.

Figure 36:
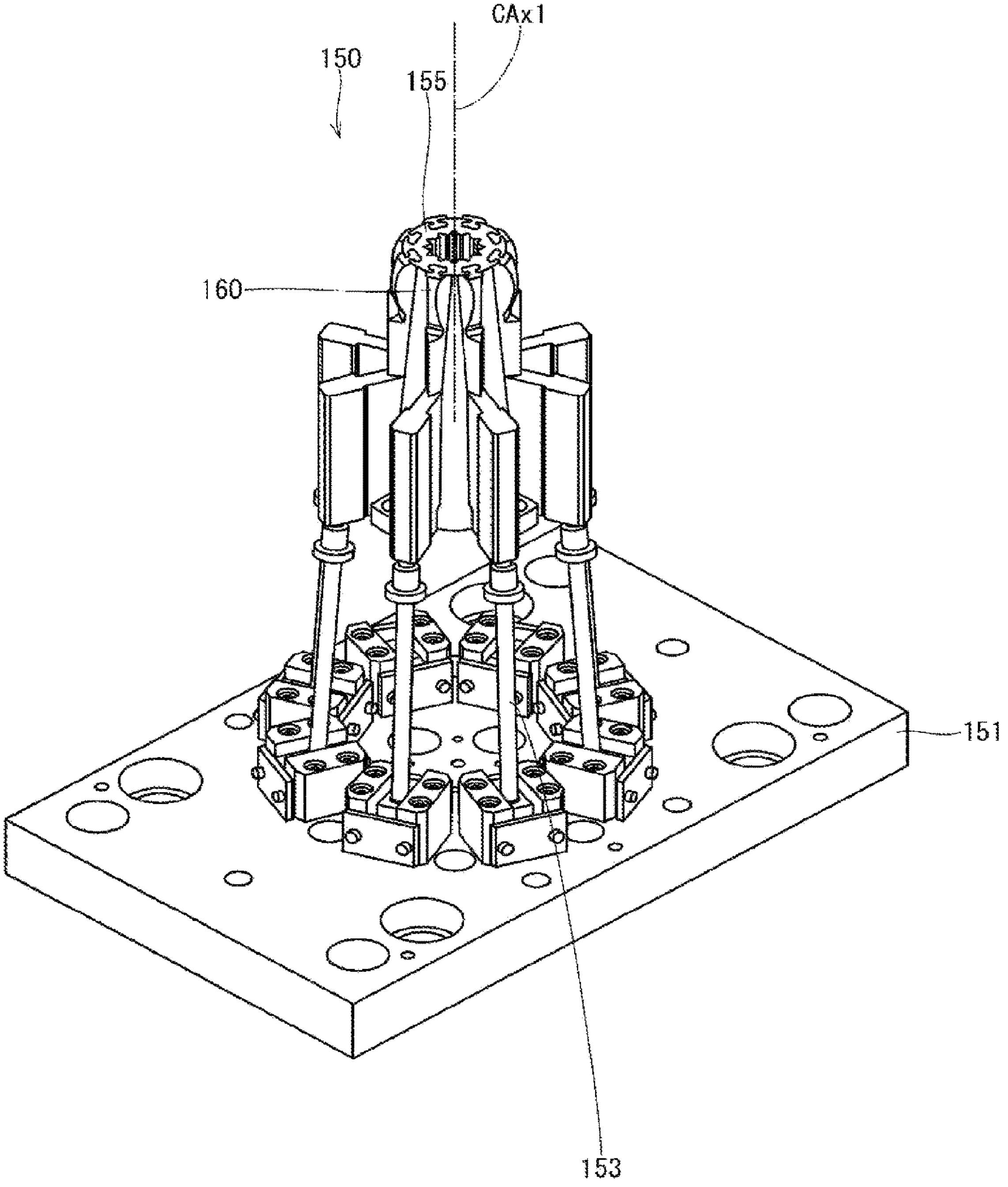
FIG. 36 is a perspective view illustrating a part of the mold device used in the manufacturing process of the valve of the valve device of the fifth embodiment.

The upper base 151 is formed in a plate shape. The lower base 152 is formed in a plate shape, and is provided to be parallel to the upper base 151. The upper support column 153 is formed in a rod shape, and one end is connected to a side of the upper base 151 which is opposite to the lower base 152. Eight upper support columns 153 are provided so that one end has an annular shape around a center axis CAx1 of a mold device 150 in the upper base 151 (refer to FIG. 36). In the upper support column 153, one end is used as a fulcrum, and the other end side can oscillate toward the center axis CAx1.

Figure 37:
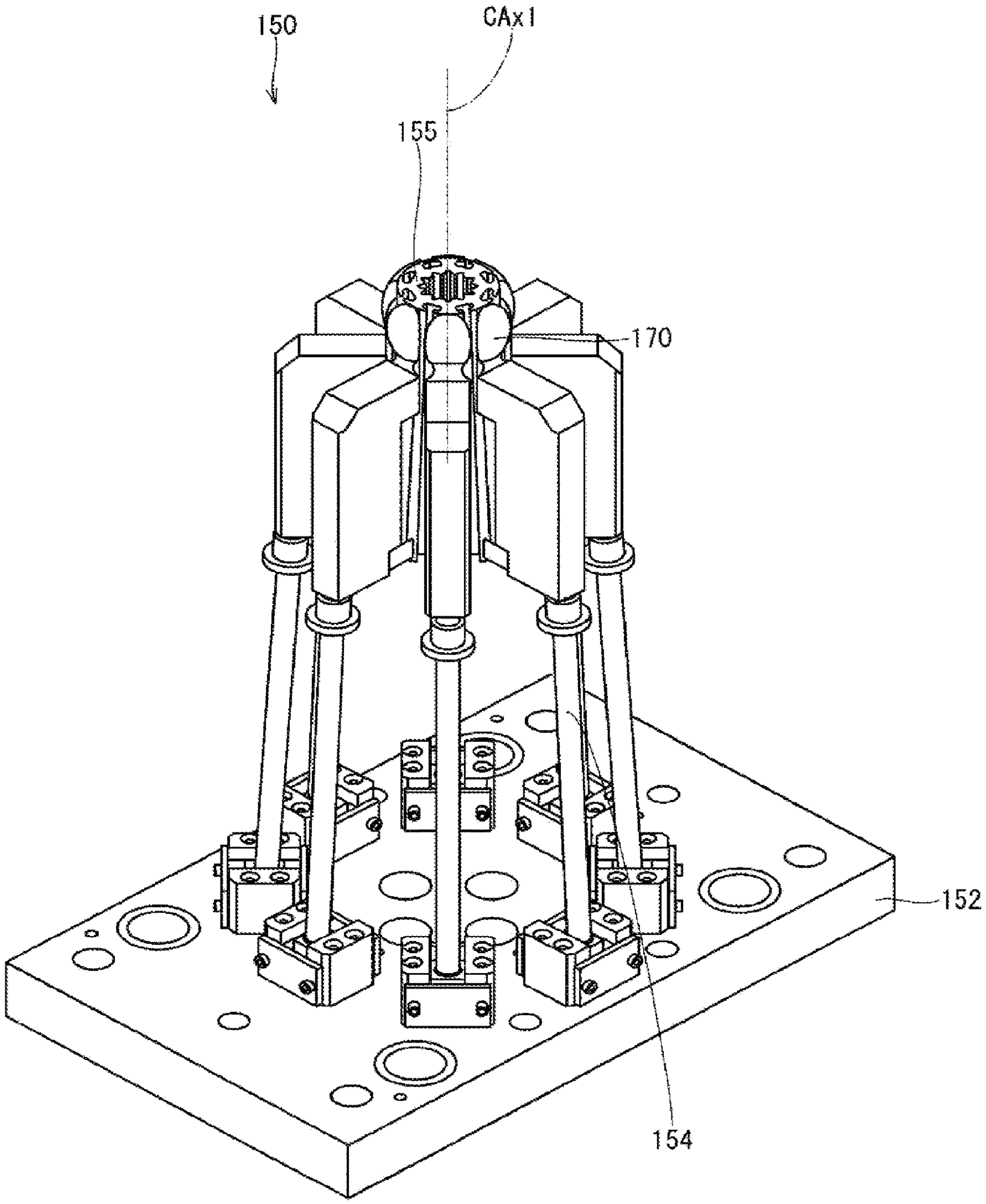
FIG. 37 is a perspective view illustrating a part of the mold device used in the manufacturing process of the valve of the valve device of the fifth embodiment.

The lower support column 154 is formed in a rod shape, and one end is connected to a side of the lower base 152 on the upper base 151 side. The lower support column 154 is provided so that the other end is located on the side opposite to the lower base 152 with respect to the upper base 151 through a hole of the upper base 151. Eight lower support column 154 are provided so that one end has an annular shape around the center axis CAx1 in the lower base 152 (refer to FIG. 37). In the lower support column 154, one end is used as a fulcrum, and the other end side can oscillate toward the center axis CAx1.

The first inner mold 160 is provided in the other end of each of the eight upper support columns 153. That is, the eight first inner molds 160 are provided in total. The second inner mold 170 is provided in the other end of each of the eight lower support columns 154. That is, the eight second inner molds 170 are provided in total.

Figure 38:
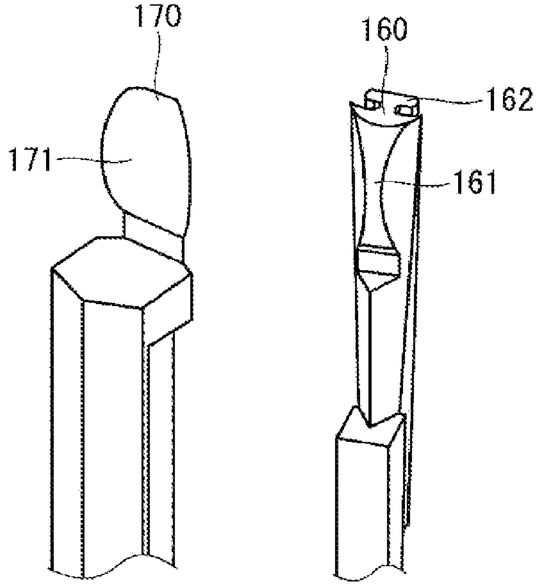
FIG. 38 is a perspective view illustrating a part of the mold device used in the manufacturing process of the valve of the valve device of the fifth embodiment.

As illustrated in FIG. 38, the first inner mold 160 has a first projection surface 161 in a portion of the outer wall. The first projection surface 161 is formed in a spherical shape. The second inner mold 170 has a second projection surface 171 in a portion of the outer wall. The second projection surface 171 is formed in a spherical shape.

As illustrated in FIG. 35, the first inner mold 160 and the second inner mold 170 are alternately disposed in the circumferential direction so that the first projection surface 161 and the second projection surface 171 face the side opposite to the center axis CAx1. In this manner, the first projection surface 161 and the second projection surface 171 can form a spherical surface continuous in the circumferential direction.

Figure 39:
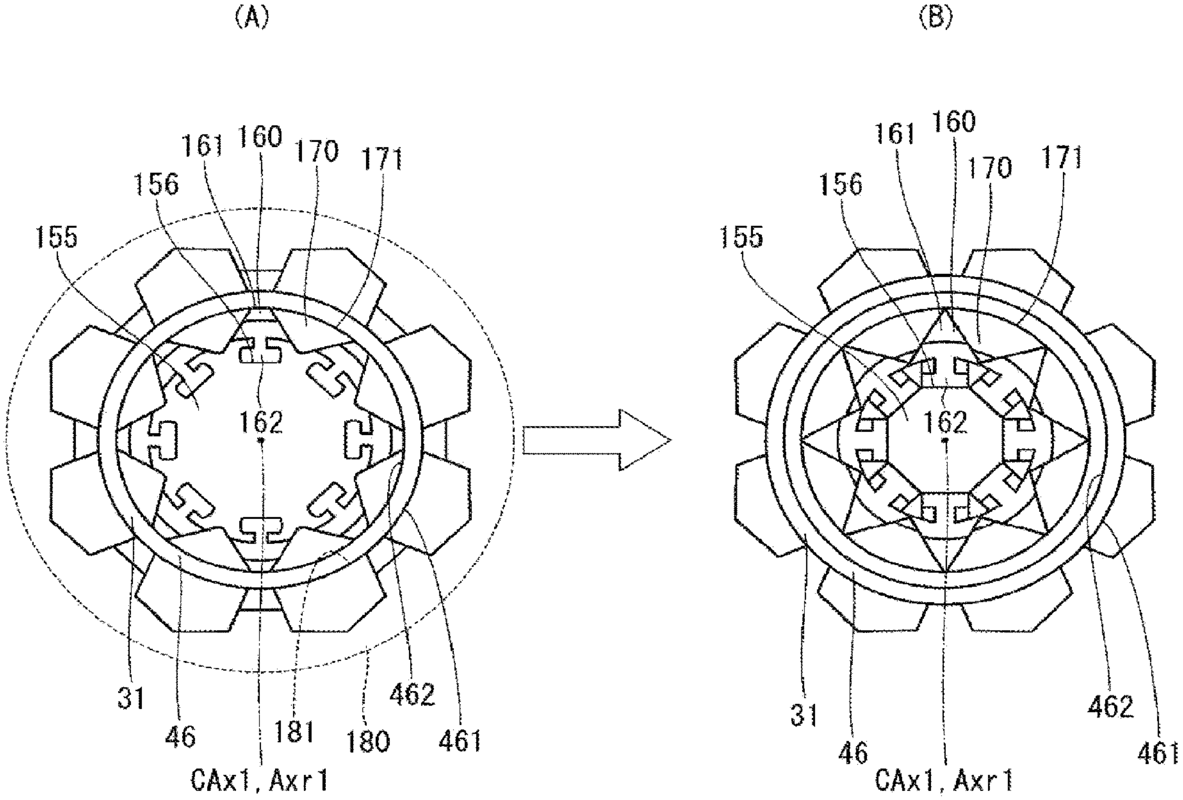
FIG. 39 is a view for describing a manufacturing process of the valve of the valve device of the fifth embodiment.

The outer mold 180 has a recess surface 181 on the inner wall (refer to FIG. 39). The recess surface 181 is formed in a spherical shape. The outer mold 180 is disposed outside the first inner mold 160 and the second inner mold 170 so that the recess surface 181 faces the first projection surface 161 and the second projection surface 171.

The mold driving body 155 is formed in a cylindrical shape. The mold driving body 155 is disposed inside the first inner mold 160 and the second inner mold 170 to be coaxially with the center axis CAx1. An engagement groove portion 156 is formed on the outer circumferential wall of the mold driving body 155. The engagement groove portion 156 is formed to extend from one end to the other end of the mold driving body 155. Eight engagement groove portions 156 are formed at an equal interval in the circumferential direction of the mold driving body 155.

Figure 40:
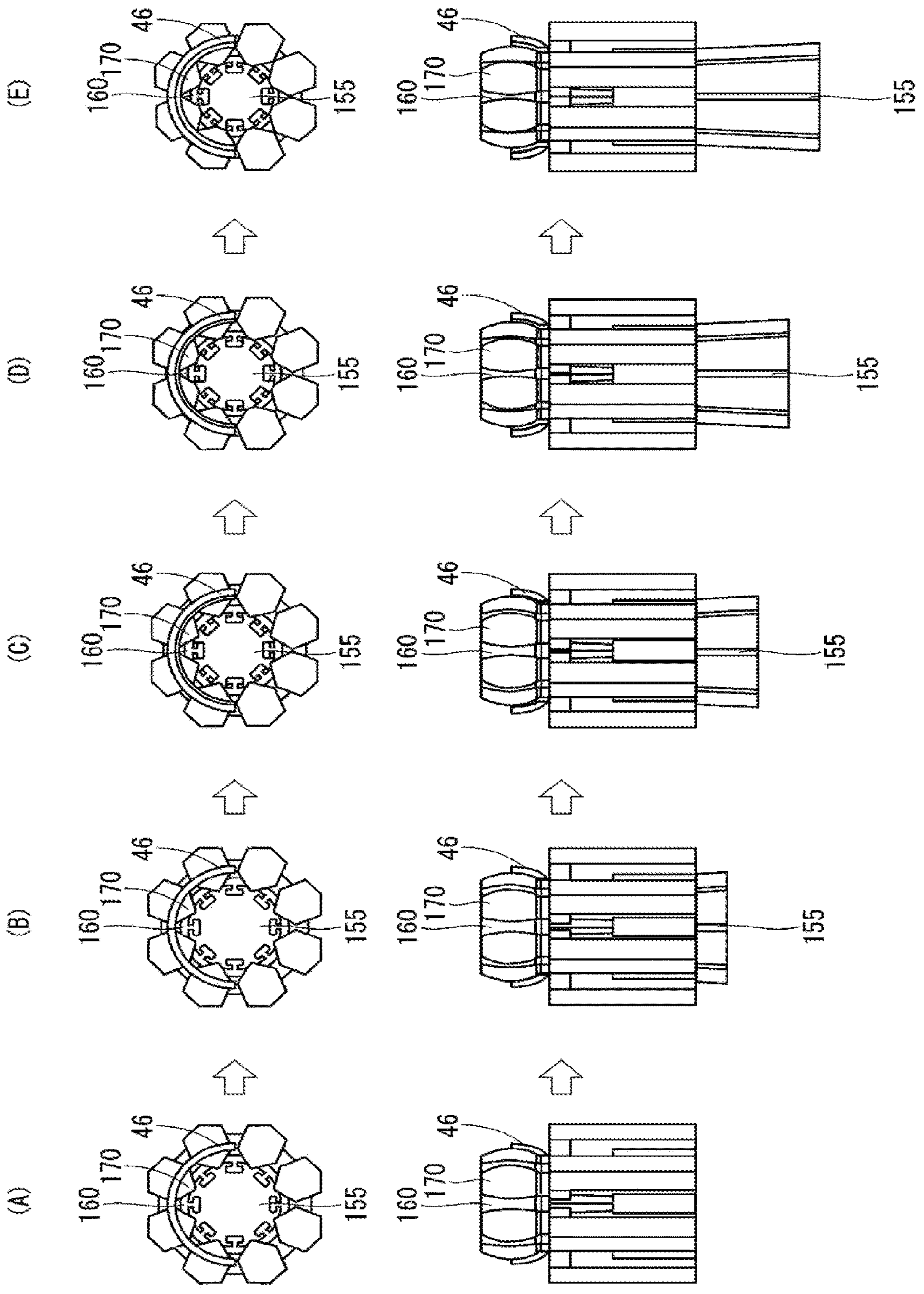
FIG. 40 is a view for describing a manufacturing process of the valve of the valve device of the fifth embodiment.

The first inner mold 160 has an engagement projection portion 162 on the side opposite to the first projection surface 161. The engagement projection portion 162 can engage with the engagement groove portion 156 of the mold driving body 155. The mold driving body 155 is movable in the direction of the center axis CAx1 in a state where the engagement projection portion 162 engages with the engagement groove portion 156. The outer circumferential wall of the mold driving body 155 is formed in a tapered shape. Therefore, when the mold driving body 155 is relatively moved to the upper base 151 side in the direction of the center axis CAx1 with respect to the first inner mold 160 and the second inner mold 170, the eight first inner molds 160 move to gather on the side of the center axis CAx1 (refer to FIGS. 39 and 40). In this manner, the inner diameter of the spherical surface formed by the first projection surface 161 is reduced. When the first inner mold 160 moves to gather on the side of the center axis CAx1, the eight second inner molds 170 are also movable to gather on the side of the center axis CAx1. That is, when the first inner mold 160 and the second inner mold 170 move to gather on the side of the center axis CAx1, the inner diameter of the spherical surface formed by the first projection surface 161 and the second projection surface 171 is reduced.

The manufacturing method of the valve 30 includes the following steps.

<3-25> Manufacturing Method of Spherical Valve Body (Resin Molding Step)

In the resin molding step, the valve body 31 is resin-molded between the outer mold 180, and the first inner mold 160 and the second inner mold 170 which are disposed inside the outer mold 180. Specifically, as illustrated in FIG. 35 and (A) of FIG. 39, the molten resin is injected into a space formed between the spherical surface formed by the first projection surface 161 and the second projection surface 171 and the recess surface 181 of the outer mold 180. When the resin is cooled and hardened, the resin molding step is completed.

<3-25-1>

When the valve body 31 is resin-molded in the resin molding step, in at least a partial area in the direction of the rotation axis Axr1 and the circumferential direction, the distances between the recess surface 181 and the first projection surface 161 and the second projection surface 171 are the same as each other (refer to (A) of FIG. 39).

Therefore, at least a portion of the valve body 31 can have the uniform thickness. In this manner, the accuracy of the spherical surface of the outer circumferential wall of the valve body 31 can be further improved, and the flow channel area of the valve body internal flow channel 300 can be further increased.

(Mold Movement Step)

In the mold movement step after the resin molding step, the first inner mold 160 and the second inner mold 170 are moved to the inside of the valve body 31. Specifically, as illustrated in (A) and (B) of FIG. 39, and (A) to (E) of FIG. 40, the mold driving body 155 is relatively moved in the direction of the center axis CAx1 with respect to the first inner mold 160 and the second inner mold 170. The first inner mold 160 and the second inner mold 170 are moved to the side of the center axis CAx1, thereby reducing the diameter of the spherical surface formed by the first projection surface 161 and the second projection surface 171. In this manner, a gap is formed between the inner circumferential wall 462 of the valve body 31 and the first projection surface 161 and the second projection surface 171. The first inner mold 160 and the second inner mold 170 are relatively moved in the direction of the center axis CAx1 with respect to the valve body 31, thereby pulling out the first inner mold 160 and the second inner mold 170 from the inside of the valve body 31.

<3-26>

Figure 41:
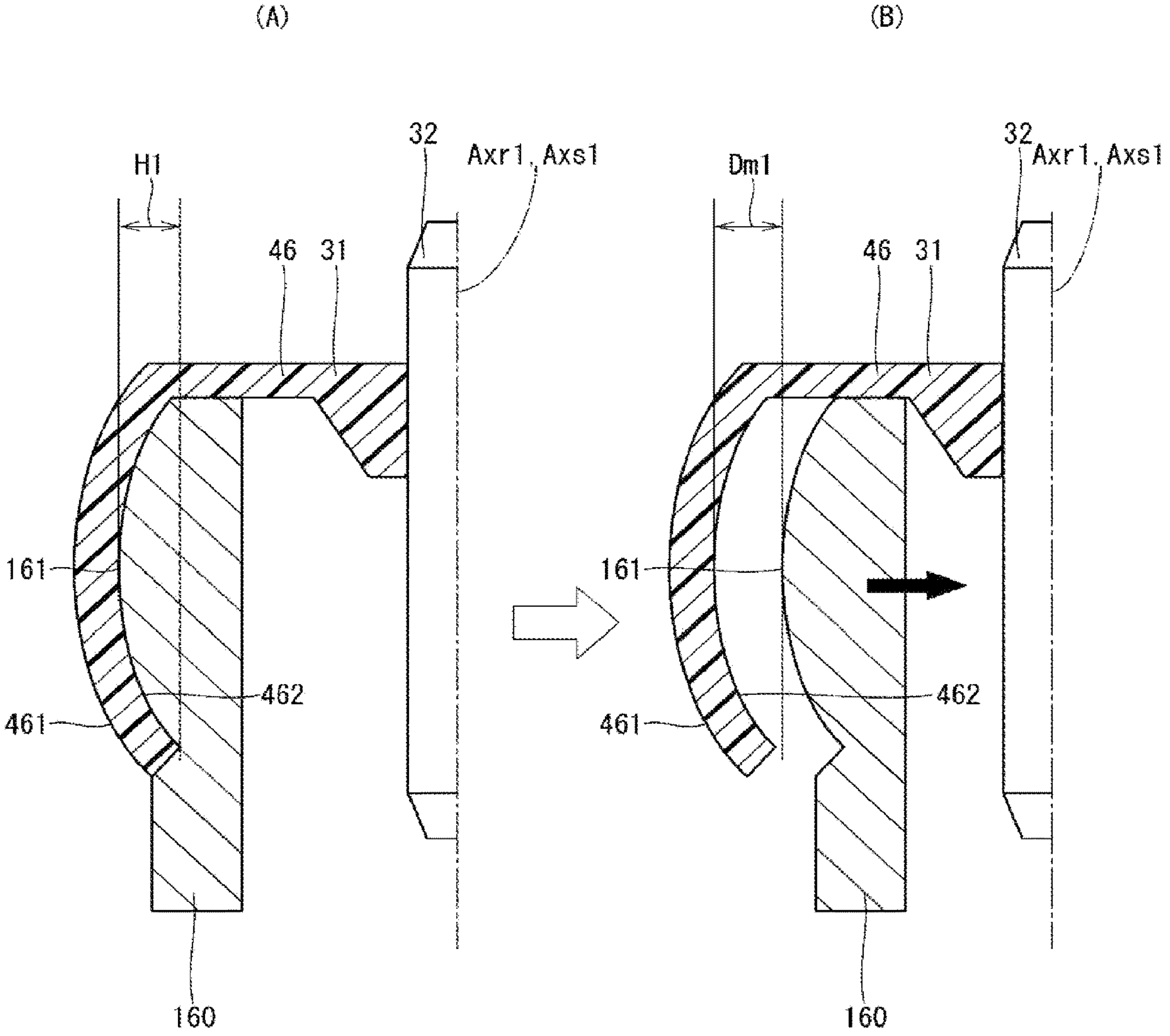
FIG. 41 is a view for describing a manufacturing process of the valve of the valve device of the fifth embodiment.

As illustrated in (A) and (B) of FIG. 41, a projection height H1 of the first projection surface 161 and the second projection surface 171 is set to be smaller than a movable distance Dm1 of the first inner mold 160 and the second inner mold 170 in the mold movement step.

Therefore, when the first inner mold 160 and the second inner mold 170 are pulled out from the inside of the valve body 31, the first projection surface 161 and the second projection surface 171 do not interfere with the inner circumferential wall 462 of the valve body 31. Accordingly, the first inner mold 160 and the second inner mold 170 can be easily pulled out from the valve body 31.

<3-25>

As described above, according to the present embodiment, there is provided the manufacturing method of the valve 30 having the valve body 31 rotatable around the rotation axis Axr1 and the valve body internal flow channel 300 formed inside the valve body 31. The manufacturing method includes the resin molding step and the mold movement step.

In the valve body 31, at least a portion of the outer circumferential wall is formed in a spherical shape, and at least a portion of the inner circumferential wall is formed to be recessed outward.

In the resin molding step, the valve body 31 is resin-molded between the outer mold 180 and the inner molds (160 and 170) disposed inside the outer mold 180.

In the mold movement step, after the resin molding step, the inner molds (160 and 170) are moved to the inside of the valve body 31.

Since the valve 30 is manufactured by using the above-described manufacturing method, it is possible to improve the molding accuracy of the spherical surface of the outer circumferential wall of the valve body 31. In this manner, it is possible to prevent the leakage of coolant water in the outer circumferential wall of the valve body 31.

In addition, a flow channel area of the valve body internal flow channel 300 can be increased, and water flow resistance can be reduced.

Sixth Embodiment

Figure 42:
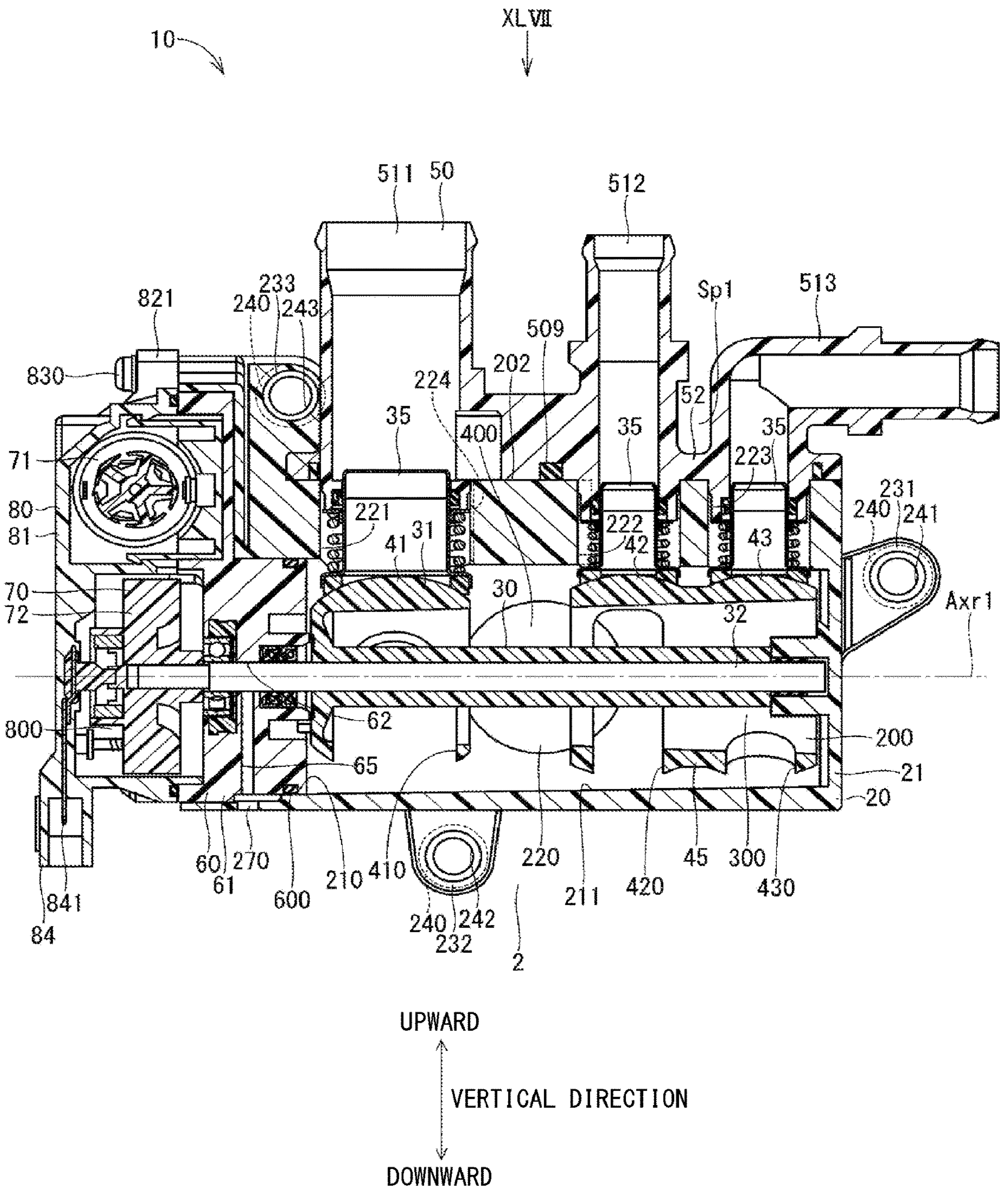
FIG. 42 is a cross-sectional view illustrating a valve device of a sixth embodiment.

A valve device according to a sixth embodiment is illustrated in FIG. 42. The sixth embodiment is different from the first embodiment in a configuration of the valve 30.

The ball valves 41 and 42 of the valve body 31, the cylindrical valve connection portion 45, and the ball valve 43 are integrally formed to be aligned in this order from the drive unit 70 side in the direction of the rotation axis Axr1 to the side opposite to the drive unit 70. The valve body 31 is formed in a cylindrical shape. The ball valves 41 and 42, the cylindrical valve connection portion 45, and the inner circumferential wall of the ball valve 43 are formed in a substantially cylindrical surface shape around the rotation axis Axr1. The inner circumferential wall of the valve body 31 is formed in a tapered shape in which the inner diameter increases from the drive unit 70 side in the direction of the rotation axis Axr1 toward the side opposite to the drive unit 70. The valve body 31 is formed so that the outer circumferential wall in the ball valves 41, 42, and 43 has a spherical shape. The shaft 32 is provided integrally with the valve body 31 in the rotation axis Axr1.

The outlet ports 221, 222, and 223 are respectively formed at positions corresponding to the ball valves 41, 42, and 43. The end portion of the pipe portion 511 which is opposite to the outlet port 221 is connected to the radiator 5 via a hose. The end portion of the pipe portion 512 which is opposite to the outlet port 222 is connected to the heater 6 via a hose. The end portion of the pipe portion 513 which is opposite to the outlet port 223 is connected to the device 7 via a hose.

As illustrated in FIG. 42, the ball valves 41, 42, and 43 are respectively provided at positions corresponding to the outlet ports 221, 222, and 223. The "positions corresponding to the outlet ports 221, 222, and 223" mean a range overlapping the projection when the outlet ports 221, 222, and 223 are projected in the axial direction of the outlet ports 221, 222, and 223.

As illustrated in FIG. 42, the cylindrical valve connection portion 45 is provided between the outlet port 222 and the outlet port 223 in the direction of the rotation axis Axr1.

Figure 43:
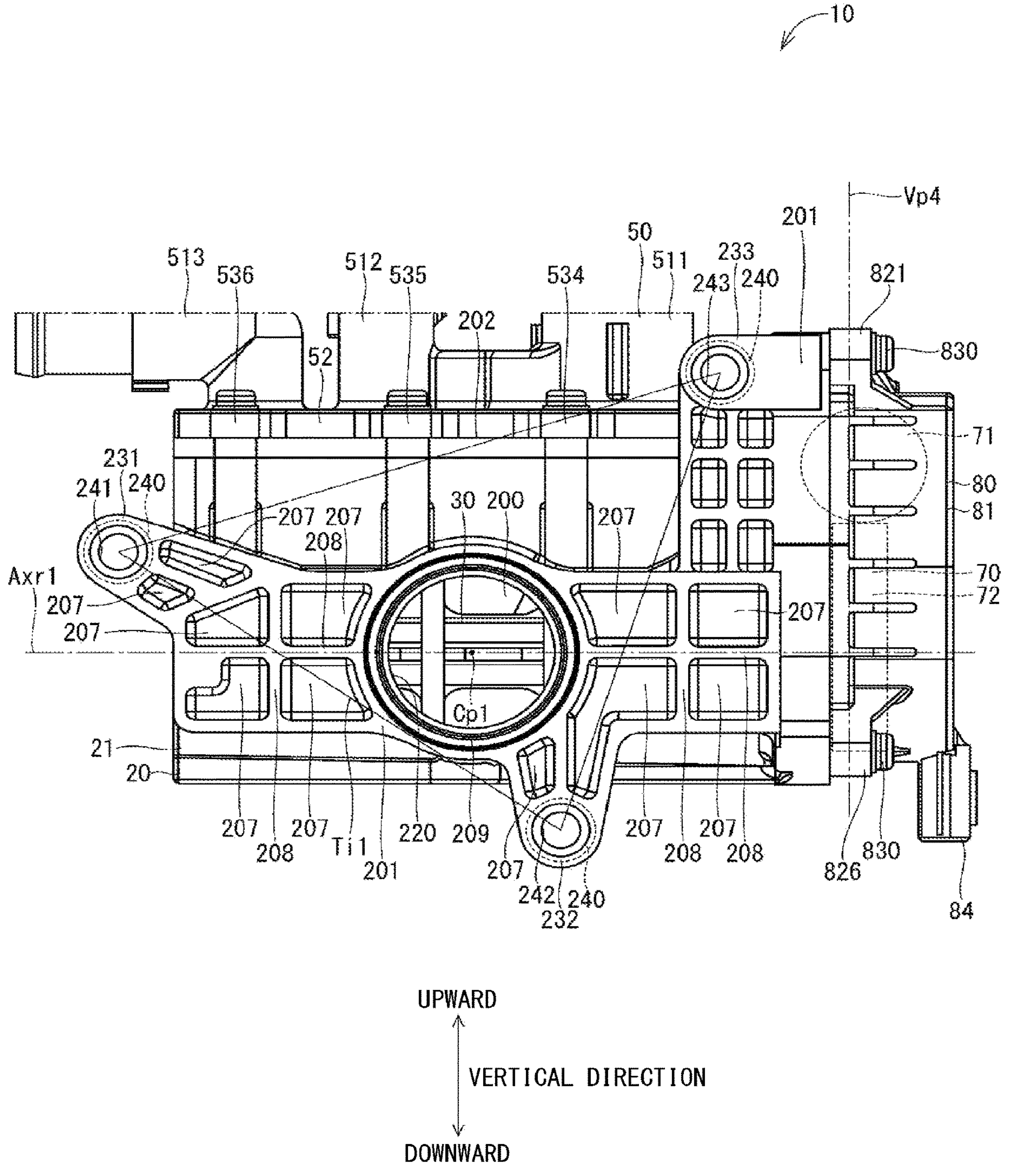
FIG. 43 is a view illustrating the valve device of the sixth embodiment.

The attachment surface 201 is formed to be orthogonal to the pipe attachment surface 202 (refer to FIG. 43). The inlet port 220 is formed to be open on the attachment surface 201. An opening of the inlet port 220 on the attachment surface 201 has a circular shape.

Figure 44:
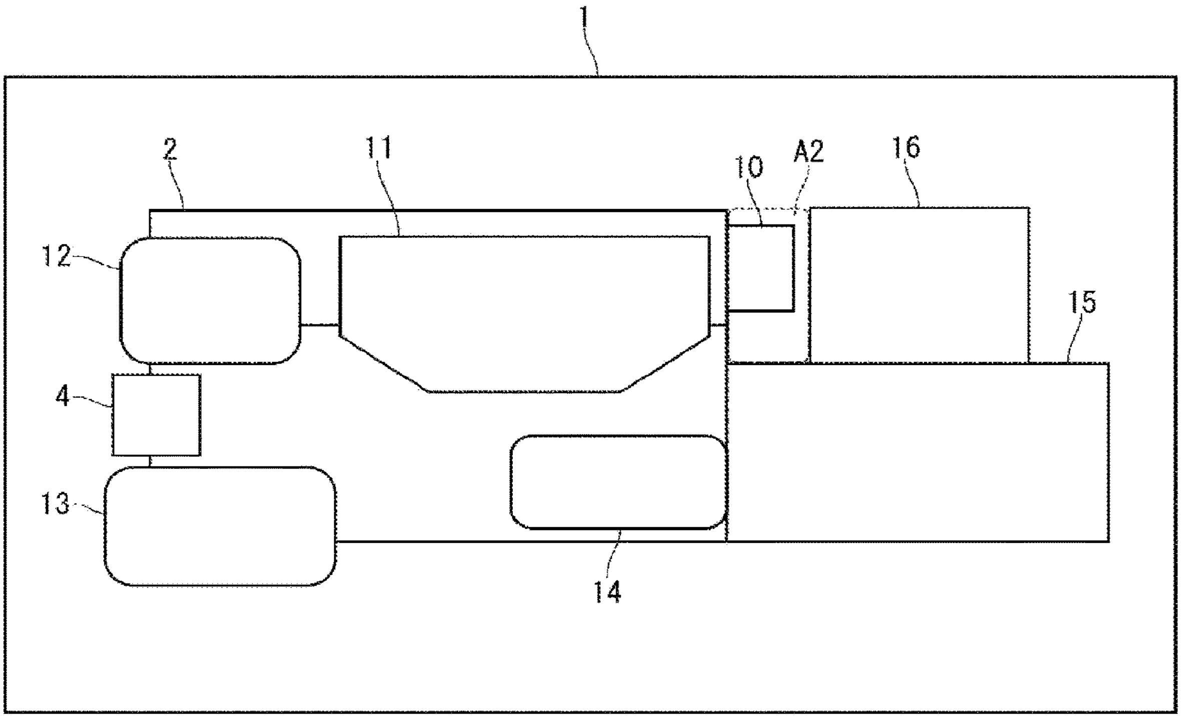
FIG. 44 is a schematic view illustrating disposition in a vehicle of the valve device of the sixth embodiment.

As illustrated in FIG. 44, the valve device 10 is attached to the engine 2 in a narrow space A2 between the engine 2 and an inverter 16. The valve device 10 is attached to the engine 2 so that the pipe member 50 is located on an upper side in the vertical direction with respect to the valve 30.

<1-1> Housing Fastening Hole

As illustrated in FIGS. 42 and 43, the housing 20 has fastening portions 231, 232, and 233 formed integrally with the housing main body 21. The fastening portions 231, 232, and 233 are formed to project in an extending direction of the attachment surface 201 from an end portion on the attachment surface 201 side of the housing main body 21. The housing 20 has fastening holes 241, 242, and 243 formed corresponding to the respective fastening portions 231, 232, and 233.

A fastening member 240 is inserted into the fastening holes 241, 242, and 243 to fasten the engine 2. In this manner, the valve device 10 is attached to the engine 2. A rubber port seal member 209 is provided outside in the radial direction of the inlet port 220 of the attachment surface 201. In a state where the valve device 10 is attached to the engine 2, the port seal member 209 is brought into a state of being compressed by an axial force of the fastening member 240. In this manner, the port seal member 209 holds a portion between the attachment surface 201 and the engine 2 in a liquid-tight manner, and can prevent a leakage of the coolant water from the inlet port 220 via the portion between the attachment surface 201 and the engine 2.

As illustrated in FIG. 43, the opening of the inlet port 220 is formed inside a triangle Ti1 formed by connecting the three fastening holes, that is, the fastening holes 241, 242, and 243.

<1-1>

As described above, according to the present embodiment, there is provided the valve device 10 capable of controlling the coolant water of the engine 2 of the vehicle 1. The valve device 10 includes the housing 20 and the valve 30.

The housing 20 has the housing main body 21 which internally forms the internal space 200, the attachment surface 201 formed on the outer wall of the housing main body 21 to face the engine 2 in a state of being attached to the engine 2, the inlet port 220 which is open on the attachment surface 201 and connects the internal space 200 and the outside of the housing main body 21 to each other, the multiple fastening portions (231, 232, and 233) formed integrally with the housing main body 21, and the multiple fastening holes (241, 242, and 243) formed corresponding to each of the multiple fastening portions.

The valve 30 has the valve body 31 rotatable around the rotation axis Axr1 inside the internal space 200, and the valve body internal flow channel 300 which is formed inside the valve body 31 and can communicate with the inlet port 220.

The housing main body 21 is fixed to the engine 2 by fastening members 240 screwed to the engine 2 through the fastening holes (241, 242, and 243).

At least three fastening holes are formed.

The opening of the inlet port 220 is formed inside the triangle Ti1 formed by connecting the three fastening holes (241, 242, and 243).

Therefore, in a case where the port seal member 209 formed of an annular elastic member is provided around the inlet port 220, when the housing main body 21 is fixed to the engine 2 by the fastening member 240 passing through the three fastening holes (231, 232, and 233), the port seal member 209 can be compressed in a balanced manner. In this manner, a sealing property around the inlet port 220 can be effectively ensured.

As illustrated in FIG. 43, the fastening portion 231 is formed to project from the housing main body 21 in the longitudinal direction of the housing main body 21. The fastening portions 232 and 233 are formed to project from the housing main body 21 in the short direction of the housing main body 21.

As illustrated in FIG. 43, a projection start position of the fastening portion 231 is a corner portion on the side opposite to the drive unit 70 on the rectangular attachment surface 201 where the inlet port 220 of the housing main body 21 is formed. The projection start position of the fastening portion 232 is a portion in the vicinity of the inlet port 220 on the side opposite to the fastening portion 233, out of the two sides extending in the longitudinal direction of the rectangular attachment surface 201 where inlet port 220 of the housing main body 21 is formed. The projection start position of the fastening portion 233 is a portion on the drive unit 70 side of the end portion in the short direction of the housing main body 21.

As illustrated in FIG. 43, the distance between the side connecting the center of the fastening hole 241 and the center of the fastening hole 242 to each other out of the sides of the triangle Ti1 and the center Cp1 of the inlet port 220 is shorter than the distance between the side connecting the center of the fastening hole 242 and the center and the fastening hole 243 to each other and the center Cp1. The distance between the side connecting the center of the fastening hole 242 and the center of the fastening hole 243 to each other and the center Cp1 is shorter than the distance between the side connecting the center of the fastening hole 243 and the center of the fastening hole 241 to each other and the center Cp1.

<4-1> Projection Prevention of Cover Fixing Portion

Figure 45:
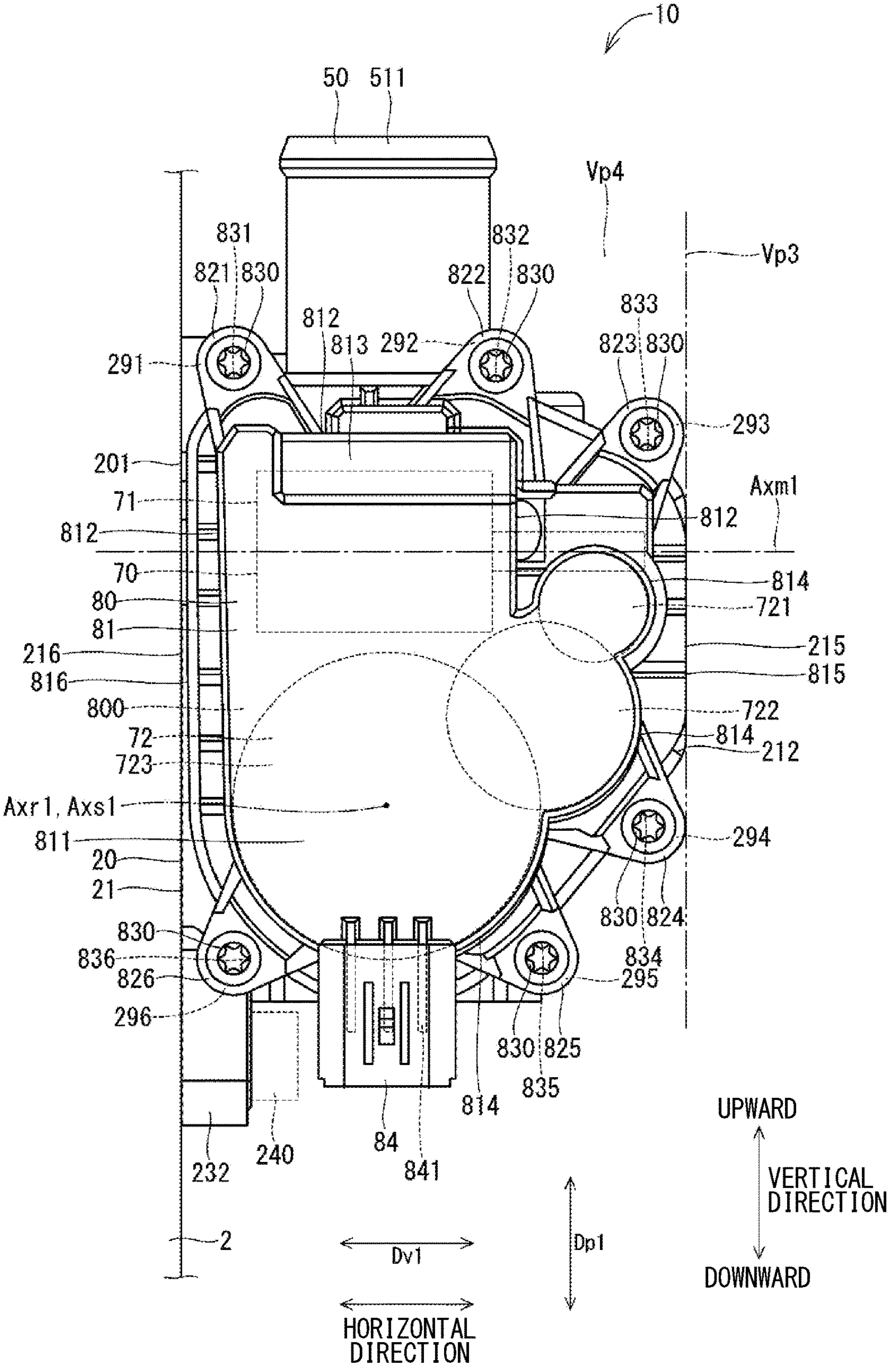
FIG. 45 is a view illustrating the valve device of the sixth embodiment.
Figure 46:
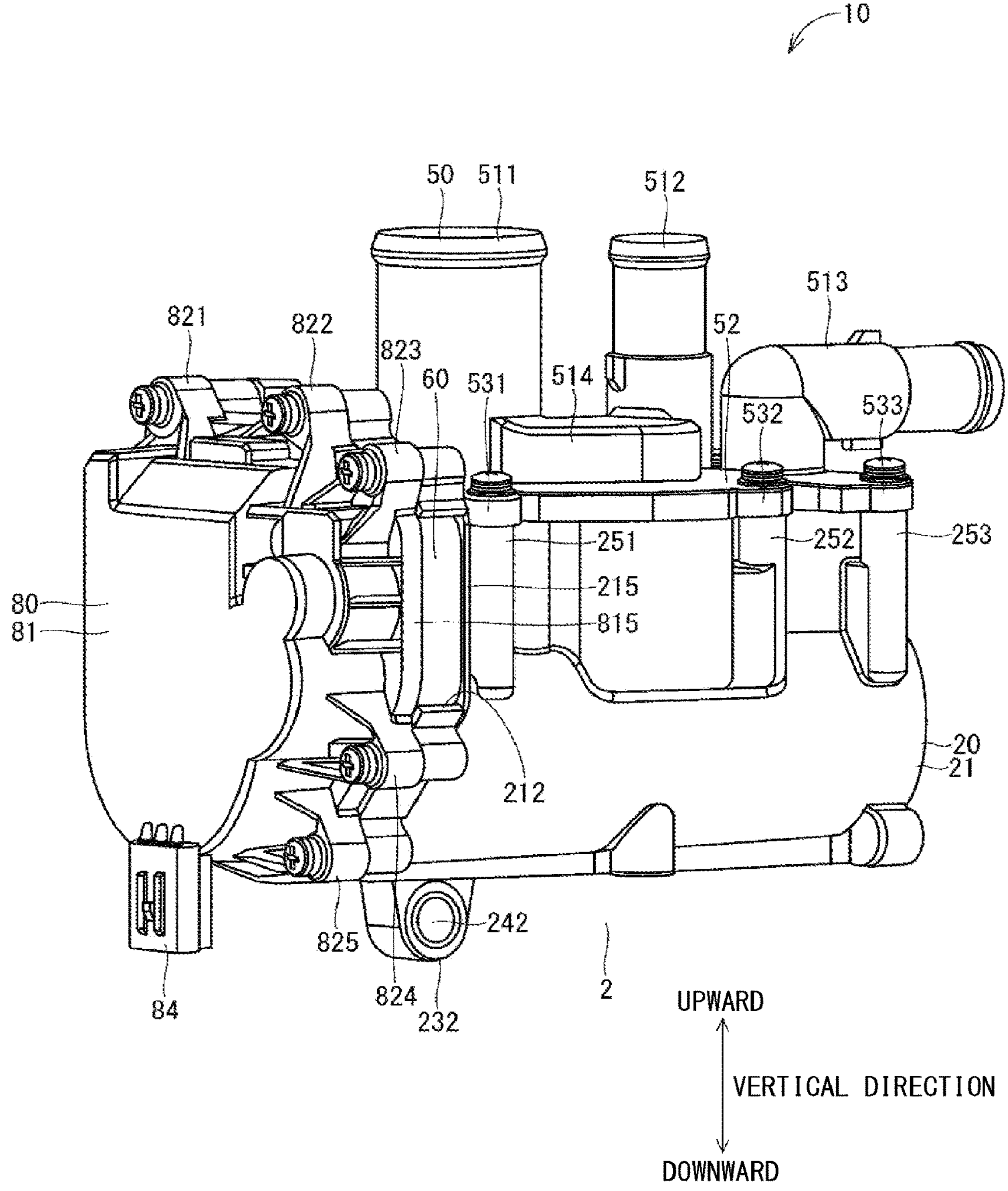
FIG. 46 is a perspective view illustrating the valve device of the sixth embodiment.

As illustrated in FIGS. 45 and 46, the drive unit cover 80 has a cover main body 81 forming a drive unit space 800, and cover fixing portions 821 to 826 formed in the outer edge portion of the cover main body 81 and fixed to the housing main body 21.

Cover fastening holes 831 to 836 are formed in each of the cover fixing portions 821 to 826. A fixing member 830 is inserted into cover fastening holes 831 to 836, and is fastened to the housing main body 21.

The cover fixing portions 823 and 824 are formed not to project outward from at least one of both end portions in the direction Dv1 perpendicular to the attachment surface 201 of the housing main body 21.

Specifically, the cover fixing portions 823 and 824 are formed not to project outward from a housing end portion 215 which is an end portion on the side opposite to the attachment surface 201 in the direction Dv1 perpendicular to the attachment surface 201 of the housing main body 21, that is, to the side opposite to the attachment surface 201.

A virtual plane Vp3 illustrated in FIG. 45 is a virtual plane parallel to the attachment surface 201 after passing through the housing end portion 215. The cover fixing portions 823 and 824 are located on the attachment surface 201 side with respect to the virtual plane Vp3.

The cover fixing portions 821 and 826 are formed not to project outward from a housing end portion 216 which is an end portion on the side opposite to the attachment surface 201 in the direction Dv1 perpendicular to the attachment surface 201 of the housing main body 21, that is, to the attachment surface 201 side. That is, the cover fixing portions 821 and 826 are located on the virtual plane Vp3 side with respect to the attachment surface 201.

The cover main body 81 is a portion of the drive unit cover 80, and means a portion that forms the drive unit space 800. Therefore, the cover fixing portions 821 to 826 are portions forming the drive unit cover 80, and are formed as portions different from the cover main body 81.

As illustrated in FIG. 45, cover flat portions 811, 812, and 813 and a cover curved portion 814 are formed on the outer wall of the cover main body 81. One cover flat portion 811 is formed in a planar shape to be orthogonal to the rotation axis Axr1. Multiple cover flat portions 812 are formed in a planar shape to be parallel to the rotation axis Axr1. One cover flat portion 813 is formed in a planar shape to be inclined with respect to the rotation axis Axr1. Multiple cover curved portions 814 are formed in a curved shape to be parallel to the rotation axis Axr1. The multiple cover curved portions 814 are connected to each other.

As illustrated in FIG. 45, the cover fastening holes 831 to 833 are formed on the pipe member 50 side with respect to the axis Axm1 of the motor 71. The cover fastening holes 834 to 836 are formed on the connector portion 84 side with respect to the axis Axm1 of the motor 71. The cover fastening hole 833 is formed at a position closer to the axis Axm1 of the motor 71 than the cover fastening holes 831 and 832. The cover fastening hole 834 is formed at a position closer to the axis Axm1 of the motor 71 than the cover fastening holes 835 and 836.

<4-1>

As described above, according to the present embodiment, the valve device 10 can control the coolant water of the engine 2 of the vehicle 1, and includes the housing 20, the valve 30, the partition wall portion 60, the drive unit cover 80, and the drive unit 70.

The housing 20 has the housing main body 21 which internally forms the internal space 200, the attachment surface 201 formed on the outer wall of the housing main body 21 to face the engine 2 in a state of being attached to the engine 2, and the ports (220, 221, 222, and 223) that connect the internal space 200 and the outside of the housing main body 21 to each other.

The valve 30 has the valve body 31 rotatable around the rotation axis Axr1 inside the internal space 200, the valve body internal flow channel 300 formed inside the valve body 31, the valve body opening portions (410, 420, and 430) which connect the valve body internal flow channel 300 and the outer side of the valve body 31 to each other, and the shaft 32 provided on the rotation axis Axr1, and can change the communication state between the valve body internal flow channel 300 and the ports (220, 221, 222, and 223) via the valve body opening portions (410, 420, and 430) in accordance with the rotation position of the valve body 31.

The partition wall portion 60 is provided to partition the internal space 200 and the outside of the housing main body 21 from each other, and has the shaft insertion hole 62 formed so that one end of the shaft 32 can be inserted.

The drive unit cover 80 is provided on the side opposite to the internal space 200 with respect to the partition wall portion 60, and forms the drive unit space 800 with the partition wall portion 60.

The drive unit 70 is provided in the drive unit space 800, and can rotatably drive the valve body 31 via one end of the shaft 32.

The drive unit cover 80 has the cover main body 81 forming the drive unit space 800, and the cover fixing portions (821 to 826) formed in the outer edge portion of the cover main body 81 and fixed to the housing main body 21.

The cover fixing portions (821 to 826) are formed not to project outward from at least one of both end portions (215 and 216) in the direction Dv1 perpendicular to the attachment surface 201 of the housing main body 21.

Therefore, it is possible to reduce the body size in the direction Dv1 perpendicular to the attachment surface 201 of the drive unit cover 80, and it is possible to reduce the body size in the direction Dv1 perpendicular to the attachment surface 201 of the valve device 10. In this manner, the valve device 10 can be mounted on the narrow space A2 of the vehicle 1.

As illustrated in FIG. 44, various devices are mounted on the periphery of the engine 2. Therefore, a space in which the valve device 10 can be disposed is limited inside an engine compartment. According to the present embodiment, the body size of the valve device 10 can be reduced. Therefore, the valve device 10 can be easily mounted on the narrow space A2 of the vehicle 1 (refer to FIG. 44).

<4-1-1>

As illustrated in FIG. 45, the cover fixing portions 821 to 826 are located on a virtual plane Vp4 perpendicular to the attachment surface 201. The virtual plane Vp4 is a plane perpendicular to the rotation axis Axr1 and the axis Axs1 of the shaft 32.

Therefore, it is possible to reduce the height of the drive unit cover 80.

<4-2>

As illustrated in FIG. 45, the housing end portion 215 which is an end portion on the side opposite to the attachment surface 201 of the housing main body 21 is formed not to project outward from the cover end portion 815 which is an end portion on the side opposite to the attachment surface 201 of the cover main body 81. The cover end portion 815 is formed along the virtual plane Vp3.

Therefore, it is possible to reduce the body size in the direction Dv1 perpendicular to the attachment surface 201 of the housing main body 21, and it is possible to further reduce the body size in the direction Dv1 perpendicular to the attachment surface 201 of the valve device 10.

<4-2-1>

As illustrated in FIG. 46, the housing main body 21 has a cutout portion 212 formed to such an extent that the partition wall portion 60 is exposed in the housing end portion 215 which is an end portion on the side opposite to the attachment surface 201.

Therefore, it is possible to further reduce the body size in the direction Dv1 perpendicular to the attachment surface 201 of the valve device 10.

As illustrated in FIG. 45, the cutout portion 212 is formed between the cover fixing portion 823 and the cover fixing portion 824.

<4-3>

As illustrated in FIG. 45, the connector portion 84 is formed not to project outward from at least one of both end portions in the direction Dv1 perpendicular to the attachment surface 201 of the cover main body 81.

Specifically, the connector portion 84 is formed not to project outward from the cover end portion 815 which is an end portion on the side opposite to the attachment surface 201 in the direction Dv1 perpendicular to the attachment surface 201 of the cover main body 81, that is, to the side opposite to the attachment surface 201. That is, the connector portion 84 is located on the attachment surface 201 side with respect to the virtual plane Vp3.

The connector portion 84 is formed not to project outward from the cover end portion 816 which is an end portion on the attachment surface 201 side in the direction Dv1 perpendicular to the attachment surface 201 of the cover main body 81, that is, to the attachment surface 201 side. That is, the connector portion 84 is located on the virtual plane Vp3 side with respect to the attachment surface 201.

<4-3-1>

As illustrated in FIG. 45, the connector portion 84 is formed to project in a direction other than the direction Dv1 perpendicular to the attachment surface 201 from the outer edge portion of the cover main body 81.

<4-3-2>

Specifically, the connector portion 84 is formed to project in a direction Dp1 parallel to the attachment surface 201 from the outer edge portion of the cover main body 81. The parallel direction Dp1 is a direction perpendicular to the rotation axis Axr1 and the axis Axs1 of the shaft 32.

Therefore, it is possible to further reduce the body size in the direction Dv1 perpendicular to the attachment surface 201 of the drive unit cover 80, and it is possible to further reduce the body size in the direction Dv1 perpendicular to the attachment surface 201 of the valve device 10.

As illustrated in FIG. 45, the connector portion 84 is formed to project in the direction Dp1 from the portion between the cover fixing portion 825 and the cover fixing portion 826 in the outer edge portion of the cover main body 81.

<4-4>

As described above, according to the present embodiment, the valve device 10 can control the coolant water of the engine 2 of the vehicle 1, and includes the housing 20, the valve 30, the partition wall portion 60, the drive unit cover 80, and the drive unit 70.

As illustrated in FIG. 45, the housing 20 has the housing main body 21 which internally forms the internal space 200, the housing-side cover fixing portions (291 to 296) formed as portions different from the housing main body 21 to project from the outer wall of the housing main body 21, the attachment surface 201 formed on the outer wall of the housing main body 21 to face the engine 2 in a state of being attached to the engine 2, and the ports (220, 221, 222, and 223) which connect the internal space 200 and the outside of the housing main body 21 to each other.

The valve 30 has the valve body 31 rotatable around the rotation axis Axr1 inside the internal space 200, the valve body internal flow channel 300 formed inside the valve body 31, the valve body opening portions (410, 420, and 430) which connect the valve body internal flow channel 300 and the outer side of the valve body 31 to each other, and the shaft 32 provided on the rotation axis Axr1, and can change the communication state between the valve body internal flow channel 300 and the ports (220, 221, 222, and 223) via the valve body opening portions (410, 420, and 430) in accordance with the rotation position of the valve body 31.

The partition wall portion 60 is provided to partition the internal space 200 and the outside of the housing main body 21 from each other, and has the shaft insertion hole 62 formed so that one end of the shaft 32 can be inserted.

The drive unit cover 80 is provided on the side opposite to the internal space 200 with respect to the partition wall portion 60, and forms the drive unit space 800 with the partition wall portion 60.

The drive unit 70 is provided in the drive unit space 800, and can rotatably drive the valve body 31 via one end of the shaft 32.

As illustrated in FIG. 45, the drive unit cover 80 has the cover main body 81 which forms the drive unit space 800, and the cover fixing portions (821 to 826) formed as portions different from the cover main body 81 to project from the outer wall of the cover main body 81 and fixed to the housing-side cover fixing portions (291 to 296). The cover fixing portions 821 to 826 are respectively fixed to the housing-side cover fixing portions 291 to 296 by the fixing member 830.

The cover fixing portions (821 to 826) are formed not to project outward from at least one of both end portions (215 and 216) in the direction Dv1 perpendicular to the attachment surface 201 of the housing main body 21. The housing end portions 215 and 216, which are both end portions in the direction Dv1 perpendicular to the attachment surface 201 of the housing main body 21, are formed in the housing main body 21 as portions different from the housing-side cover fixing portions 291 to 296.

Therefore, it is possible to reduce the body size in the direction Dv1 perpendicular to the attachment surface 201 of the drive unit cover 80, and it is possible to reduce the body size in the direction Dv1 perpendicular to the attachment surface 201 of the valve device 10. In this manner, the valve device 10 can be mounted on the narrow space A2 of the vehicle 1.

<4-5>

As illustrated in FIG. 45, in a state where the housing main body 21 is attached to the engine 2, the cover fixing portions 821 to 826 are formed not to project outward from at least one of both end portions (215 and 216) in the direction Dv1 perpendicular to the attachment surface 201 of the housing main body 21 and in the horizontal direction. That is, the cover fixing portions 821 to 826 are formed not to project from the housing end portion 215 in the direction Dv1 perpendicular to the attachment surface 201 which is a direction in which the housing main body 21 is thinnest.

Therefore, it is possible to reduce the body size in the direction Dv1 perpendicular to the attachment surface 201 of the drive unit cover 80 and in the horizontal direction, and it is possible to reduce the body size in the direction Dv1 perpendicular to the attachment surface 201 of the valve device 10 and in the horizontal direction. In this manner, the valve device 10 can be mounted on the narrow space A2 which is narrow in the direction Dv1 perpendicular to the attachment surface 201 and in the horizontal direction.

<5-1> housing-side fixing portion Gap

Figure 47:
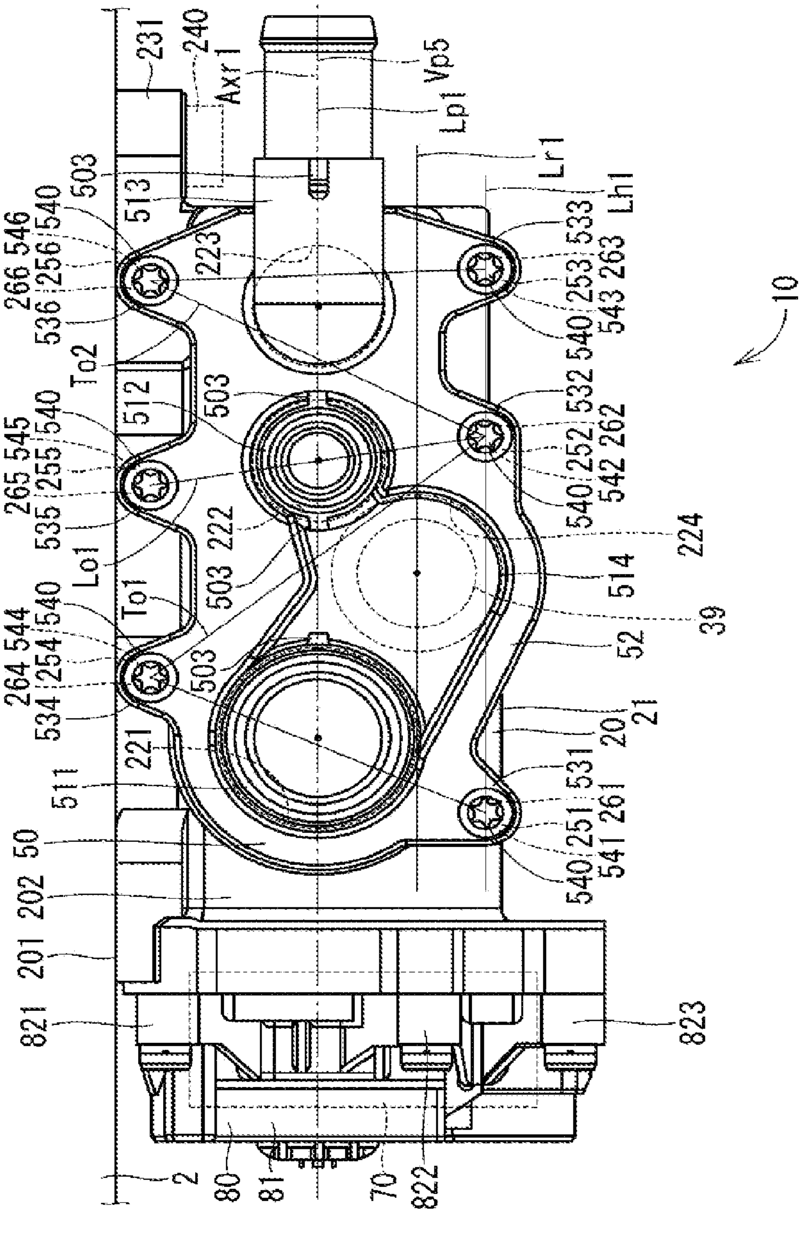
FIG. 47 is a view when

As illustrated in FIG. 47, the housing 20 has housing-side fixing portions 251 to 256 formed integrally with the housing main body 21. The housing-side fixing portions 251 to 253 are formed to be aligned in the direction parallel to the rotation axis Axr1 on the side opposite to the attachment surface 201 with respect to a virtual plane Vp5 including the rotation axis Axr1 and parallel to the attachment surface 201. The housing-side fixing portions 254 to 256 are formed to be aligned in the direction parallel to the rotation axis Axr1 on the attachment surface 201 side with respect to the virtual plane Vp5. That is, the housing-side fixing portions 251 to 253 and the housing-side fixing portions 254 to 256 are formed to interpose the virtual plane Vp5 therebetween.

The distance between the housing-side fixing portion 251 and the housing-side fixing portion 252 is longer than the distance between the housing-side fixing portion 252 and the housing-side fixing portion 253. The distance between the housing-side fixing portion 254 and the housing-side fixing portion 255 is the same as the distance between the housing-side fixing portion 255 and the housing-side fixing portion 256. The distance between the housing-side fixing portion 252 and the housing-side fixing portion 253 is shorter than the distance between the housing-side fixing portion 255 and the housing-side fixing portion 256.

The housing-side fixing portion 251 is formed on the drive unit 70 side with respect to the housing-side fixing portion 254 in the direction of the rotation axis Axr1. The housing-side fixing portion 252 is formed on the housing-side fixing portion 256 side with respect to the housing-side fixing portion 255 in the direction of the rotation axis Axr1. The housing-side fixing portion 253 is formed on the side slightly opposite to the drive unit 70 with respect to the housing-side fixing portion 256 in the direction of the rotation axis Axr1.

Housing-side fastening holes 261 to 266 are formed in each of the housing-side fixing portions 251 to 256. The housing-side fastening holes 261 to 266 are formed in a substantially cylindrical shape, and are formed so that the axis is parallel to the attachment surface 201, the virtual plane Vp5, and the vertical direction. In addition, a thread groove is not formed in advance on the inner circumferential wall of the housing-side fastening holes 261 to 266.

As illustrated in FIG. 47, the pipe member 50 has pipe portions 511 to 514, a pipe coupling portion 52, and pipe-side fixing portions 531 to 536. The pipe portions 511 to 513 are respectively provided so that the internal space communicates with the outlet ports 221 to 223. The pipe portion 514 is provided so that the internal space communicates with the relief port 224. The pipe portion 511 and the pipe portion 514 are integrally formed, and the internal spaces communicate with each other. The pipe portion 512 and the pipe portion 514 are integrally formed so that the outer walls are connected to each other, and the internal spaces do not communicate with each other. The pipe coupling portion 52 is formed integrally with the pipe portions 511 to 514 to couple end portions on the housing main body 21 side of the pipe portions 511 to 514 with each other.

Pipe-side fixing portions 531 to 536 are respectively formed at positions corresponding to the housing-side fixing portions 251 to 256 at the outer edge portion of the pipe coupling portion 52. Pipe-side fastening holes 541 to 546 are formed in each of the pipe-side fixing portions 531 to 536. The pipe-side fastening holes 541 to 546 are formed in a substantially cylindrical shape, and are formed so that each axis substantially coincides with the axis of the housing-side fastening holes 261 to 266.

The valve device 10 includes a pipe fastening member 540. The pipe fastening member 540 fixes the pipe-side fixing portions 531 to 536 and the housing-side fixing portions 251 to 256 to each other by being screwed into the housing-side fastening holes 261 to 266 after passing through the pipe-side fastening holes 541 to 546.

Figure 48:
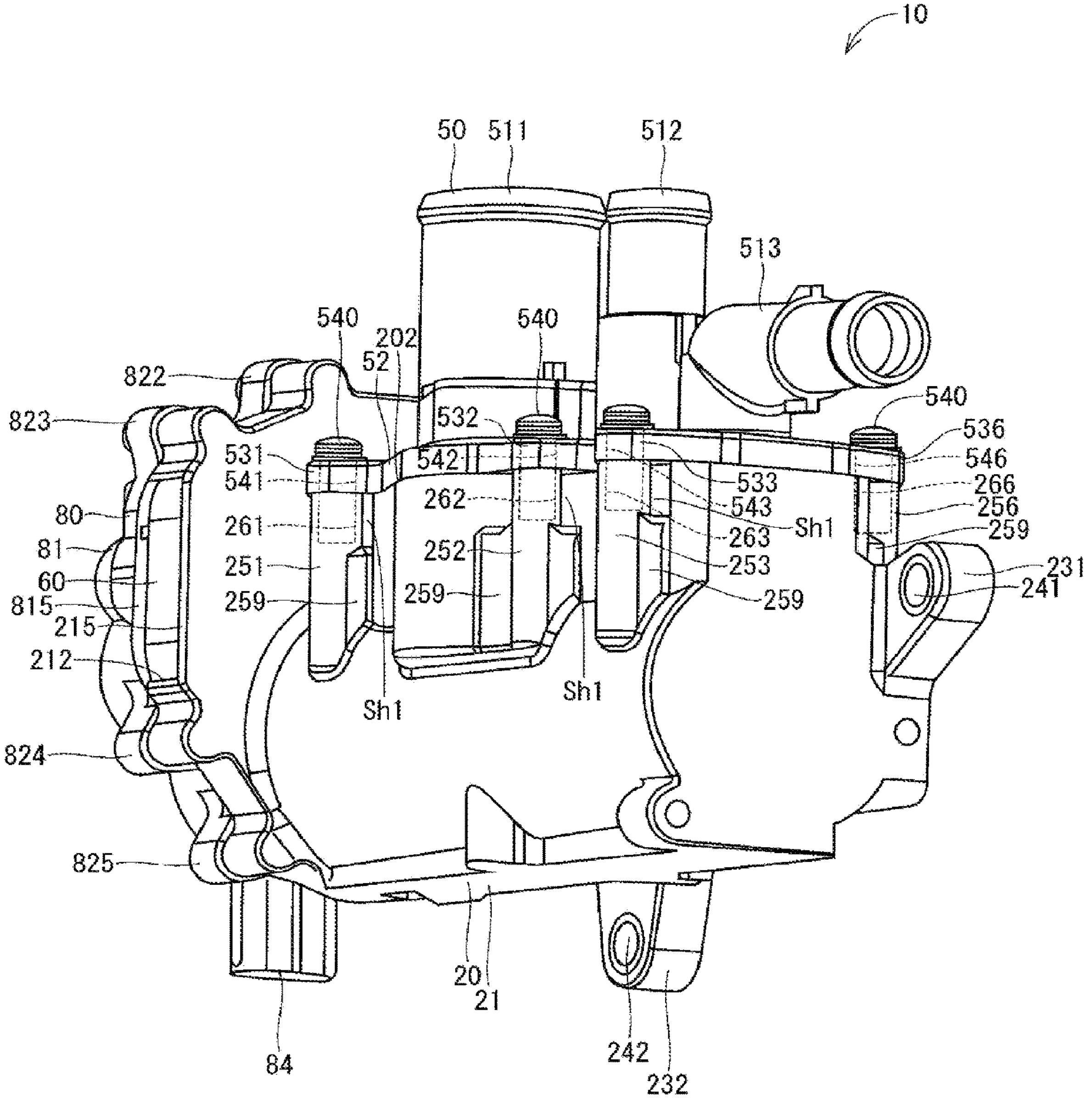
FIG. 48 is a perspective view illustrating the valve device of the sixth embodiment.
Figure 49:
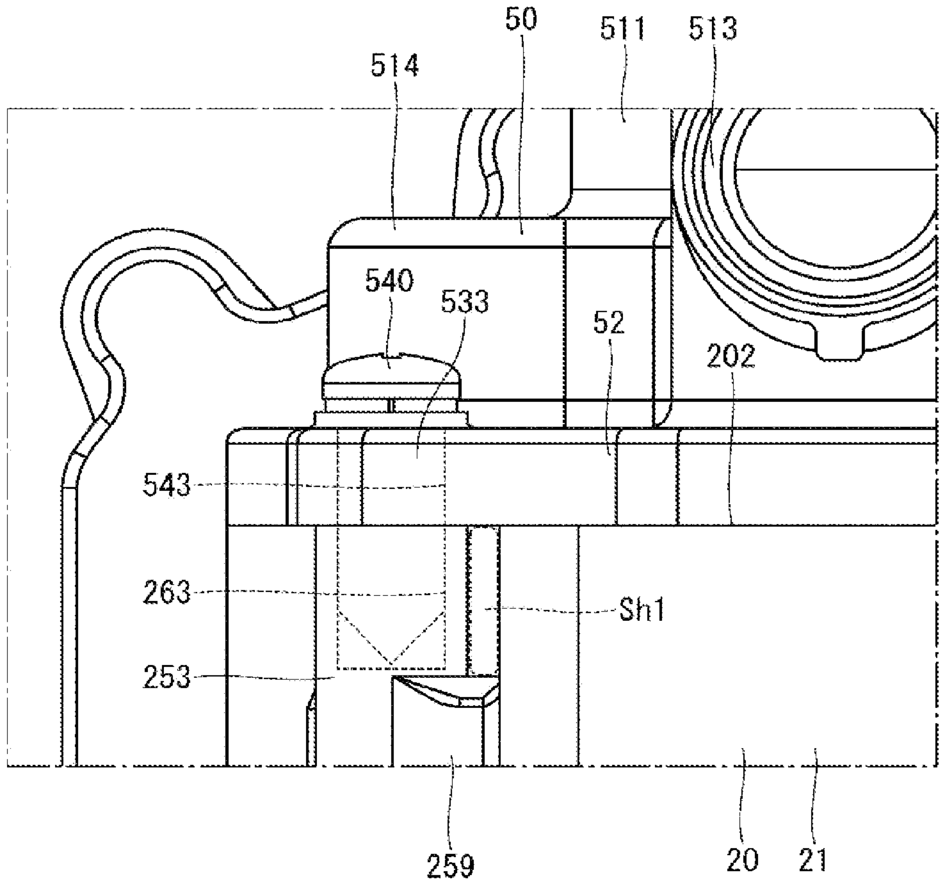
FIG. 49 is a view illustrating a part of the valve device of the sixth embodiment.

As illustrated in FIGS. 48 and 49, the housing-side fixing portions 251 to 256 are formed in a substantially columnar shape. The housing-side fixing portions 251 to 256 are provided so that one end surface in the axial direction is located on the same plane as the pipe attachment surface 202. The housing 20 has a housing connection portion 259 which connects the outer circumferential wall on the other end portion side in the axial direction of the housing-side fixing portions 251 to 256 and the outer wall of the housing main body 21 to each other. In this manner, the housing-side fixing portions 251 to 256 form an inter-housing gap Sh1 as a gap from the outer wall of the housing main body 21. The inter-housing gap Sh1 is formed between the housing connection portion 259 and the pipe-side fixing portions 531 to 536.

More specifically, the inter-housing gap Sh1 is formed among the housing-side fixing portions 251 to 256, the outer wall of the housing main body 21, the housing connection portion 259, and the pipe-side fixing portions 531-536.

The housing-side fastening holes 261 to 266 are respectively formed to be coaxial with the housing-side fixing portions 251 to 256. In addition, an end portion of the housing-side fastening holes 261 to 266 on the side opposite to the pipe member 50 is located on the pipe member 50 side from the housing connection portion 259.

<5-1>

As described above, according to the present embodiment, there is provided the valve device 10 capable of controlling the coolant water of the engine 2 of the vehicle 1, and the valve device 10 includes the housing 20, the valve 30, the pipe member 50, and the pipe fastening member 540.

The housing 20 has the housing main body 21 which internally forms the internal space 200, the housing-side fixing portions (251 to 256) formed integrally with the housing main body 21, the housing-side fastening holes (261 to 266) formed in the housing-side fixing portions, and the ports (220, 221, 222, 223, and 224) which connect the internal space 200 and the outside of the housing main body 21 to each other.

The valve 30 has the valve body 31 rotatable around the rotation axis Axr1 inside the internal space 200, the valve body internal flow channel 300 formed inside the valve body 31, and the valve body opening portions (410, 420, and 430) which connect the valve body internal flow channel 300 and the outer side of the valve body 31 to each other, and can change a communication state between the valve body internal flow channel 300 and the ports via the valve body opening portions in accordance with the rotation position of the valve body 31.

The pipe member 50 has the cylindrical pipe portions (511, 512, 513, and 514) in which the internal space communicates with ports (221, 222, and 223, 224), the pipe-side fixing portions (531 to 536) formed integrally with the pipe portions and fixed to the housing-side fixing portions, and the pipe-side fastening holes (541 to 546) formed in the pipe-side fixing portions.

The pipe fastening member 540 fixes the pipe-side fixing portions (531 to 536) and the housing-side fixing portions (251 to 256) to each other by being screwed into the housing-side fastening holes (261 to 266) after passing through the pipe-side fastening holes (541 to 546).

The housing-side fixing portions (251 to 256) form the gap (Sh1) with the outer wall of the housing main body 21.

Therefore, when the pipe member 50 is fastened to the housing 20 by the pipe fastening member 540, even if the housing-side fixing portions (251 to 256) are cracked, it is possible to prevent a possibility that the crack may affect the housing main body 21. In this manner, it is possible to prevent the leakage of the coolant water which can be caused by the fastening of the pipe member 50 to the housing 20.

According to the present embodiment, the outlet port 221 is connected to the radiator 5 to increase the flow rate. Accordingly, it is possible to prevent a possibility that the crack from the housing-side fixing portions 251 and 254 particularly in the vicinity of the outlet port 221 out of the housing-side fixing portions (251 to 256) may affect the housing main body 21. Therefore, it is possible to effectively prevent the leakage of the coolant water.

As illustrated in FIG. 47, the housing-side fixing portion 251 and the housing-side fixing portion 254 are formed to interpose the outlet port 221 therebetween. Here, compared to the housing-side fixing portions 252, 253, 255, and 256, the housing-side fixing portions 251 and 254 are formed at positions close to the outlet port 221, that is, are formed in the vicinity of the outlet port 221. The center of the outlet port 221 is located between two tangent lines parallel tangent to the outer edge of the housing-side fastening holes 261 and 264.

<5-2>

Figure 50:
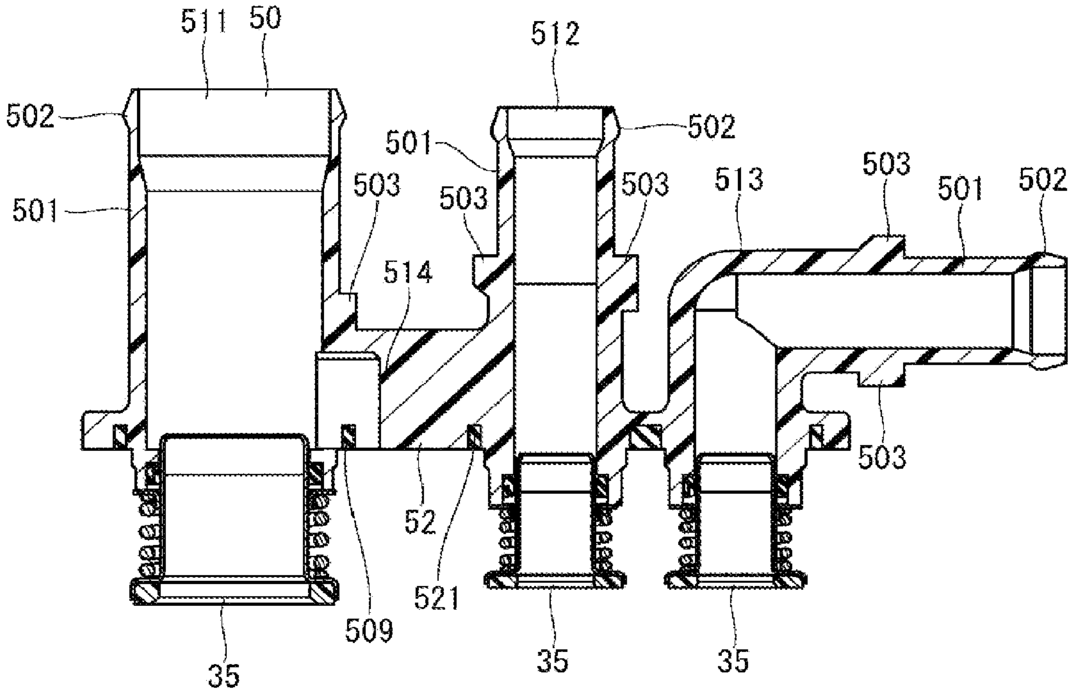
FIG. 50 is a cross-sectional view illustrating a pipe member, a seal unit, and a gasket of the valve device of the sixth embodiment.
Figure 51:
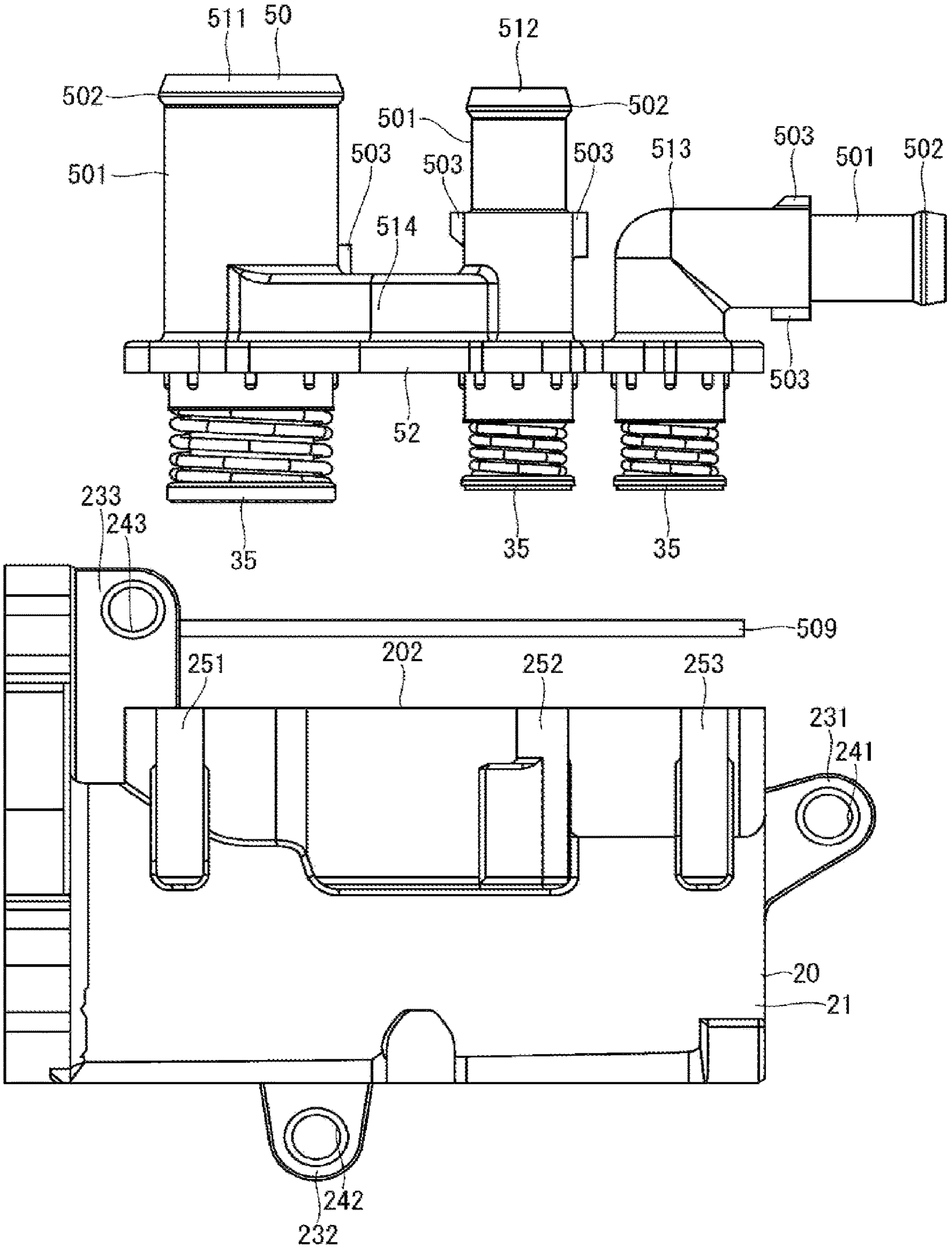
FIG. 51 is an exploded view illustrating a part of the valve device of the sixth embodiment.

As illustrated in FIG. 42, the housing 20 has outlet ports 221-223. As illustrated in FIGS. 42, 50, and 51, the pipe member 50 has pipe portions 511 to 513 which are coupled with each other. The valve device 10 includes multiple seal units 35 provided in each of the pipe portions 511 to 513 and capable of holding a portion between the multiple seal units 35 and the outer circumferential wall of the valve body 31 in a liquid-tight manner.

Therefore, the number of components for tapping can be reduced. The assembly man-hours of the pipe member 50 can be reduced.

The end portions of the pipe portions 511 to 513 provided with the seal unit 35 is provided are coupled with each other by the pipe coupling portion 52. The end portions of the pipe portions 511 to 513 provided with the seal unit 35 are formed so that respective axes are parallel to each other.

<5-2-1>

As illustrated in FIG. 42, the inlet ports 220 and the outlet ports 221 to 223 provided with the seal unit 35 out of the outlet ports 221 to 223 are formed so that the axes are parallel to each other, and are formed to be open on the pipe attachment surface 202. The outlet ports 221 to 223 are formed to be coaxial with the end portions of the pipe portions 511-513 provided with the seal unit 35.

Therefore, the pipe member 50 to which the multiple seal units 35 are assembled can be assembled to the housing main body 21 in one direction.

<5-3>

As illustrated in FIGS. 42, 50, and 51, the valve device 10 includes a gasket 509. For example, the gasket 509 is formed of an elastic member such as rubber, and is provided between the pipe member 50 and the pipe attachment surface 202 of the housing main body 21 outside in the radial direction of each of the pipe portions 511 to 513. In this manner, the gasket 509 can hold a portion between the pipe member 50 and the housing main body 21 in a liquid-tight manner.

As illustrated in FIG. 51, the pipe member 50 can be assembled to the housing main body 21 in a state where the three seal units 35 are held by the pipe portions 511 to 513. The gasket 509 is assembled to the housing main body 21 together with the pipe member 50 in a state of being fitted into a gasket groove 521 formed in the pipe coupling portion 52. That is, the pipe member 50 to which the multiple seal units 35 and the gasket 509 are assembled can be assembled at a time to the housing main body 21 in one direction.

The assembly man-hours are reduced by assembling the multiple members at a time. In this manner, multiple defects that may occur during assembly of the multiple members can be reduced to one, and quality of the valve device 10 can be improved. This is important since the device mounted on the vehicle 1 needs high quality.

As illustrated in FIG. 50, the three seal units 35 provided in each of the pipe portions 511 to 513 have the outer diameter set in accordance with the size of the inner diameter of the pipe portions 511 to 513. The outer diameter of the seal unit 35 provided in the pipe portion 511 is larger than the outer diameter of the seal unit 35 provided in the pipe portions 512 and 513. The outer diameter of the seal unit 35 provided in the pipe portion 512 is substantially the same as the outer diameter of the seal unit 35 provided in the pipe portion 513.

<5-4>

As illustrated in FIG. 47, the outlet ports 221-223 and the relief port 224 are formed so that the center is located on the straight line connecting the two housing-side fastening holes to each other out of the multiple housing-side fastening holes (261-266) or inside the triangle formed by the three housing-side fastening holes.

Specifically, the outlet port 221 is formed so that the center is located inside a triangle To1 formed by connecting the center of the housing-side fastening hole 261, the center of the housing-side fastening hole 262, and the center of the housing-side fastening hole 264. The outlet port 222 is formed so that the center is located on a straight line Lo1 connecting the center of the housing-side fastening hole 262 and the center of the housing-side fastening hole 265. The outlet port 223 is formed so that the center is located inside a triangle To2 formed by connecting the center of the housing-side fastening hole 262, the center of the housing-side fastening hole 263, and the center of the housing-side fastening hole 266. The relief port 224 is formed so that the center is located inside the triangle To1.

Therefore, a sealing load of the gasket 509 can be dispersed and stabilized outside in the radial direction of the outlet ports 221 to 223 and the relief port 224.

<5-5>

As illustrated in FIG. 42, the housing 20 has a pipe attachment surface 202 formed on the outer wall of the housing main body 21 to face the pipe member 50 in a state where the pipe member 50 is attached to the housing main body 21. The ports formed in the housing main body 21 include three outlet ports (221 to 223) that are open on the pipe attachment surface 202 and one relief port 224.

As illustrated in FIG. 47, the valve device 10 includes the relief valve 39. The relief valve 39 is provided in the relief port 224, and allows or blocks communication between the internal space 200 and the outside of the housing main body 21 via the relief port 224 in response to conditions. Specifically, when a predetermined condition, for example, a temperature of the coolant water is equal to or higher than a predetermined temperature, the relief valve 39 is opened, and allows the communication between the internal space 200 and the outside of the housing main body 21, that is, the internal space of the pipe portion 511 via the relief port 224. When the temperature of the coolant water is lower than the predetermined temperature, the relief valve 39 blocks the communication.

As illustrated in FIG. 47, at least two (221 to 223) of the three outlet ports (221 to 223) are formed so that the centers of respective openings are located on a port array straight line Lp1 which is one straight line on the pipe attachment surface 202. The port array straight line Lp1 is parallel to the attachment surface 201, and is located on the virtual plane Vp5.

That is, at least two (221 to 223) of the three outlet ports (221 to 223) are formed so that the centers of the respective openings are linearly aligned on the pipe attachment surface 202 in the direction of the rotation axis Axr1.

The relief port 224 is formed so that the center of the opening is located at a position separated to the side opposite to the attachment surface 201 from the port array straight line Lp1.

As illustrated in FIG. 42, in the direction of the rotation axis Axr1, the inlet port 220, the relief port 224, and the inter-valve space 400 overlap each other. Therefore, when the coolant water flowing from the inlet port 220 is guided to the relief port 224, it is possible to prevent a possibility that the ball valves 41 and 42 may become obstacles. The temperature of the coolant water from the inlet port 220 can be smoothly transmitted to the relief valve 39. Accordingly, responsiveness of the relief valve 39 can be improved.

Therefore, the three outlet ports (221 to 223) are linearly aligned. In this manner, while the body size of the housing main body 21 is reduced, the relief port 224 can be formed in the housing main body 21.

The relief port 224 is formed in the housing main body 21 so that a portion is located between the outlet port 221 and the outlet port 222.

As illustrated in FIG. 47, a portion of the relief port 224 is formed in a region formed by two tangent lines connecting an outer edge of the outlet port 221 and an outer edge of the outlet port 222 to each other.

<5-6>

As illustrated in FIG. 47, when viewed in a direction of the port array straight line Lp1, at least two (221 to 223) of the three outlet ports (221 to 223) and the relief port 224 are formed to partially overlap each other.

Therefore, it is possible to further reduce the body size of the housing main body 21 which forms the relief port 224.

<5-7>

As illustrated in FIG. 47, the relief port 224 is formed so that the center of the opening is located on a relief array straight line Lr1 which is a straight line on the pipe attachment surface 202 parallel to the port array straight line Lp1. The relief array straight line Lr1 is located on the side opposite to the attachment surface 201 with respect to the port array straight line Lp1.

That is, the distance from the attachment surface 201 to the center of the relief port 224 is longer than the distance from the attachment surface 201 to the center of each of the outlet ports 221, 222, and 223.

When viewed in the direction of the port array straight line Lp1, a portion on the relief array straight line Lr1 side with respect to the port array straight line Lp1 of at least two (221 to 223) of the three outlet ports (221 to 223) and a portion on the port array straight line Lp1 side with respect to the relief array straight line Lr1 of the relief port 224 are formed to partially overlap each other.

That is, when viewed in the direction of the rotation axis Axr1, a portion on the side opposite to the attachment surface 201 with respect to the center of at least two (221 to 223) of the three outlet ports (221 to 223) overlaps a portion on the attachment surface 201 side with respect to the center of the relief port 224.

In a case where the centers of the three outlet ports form a triangle on the pipe attachment surface 202, when viewed in the direction of the rotation axis Axr1, a portion on the side opposite to the attachment surface 201 with respect to the centers of the two outlet ports far away from the attachment surface 201 overlap a portion on the attachment surface 201 side with respect to the center of the relief port 224.

Therefore, it is possible to further reduce the body size of the housing main body 21 which forms the relief port 224.

<5-8>

As illustrated in FIG. 47, at least two (261 to 266) of the multiple housing-side fastening holes (261 to 263) are formed on a fastening hole array straight line Lh1 which is a straight line located on the relief port 224 side with respect to the port array straight line Lp1. The fastening hole array straight line Lh1 is parallel to the port array straight line Lp1 and the relief array straight line Lr1, and is located on the side opposite to the port array straight line Lp1 with respect to the relief array straight line Lr1.

As illustrated in FIG. 47, the relief port 224 is formed to overlap a portion of the fastening hole array straight line Lh1.

Therefore, it is possible to further reduce the body size of the housing main body 21 which forms the relief port 224.

<5-9>

As illustrated in FIG. 50, the pipe portions 511 to 513 have a pipe portion main body 501, and a pipe portion end portion 502 formed on the side opposite to the outlet ports 221 to 223 (pipe coupling portion 52) of the pipe portion main body 501, having the inner diameter larger than the inner diameter of the pipe portion main body 501, and having the outer diameter larger than the outer diameter of the pipe portion main body 501.

Therefore, for example, when the pipe portion end portion 502 is formed by forcibly pulling, the mold can be pulled while the pipe portion end portion 502 is easily deformed inward. Accordingly, it is possible to prevent the crack of the pipe portion end portion 502. In this manner, it is possible to prevent the leakage of coolant water from the pipe portion end portion 502.

The outer diameter of the pipe portion end portion 502 is larger than the outer diameter of the pipe portion main body 501. Accordingly, it is possible to prevent disconnection of a hose connected to the pipe portion end portion 502.

As illustrated in FIG. 42, the pipe portion 511 is formed to extend from the pipe attachment surface 202 to the side opposite to the outlet port 221. The pipe portion 512 is formed to extend from the pipe attachment surface 202 to the side opposite to the outlet port 222. After extending from the pipe attachment surface 202 to the side opposite to the outlet port 223, the pipe portion 513 is bent, and is formed to extend to the side opposite to the pipe portion 512 in the direction parallel to the rotation axis Axr1.

The pipe portion 513 is formed to be bent at a position corresponding to the center in the axial direction of the pipe portion 512. Therefore, the gap Sp1 is formed between the portion on the pipe attachment surface 202 side of the pipe portion 512 and the pipe portion 513.

<5-10>

As illustrated in FIG. 50, the pipe portions 511 to 513 have a pipe portion projection 503 that projects outward from the outer wall of the pipe portion main body 501.

The pipe portion projection 503 enables easy determination of a fixing position of the hose to the pipe portions 511 to 513, and can prevent a possibility that the hose may stick too deeply into the pipe portions 511 to 513.

<5-11>

As illustrated in FIG. 47, the pipe portion projection 503 is formed on the virtual plane Vp5 parallel to the attachment surface 201.

That is, as illustrated in FIG. 47, when viewed in the axial direction of the outlet ports 221 to 223, the pipe portion projections 503 are formed to be linearly aligned in the direction of the rotation axis Axr1.

Therefore, it is possible to reduce the size of the pipe member 50 in the direction perpendicular to the attachment surface 201, and the body size of the valve device 10 can be reduced.

One pipe portion projection 503 is formed for the pipe portion 511. Two pipe portion projections 503 are formed for the pipe portion 512 to interpose the pipe portion 512 therebetween. Two pipe portion projections 503 are formed for the pipe portion 513 to interpose the pipe portion 513 therebetween (refer to FIG. 50).

In order only to limit a position of the end portion of the hose in the pipe portion 511, only one pipe portion projection 503 is formed in the pipe portion 511. Since only one pipe portion projection 503 is formed in the pipe portion 511, the material cost can be reduced. In another embodiment, two pipe portion projections 503 may be formed in the pipe portion 511.

<5-12>

As illustrated in FIG. 50, the pipe member 50 has the multiple pipe portions (511 to 514), and the pipe coupling portion 52 that couples the portions on the housing main body 21 side of the multiple pipe portions (511 to 514).

Therefore, the number of members can be reduced, and the gasket 509 is disposed between the pipe coupling portion 52 and the housing main body 21. In this manner, it is possible to ensure the sealing property between the pipe member 50 and the housing main body 21.

As illustrated in FIG. 50, the pipe coupling portion 52 is formed on the seal unit 35 side with respect to the pipe portion projections 503 formed in the pipe portions 511 to 513. The outer edge portion of the pipe coupling portion 52 is formed to extend outward in the radial direction of the end portion on the pipe attachment surface 202 side of the pipe portions 511 to 514 (refer to FIGS. 47 and 50).

<5-13>

As illustrated in FIG. 42, the housing 20 has the housing opening portion 210 which connects the internal space 200 and the outside of the housing main body 21 to each other, and the cylindrical housing inner wall 211 whose one end is connected to the housing opening portion 210 to form the internal space 200. The valve 30 has the shaft 32 provided on the rotation axis Axr1.

The valve device 10 includes the partition wall portion main body 61 provided in the housing opening portion 210 to partition the internal space 200 and the outside of the housing main body 21 from each other, and the partition wall portion 60 having the shaft insertion hole 62 formed in the partition wall portion main body 61 so that one end of the shaft 32 can be inserted.

The inner diameter of the housing opening portion 210 is larger than the inner diameter of the end portion on the side opposite to the housing opening portion 210 of the housing inner wall 211.

Therefore, it is possible to increase the flow channel area on the housing opening portion 210 side of the internal space 200. In this manner, in particular, it is possible to increase the flow rate of the coolant water flowing to the outlet port 221 (radiator 5) side formed on the housing opening portion 210 side.

<5-13-1>

As illustrated in FIG. 42, the annular seal member 600 is provided between the housing opening portion 210 and the partition wall portion main body 61 of the partition wall portion 60, and can hold the portion between the housing opening portion 210 and the partition wall portion 60 in a liquid-tight manner.

Therefore, when the inner diameter of the housing opening portion 210 is formed to be constant, it is possible to adopt the annular seal member 600 having a standard shape in which the inner diameter and the outer diameter are constant. Accordingly, the cost can be reduced.

<5-14>

As illustrated in FIG. 42, the housing inner wall 211 is formed in a tapered shape so that the inner diameter decreases from the housing opening portion 210 side toward the side opposite to the housing opening portion 210.

Therefore, the flow channel area of the internal space 200 can be gradually increased toward the housing opening portion 210 side. In addition, a step is not formed in the housing inner wall 211. Accordingly, the water flow resistance in the internal space 200 can be reduced.

<5-15>

As illustrated in FIG. 47, at least two (outlet ports 221 to 223) of the multiple ports formed in the housing main body 21 are formed to be aligned in the direction parallel to the attachment surface 201.

Therefore, it is possible to reduce the size in the direction perpendicular to the attachment surface 201 of the housing main body 21, and the body size of the valve device 10 can be reduced.

<5-16>

As illustrated in FIG. 49, the pipe fastening member 540 is a tapping screw which can be screwed to the housing-side fastening holes 261 to 266 by tapping.

Therefore, it is not necessary to perform insert molding on a metal member having a thread groove to be inserted into the housing-side fixing portions 251 to 256. The inter-housing gap Sh1 is formed between the housing-side fixing portions 251 to 256 and the outer wall of the housing main body 21. Accordingly, even in a case where the housing-side fixing portions 251 to 256 are cracked when the pipe fastening member 540 is screwed into the housing-side fastening holes 261 to 266, it is possible to prevent a possibility that the crack may affect the housing main body 21.

<6-1> Partition Wall Through-hole

Figure 52:
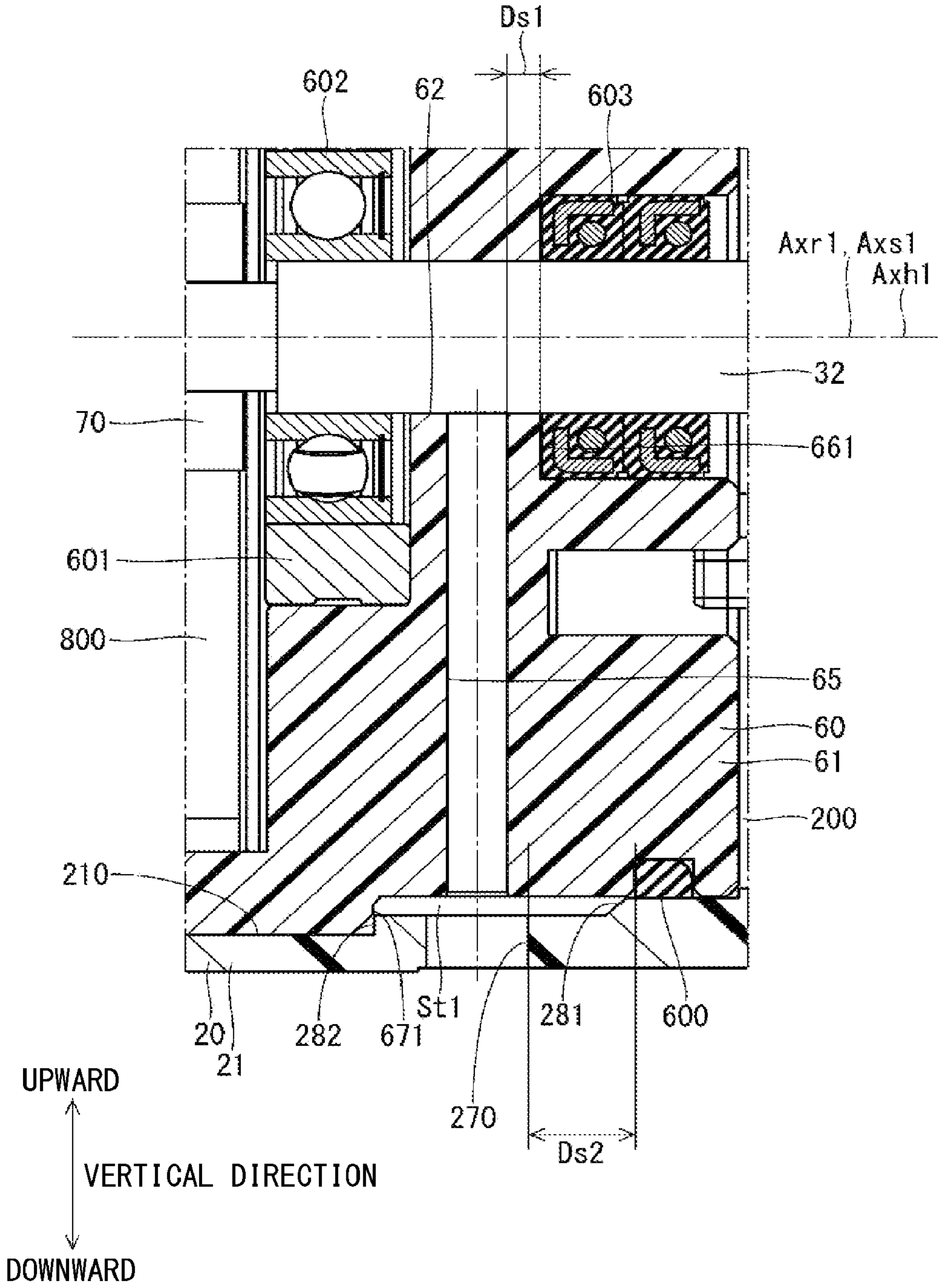
FIG. 52 is a cross-sectional view illustrating the vicinity of a partition wall through-hole of the valve device of the sixth embodiment.

As illustrated in FIG. 52, the partition wall portion 60 has a partition wall through-hole 65 which extends outward from the shaft insertion hole 62 and which is open on the outer wall of the partition wall portion main body 61.

<6-1>

As described above, according to the present embodiment, the valve device 10 can control the coolant water of the engine 2 of the vehicle 1, and includes the housing 20, the valve 30, the partition wall portion 60, and the drive unit 70.

The housing 20 has the housing main body 21 which internally forms the internal space 200, the ports (220, 221, 222, and 223) which connect the internal space 200 and the outside of the housing main body 21 to each other, and the housing opening portion 210 which connects the internal space 200 and the outside of the housing main body 21 to each other.

The valve 30 has the valve body 31 rotatable around the rotation axis Axr1 inside the internal space 200, the valve body internal flow channel 300 formed inside the valve body 31, the valve body opening portions (410, 420, and 430) which connect the valve body internal flow channel 300 and the outside of the valve body 31 to each other, and the shaft 32 provided on the rotation axis Axr1, and can change the communication state between the valve body internal flow channel 300 and the ports via the valve body opening portion in accordance with the rotation position of the valve body 31.

The partition wall portion 60 has the partition wall portion main body 61 provided in the housing opening portion 210 to partition the internal space 200 and the outside of the housing main body 21 from each other, and the shaft insertion hole 62 formed in the partition wall portion main body 61 so that one end of the shaft 32 can be inserted.

The drive unit 70 is provided on the side opposite to the internal space 200 with respect to the partition wall portion 60, can drive the valve body 31 to rotate via one end of the shaft 32.

The partition wall portion 60 has the partition wall through-hole 65 which extends outward from the shaft insertion hole 62 and which is open on the outer wall of the partition wall portion main body 61.

Therefore, the coolant water flowing toward the drive unit 70 side through the shaft insertion hole 62 from the internal space 200 can flow to the partition wall through-hole 65. In this manner, it is possible to prevent a possibility that the coolant water of the internal space 200 may flow to the drive unit 70 side.

<6-1-1>

The partition wall through-hole 65 is formed so that the cross-sectional shape perpendicular to the axis is oval or rectangular.

Therefore, while the body size of the partition wall portion main body 61 is reduced, the influence of surface tension in the partition wall through-hole 65 is prevented. Accordingly, the coolant water can easily flow in the partition wall through-hole 65.

The partition wall through-hole 65 is formed so that the short direction of the cross section is parallel to an axis Axh1 of the shaft insertion hole 62. Therefore, it is possible to reduce the body size of the partition wall portion main body 61 in the direction of the axis Axh1.

<6-2>

As illustrated in FIG. 52, the housing 20 has the housing through-hole 270 which extends outward from the inner wall of the housing opening portion 210, which is open on the outer wall of the housing main body 21, and which is formed to be capable of communicating with the partition wall through-hole 65. The housing through-hole 270 is open on the end surface on the side opposite to the pipe attachment surface 202 of the housing main body 21.

Therefore, the coolant water flowing into the partition wall through-hole 65 can be discharged outward from the housing through-hole 270. In addition, a double structure of the partition wall through-hole 65 and the housing through-hole 270 can prevent the inflow of the water from the outside.

Here, when a large amount of the coolant water flows from the internal space 200 to the drive unit 70 side, the coolant water can be discharged outward via the partition wall through-hole 65 and the housing through-hole 270, and a user can recognize the leakage of the coolant water in the shaft insertion hole 62. In this manner, the user can respond to the leakage which needs the user's response.

On the other hand, when a small amount of the coolant water flows from the internal space 200 to the drive unit 70 side, the coolant water can be accumulated in the partition wall through-hole 65 and the housing through-hole 270, and the user may not recognize the leakage of the coolant water in the shaft insertion hole 62. In this manner, it is possible to prevent a possibility that the user may respond to the leakage which does not need the user's response.

<6-2-1>

The housing through-hole 270 is formed so that the cross-sectional shape perpendicular to the axis is oval or rectangular.

Therefore, while the body size of the housing main body 21 is reduced, the influence of surface tension in the housing through-hole 270 is prevented. Accordingly, the coolant water can easily flow in the housing through-hole 270.

The housing through-hole 270 is formed so that the short direction of the cross section is parallel to the axis Axh1 of the shaft insertion hole 62. Therefore, it is possible to reduce the body size of the housing main body 21 in the direction of the axis Axh1

<6-2-2>

As illustrated in FIG. 52, the partition wall through-hole 65 and the housing through-hole 270 are coaxially formed.

Therefore, the coolant water flowing into the partition wall through-hole 65 can be easily discharged outward from the housing through-hole 270.

<6-3>

As illustrated in FIG. 52, the valve device 10 includes a shaft seal member 603, an annular seal member 600. For example, the shaft seal member 603 is mainly formed of an elastic member such as rubber in an annular shape, is provided between the shaft 32 and the shaft insertion hole 62 on the internal space 200 side with respect to the partition wall through-hole 65, and can hold the portion between the shaft 32 and the shaft insertion hole 62 in a liquid-tight manner.

The annular seal member 600 is mainly formed of an elastic member such as rubber in an annular shape, is provided between the partition wall portion main body 61 and the inner wall of the housing opening portion 210 on the internal space 200 side with respect to the housing through-hole 270, and can hold the portion between the partition wall portion main body 61 and the inner wall of the housing opening portion 210 in a liquid-tight manner. The shaft seal member 603 and the annular seal member 600 respectively correspond to a "first seal member" and a "second seal member".

Therefore, the shaft seal member 603 can prevent the leakage of the coolant water from the internal space 200 to the drive unit 70 side via the shaft insertion hole 62. The annular seal member 600 can prevent the leakage of the coolant water from the internal space 200 to the outside via the portion between the partition wall portion main body 61 and the housing opening portion 210.

The shaft seal member 603 is provided at a position separated to the internal space 200 side by a predetermined distance from the partition wall through-hole 65. Accordingly, it is possible to form a space between the partition wall through-hole 65 and the shaft seal member 603. Therefore, when the leakage of the coolant water is small, the coolant water can be accumulated in the space, and the user may not recognize the leakage.

The annular seal member 600 is provided at a position separated to the internal space 200 side by a predetermined distance from the housing through-hole 270. Accordingly, it is possible to form a space between the housing through-hole 270 and the annular seal member 600. Therefore, when the leakage of the coolant water is small, the coolant water can be accumulated in the space, and the user may not recognize the leakage.

<6-4>

As illustrated in FIG. 52, a distance Ds1 between the shaft seal member 603 and the partition wall through-hole 65 is shorter than a distance Ds2 between the annular seal member 600 and the housing through-hole 270.

Therefore, a space formed between the housing through-hole 270 and the annular seal member 600 can be larger than a space formed between the partition wall through-hole 65 and the shaft seal member 603. In this manner, a larger amount of the coolant water can be accumulated in the space side formed between the housing through-hole 270 and the annular seal member 600.

<6-5>

As illustrated in FIG. 52, the partition wall portion 60 has a partition wall inner step surface 661 which forms a step between the partition wall through-hole 65 of the shaft insertion hole 62 and the shaft seal member 603. The partition wall inner step surface 661 is formed in an annular shape planar shape to face the internal space 200 side. The shaft seal member 603 is provided to be capable of coming into contact with the partition wall inner step surface 661.

The housing 20 has a housing step surface 281 which forms a step between the housing through-hole 270 of the inner wall of the housing opening portion 210 and the annular seal member 600. The housing step surface 281 is formed in an annular shape to face the drive unit 70 side.

Therefore, when the leakage of the coolant water is small, the coolant water can be accumulated in the partition wall inner step surface 661 and the housing step surface 281. In this manner, the user may not recognize the small amount of the leakage.

In addition, even when the water enters from the outside via the housing through-hole 270, the water is accumulated in the partition wall inner step surface 661 and the housing step surface 281. In this manner, it is possible to prevent a possibility that the water may flow to the shaft seal member 603 and the annular seal member 600.

<6-6>

As illustrated in FIG. 52, the housing step surface 281 is formed in a tapered shape so that the inner diameter increases from the internal space 200 side toward the drive unit 70 side.

Therefore, it is possible to increase the space formed between the housing through-hole 270 and the annular seal member 600, and a large amount of the coolant water can be accumulated in the space.

The housing 20 has a housing step surface 282 which forms a step on the drive unit 70 side of the housing through-hole 270 of the inner wall of the housing opening portion 210. The housing step surface 282 is formed in an annular shape to face the drive unit 70 side.

The partition wall portion 60 has a partition wall outer step surface 671 which forms a step on the drive unit 70 side of the partition wall through-hole 65 of the outer wall of the partition wall portion main body 61. The partition wall outer step surface 671 is formed in an annular shape to face the internal space 200 and the housing step surfaces 281 and 282 side.

As illustrated in FIG. 52, a cylindrical space St1 having a substantially cylindrical shape is formed between the housing step surface 281 and the partition wall outer step surface 671, between the outer wall of the partition wall portion main body 61 and the inner wall of the housing opening portion 210. The partition wall through-hole 65 and the housing through-hole 270 communicate with each other via the cylindrical space St1.

When the leakage of coolant water is small, the coolant water can be accumulated in the cylindrical space St1.

As illustrated in FIG. 52, the housing step surface 281, the housing through-hole 270, and the housing step surface 282 are formed in the housing opening portion 210 in this order from the internal space 200 side toward the drive unit 70 side. The annular seal member 600 is directed toward the internal space 200 side with respect to the housing step surface 281.

As illustrated in FIG. 52, in an end portion on the side opposite to the shaft 32 of the partition wall through-hole 65, an inner edge portion is chamfered in a tapered shape. In this manner, the coolant water inside the partition wall through-hole 65 can be easily discharged.

<6-8>

As illustrated in FIG. 52, in a state where the housing 20 is attached to the engine 2, the partition wall through-hole 65 is located on the lower side of the shaft 32 in the vertical direction.

Therefore, when the leakage of coolant water is large, the coolant water can quickly flow to the partition wall through-hole 65.

<6-9>

As illustrated in FIG. 52, in a state where the housing 20 is attached to the engine 2, the housing through-hole 270 is located on the lower side of the shaft 32 in the vertical direction.

Therefore, when the leakage of the coolant water is large, the coolant water can be quickly discharged outward from the housing through-hole 270.

<6-10>

As illustrated in FIG. 52, in the partition wall through-hole 65 and the housing through-hole 270, the cross-sectional areas are different from each other in a cross section perpendicular to the axis. The cross-sectional area of the housing through-hole 270 is larger than the cross-sectional area of the partition wall through-hole 65.

Therefore, even when the housing main body 21 and the partition wall portion 60 are misaligned, it is possible to ensure communication between the partition wall through-hole 65 and the housing through-hole 270. The cross-sectional area of the housing through-hole 270 is larger than the cross-sectional area of the partition wall through-hole 65. Accordingly, the coolant water can be quickly discharged outward from the housing through-hole 270. In addition, it is possible to prevent a possibility that the water may enter the shaft insertion hole 62 side from the outside via the housing through-hole 270 and the partition wall through-hole 65.

<6-18>

As illustrated in FIG. 52, in a state where the housing 20 is attached to the engine 2, the partition wall through-hole 65 is located on the lower side of the shaft 32.

Therefore, when the leakage of coolant water is large, the coolant water can quickly flow to the partition wall through-hole 65.

<6-19>

As illustrated in FIG. 52, in a state where the housing 20 is attached to the engine 2, the housing through-hole 270 is located on the lower side of the shaft 32.

Therefore, when the leakage of the coolant water is large, the coolant water can be quickly discharged outward from the housing through-hole 270.

Here, for example, the lower side of the shaft 32 is the lower side of a horizontal plane including the axis Axs1 of the shaft 32, and means not only a side directly below the shaft 32 in the vertical direction, but also a predetermined range on the lower side of the shaft 32.

<6-20>

When a directly downward direction of the axis Axs1 of the shaft 32 is set to 0 degrees, the partition wall through-hole 65 is formed in a range of 0 to 80 degrees in the circumferential direction of the shaft 32. According to the present embodiment, the partition wall through-hole 65 is formed to extend in the direction of 0 degrees from the shaft 32 side. Therefore, when the leakage of the coolant water is large, the coolant water can be quickly discharged.

The partition wall through-hole 65 may be formed in a range of 30 to 80 degrees in the circumferential direction of the shaft 32. In this case, an angle of the partition wall through-hole 65 can be gentle to some extent, the coolant water can be spread and discharged. Therefore, even when a problem occurs due to an inadvertent leakage of the coolant water, it is possible to avoid a situation in which a user sensitively responds to an abnormality more than necessary.

<6-21>

When the directly downward direction of the axis Axs1 of the shaft 32 is set to 0 degrees, the housing through-hole 270 is formed in a range of 0 to 80 degrees in the circumferential direction of the shaft 32. According to the present embodiment, the housing through-hole 270 is formed to extend in the direction of 0 degrees from the shaft 32 side. Therefore, when the leakage of the coolant water is large, the coolant water can be quickly discharged.

The housing through-hole 270 may be formed in a range of 30 to 80 degrees in the circumferential direction of the shaft 32, as in the partition wall through-hole 65. In this case, the angle of the housing through-hole 270 can be gentle to some extent, and the coolant water can be spread and discharged. Therefore, even when a problem occurs due to an inadvertent leakage of the coolant water, it is possible to avoid a situation in which a user sensitively responds to an abnormality more than necessary.

Seventh Embodiment

Figure 53:
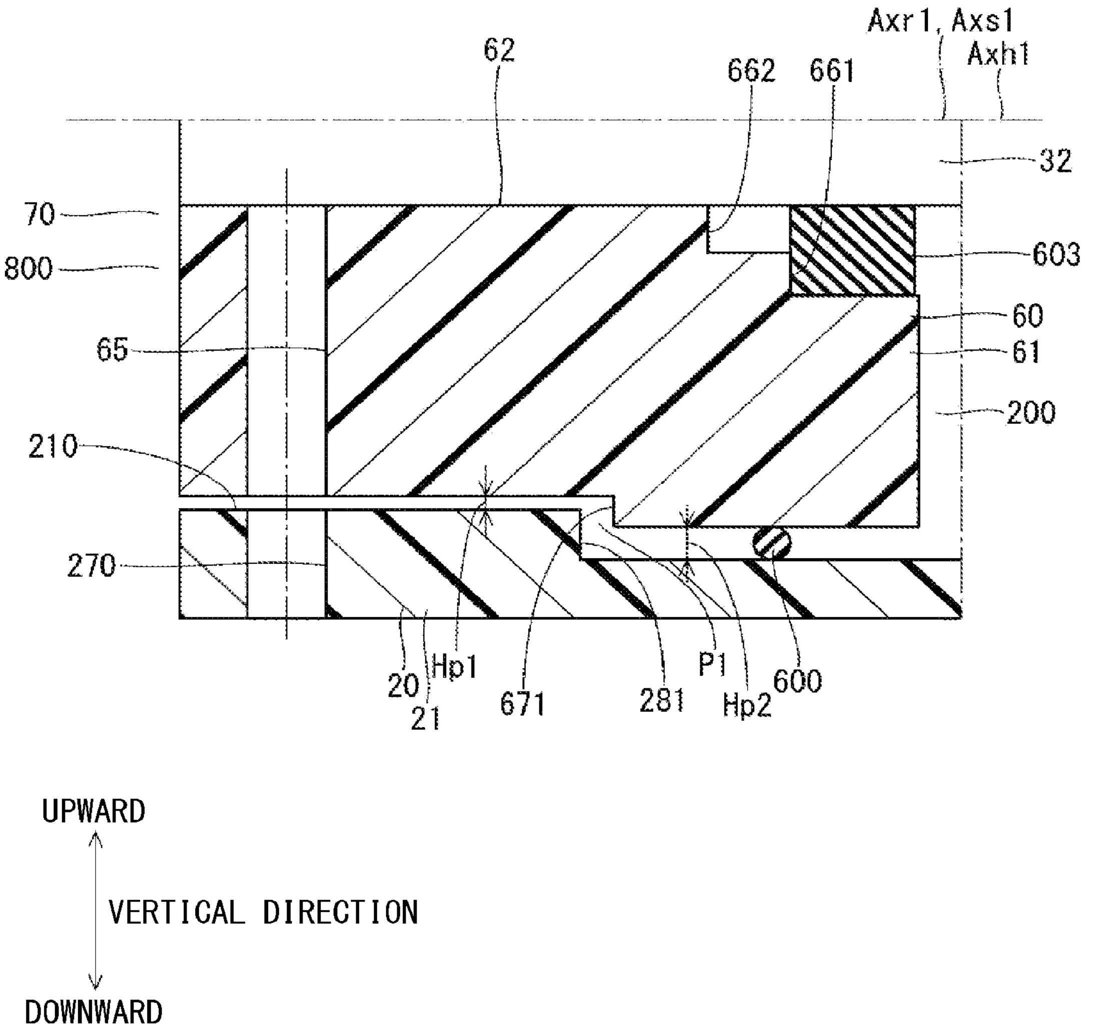
FIG. 53 is a cross-sectional view illustrating the vicinity of a partition wall through-hole of a valve device of a seventh embodiment.

A portion of a valve device according to a seventh embodiment is illustrated in FIG. 53.

<6-5>

As illustrated in FIG. 53, the partition wall portion 60 has a partition wall inner step surface 662 which forms a step between the partition wall through-hole 65 of the shaft insertion hole 62 and the shaft seal member 603. The partition wall inner step surface 662 is formed in an annular shape planar shape to face the internal space 200 side. The partition wall inner step surface 662 is formed on the partition wall through-hole 65 side with respect to the partition wall inner step surface 661.

Therefore, it is possible to form a space between the partition wall inner step surface 662 and the shaft seal member 603. In this manner, when the leakage of the coolant water is small, the coolant water is accumulated in the space. In this manner, the user may not recognize the small amount of the leakage.

In addition, even when the water enters from the outside via the housing through-hole 270, the water is accumulated in the space. In this manner, it is possible to prevent a possibility that the water may flow to the shaft seal member 603.

The housing step surface 281 is formed in an annular shape to face the internal space 200 side. The partition wall outer step surface 671 is formed in an annular shape to face the drive unit 70 and the housing step surface 281 side between the housing step surface 281 and the annular seal member 600. The partition wall outer step surface 671 and the housing step surface 281 are separated from each other by a predetermined distance while facing each other. Therefore, a labyrinth-shaped passage P1 is formed between the annular seal member 600 and the housing through-hole 270, between the outer wall of the partition wall portion main body 61 and the inner wall of the housing opening portion 210.

Therefore, even when the water enters from the outside via the housing through-hole 270, the water is accumulated in the passage P1. In this manner, it is possible to prevent a possibility that the water may flow to the annular seal member 600.

As illustrated in FIG. 53, in the radial direction of the housing opening portion 210, a height Hp1 on the drive unit 70 side of the labyrinth-shaped passage P1 is lower than a height Hp2 on the internal space 200 side of the passage P1. Therefore, when viewed from the housing through-hole 270 side, the passage P1 is changed from a narrow portion to a wide portion. Therefore, due to the narrow portion of the passage P1, the water is less likely to flow from the housing through-hole 270 side to the annular seal member 600 side. In addition, due to the narrow portion of the passage P1, the water is less likely to flow from the internal space 200 side to the housing through-hole 270 side.

Eighth Embodiment

Figure 54:
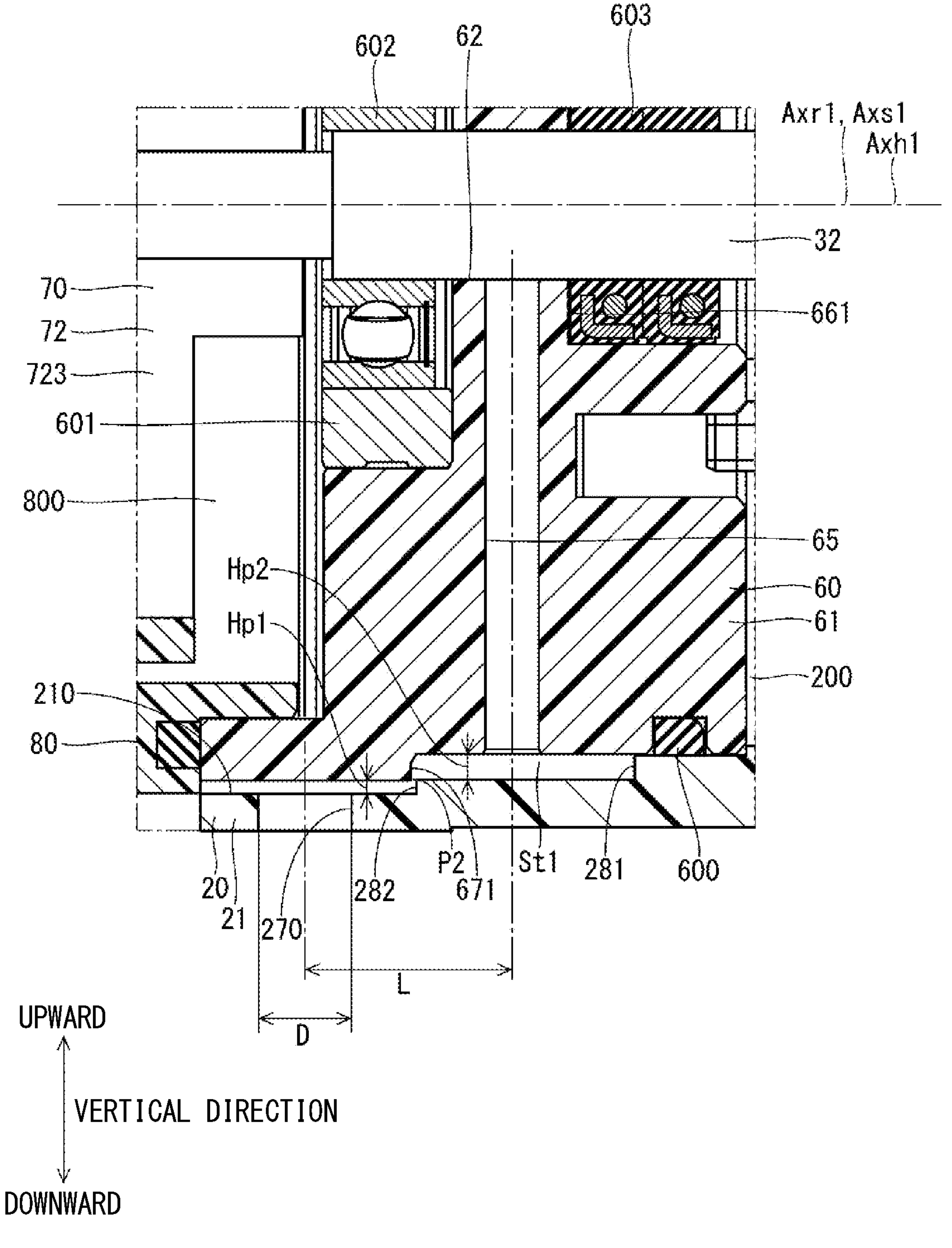
FIG. 54 is a cross-sectional view illustrating the vicinity of a partition wall through-hole of a valve device of an eighth embodiment.

A portion of a valve device according to an eighth embodiment is illustrated in FIG. 54. The eighth embodiment is different from the sixth embodiment in a position of the housing through-hole 270.

<6-11>

As illustrated in FIG. 54, in the partition wall through-hole 65 and the housing through-hole 270, positions of mutual axes in the direction of the axis (Axh1) of the shaft insertion hole 62 are different from each other. The housing through-hole 270 is formed on the drive unit 70 side with respect to the partition wall through-hole 65.

Therefore, even when the water enters from the outside via the housing through-hole 270, it is possible to prevent a possibility that the water may flow to the shaft insertion hole 62 side via the partition wall through-hole 65.

<6-11-1>

As illustrated in FIG. 54, when the distance between the axis of the partition wall through-hole 65 and the axis of the housing through-hole 270 is defined as L, and the size of the housing through-hole 270 in the direction of the axis (Axh1) of the shaft insertion hole 62 is defined as D, the partition wall through-hole 65 and the housing through-hole 270 are formed to satisfy a relationship of $D \leq L \leq 10D$.

Therefore, even when the water enters from the outside via the housing through-hole 270, it is possible to effectively prevent a possibility that the water may flow to the shaft insertion hole 62 side via the partition wall through-hole 65.

<6-12>

As illustrated in FIG. 54, the partition wall portion 60 has a partition wall outer step surface 671 which forms a step between the partition wall through-hole 65 of the outer wall of the partition wall portion main body 61 and the housing through-hole 270.

Therefore, even when the water enters from the outside via the housing through-hole 270, the water is accumulated in the partition wall outer step surface 671. In this manner, it is possible to prevent a possibility that the water may flow to the shaft insertion hole 62 side via the partition wall through-hole 65.

As illustrated in FIG. 54, the housing through-hole 270 is formed on the drive unit 70 side with respect to the housing step surface 282 and the partition wall outer step surface 671. The partition wall outer step surface 671 and the housing step surface 282 are separated from each other by a predetermined distance while facing each other. Therefore, a labyrinth-shaped passage P2 is formed between the housing through-hole 270 and the partition wall through-hole 65, between the outer wall of the partition wall portion main body 61 and the inner wall of the housing opening portion 210.

Therefore, even when the water enters from the outside via the housing through-hole 270, the water is accumulated in the passage P2. In this manner, it is possible to prevent a possibility that the water may flow to the shaft insertion hole 62 side via the partition wall through-hole 65.

As illustrated in FIG. 54, in the radial direction of the housing opening portion 210, the height Hp1 of the portion on the drive unit 70 side of the labyrinth-shaped passage P2 is lower than the height Hp2 of the portion on the internal space 200 side of the passage P2. Therefore, when viewed from the housing through-hole 270 side, the passage P2 is changed from a narrow portion to a wide portion. Therefore, due to the narrow portion of the passage P2, the water is less likely to flow from the housing through-hole 270 side to the partition wall through-hole 65 side. In addition, due to the narrow portion of the passage P2, the water is less likely to flow from the partition wall through-hole 65 side to the housing through-hole 270 side.

In another embodiment, in the radial direction of the housing opening portion 210, the height Hp1 of the portion on the drive unit 70 side of the labyrinth-shaped passage P2 may be higher than the height Hp2 of the portion on the side of the internal space 200 of the passage P2. In this case, when viewed from the housing through-hole 270 side, the passage P2 is changed from a wide portion to a narrow portion. Therefore, the water entering from the outside through the housing through-hole 270 is trapped at the narrow portion of the passage P2. Accordingly, the water is less likely to flow to the partition wall through-hole 65 side. On the other hand, the water on the partition wall through-hole 65 side is likely flow to the housing through-hole 270 side via the passage P2.

Ninth Embodiment

Figure 55:
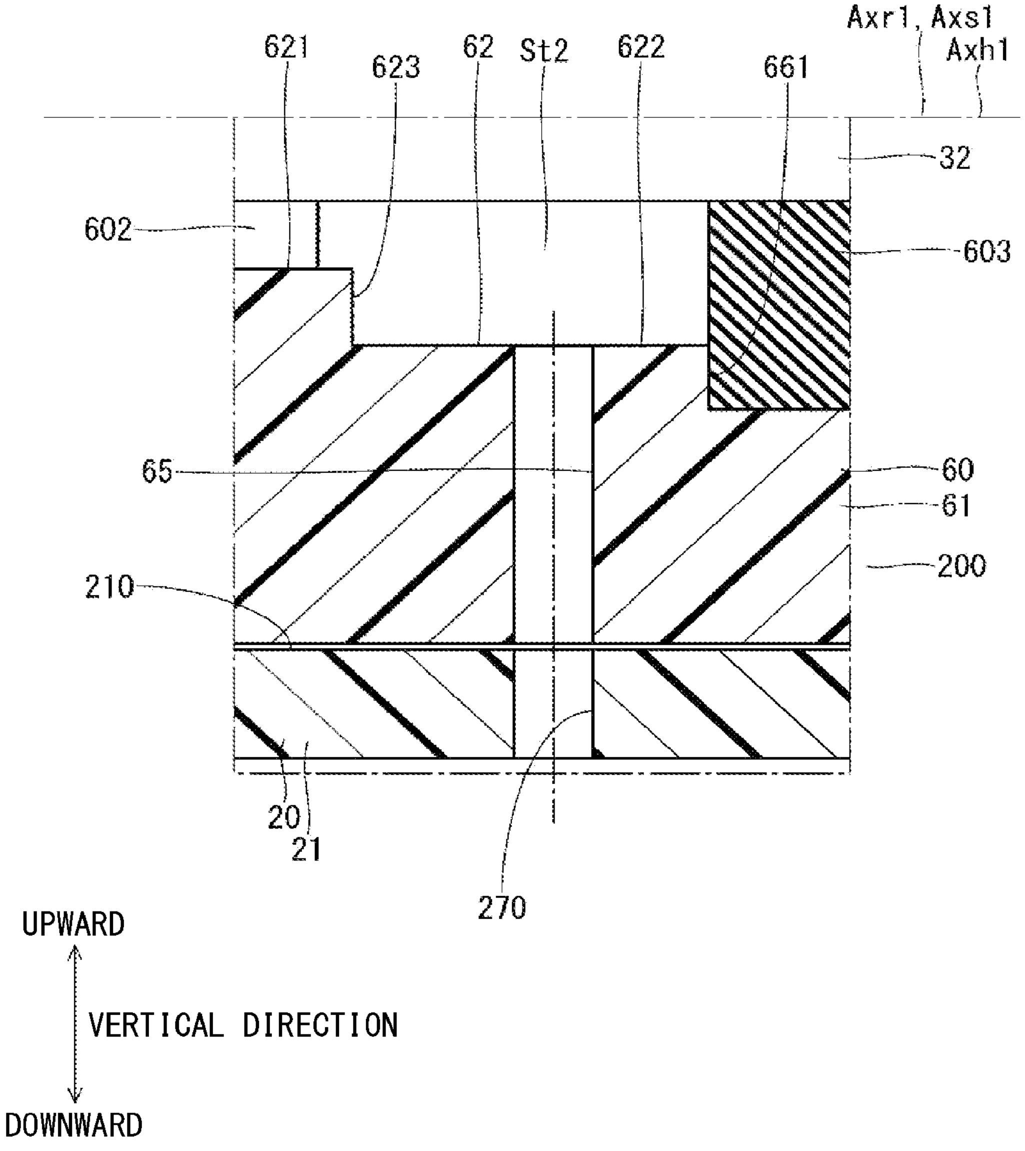
FIG. 55 is a cross-sectional view illustrating the vicinity of a partition wall through-hole of a valve device of a ninth embodiment.

A portion of a valve device according to a ninth embodiment is illustrated in FIG. 55.

<6-13>

As illustrated in FIG. 55, the valve device 10 includes a bearing portion 602. The bearing portion 602 is provided on the drive unit 70 side with respect to the partition wall through-hole 65 of the shaft insertion hole 62, and bears one end of the shaft 32.

Therefore, the coolant water flowing from the internal space 200 to the drive unit 70 side is caused to flow to the partition wall through-hole 65. In this manner, it is possible to prevent a possibility that the coolant water may flow to the bearing portion 602.

<6-14>

As illustrated in FIG. 55, the shaft insertion hole 62 has a small diameter portion 621 in which the bearing portion 602 is internally provided, a large diameter portion 622 in whose inner diameter is larger than the small diameter portion 621, and in which the partition wall through-hole 65 is open, and an insertion hole inner step surface 623 formed between the small diameter portion 621 and the large diameter portion 622.

The insertion hole inner step surface 623 is formed in an annular shape to face the internal space 200 side. As illustrated in FIG. 55, a cylindrical space St2 having a substantially cylindrical shape is formed between the shaft seal member 603 and the bearing portion 602 outside in the radial direction of the shaft 32. The partition wall through-hole 65 is connected to the cylindrical space St2.

Therefore, the coolant water flowing from the internal space 200 to the drive unit 70 side is accumulated in the cylindrical space St2. In this manner, it is possible to prevent a possibility that the coolant water may flow to the bearing portion 602. In addition, even when the water enters from the outside via the housing through-hole 270, the water is accumulated in the cylindrical space St2. In this manner, it is possible to prevent a possibility that the water may flow to the bearing portion 602.

Tenth Embodiment

Figure 56:
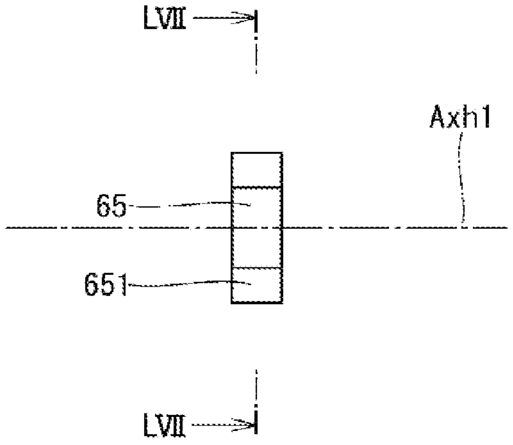
FIG. 56 is a view illustrating a partition wall through-hole of a valve device of a tenth embodiment.
Figure 57:
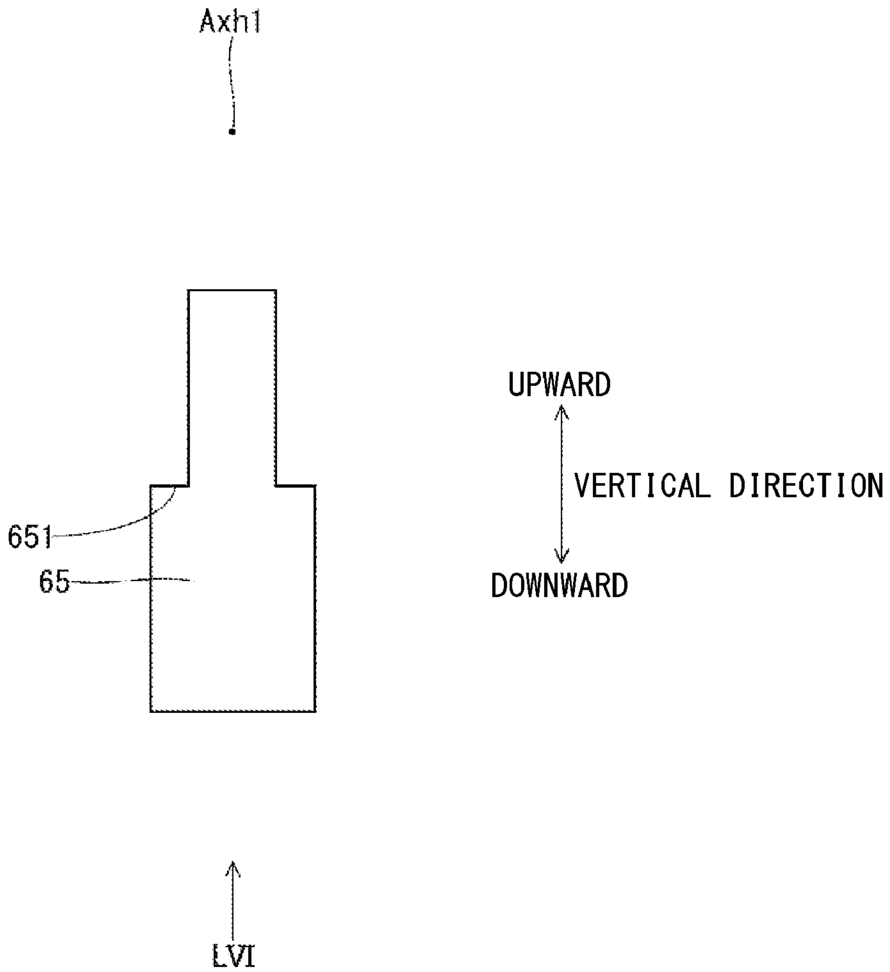
FIG. 57 is a view illustrating the partition wall through-hole of the valve device of the tenth embodiment.

A portion of a valve device according to a tenth embodiment is illustrated in FIGS. 56 and 57.

<6-15>

As illustrated in FIGS. 56 and 57, the partition wall through-hole 65 has a partition wall through-hole inner step surface 651 which forms a step between one end and the other end of the partition wall through-hole 65.

The partition wall through-hole inner step surface 651 is formed to face downward in the vertical direction, in a state where the valve device 10 is attached to the engine 2. Therefore, the cross-sectional area of the lower side of the partition wall through-hole 65 in the vertical direction is larger than the cross-sectional area of the upper side in the vertical direction.

Therefore, even when the water enters from the outside via the housing through-hole 270, the water is accumulated in the partition wall through-hole inner step surface 651. In this manner, it is possible to prevent a possibility that the water may flow to the shaft insertion hole 62.

Eleventh Embodiment

Figure 58:
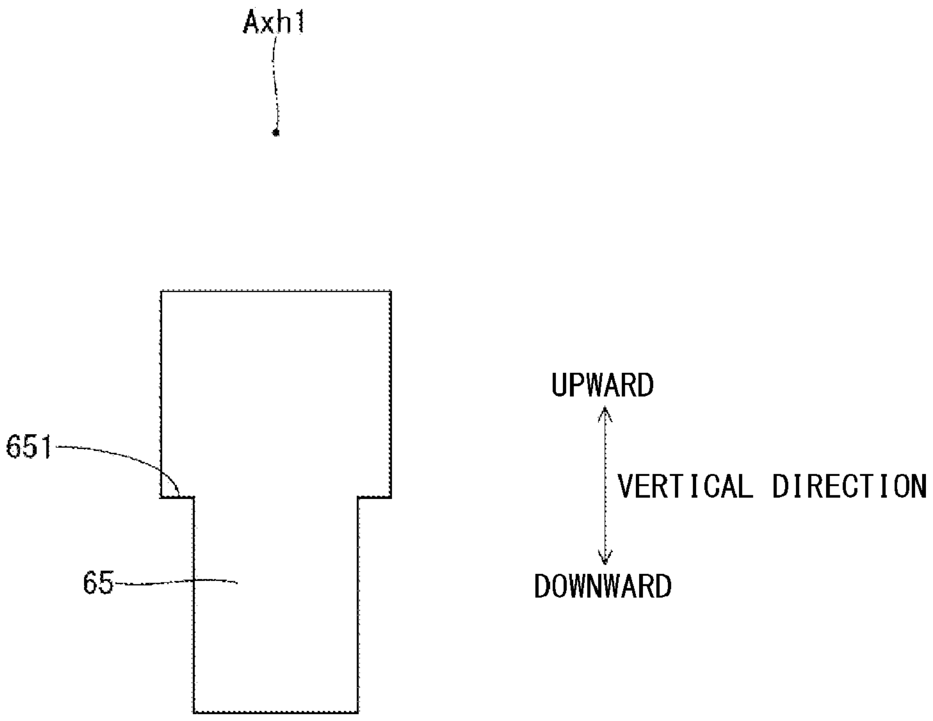
FIG. 58 is a view illustrating a partition wall through-hole of a valve device of an eleventh embodiment.

A portion of a valve device according to an eleventh embodiment is illustrated in FIG. 58.

<6-15>

As illustrated in FIG. 58, the partition wall through-hole inner step surface 651 is formed to face upward in the vertical direction, in a state where the valve device 10 is attached to the engine 2. Therefore, the cross-sectional area of the upper side of the partition wall through-hole 65 in the vertical direction is larger than the cross-sectional area of the lower side in the vertical direction.

Therefore, when the leakage of the coolant water is small, the coolant water is accumulated in the partition wall through-hole inner step surface 651. In this manner, the user may not recognize the small amount of the leakage.

Twelfth Embodiment

Figure 59:
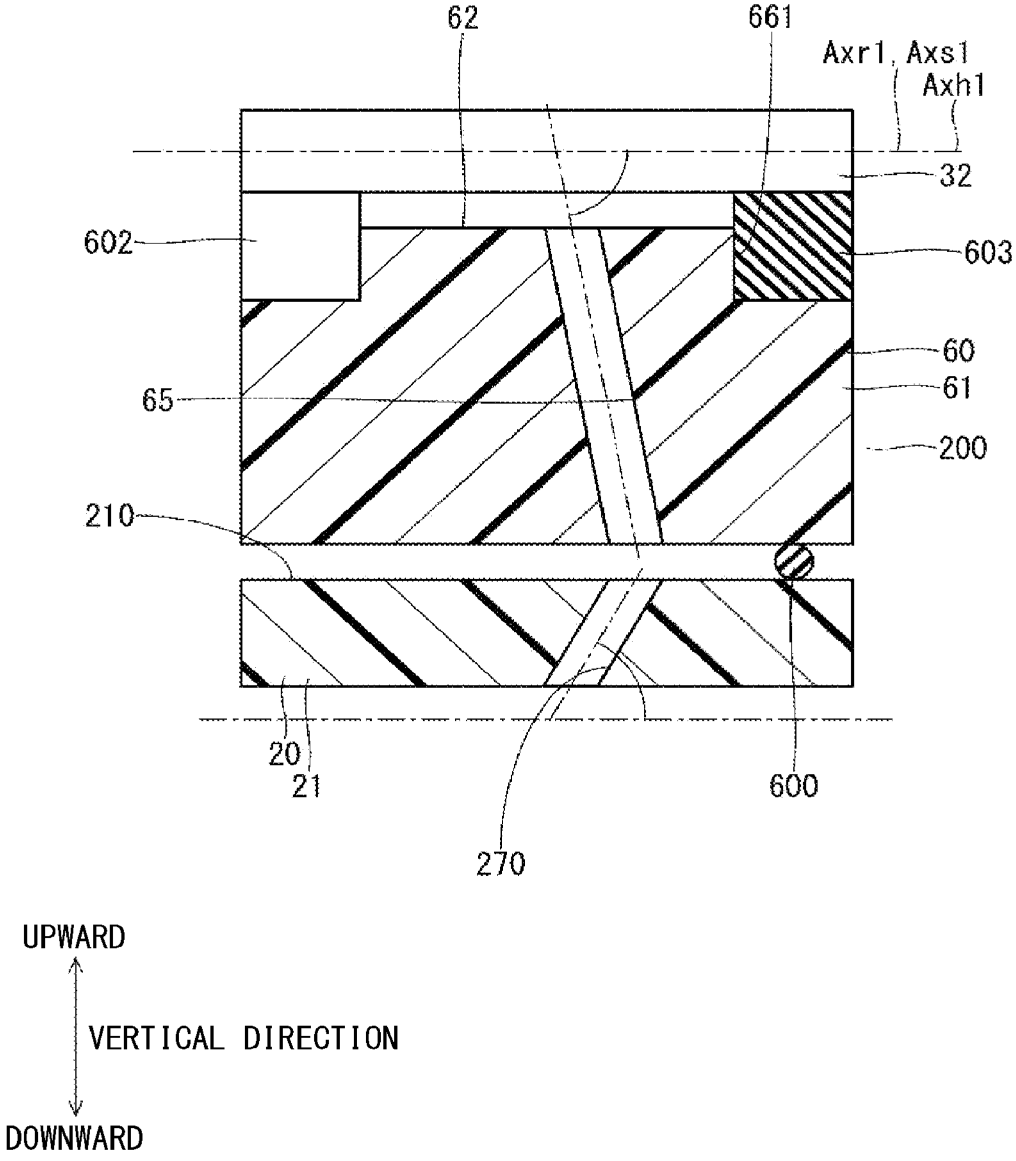
FIG. 59 is a cross-sectional view illustrating the vicinity of a partition wall through-hole of a valve device of a twelfth embodiment.

A portion of a valve device according to a twelfth embodiment is illustrated in FIG. 59.

<6-16>

As illustrated in FIG. 59, the partition wall through-hole 65 and the housing through-hole 270 are formed so that the respective axes are not orthogonal to the axis Axh1 of the shaft insertion hole 62.

Therefore, even when the water enters from the outside via the housing through-hole 270, it is possible to prevent a possibility that the water may flow to the shaft insertion hole 62 via the partition wall through-hole 65.

The partition wall through-hole 65 and the housing through-hole 270 are formed so that the axes intersect with each other.

Thirteenth Embodiment

Figure 60:
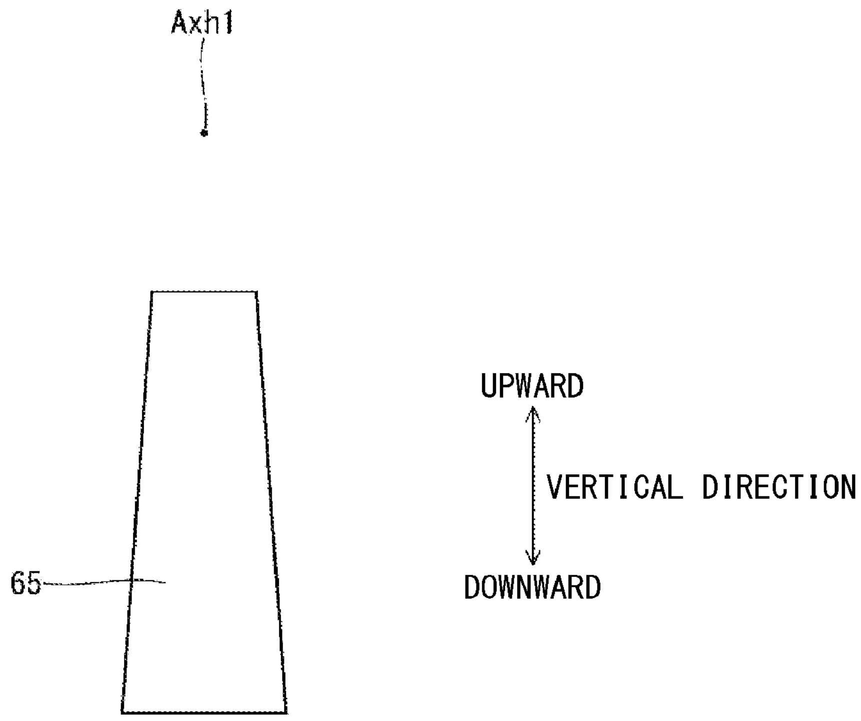
FIG. 60 is a view illustrating a partition wall through-hole of a valve device of a thirteenth embodiment.

A portion of a valve device according to a thirteenth embodiment is illustrated in FIG. 60.

<6-17>

As illustrated in FIG. 60, the partition wall through-hole 65 is formed so that the cross-sectional area gradually increases outward in the radial direction from the inside in the radial direction of the shaft insertion hole 62.

Therefore, when the leakage of the coolant water is large, the coolant water can be quickly discharged outward from the housing through-hole 270 via the partition wall through-hole 65.

Fourteenth Embodiment

A valve device according to a fourteenth embodiment is illustrated in FIGS. 61 to 77.

The present embodiment is different from the first embodiment in each shape of the housing 20, the valve 30, the pipe member 50, and the drive unit cover 80.

Figure 61:
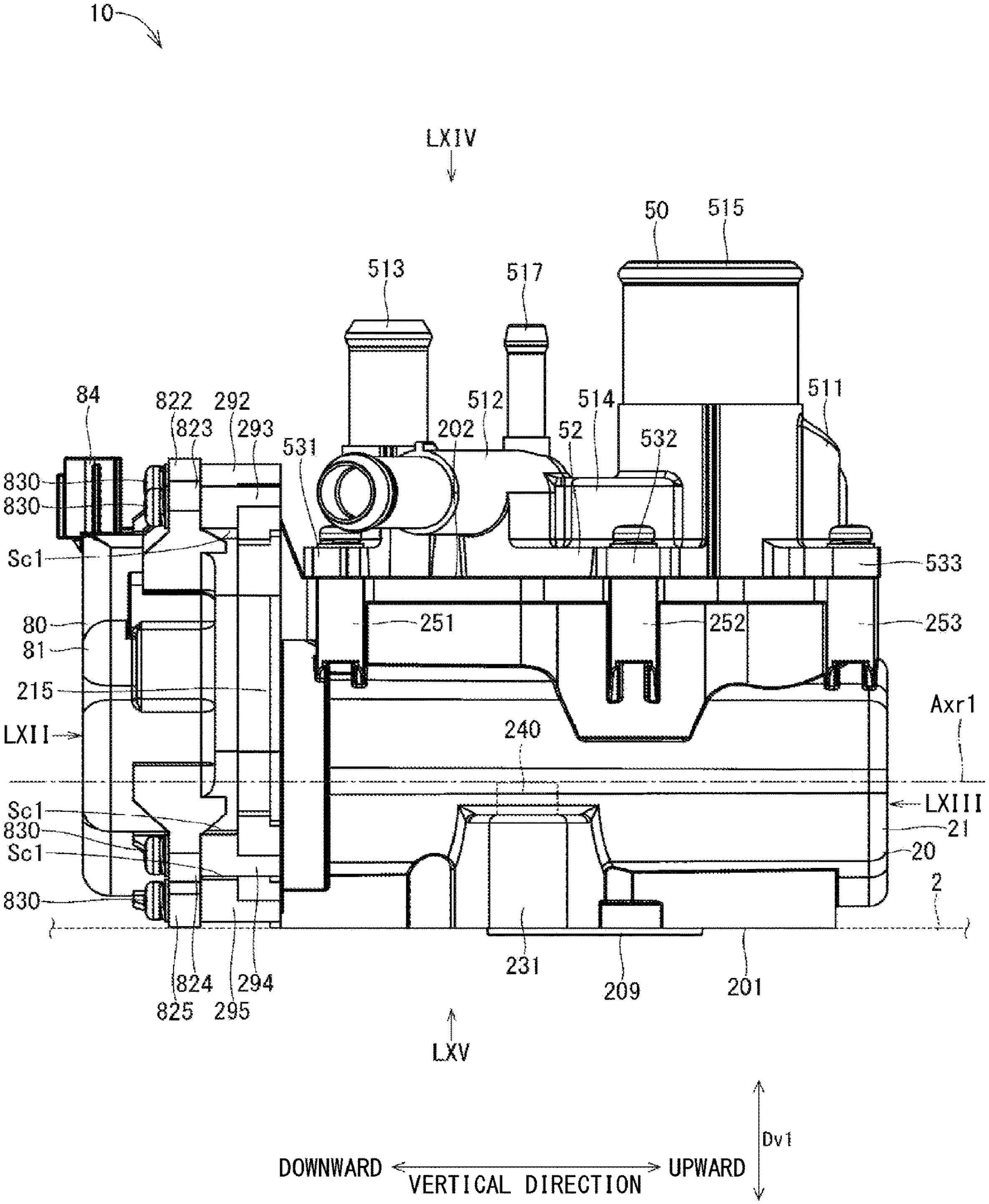
FIG. 61 is a view illustrating a valve device of a fourteenth embodiment.

As illustrated in FIG. 61, in the valve device 10 of the present embodiment, the drive unit cover 80 is provided on the lower side of the housing main body 21 in the vertical direction, and the attachment surface 201 is provided in the narrow space A1 to face the engine 2.

Figure 65:
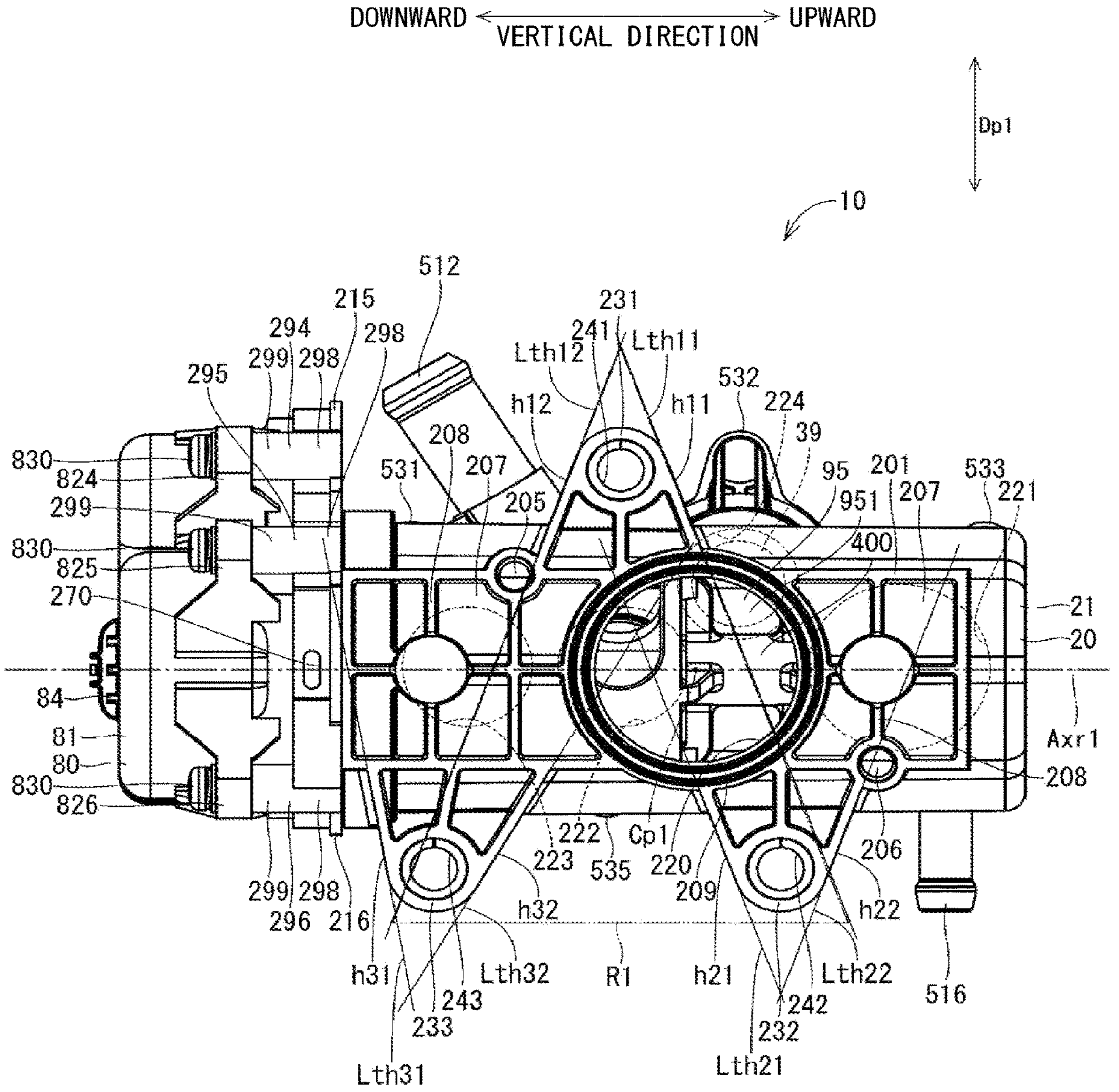
FIG. 65 is a view when
Figure 66:
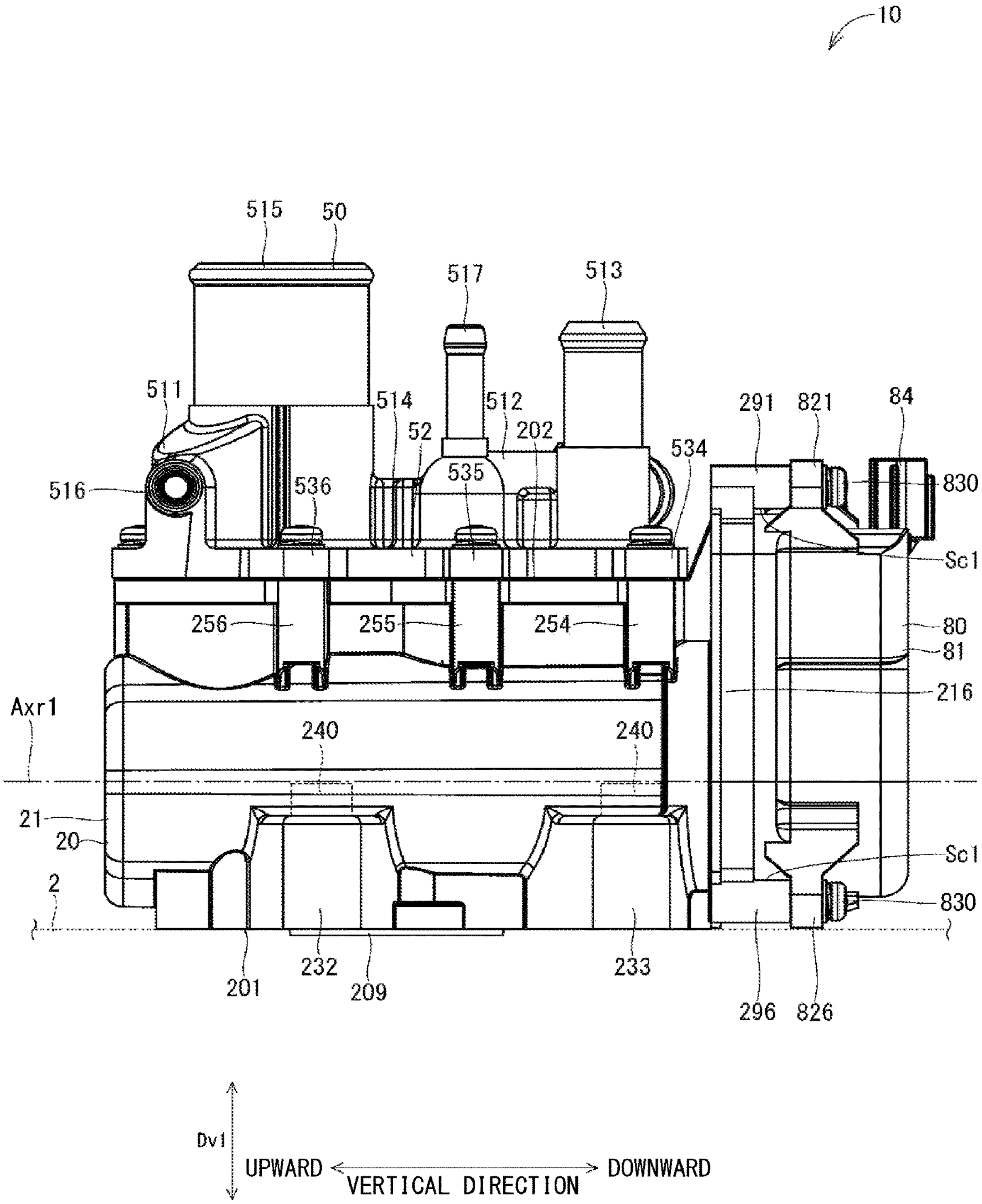
FIG. 66 is a view when

As illustrated in FIG. 65, a base portion of one side h11 of two sides (h11 and h12) of the fastening portion 231 having a substantially triangular shape when viewed in the direction perpendicular to the attachment surface 201 is formed at a position overlapping the inlet port 220 when viewed in the longitudinal direction of the housing main body 21. In addition, a base portion of one side h21 of the two sides (h21 and h22) of the fastening portion 232 is formed at a position overlapping the inlet port 220 when viewed in the longitudinal direction of the housing main body 21.

That is, one of start positions of the fastening portions (231 and 232) of the two fastening holes (241 and 242) closest to the inlet port 220 is formed at a position overlapping the inlet port 220 when viewed in the longitudinal direction of the housing main body 21.

Therefore, the housing main body 21 can be stably fixed to the engine 2.

A base portion of one side h32 of the two sides (h31 and h32) of the fastening portion 233 is formed at a position that does not overlap the inlet port 220 when viewed in the longitudinal direction of the housing main body 21.

That is, one of the start positions of the fastening portion (233) of the fastening hole (243) farthest away from the inlet port 220 is formed at a position that does not overlap with the inlet port 220 when viewed in the longitudinal direction of the housing main body 21.

As illustrated in FIG. 65, the fastening holes (242 and 243) of the other two fastening portions (232 and 233) exist in a region R1 surrounded by side straight lines Lth11 and Lth12 which are straight lines along the two sides (h11 and h12) of the fastening portion 231.

As illustrated in FIG. 65, a side straight line Lth11 which is a straight line along the side h11 of the fastening portion 231, a side straight line Lth21 which is a straight line along the side h21 of the fastening portion 232, and a side straight line Lth32 which is a straight line along the side h32 of the fastening portion 233 intersect with the inlet port 220.

That is, when the side h11, the side h21, and the side h32 of the fastening portions 231 to 233 are extended in each of the fastening holes 241 to 243, the sides intersect with the inlet port 220.

As illustrated in FIG. 65, compared to the other sides (h11, h12, h21, h22, and h31), the side h32 on the inlet port 220 side of the fastening portion 233 of the fastening hole (243) farthest away from the inlet port 220 has the smallest inclination angle with respect to the longitudinal direction of the housing main body 21.

As illustrated in FIG. 65, the positioning portion 205 is formed on an extension line of the side h12 of the fastening portion 231. The positioning portion 206 is formed on an extension line of the side h22 of the fastening portion 232.

That is, the positioning portions (205 and 206) capable of positioning the housing main body 21 by engaging with the other member is formed on the extension lines of the sides (h12 and h22) of the fastening portions (231 and 232).

<2-12>

Figure 79:
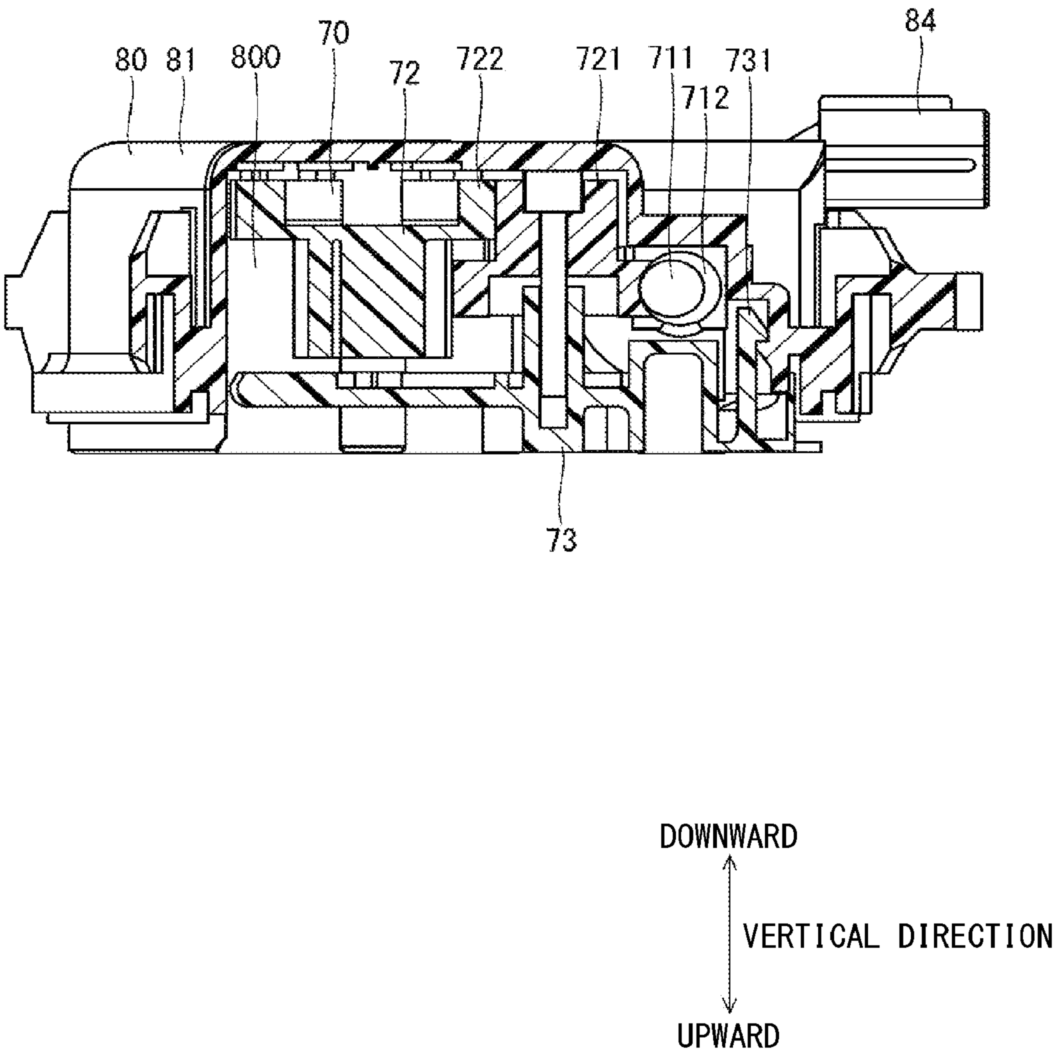
FIG. 79 is a cross-sectional view taken along line LXXIX-LXXIX in FIG. 62.
Figure 80:
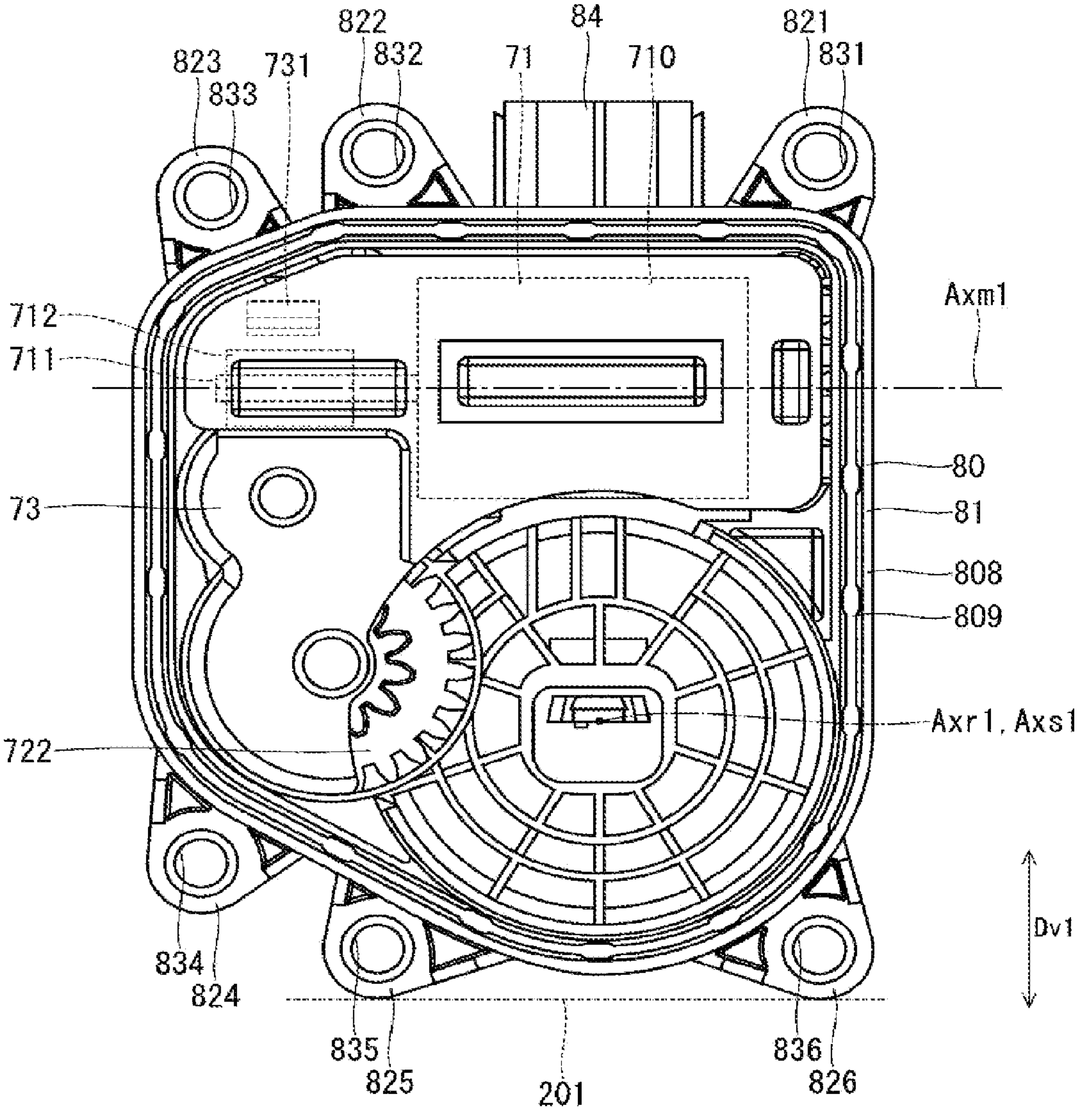
FIG. 80 is a view illustrating a drive unit cover and a part of a drive unit of the valve device of the fourteenth embodiment.
Figure 81:
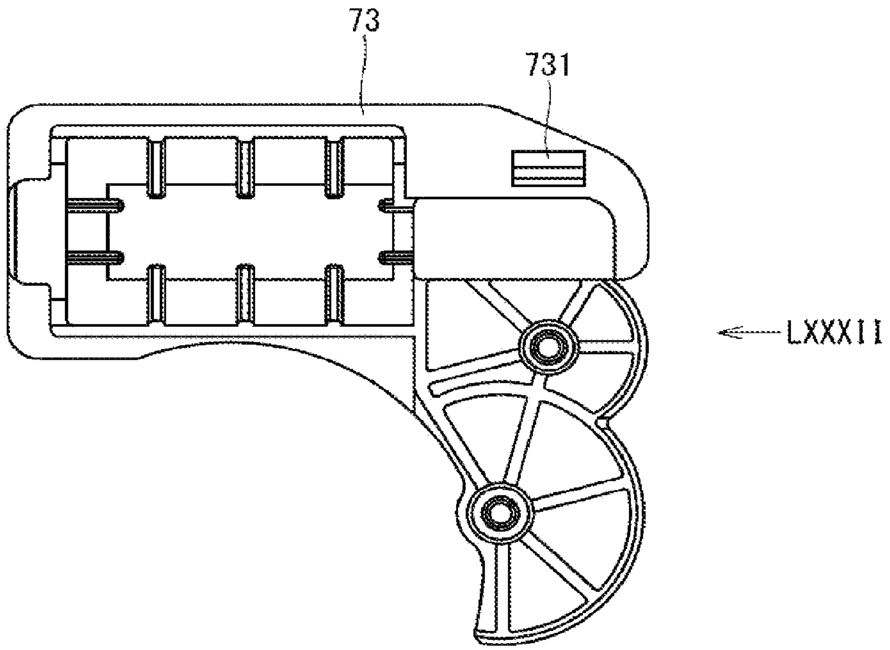
FIG. 81 is a view illustrating a holding member of the valve device of the fourteenth embodiment.
Figure 82:
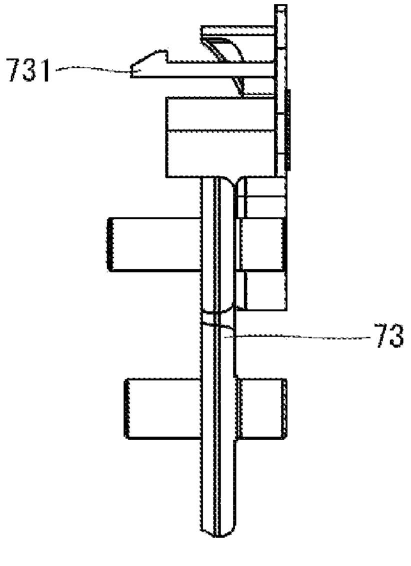
FIG. 82 is a view when

As illustrated in FIGS. 79 to 82, the holding member 73 has one snap-fit portion 731. As illustrated in FIGS. 79 and 80, the holding member 73 is formed so that the snap-fit portion 731 is located outside in the radial direction of the worm gear 712.

Figure 87:
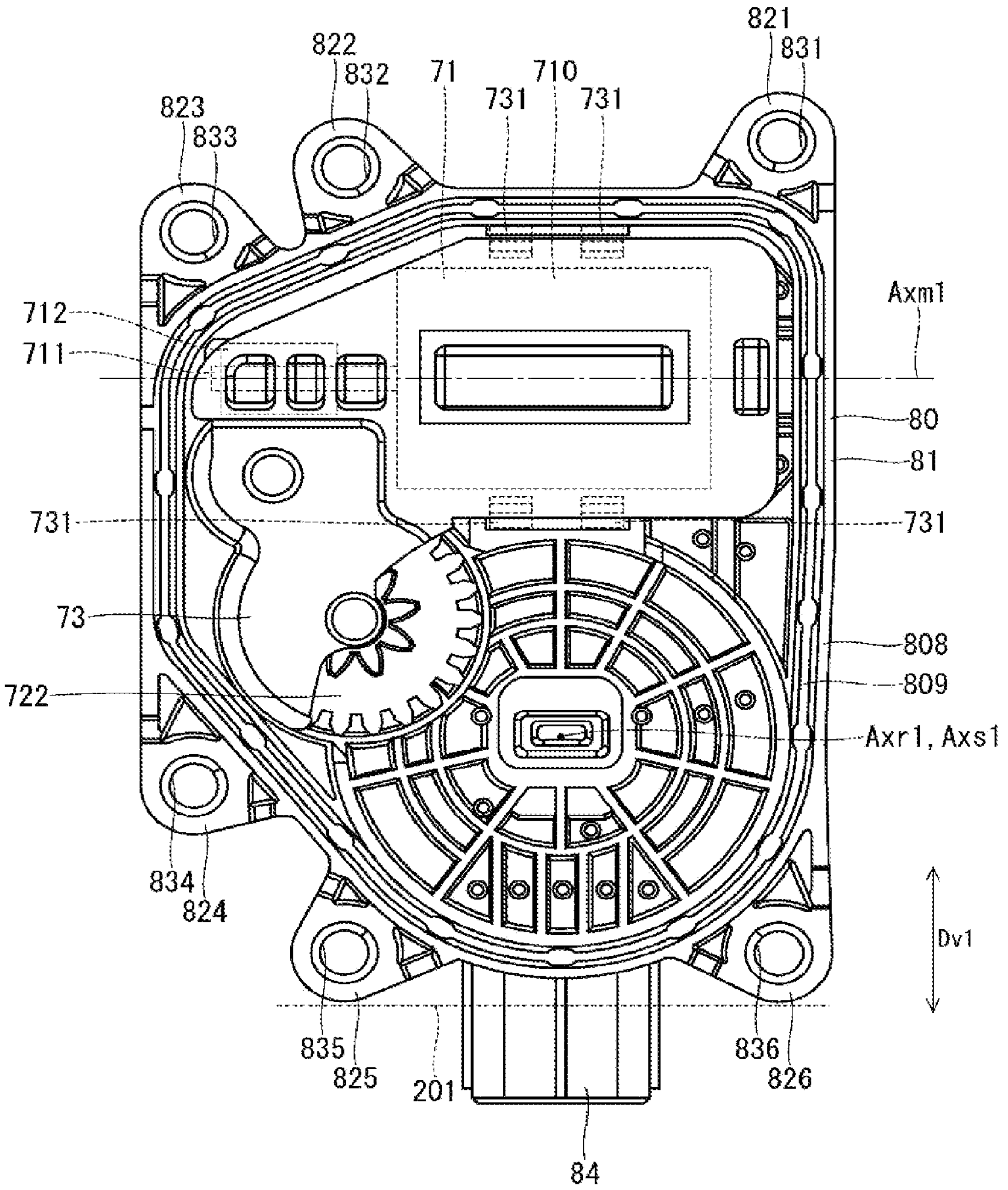
FIG. 87 is a view illustrating the drive unit cover and a part of the drive unit of the valve device of the first embodiment.
Figure 88:
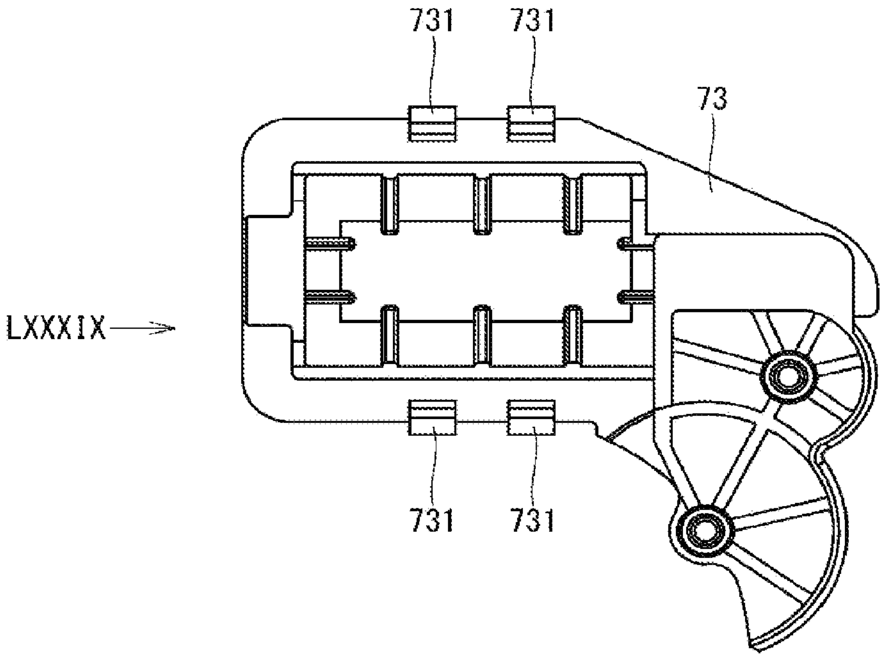
FIG. 88 is a view illustrating a holding member of the valve device of the first embodiment.
Figure 89:
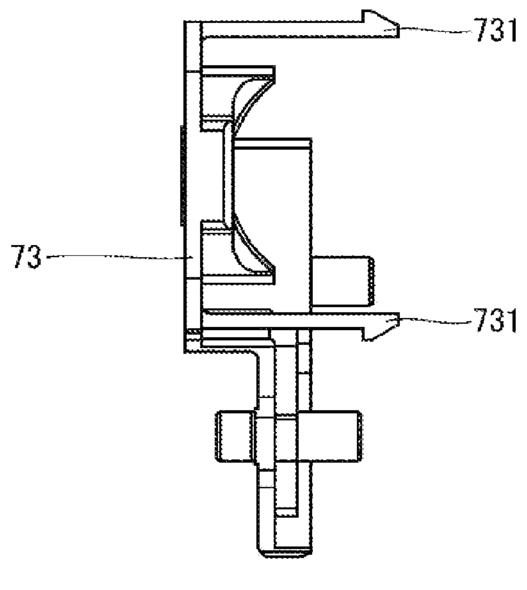
FIG. 89 is a view when
Figure 90:
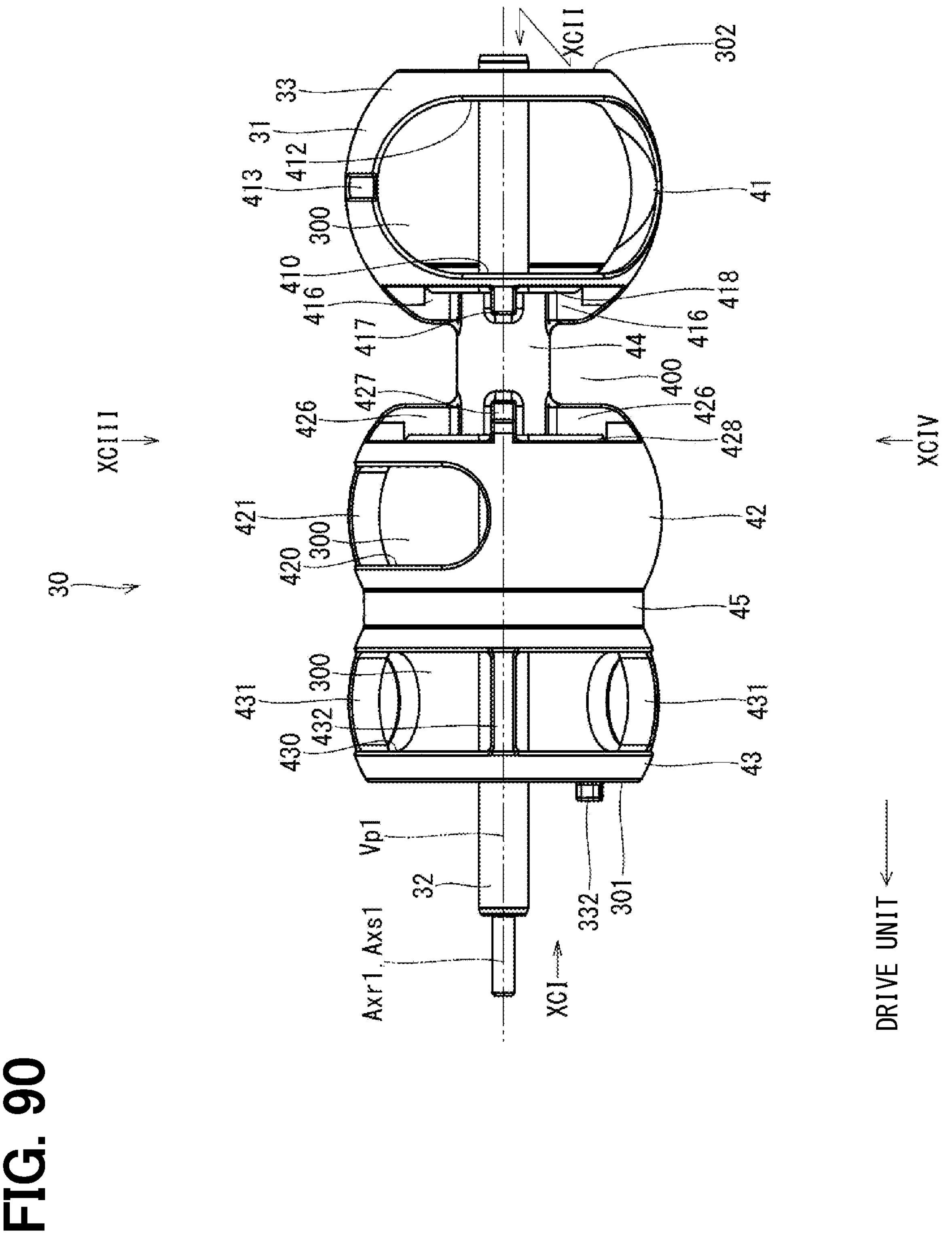
FIG. 90 is a view illustrating a valve of the valve device of the fourteenth embodiment.
Figure 91:
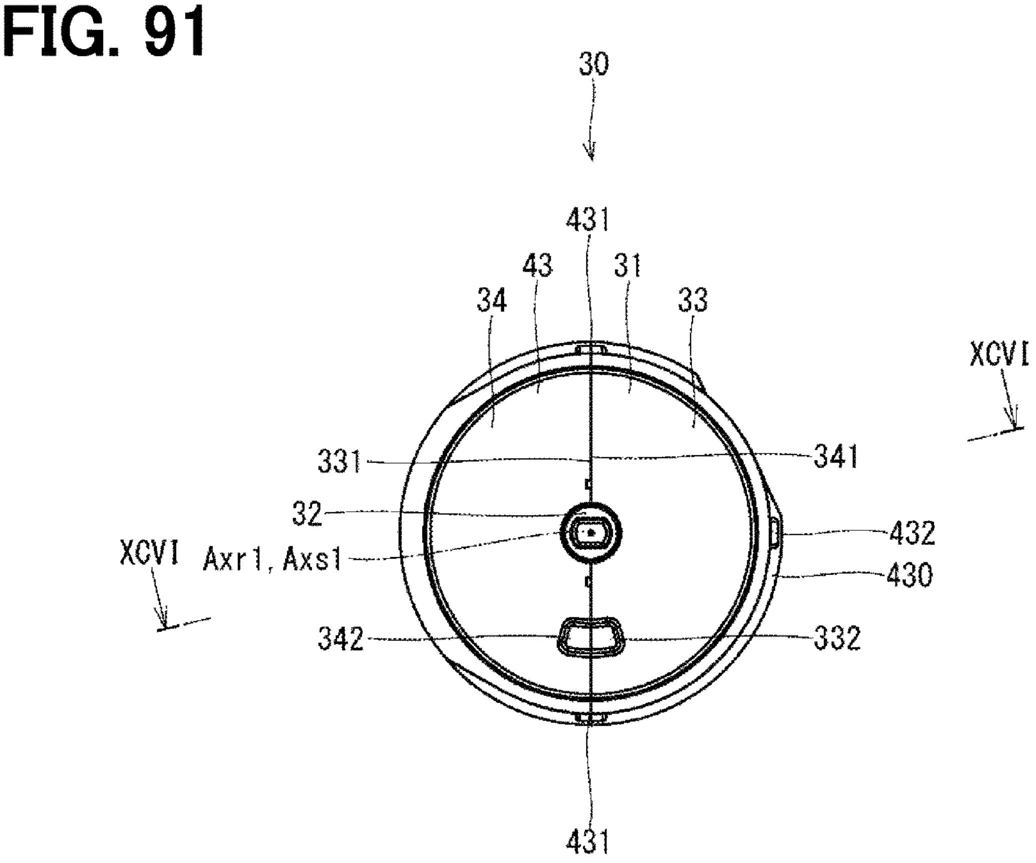
FIG. 91 is a view when
Figure 92:
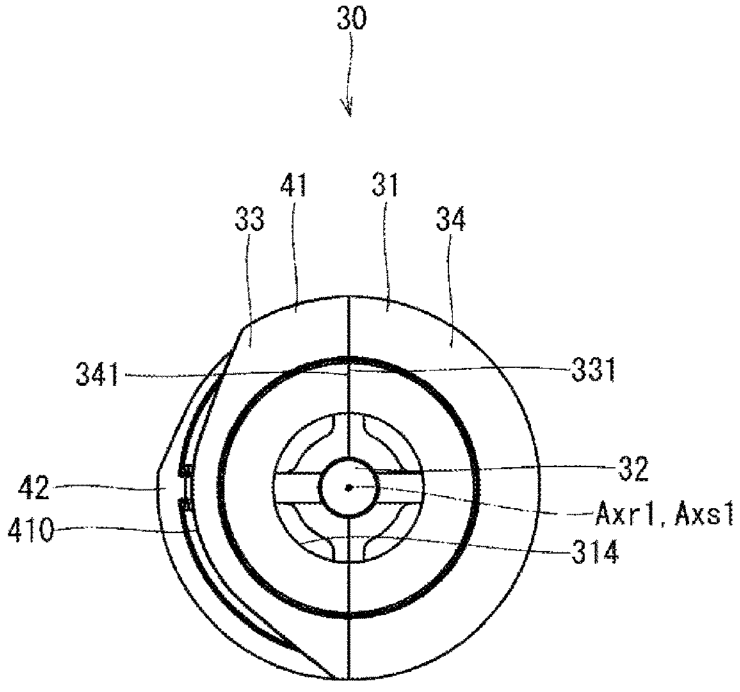
FIG. 92 is a view when

Therefore, compared to the holding member 73 (refer to FIGS. 87 to 89) according to the first embodiment in which the snap-fit portions 731 are formed two by two on both sides of the motor main body 710, it is possible to reduce the body size of the holding member 73 in the direction perpendicular to the axis Axm1 of the motor 71, that is, in the direction Dv1 perpendicular to the attachment surface 201. Therefore, it is possible to reduce the body size of the drive unit cover 80 and the valve device 10 in the direction Dv1 perpendicular to the attachment surface 201.

In addition, compared to the first embodiment (refer to FIG. 87) in which the snap-fit portions 731 are formed two by two on both sides of the motor main body 710, the motor 71 can be brought close to the attachment surface 201, that is, the engine 2. Accordingly, the vibrations applied to the motor 71 can be reduced, and robustness against disconnection can be improved.

As illustrated in FIGS. 61 to 65, the pipe portion 512 of the pipe member 50 is formed to extend while being inclined toward the drive unit cover 80.

<2-13>

Figure 67:
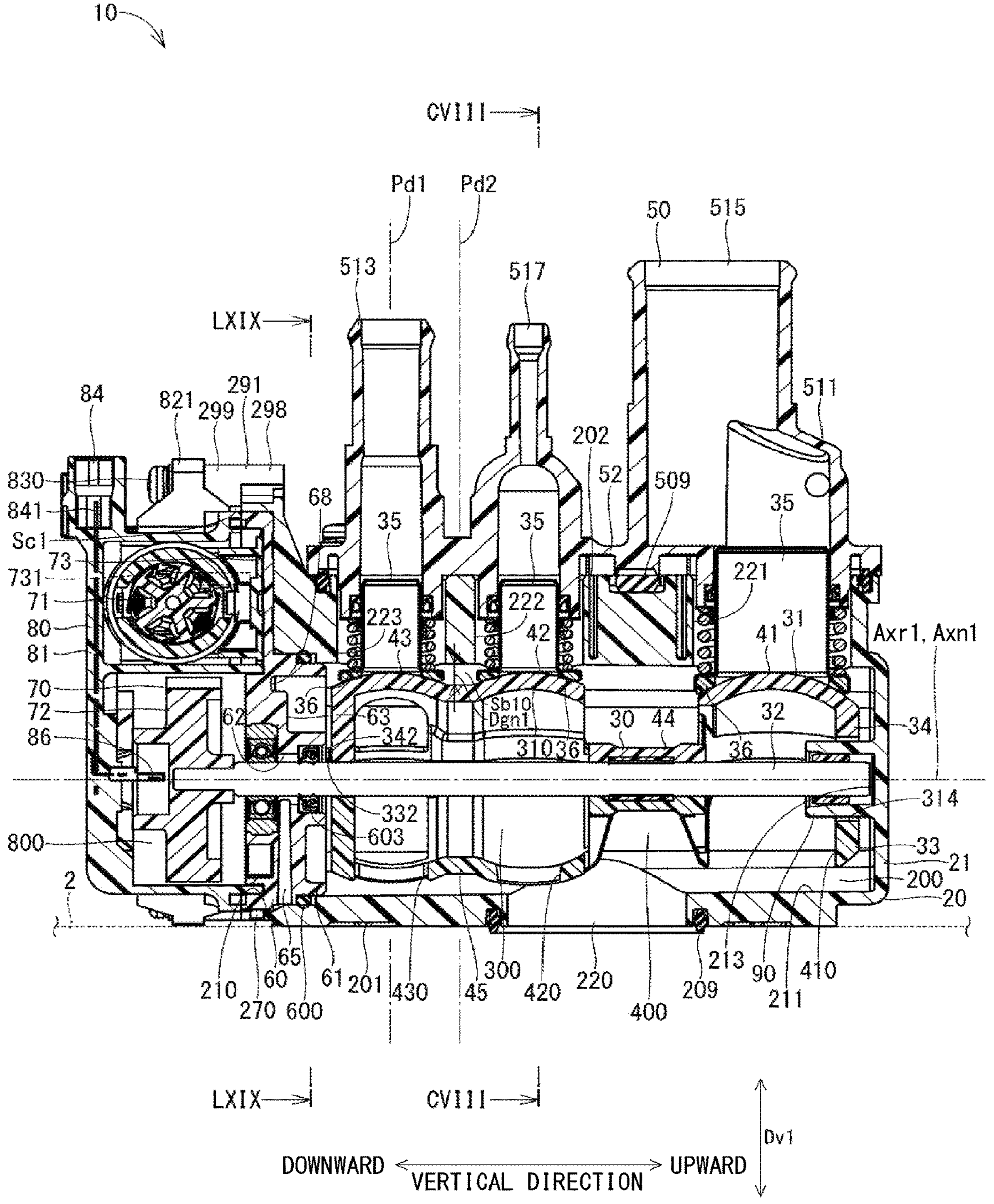
FIG. 67 is a cross-sectional view taken along line LXVII-LXVII in FIG. 62.

As illustrated in FIG. 67, the holding member 73 is formed so that the snap-fit portion 731 is located on the pipe member 50 side with respect to the rotation axis Axr1.

Therefore, it is possible to reduce the body size of the drive unit cover 80 in the direction Dv1 perpendicular to the attachment surface 201, and it is possible to prevent a possibility that the drive unit cover 80 may interfere particularly with the pipe portion 512 of the pipe member 50.

Figure 83:
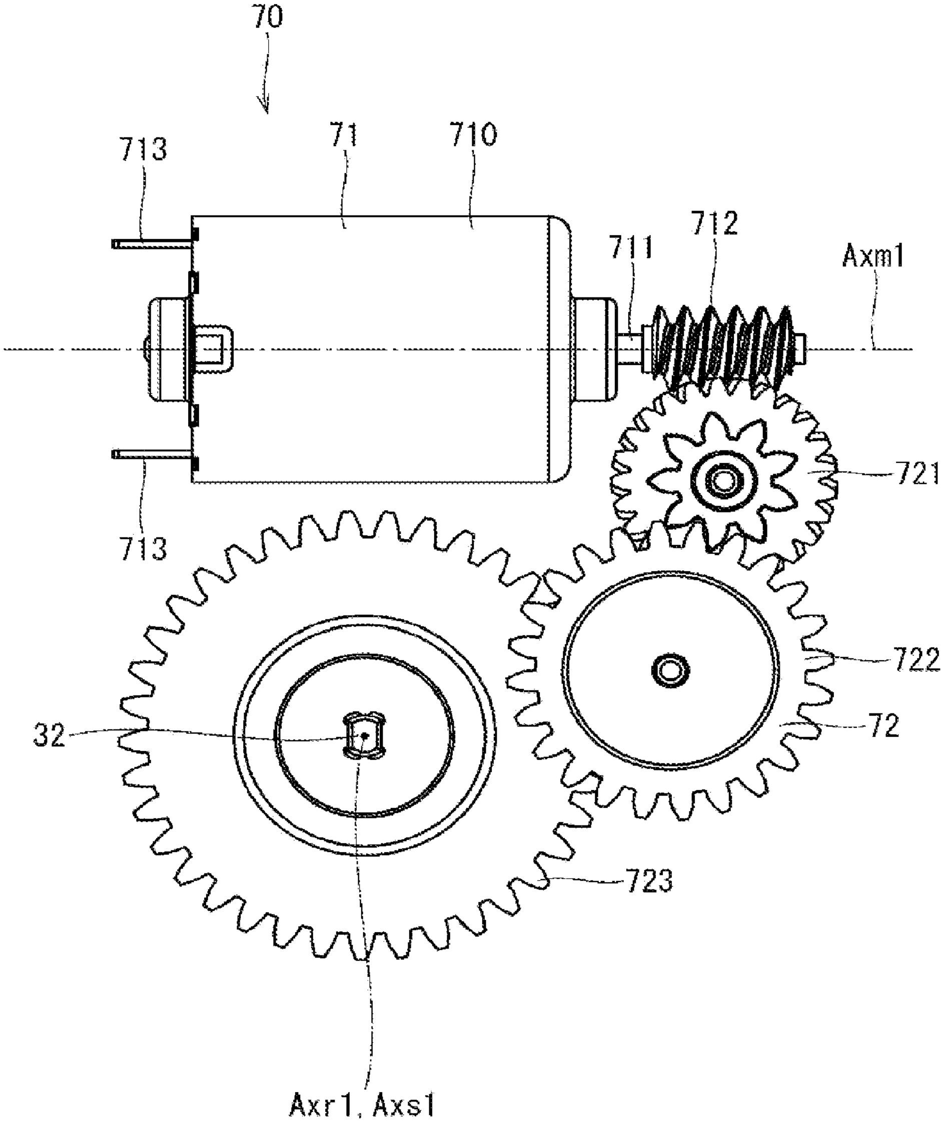
FIG. 83 is a plan view illustrating the drive unit of the valve device of the fourteenth embodiment.
Figure 84:
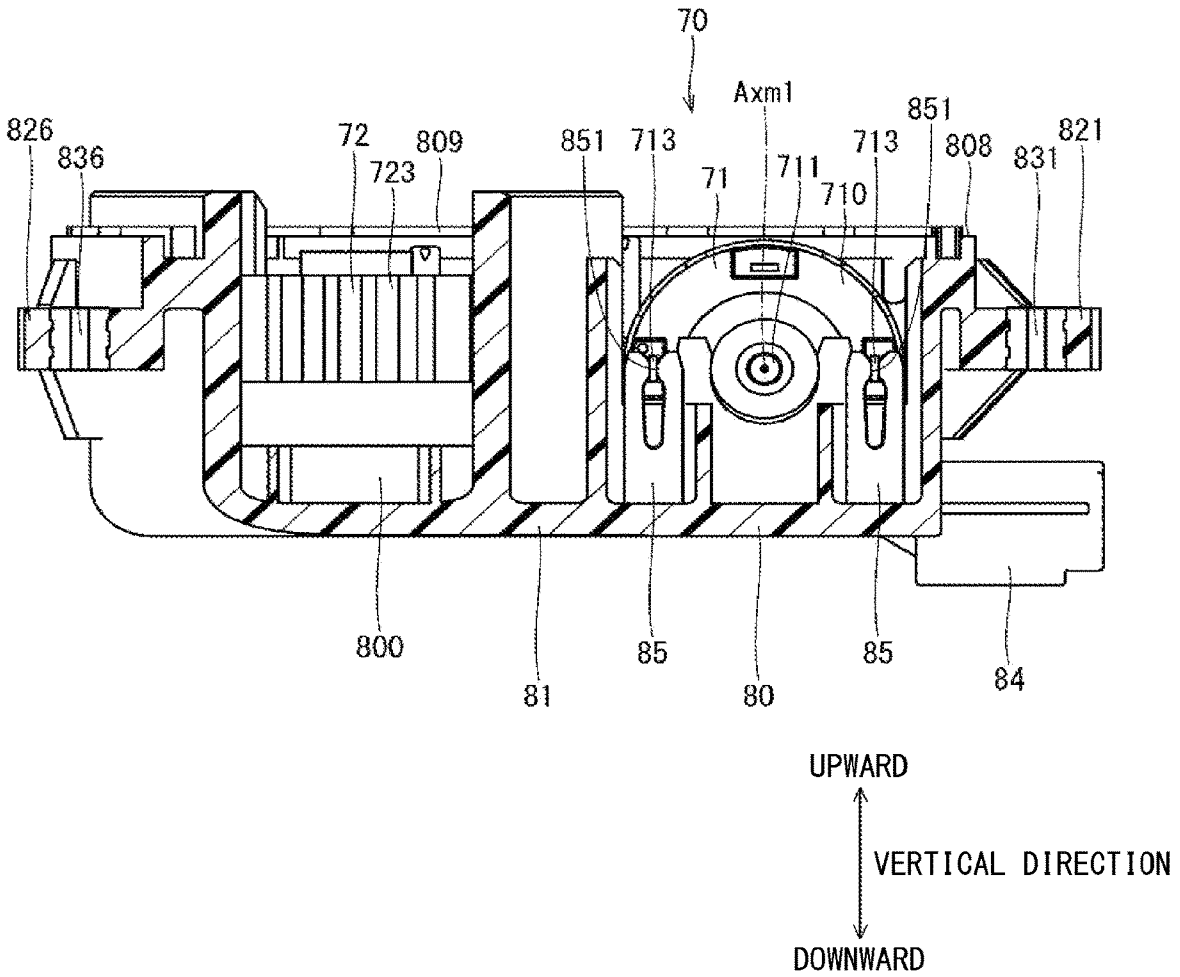
FIG. 84 is a cross-sectional view taken along line LXXXIV-LXXXIV in FIG. 62.
Figure 85:
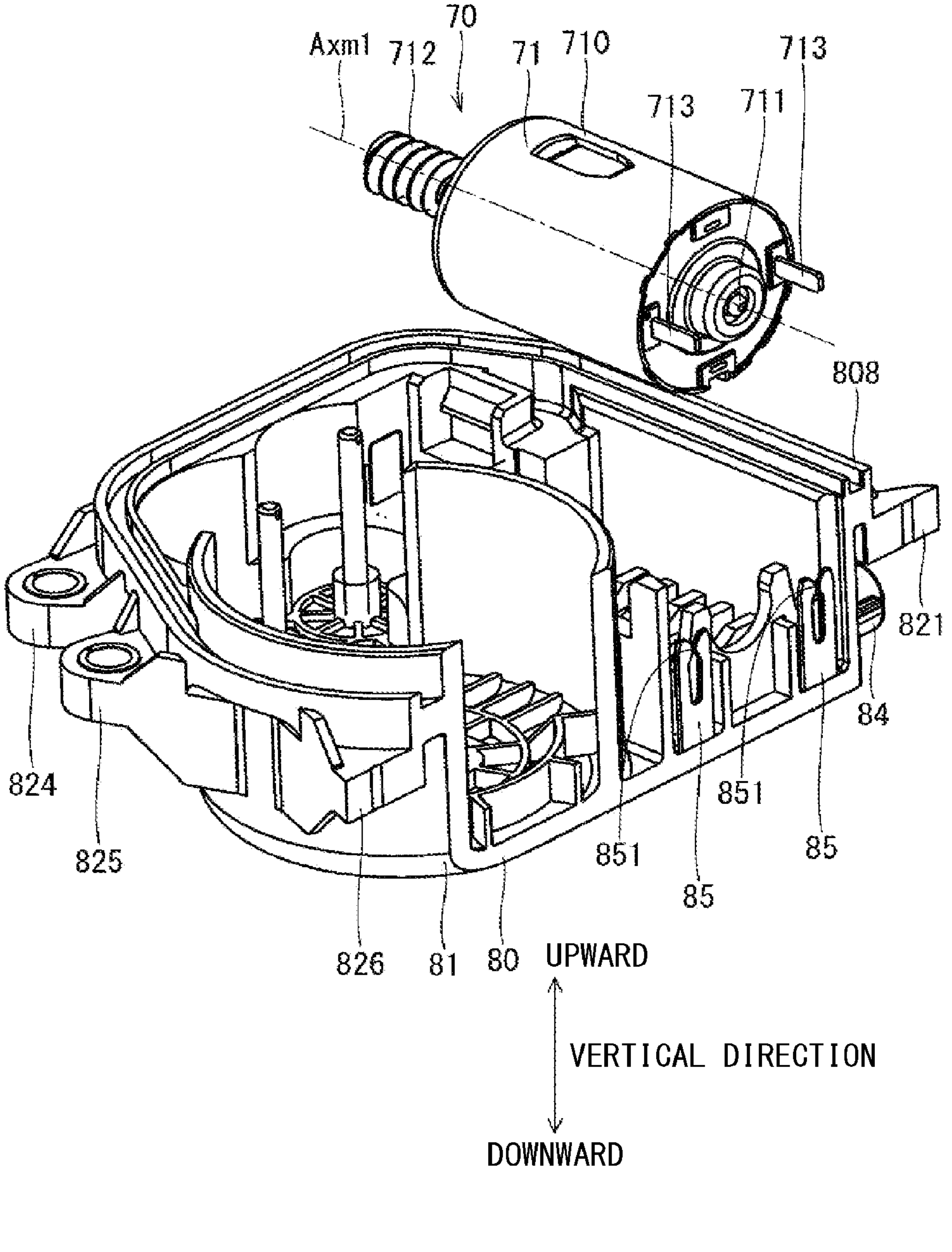
FIG. 85 is an exploded perspective view illustrating the drive unit cover and a part of the drive unit of the valve device of the fourteenth embodiment.
Figure 86:
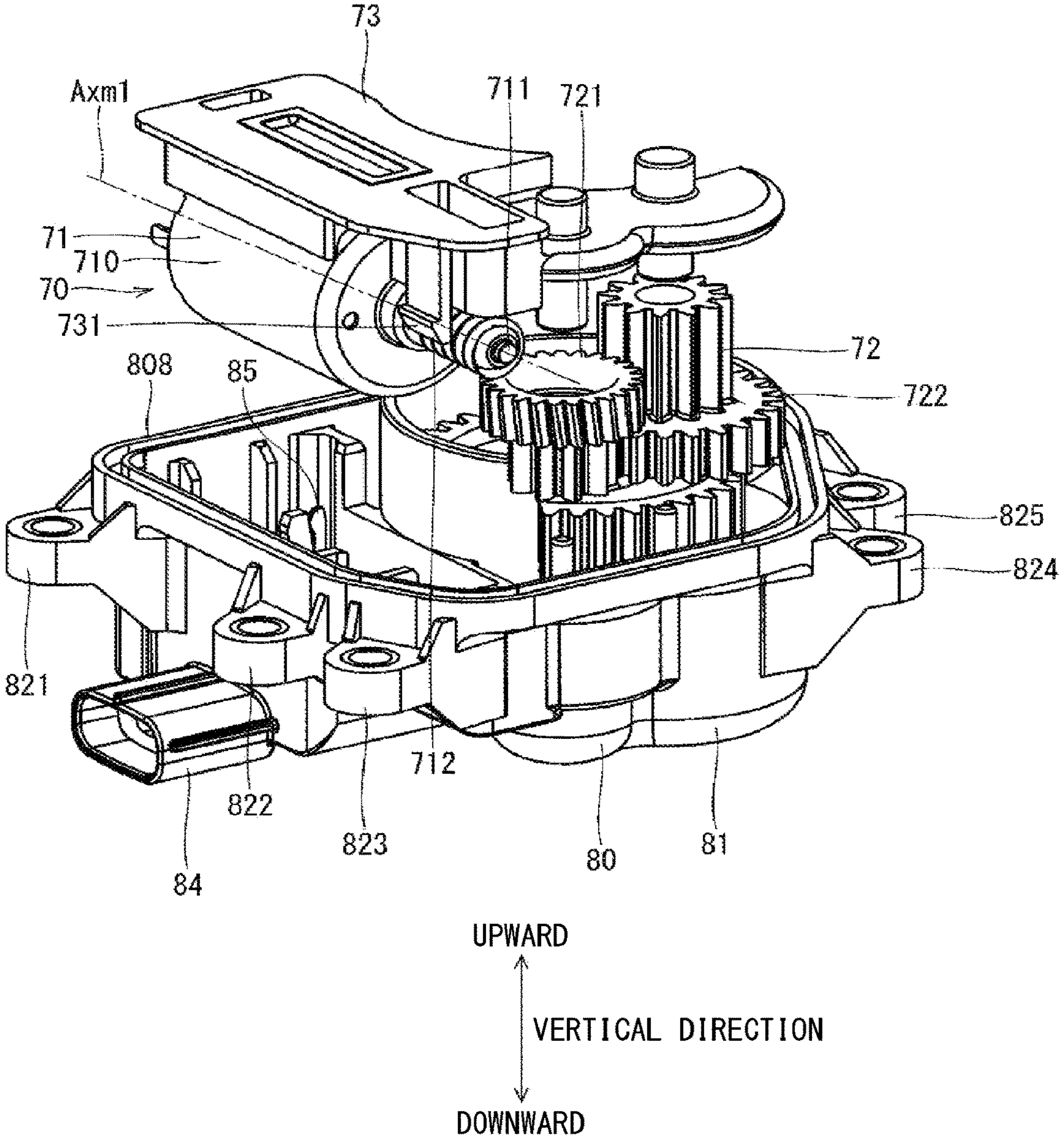
FIG. 86 is an exploded perspective view illustrating the drive unit cover and a part of the drive unit of the valve device of the fourteenth embodiment.

In another embodiment, the snap-fit portion 731 may be formed to be located between the third gear 723 and the motor side terminal 713 (refer to FIGS. 80 and 83).

Even in this case, compared to the holding member 73 (refer to FIGS. 87 to 89) according to the first embodiment in which the snap-fit portions 731 are formed two by two on both sides of the motor main body 710, it is possible to reduce the body size of the holding member 73 in the direction perpendicular to the axis Axm1 of the motor 71, that is, in the direction Dv1 perpendicular to the attachment surface 201.

FIGS. 90 to 102 illustrate the valve 30 and a portion thereof according to the present embodiment.

The valve 30 of the present embodiment is similar to the valve 30 of the first and third embodiments in a shape of the valve body 31. The valve 30 of the present embodiment is different from that of the third embodiment, and is the same as that of the first embodiment in the alignment direction of the ball valve 41, the cylindrical connection portion 44, the ball valve 42, the cylindrical valve connection portion 45, and the ball valve 43. That is, the valve 30 of the present embodiment is formed so that the ball valve 41, the cylindrical connection portion 44, the ball valve 42, the cylindrical valve connection portion 45, and the ball valve 43 are aligned in this order toward the drive unit 70 side from the side opposite to the drive unit 70 in the direction of the rotation axis Axr1. The ball valves 41, 42, and 43 are respectively provided so that the outlet ports 221, 222, and 223 can be opening and closing (refer to FIG. 67).

Figure 93:
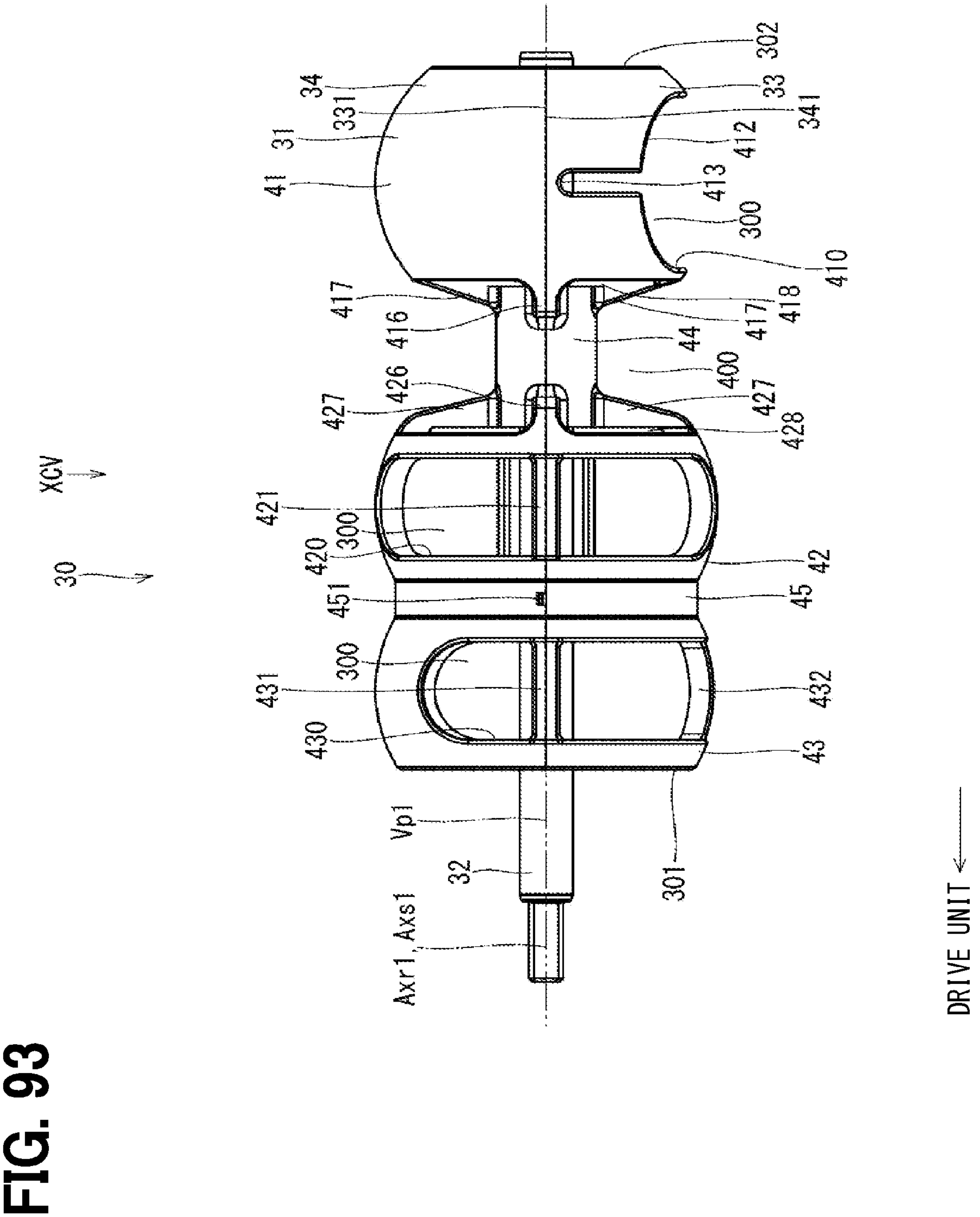
FIG. 93 is a view when
Figure 94:
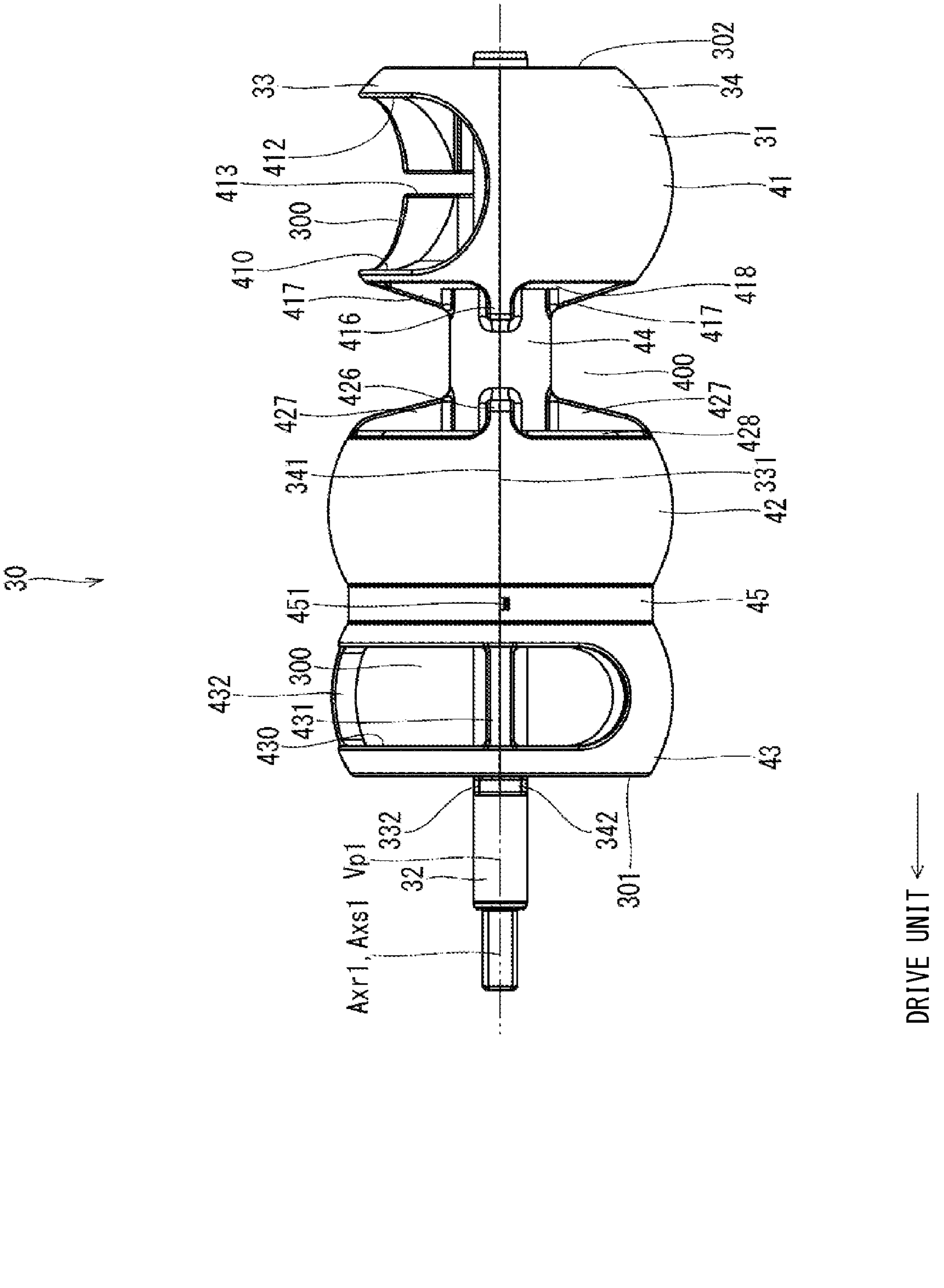
FIG. 94 is a view when
Figure 95:
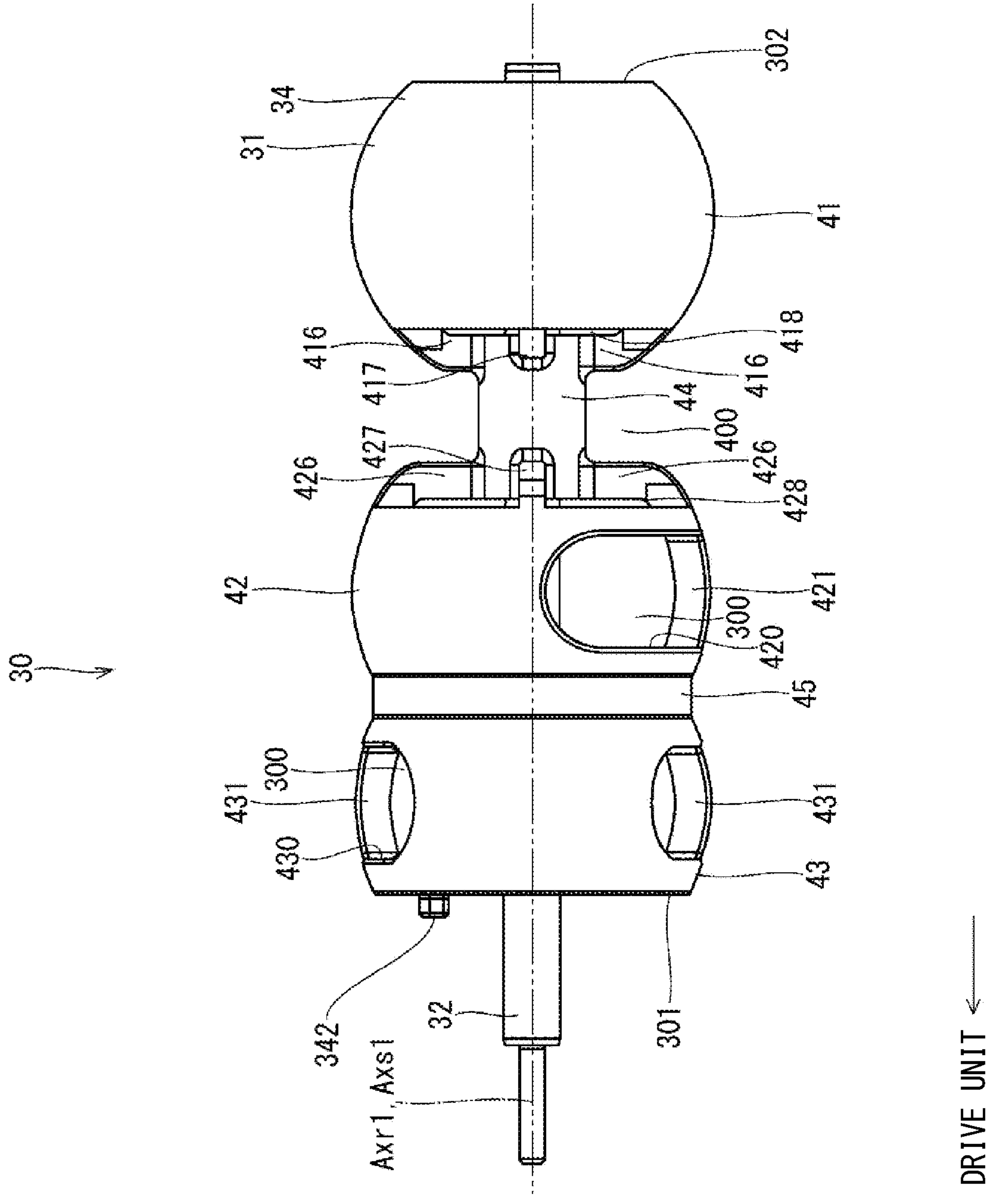
FIG. 95 is a view when
Figure 96:
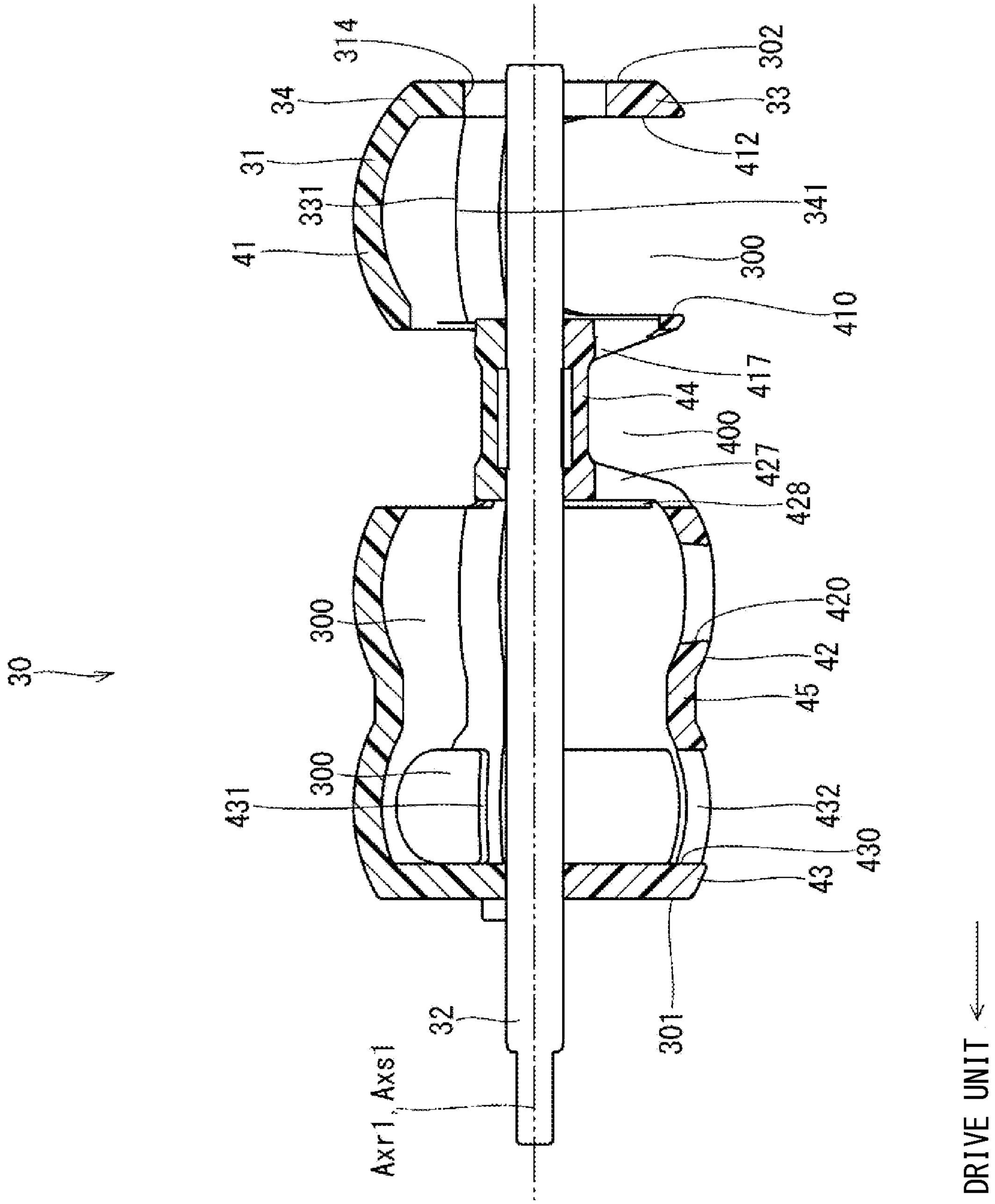
FIG. 96 is a cross-sectional view taken along line XCVI-XCVI in FIG. 91.
Figure 97:
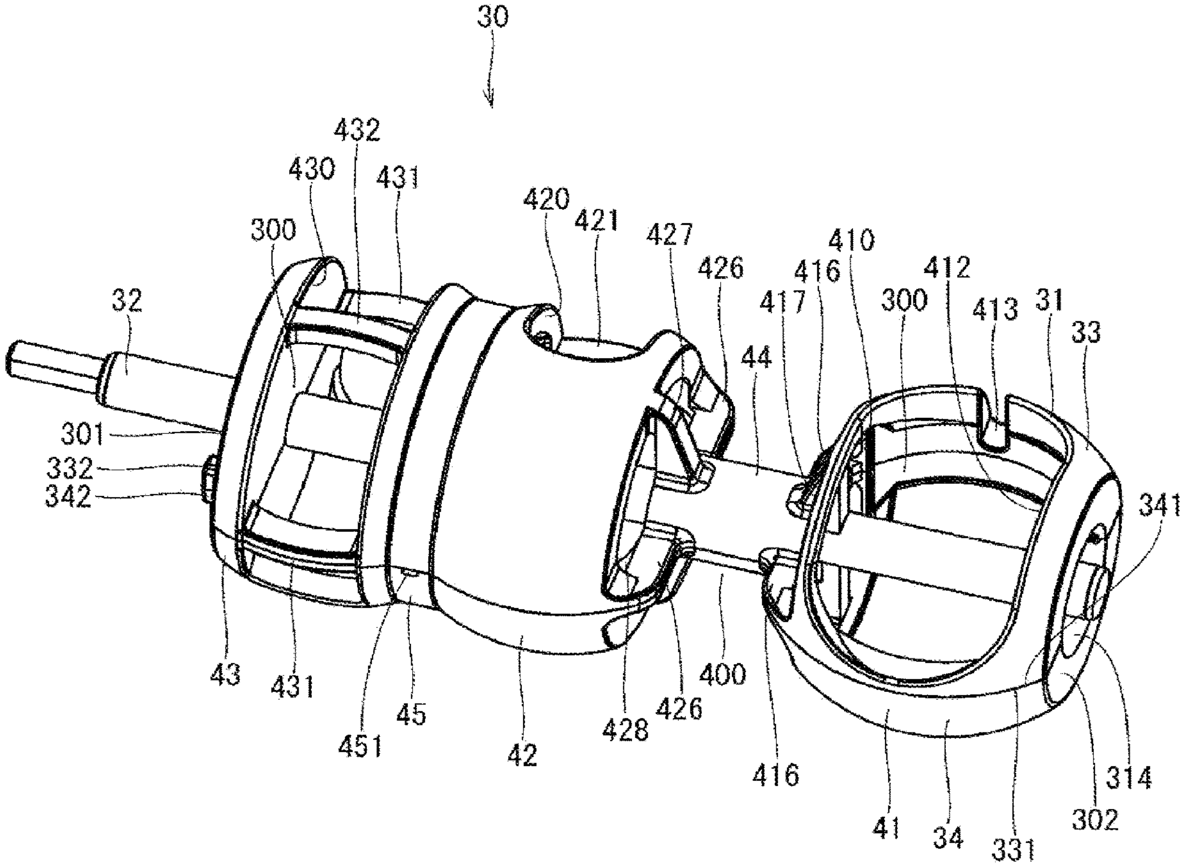
FIG. 97 is a perspective view illustrating the valve of the valve device of the fourteenth embodiment.
Figure 98:
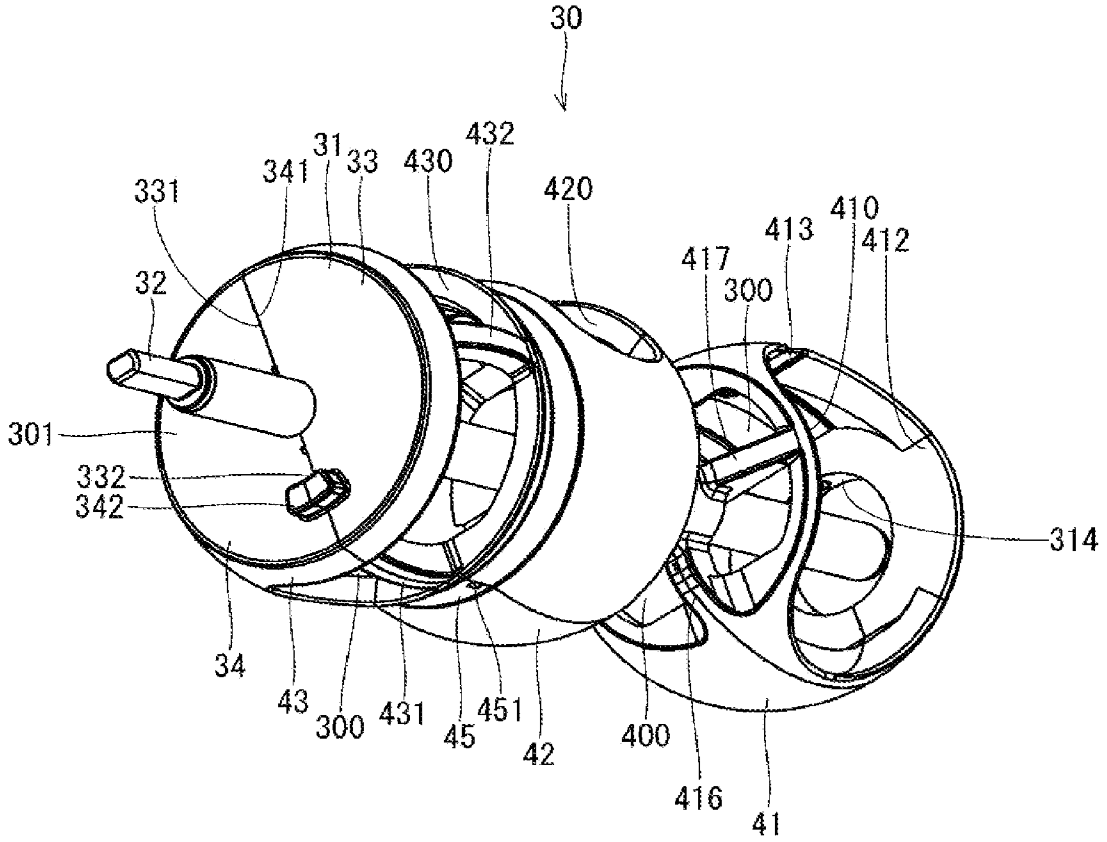
FIG. 98 is a perspective view illustrating the valve of the valve device of the fourteenth embodiment.
Figure 99:
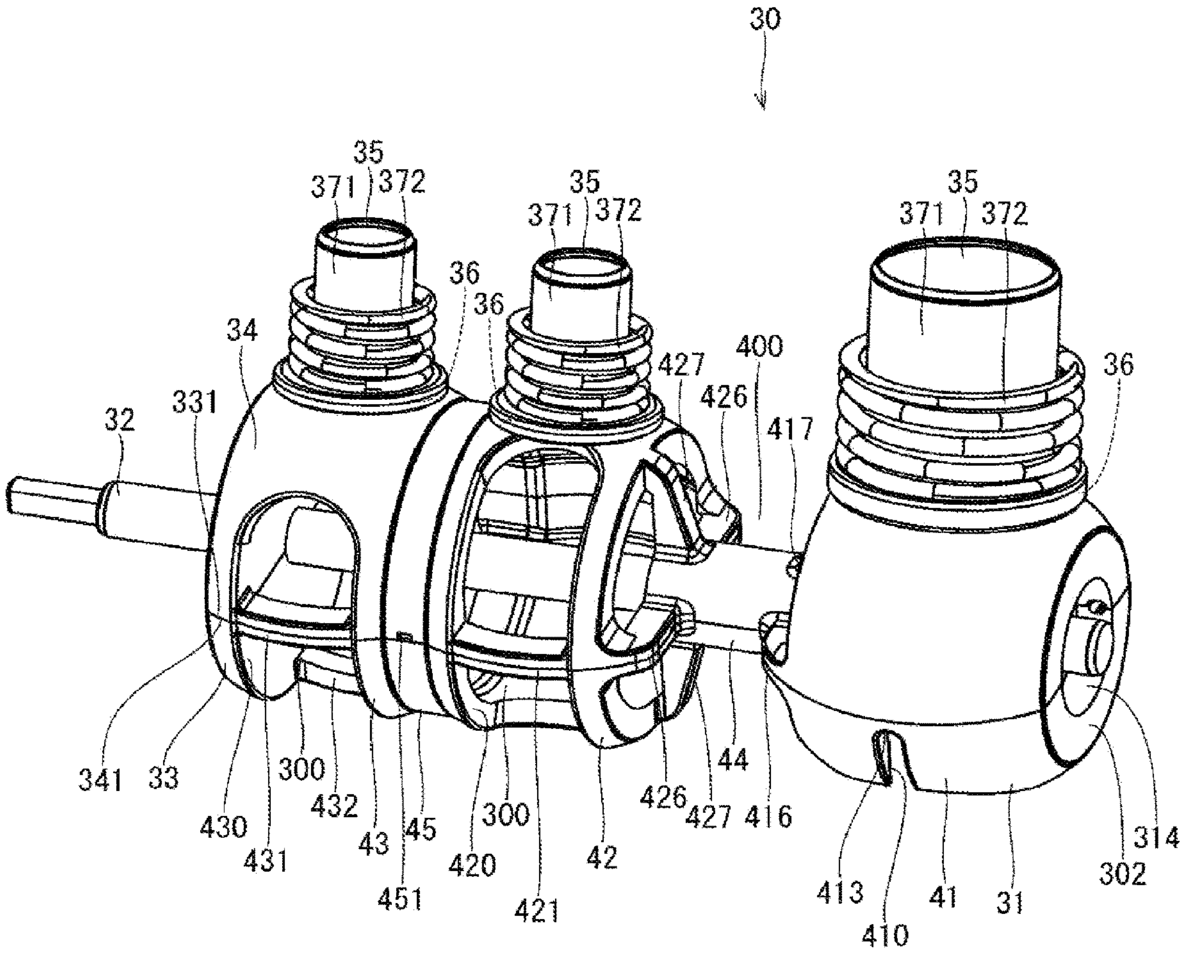
FIG. 99 is a perspective view illustrating the valve and a seal unit of the valve device of the fourteenth embodiment.
Figure 100:
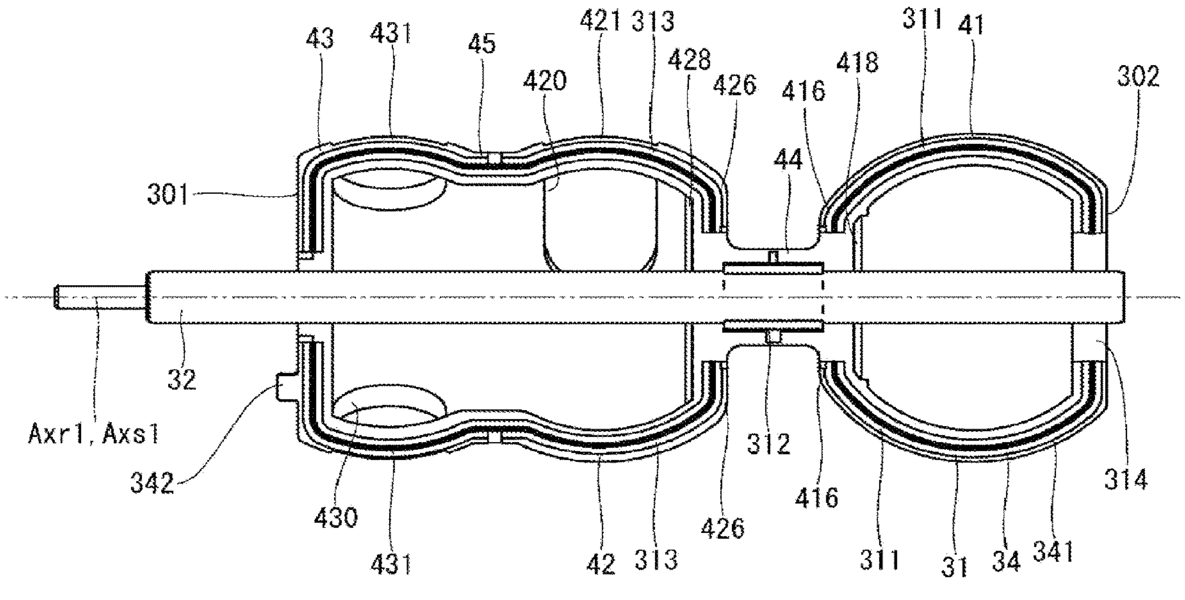
FIG. 100 is a view illustrating a part of the valve of the valve device of the fourteenth embodiment.
Figure 101:
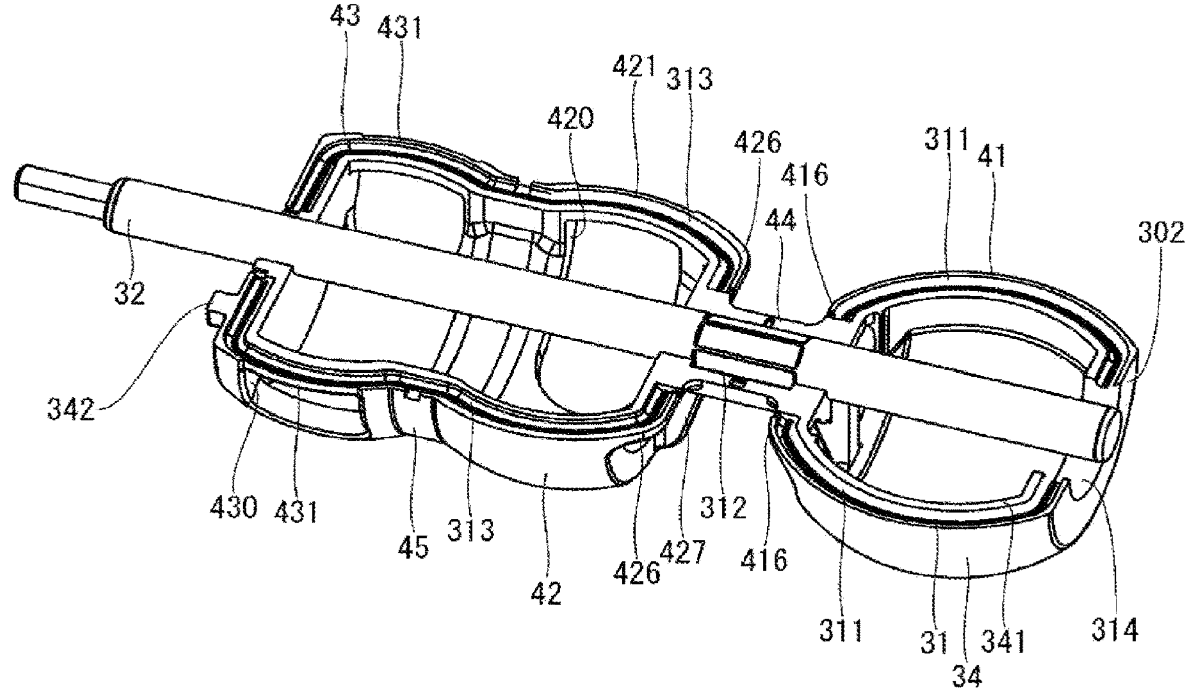
FIG. 101 is a perspective view illustrating a part of the valve of the valve device of the fourteenth embodiment.
Figure 102:
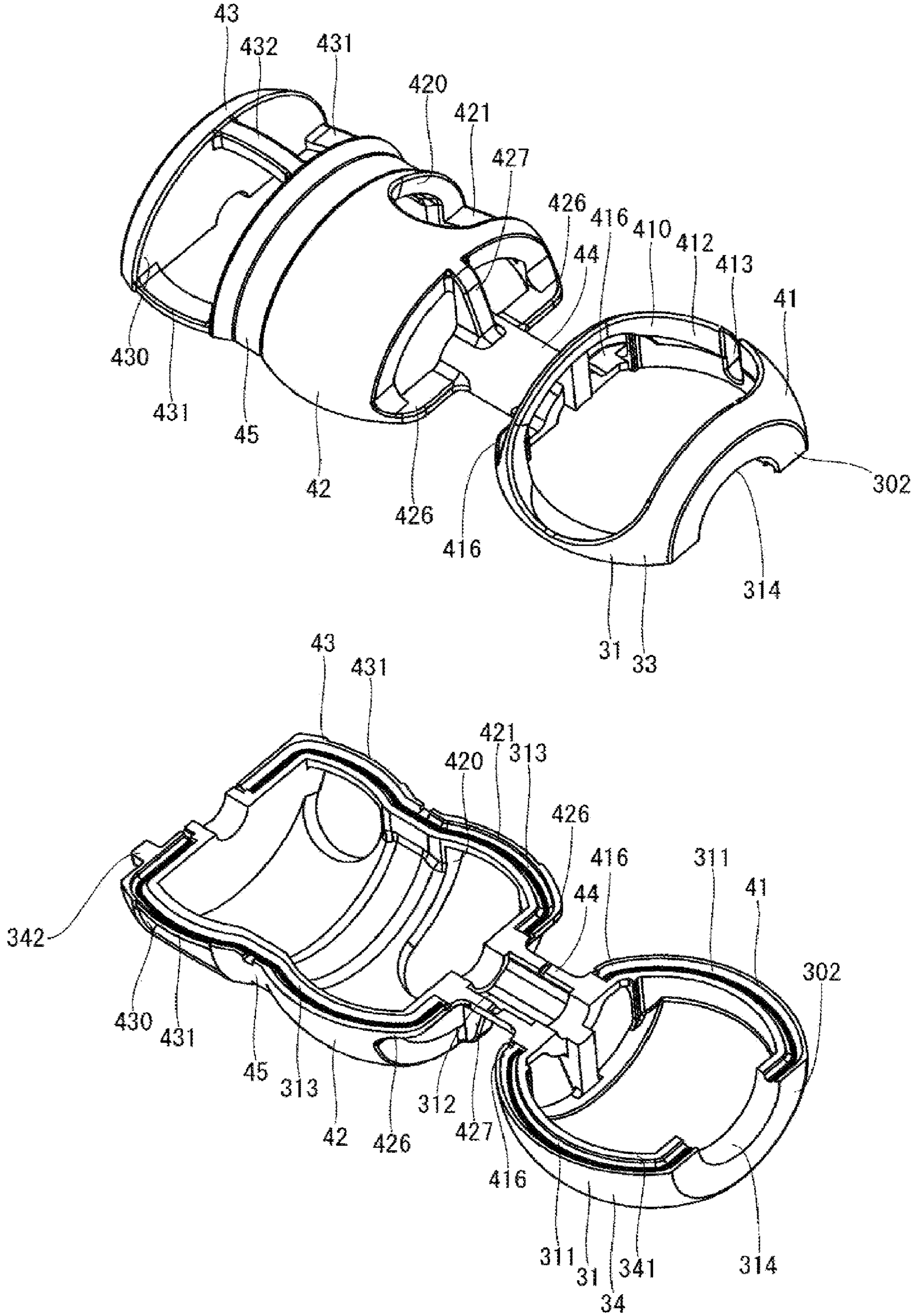
FIG. 102 is an exploded perspective view illustrating a part of the valve of the valve device of the fourteenth embodiment.

As illustrated in FIGS. 93 and 94, the valve body opening portion 410 of the ball valve 41 has a large opening portion 412 and an extension opening portion 413. The large opening portion 412 is formed to extend from one end toward the other end side in the circumferential direction of the first divided body 33. The extension opening portion 413 is formed to extend from the other end of the large opening portion 412 to the vicinity of the other end in the circumferential direction of the first divided body 33. A size of the extension opening portion 413 in the direction of the rotation axis Axr1 is smaller than a size of the large opening portion 412 in the direction of the rotation axis Axr1. An opening area of the valve body opening portion 410 is an area obtained by adding an opening area of the large opening portion 412 and an opening area of the extension opening portion 413 to each other.

Since the valve body opening portion 410 has the extension opening portion 413, at an initial stage of opening the outlet port 221, the flow rate of the coolant water flowing to the radiator 5 can be gradually increased. In this manner, it is possible to prevent a rapid temperature change in the coolant water which is caused by the heat exchange in the radiator 5.

According to the present embodiment, only the valve body opening portion 410 has the extension opening portion 413. In contrast, in another embodiments, the valve body opening portions 420 and 430 may also be provided with opening portion similar to the extension opening portion 413. In this case, it is possible to prevent the rapid temperature change in the coolant water which is caused by heat exchange in the heater 6 and the device 7.

<3-29>

The size of the valve body opening portion 410 of the ball valve 41 as a first ball valve is larger than the size of the valve body opening portion 420 of the ball valve 42 as a second ball valve and the size of the valve body opening portion 430 of the ball valve 43 as a third ball valve.

That is, the valve body opening portions 420 and 430 of the ball valves 42 and 43 formed so that the two ball valves are continuous with each other is small, and the valve body opening portion 410 of the ball valve 41 formed as one ball valve is largest.

The coolant water flowing from the inlet port 220 flows into the inter-valve space 400 between the ball valves 42 and 43 and the ball valve 41. Thereafter, the coolant water is distributed to the ball valves 42 and 43 side and the ball valve 41 side. Here, when the amounts of the coolant water required for the ball valves 42 and 43 side and the ball valve 41 side are unbalanced, the coolant water cannot be properly distributed. Accordingly, the ball valve 41 provided with the valve body opening portion 410 having the largest opening requires a large amount of the coolant water. Therefore, the ball valve 41 is not continuous with the ball valves 42 and 43 provided with the other valve body opening portions 420 and 430 having the small opening. That is, when the two ball valves are continuous with each other, the coolant water is required as much as the opening amounts of the two ball valves. Therefore, the ball valves (42 and 43) having the small opening are continuous with each other to the utmost.

<4-4>

Figure 62:
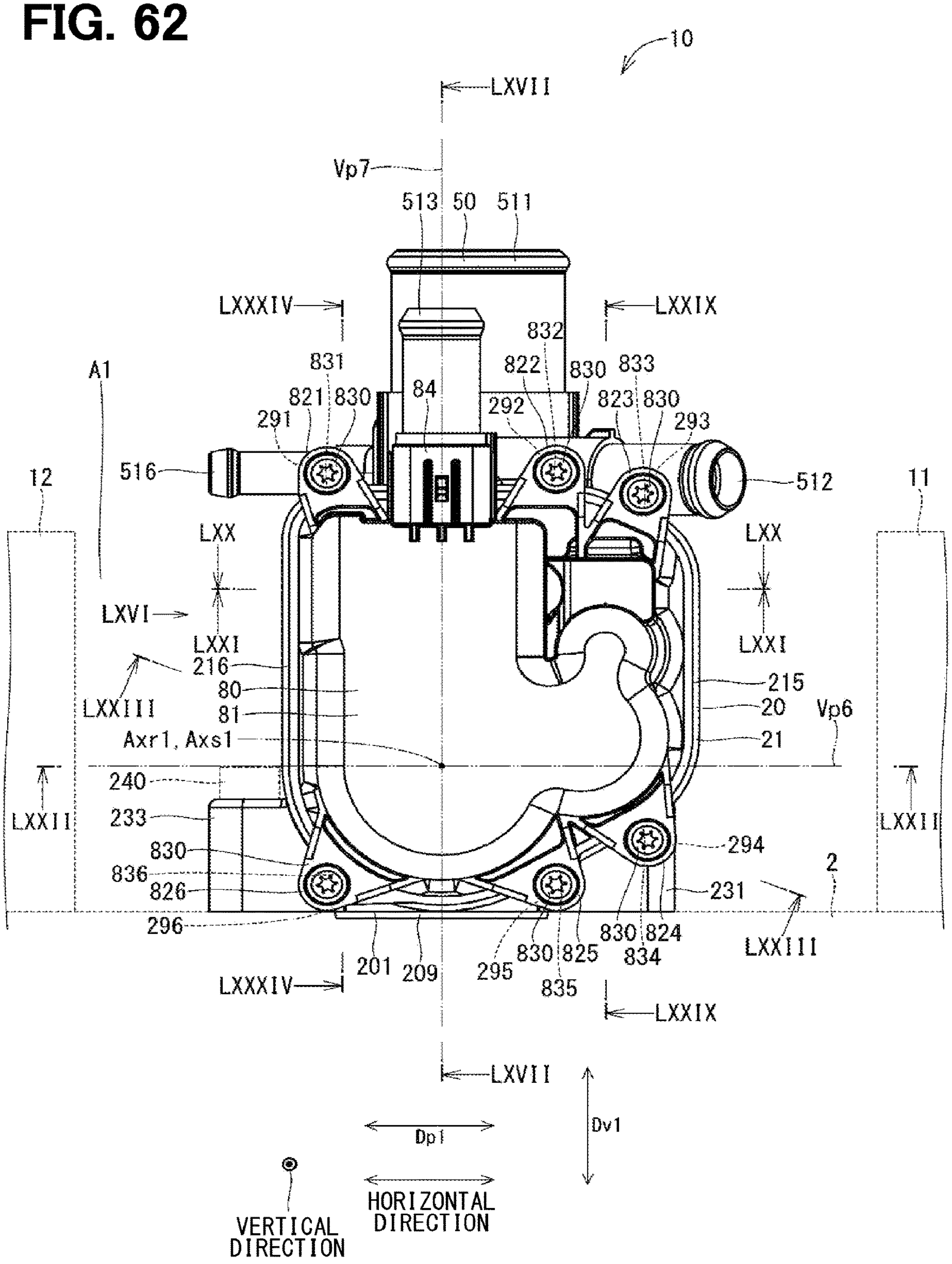
FIG. 62 is a view when
Figure 63:
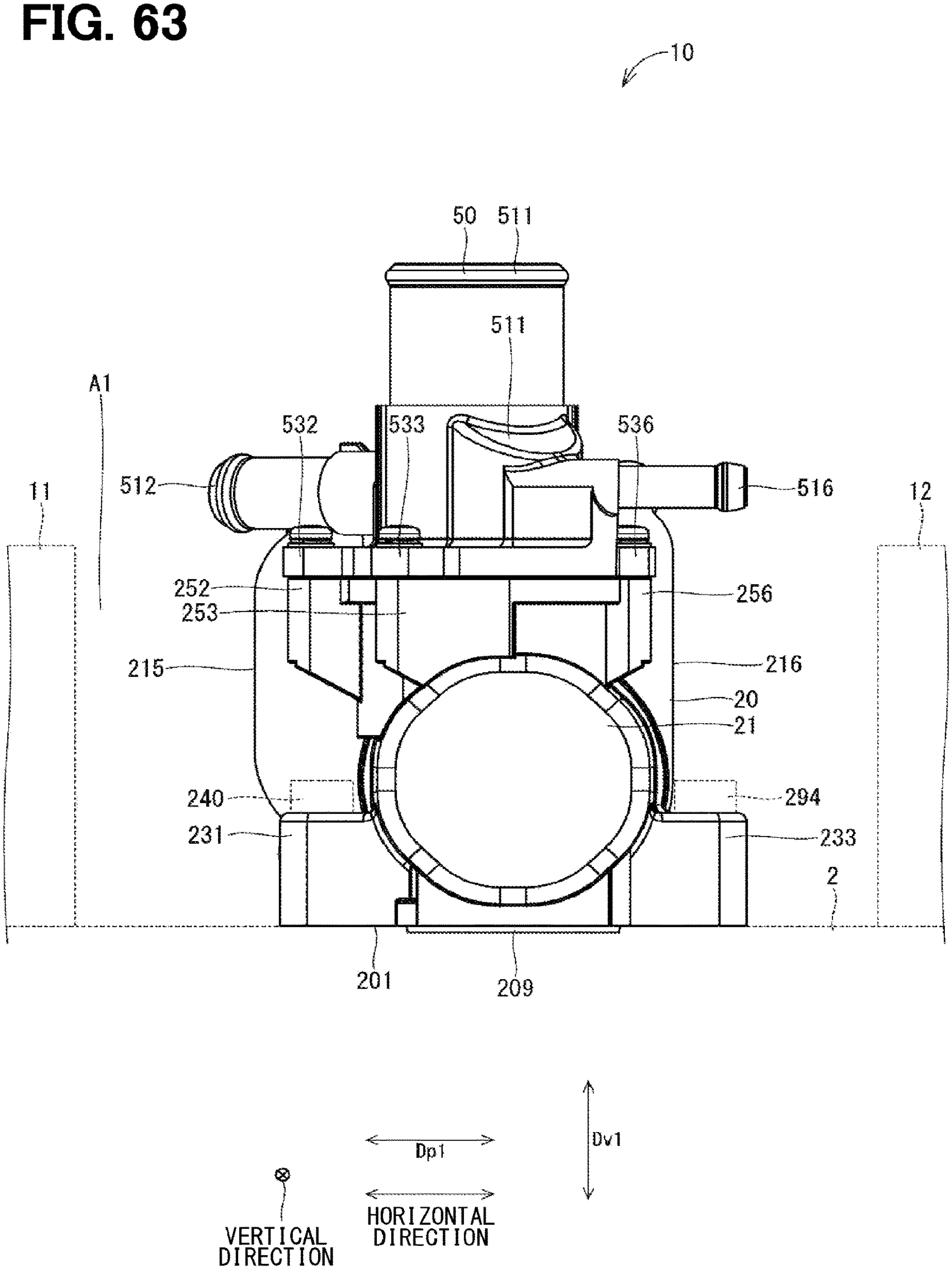
FIG. 63 is a view when

As illustrated in FIG. 62, the housing 20 has housing-side cover fixing portions (291 to 296) formed as a portion different from the housing main body 21 to project from the outer wall of the housing main body 21.

The drive unit cover 80 has the cover main body 81 which forms the drive unit space 800, and cover fixing portions (821 to 826) formed as a portion different from the cover main body 81 to project from the outer wall of the cover main body 81 and fixed to the housing-side cover fixing portions (291 to 296).

The cover fixing portions (821 to 826) are formed not to project outward from at least one of both end portions (215 and 216) in the direction Dp1 parallel to the attachment surface 201 of the housing main body 21. According to the present embodiment, the cover fixing portions (821 to 826) are formed not to project outward from both end portions (215 and 216) in the direction Dp1 parallel to the attachment surface 201 of the housing main body 21. The housing end portions 215 and 216, which are both end portions in the direction Dp1 parallel to the attachment surface 201 of the housing main body 21, are formed in the housing main body 21 as portions different from the housing-side cover fixing portions 291 to 296.

Therefore, it is possible to reduce the body size of the drive unit cover 80 in the direction Dp1 parallel to the attachment surface 201, and it is possible to reduce the body size of the valve device 10 in the direction Dp1 parallel to the attachment surface 201. In this manner, the valve device 10 can be mounted on the narrow space A1 of the vehicle 1.

According to the present embodiment, the direction Dp1 parallel to the attachment surface 201 is a direction perpendicular to the vertical direction, that is, a direction parallel to the horizontal direction. The direction Dp1 parallel to the attachment surface 201 is perpendicular to the direction Dv1 perpendicular to the attachment surface 201.

<4-5>

As illustrated in FIG. 62, in a state where the housing main body 21 is attached to the engine 2, the cover fixing portions 821 to 826 are formed not to project outward from at least one of both end portions (215 and 216) in the direction Dp1 parallel to the attachment surface 201 of the housing main body 21 and in the horizontal direction. According to the present embodiment, the cover fixing portions 821 to 826 are formed not to project outward from both end portions (215 and 216) in the direction Dp1 parallel to the attachment surface 201 of the housing main body 21 and in the horizontal direction. That is, the cover fixing portions 821 to 826 are formed not to project from the housing end portions 215 and 216 in the direction Dp1 parallel to the attachment surface 201 which is a direction in which the housing main body 21 is thinnest.

Therefore, it is possible to reduce the body size of the drive unit cover 80 in the direction Dp1 parallel to the attachment surface 201 and in the horizontal direction, and it is possible to reduce the body size of the valve device 10 in the direction Dp1 parallel to the attachment surface 201 and in the horizontal direction. In this manner, the valve device 10 can be mounted in the narrow space A1 which is narrow in the direction Dp1 parallel to the attachment surface 201 and in the horizontal direction.

According to the present embodiment, the valve device 10 is provided in the narrow space A1 (refer to FIGS. 2 and 62) between the alternator 12 and the intake manifold 11. Accordingly, the body size of the valve device 10 is reduced in the direction Dp1 parallel to the attachment surface 201. In this manner, the valve device 10 can be provided in the narrow space A1 without interfering with the alternator 12 and the intake manifold 11.

<7-1> Housing-Side Cover Fixing Portion

According to the present embodiment, there is provided the valve device 10 capable of controlling the coolant water of the engine 2 of the vehicle 1. The valve device 10 includes the housing 20, the valve 30, the pipe member 50, the partition wall portion 60, the drive unit cover 80, the drive unit 70, and the fixing member 830.

As illustrated in FIGS. 61, 62, 64 to 68, and 73 to 78, the housing 20 has the housing main body 21 which internally forms the internal space 200, the ports (220, 221, 222, 223, and 224) which connect the internal space 200 and the outside of the housing main body 21 to each other, the housing-side cover fixing portion 291 to 296 formed as the portion different from the housing main body 21 to project from the outer wall of the housing main body 21, and the housing-side cover fastening hole 290 formed in the housing-side cover fixing portions 291 to 296.

The valve 30 has the valve body 31 rotatable around the rotation axis Axr1 inside the internal space 200, and the shaft 32 provided on the rotation axis Axr1, and can open and close the ports (221, 222, and 223) in accordance with the rotation position of the valve body 31.

The pipe member 50 has the cylindrical pipe portions (511, 512, 513, and 514) whose internal spaces communicate with the ports (221, 222, 223, and 224), and is attached to the housing main body 21.

The partition wall portion 60 is provided to partition the internal space 200 and the outside of the housing main body 21 from each other, and has the shaft insertion hole 62 formed so that one end of the shaft 32 can be inserted.

The drive unit cover 80 has the cover main body 81 provided on the side opposite to the internal space 200 with respect to the partition wall portion 60 and forming the drive unit space 800 with the partition wall portion 60, the cover fixing portions 821 to 826 formed as the portion different from the cover main body 81 to project from the outer wall of the cover main body 81, and the cover fastening holes 831 to 836 formed in the cover fixing portions 821 to 826.

The drive unit 70 is provided in the drive unit space 800, and can rotatably drive the valve body 31 via one end of the shaft 32.

The fixing member 830 fixes the cover fixing portions 821 to 826 and the housing-side cover fixing portions 291 to 296 to each other by being screwed into the housing-side cover fastening holes 290 after passing through the cover fastening holes 831 to 836.

The housing-side cover fixing portions 291 to 296 have a cover fixing base portion 298 that projects from the outer wall of the housing main body 21, and a cover fixing projection portion 299 that projects from the cover fixing base portion 298 to the cover fixing portions 821 to 826 and fixed to the cover fixing portions 821 to 826.

Figure 64:
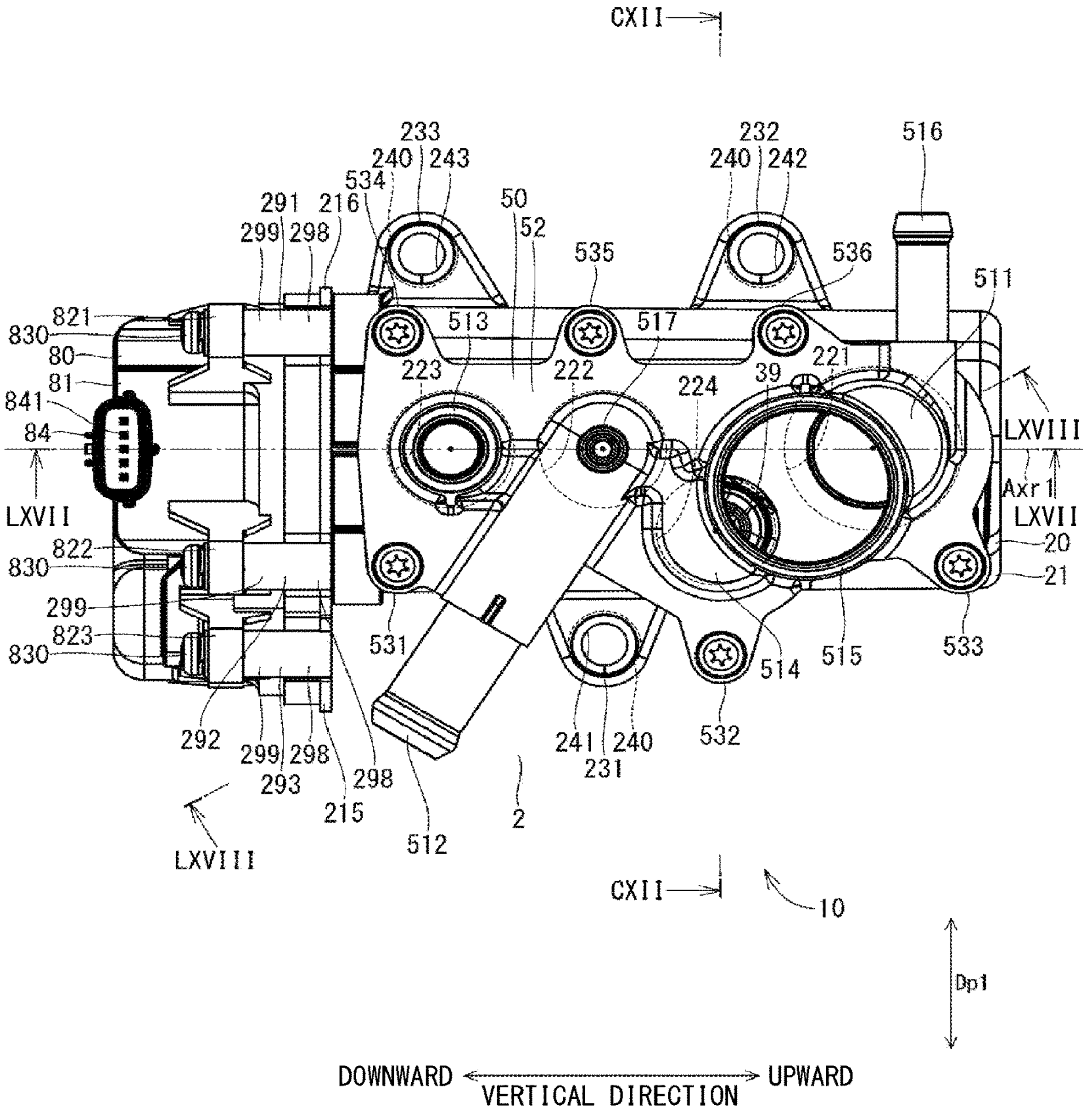
FIG. 64 is a view when

As illustrated in FIG. 64, at least a portion of the pipe member 50 is located on the side opposite to the cover fixing projection portion 299 with respect to the cover fixing base portion 298.

In this way, the cover fixing projection portion 299 is formed to project from the cover fixing base portion 298 to the side opposite to the pipe member 50. Accordingly, it is possible to prevent interference between the housing-side cover fixing portions 291 to 296 and the pipe member 50, and the pipe member 50 can be more freely mounted. In addition, it is possible to reduce the body size of the valve device 10 in the direction of the rotation axis Axr1. Therefore, the valve device 10 can be easily mounted in the narrow space A1 of the vehicle 1.

According to the present embodiment, at least a portion of the pipe member 50 is located on the side opposite to the cover fixing projection portion 299 with respect to the cover fixing base portion 298 of the housing-side cover fixing portion 291 to 293 (refer to FIG. 64).

<7-2>

Figure 73:
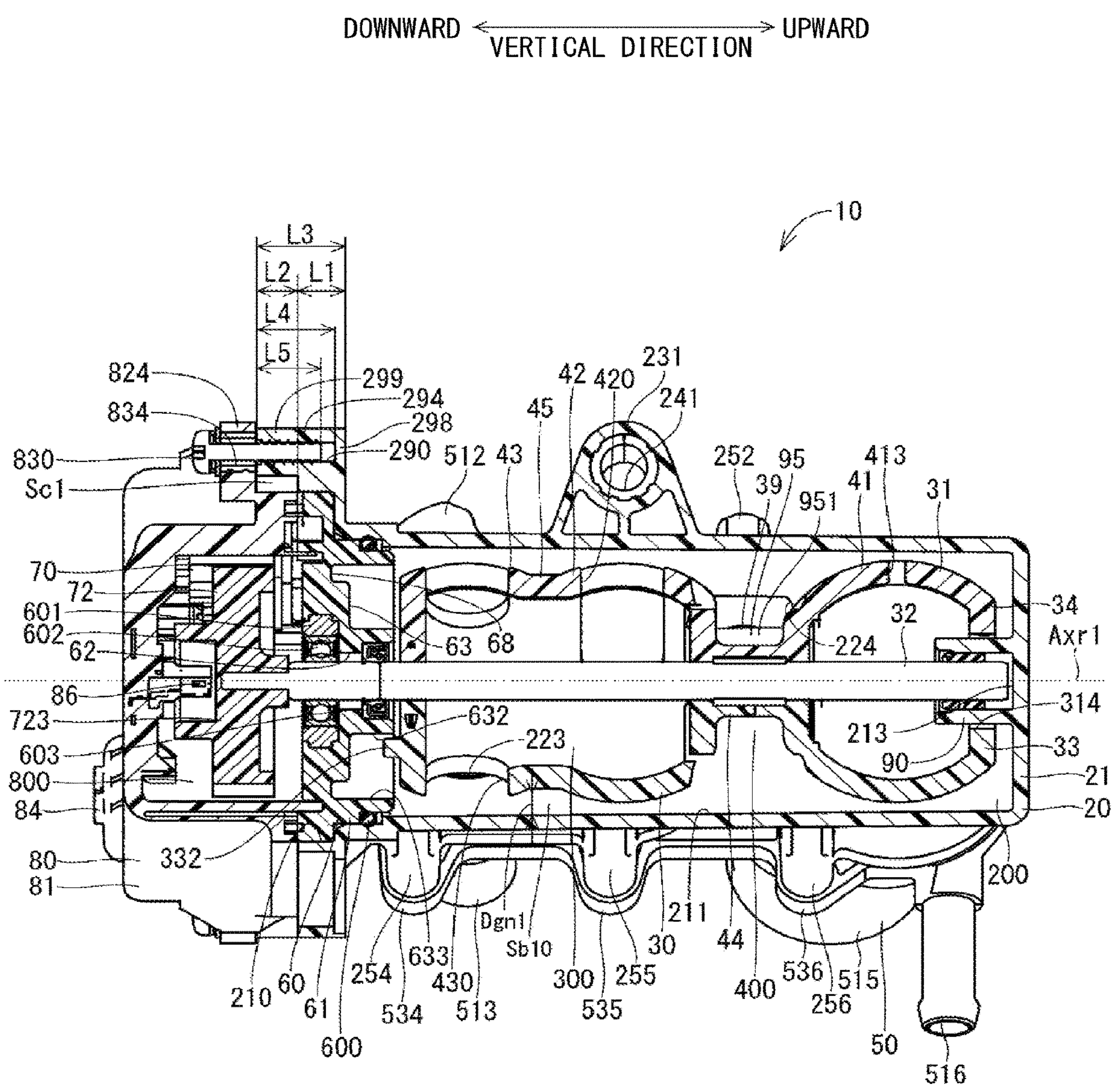
FIG. 73 is a cross-sectional view taken along line LXXIII-LXXIII in FIG. 62.
Figure 74:
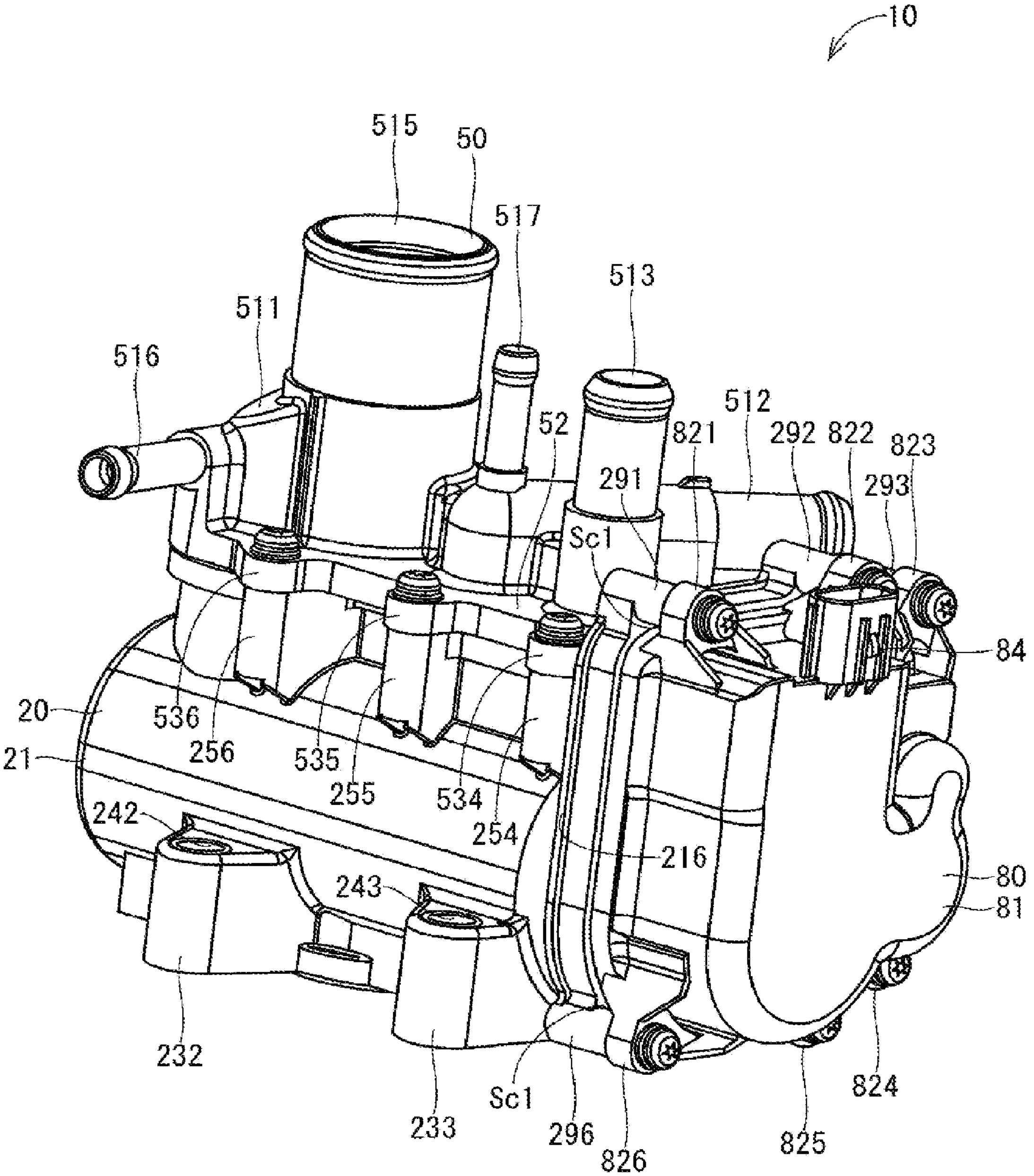
FIG. 74 is a perspective view illustrating the valve device of the fourteenth embodiment.
Figure 75:
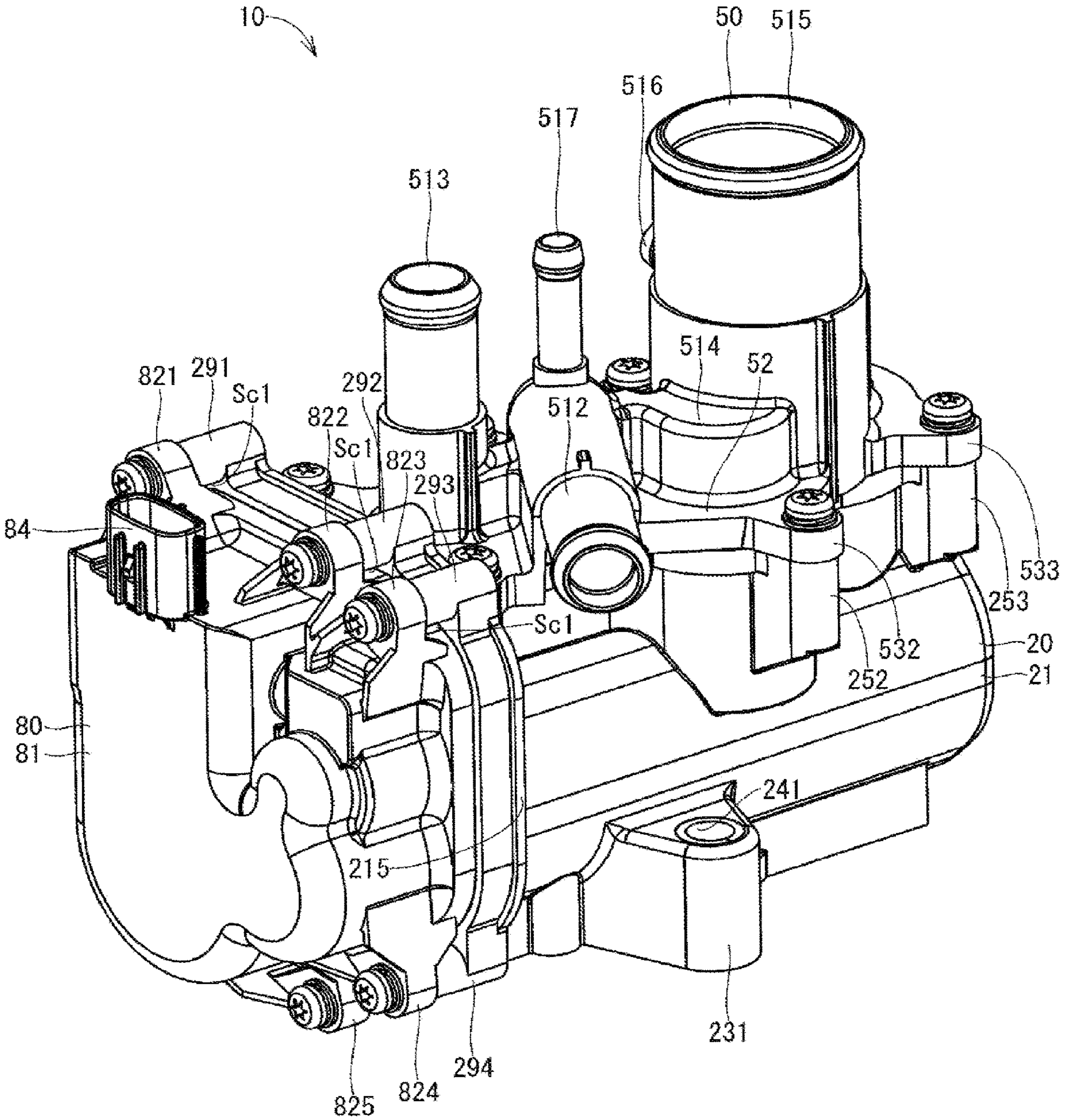
FIG. 75 is a perspective view illustrating the valve device of the fourteenth embodiment.
Figure 76:
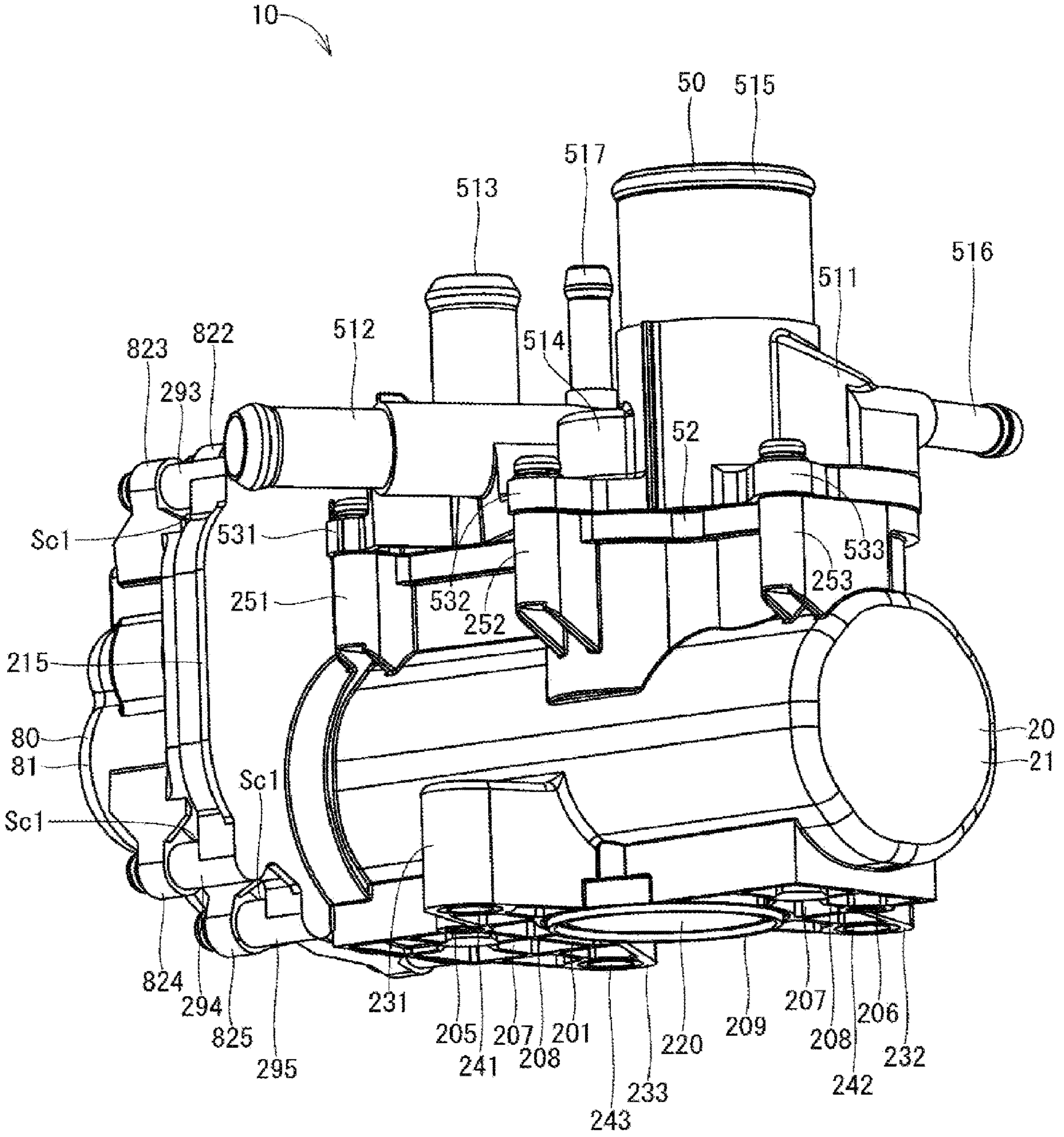
FIG. 76 is a perspective view illustrating the valve device of the fourteenth embodiment.
Figure 77:
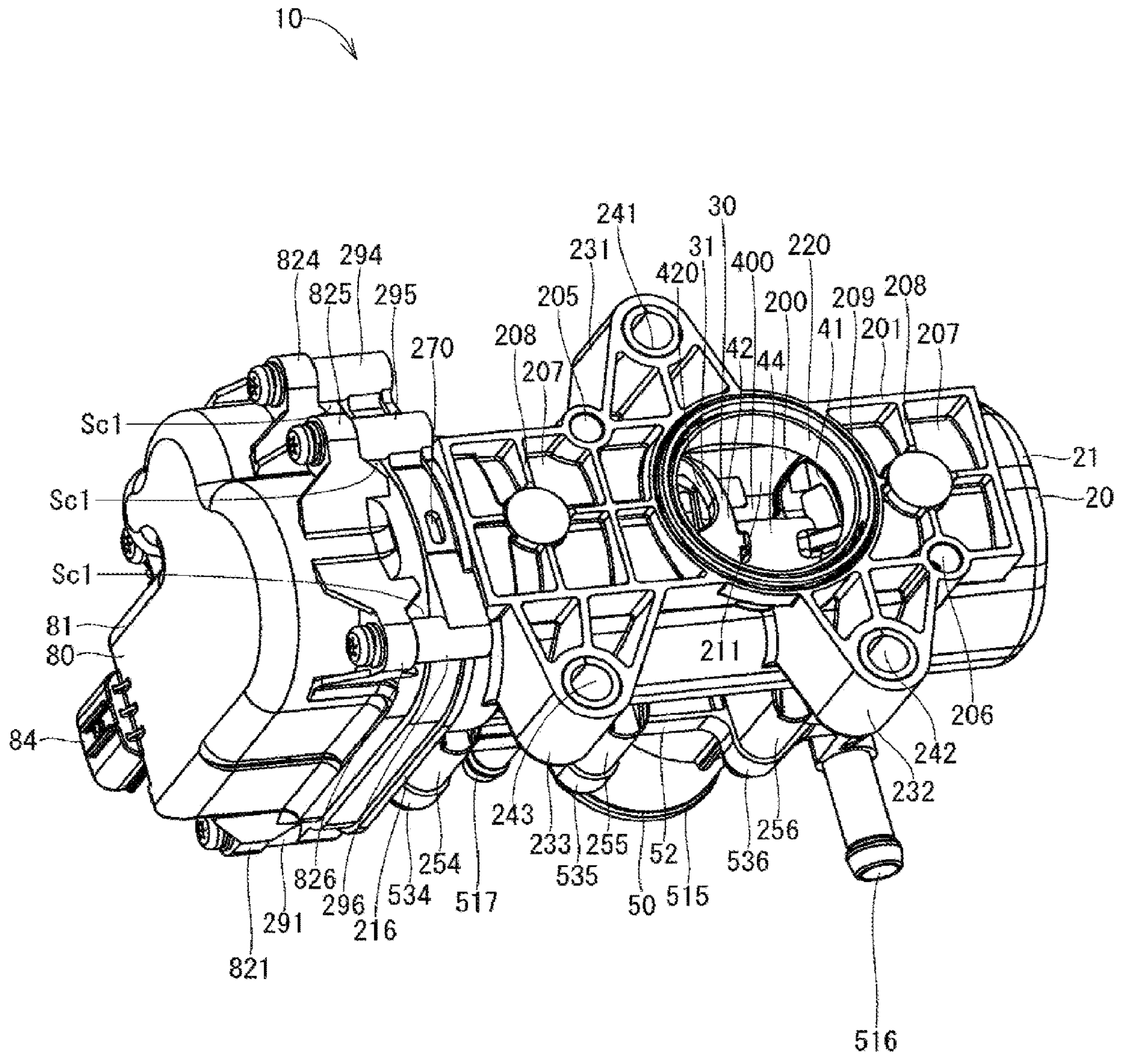
FIG. 77 is a perspective view illustrating the valve device of the fourteenth embodiment.
Figure 78:
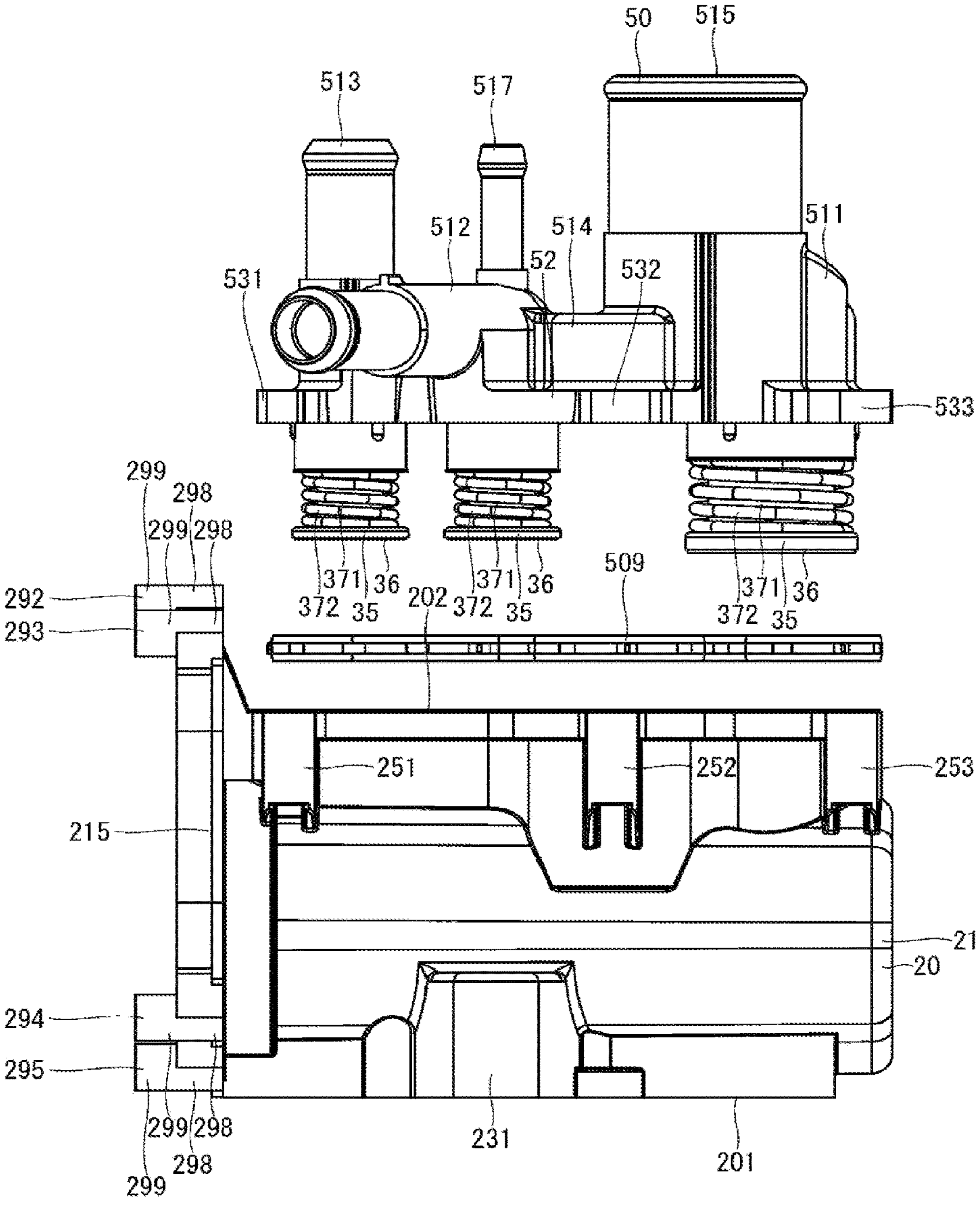
FIG. 78 is an exploded view illustrating a part of the valve device of the fourteenth embodiment.

As illustrated in FIG. 73, the cover fixing projection portion 299 forms an inter-cover gap Sc1 as a gap from the outer wall of the cover main body 81.

Therefore, when the drive unit cover 80 is fastened to the housing 20 by the fixing member 830, even if the cover fixing projection portion 299 of the housing-side cover fixing portions 291 to 296 is cracked, it is possible to prevent a possibility that the crack may affect the housing main body 21. In this manner, it is possible to effectively prevent the leakage of the coolant water which may be caused by the fastening of the drive unit cover 80 to the housing 20.

<7-3>

As illustrated in FIG. 73, a length L4 in the axial direction of the housing-side cover fastening hole 290 is shorter than a length L3 obtained by adding a length L1 of the cover fixing base portion 298 in the axial direction of the housing-side cover fastening hole 290 and a length L2 of the cover fixing projection portion 299 to each other. That is, $L4<L3=L1+L2$.

Therefore, strength of the housing-side cover fixing portions 291 to 296 can be ensured.

<7-4>

As illustrated in FIG. 73, a length L5 in the axial direction of the fixing member 830 inside the housing-side cover fastening hole 290 is shorter than the length L4 in the axial direction of the housing-side cover fastening hole 290. That is, $L5<L4$.

Therefore, when the fixing member 830 is screwed into the housing-side cover fastening hole 290, it is possible to prevent a possibility that the housing-side cover fixing portions 291 to 296 may be cracked. The tip of the fixing member 830 does not project to the side opposite to the cover fixing projection portion 299 with respect to the cover fixing base portion 298. Accordingly, it is possible to prevent a possibility that the tip of the fixing member 830 may interfere with the pipe member 50.

<7-5>

As illustrated in FIG. 73, the fixing member 830 is a tapping screw which can be screwed to the housing-side cover fastening hole 290 by tapping.

Therefore, it is not necessary to perform insert molding on a metal member having a thread groove to be inserted into the housing-side cover fixing portions 291 to 296. The inter-cover gap Sc1 is formed between the cover fixing projection portion 299 of the housing-side cover fixing portions 291 to 296 and the outer wall of the cover main body 81. Accordingly, even in a case where the housing-side cover fixing portions 291 to 296 are cracked when the fixing member 830 is screwed into the housing-side cover fastening hole 290, it is possible to prevent a possibility that the crack may affect the housing main body 21.

The length L5 in the axial direction of the fixing member 830 inside the housing-side cover fastening hole 290 corresponds to a length required for the tapping of the fixing member 830.

As illustrated in FIG. 64, the pipe portion 512 is formed to extend to the drive unit cover 80 side. The pipe portion 512 is formed to extend to the side provided with one fastening portion (231) out of both sides in the short direction of the housing main body 21. The pipe portion 512 is formed to extend to the housing end portion 215 side which is the end portion farther from the rotation axis Axr1 out of the both end portions (215 and 216) in the direction Dp1 parallel to the attachment surface 201 of the housing main body 21, that is, the end portion projecting in the direction Dp1 from the outer wall of the portion forming the internal space 200 in the housing main body 21.

The pipe portion 512 is formed to extend from the outlet port 222 which is a middle port out of the outlet ports 221, 222, and 223 aligned on a straight line in the housing main body 21. The pipe portion 512 is formed to extend from the outlet port 222 which is a port close to the drive unit cover 80 with respect to the center in the longitudinal direction of the housing main body 21.

The tip portion of the pipe portion 512 is located on the side opposite to the housing main body 21 from the housing projection portion 219. The tip portion side of the pipe portion 512 is located on the side opposite to the cover fixing projection portion 299 with respect to the cover fixing base portion 298 of the housing-side cover fixing portion 293.

As illustrated in FIG. 62, the housing-side cover fixing portions 291 to 293 are formed on the pipe member 50 side with respect to a virtual plane Vp6 including the rotation axis Axr1 and parallel to the attachment surface 201. The housing-side cover fixing portions 294 to 296 are formed on the attachment surface 201 side with respect to the virtual plane Vp6.

The housing-side cover fixing portions 291 and 296 are formed on the side where the tip portion of the pipe portion 516 is located with respect to a virtual plane Vp7 including the rotation axis Axr1 and perpendicular to the attachment surface 201. The housing-side cover fixing portions 292 to 295 are formed on the side where the tip portion of the pipe portion 512 is located with respect to the virtual plane Vp7.

The inter-cover gap Sc1 is formed between the cover fixing projection portion 299 of the housing-side cover fixing portions 291 to 296 formed as described above and the outer wall of the cover main body 81.

<8-1> Foreign Substance Collection Portion

According to the present embodiment, there is provided the valve device 10 capable of controlling the coolant water of the engine 2 of the vehicle 1. The valve device 10 includes the housing 20, the valve 30, the partition wall portion 60, and the drive unit 70.

The housing 20 has the housing main body 21 which internally forms the internal space 200, the ports (220, 221, 222, and 223) which connect the internal space 200 and the outside of the housing main body 21 to each other, and the housing opening portion 210 which connects the internal space 200 and the outside of the housing main body 21 to each other.

The valve 30 has the valve body 31 rotatable around the rotation axis Axr1 inside the internal space 200, and the shaft 32 provided on the rotation axis Axr1, and can open and close the ports (221, 222, and 223) in accordance with the rotation position of the valve body 31.

The partition wall portion 60 has the partition wall portion main body 61 provided in the housing opening portion 210 to partition the internal space 200 and the outside of the housing main body 21 from each other, and the shaft insertion hole 62 formed in the partition wall portion main body 61 so that one end of the shaft 32 can be inserted.

The drive unit 70 is provided on the side opposite to the internal space 200 with respect to the partition wall portion 60, can drive the valve body 31 to rotate via one end of the shaft 32.

Figure 69:
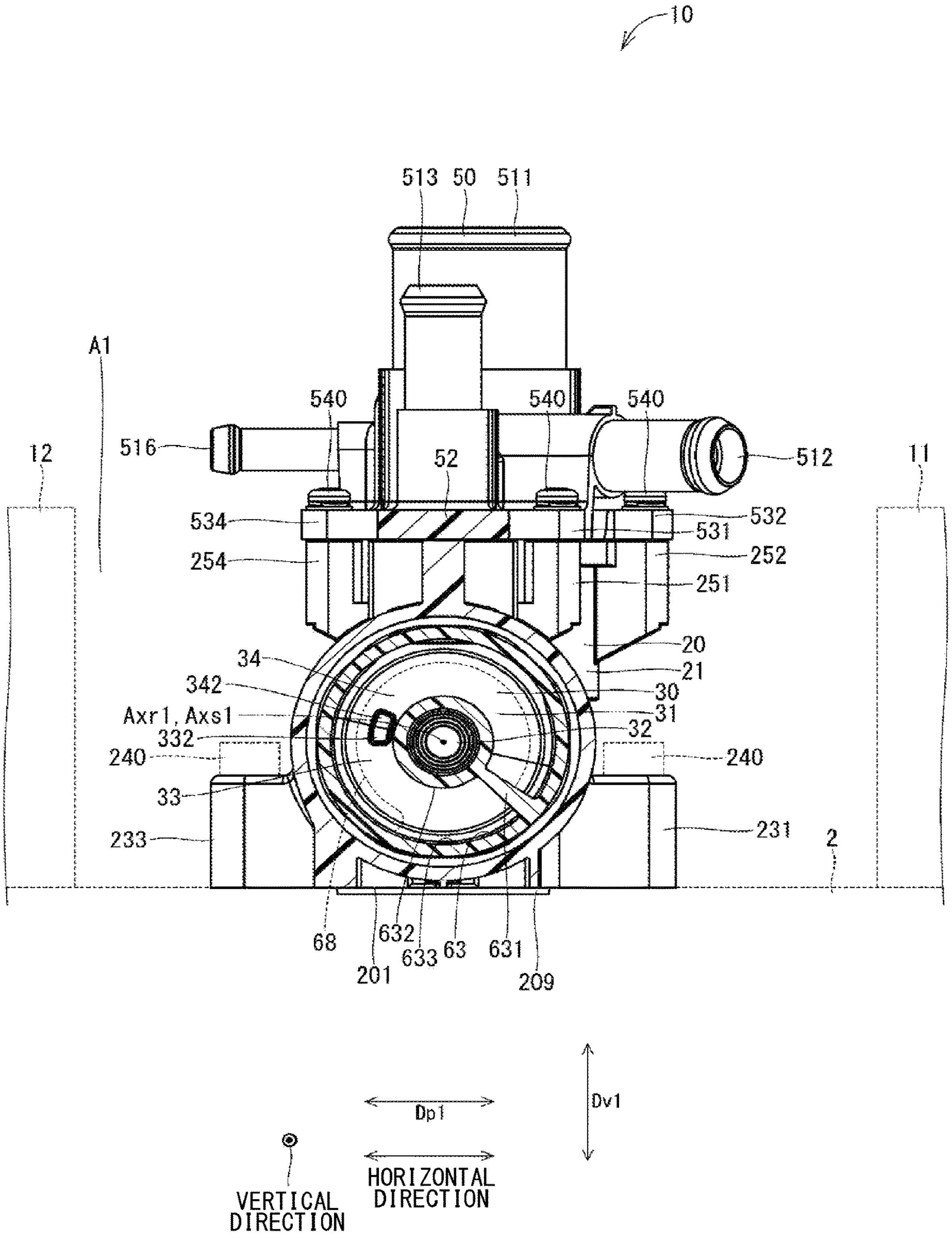
FIG. 69 is a cross-sectional view taken along line LXIX-LXIX in FIG. 67.
Figure 70:
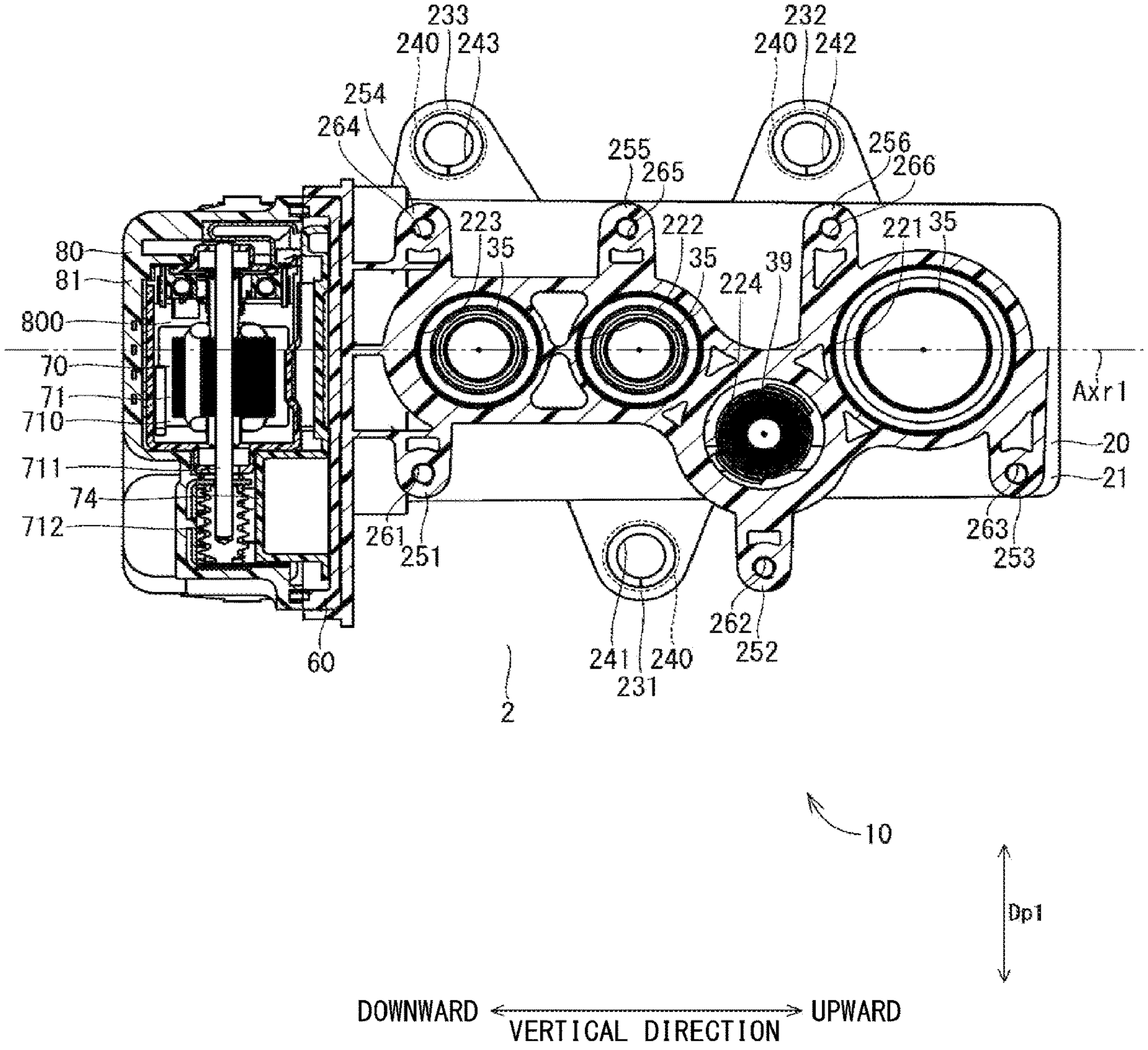
FIG. 70 is a cross-sectional view taken along line LXX-LXX in FIG. 62.
Figure 71:
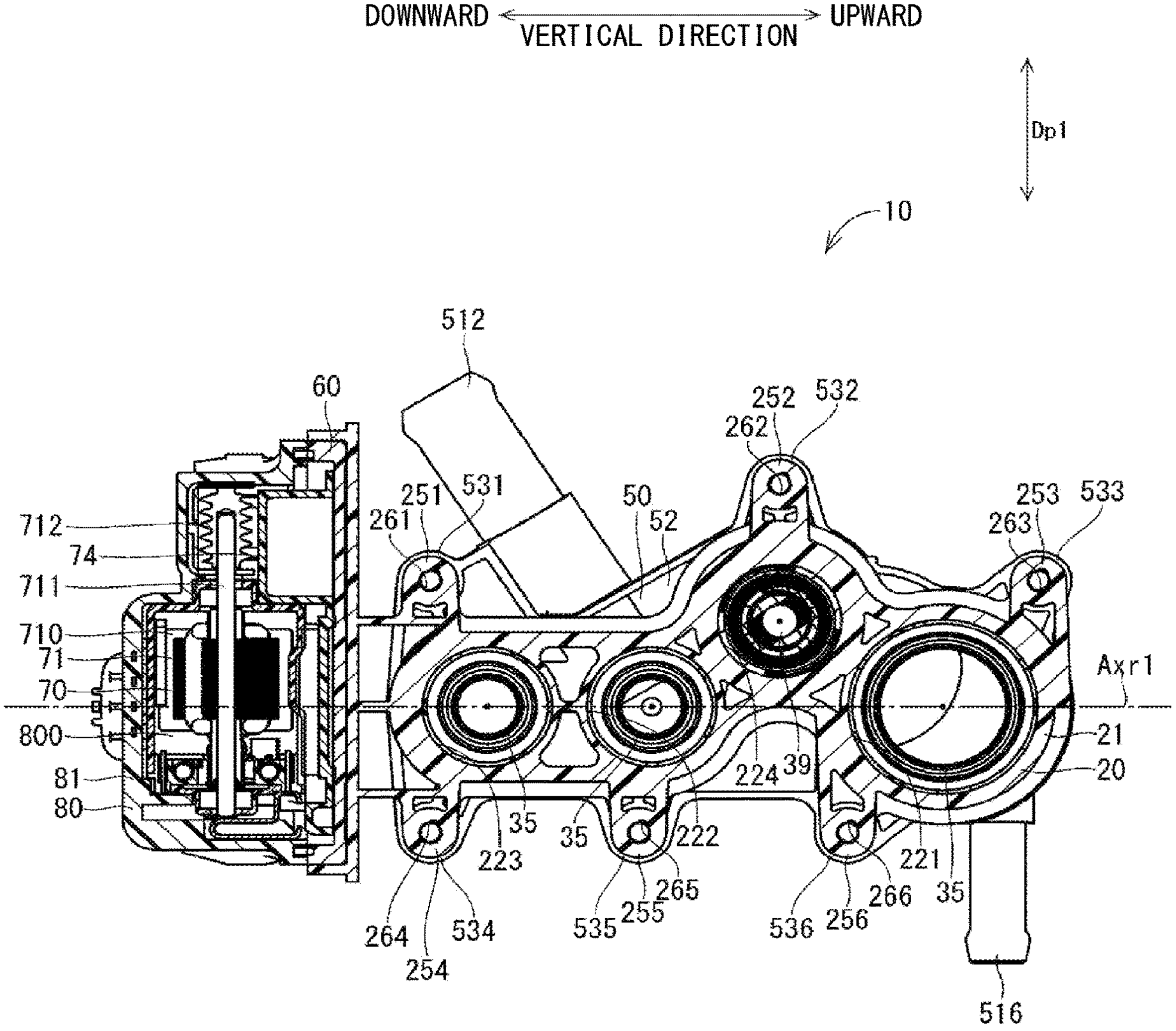
FIG. 71 is a cross-sectional view taken along line LXXI-LXXI in FIG. 62.
Figure 72:
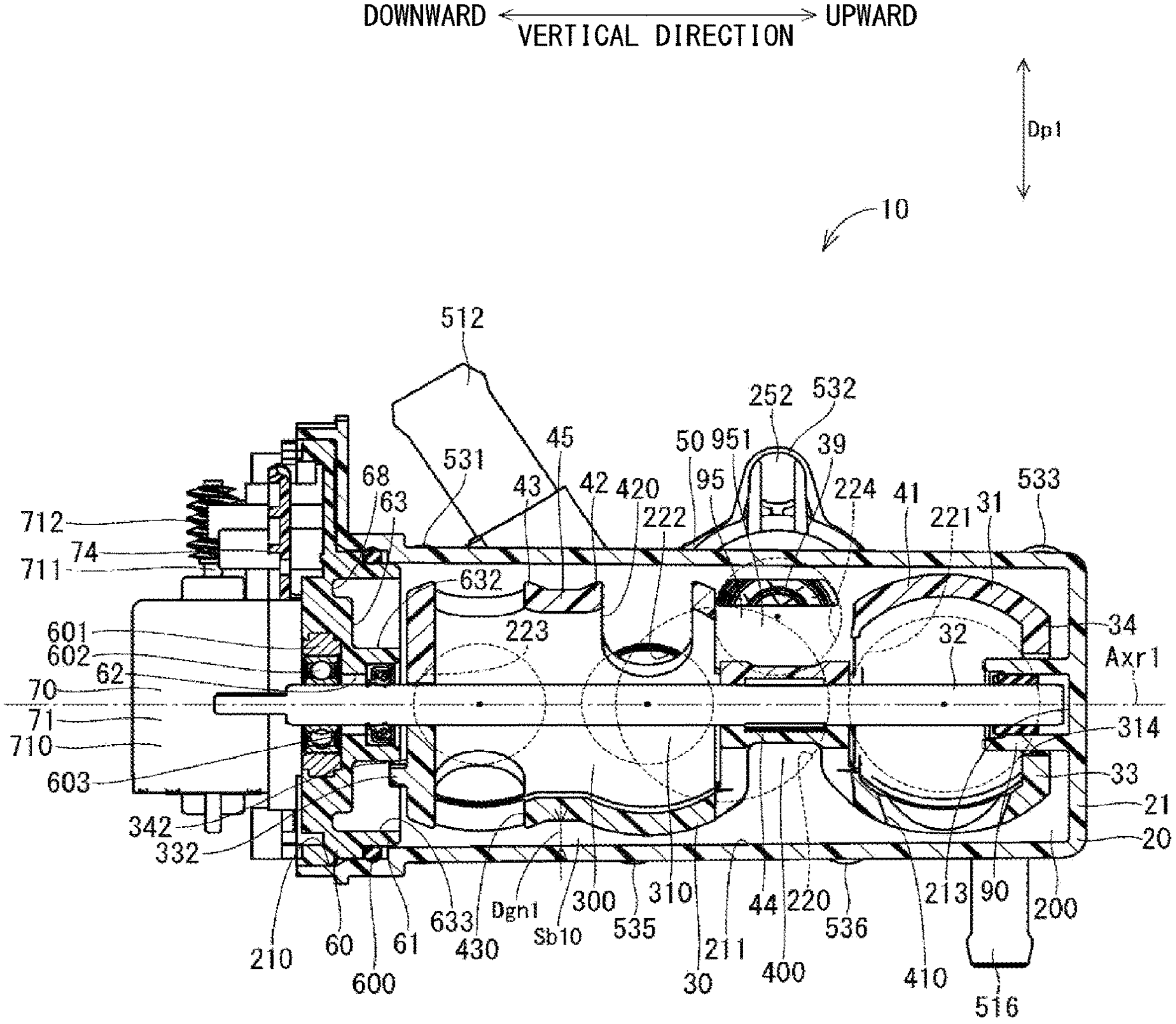
FIG. 72 is a cross-sectional view taken along line LXXII-LXXII in FIG. 62.

As illustrated in FIG. 69, the valve 30 has the first restriction projection portion 332 and the second restriction projection portion 342 as a restricted portion formed in the valve body 31.

Figure 103:
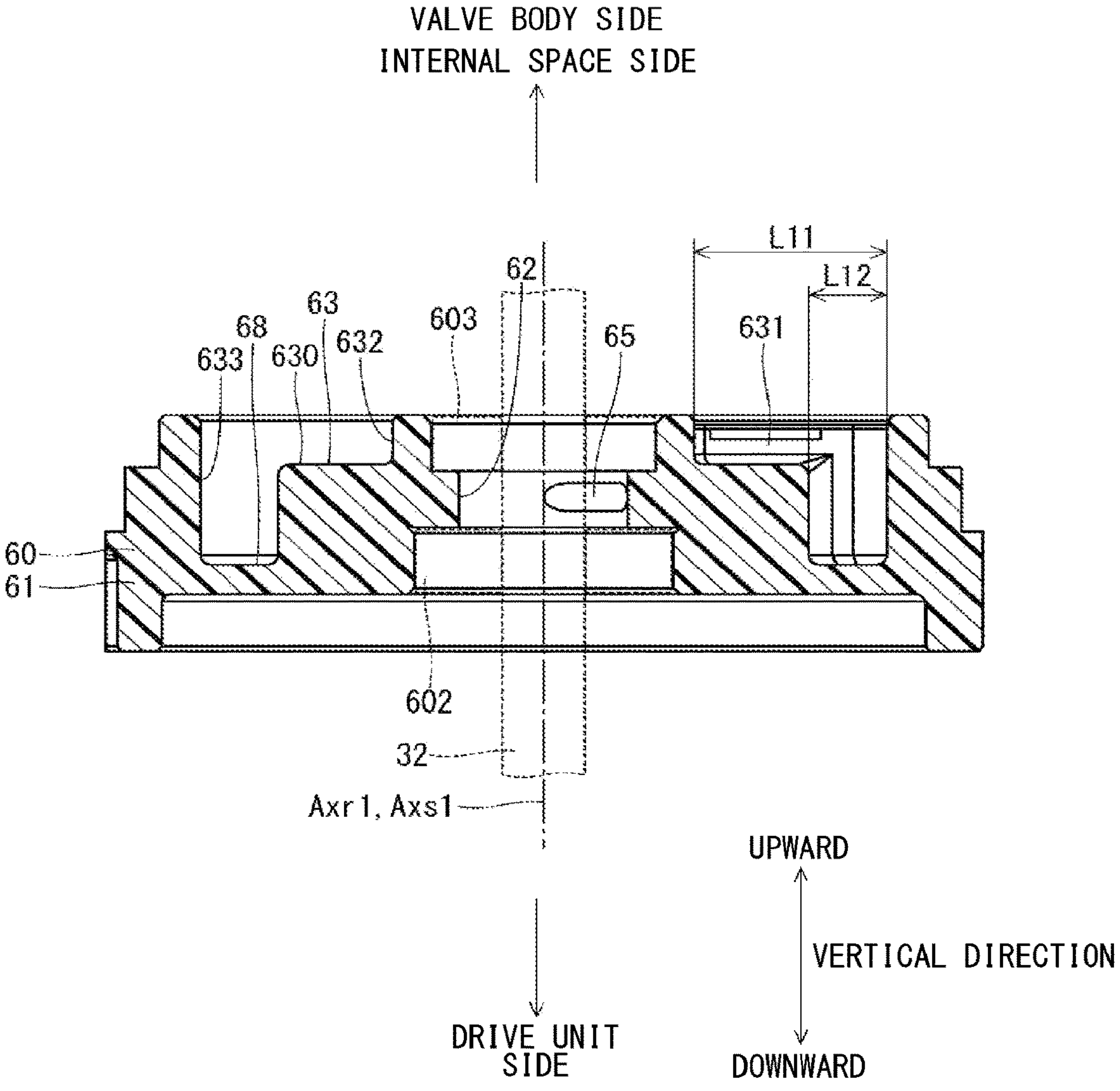
FIG. 103 is a cross-sectional view illustrating a partition wall portion of the valve device of the fourteenth embodiment.
Figure 104:
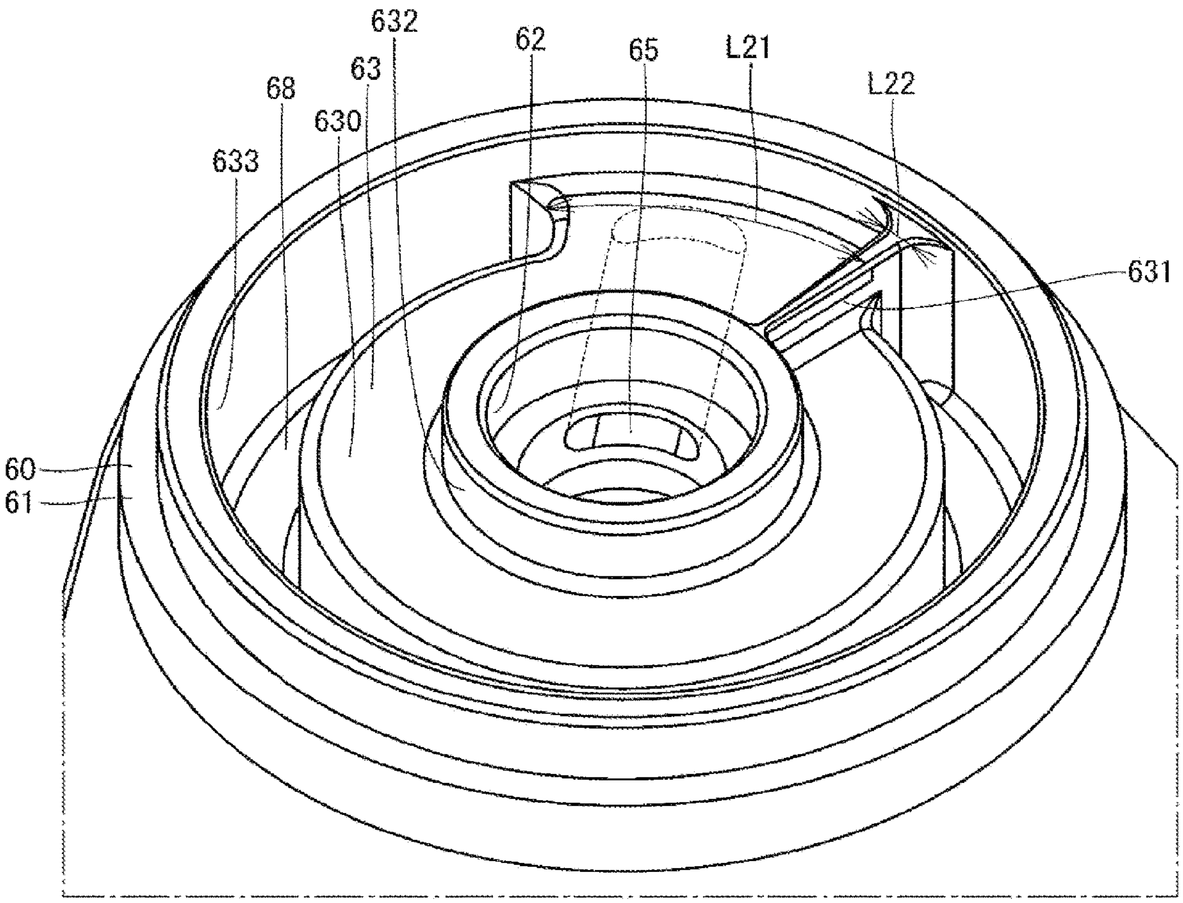
FIG. 104 is a perspective view illustrating a part of the partition wall portion of the valve device of the fourteenth embodiment.

As illustrated in FIGS. 69, 103, and 104, the partition wall portion 60 has the annular restriction recess portion 63 recessed to the drive unit 70 side from the surface on the internal space 200 side of the partition wall portion main body 61 outside in the radial direction of the shaft insertion hole 62, the restriction portion 631 formed in a portion in the circumferential direction of the restriction recess portion 63 and capable of restricting the rotation of the valve body 31 by coming into contact with the first restriction projection portion 332 and the second restriction projection portion 342, and a foreign substance collection portion 68 recessed to the drive unit 70 side from a bottom surface 630 of the restriction recess portion 63.

Therefore, a foreign substance existing inside the restriction recess portion 63 or a foreign substance accumulated on the bottom surface 630 of the restriction recess portion 63 can be collected in the foreign substance collection portion 68. In this manner, the foreign substance can be kept away from the first restriction projection portion 332, the second restriction projection portion 342, and the restriction portion 631 which are restricted portions, and it is possible to prevent a possibility that the foreign substance may be caught in the first restriction projection portion 332, the second restriction projection portion 342, and the restriction portion 631. Therefore, it is possible to prevent degradation of driving accuracy of the valve body 31 which is caused by the foreign substance collected in the restriction portion 631. In addition, it is possible to prevent degradation of sensor accuracy of the rotation angle sensor 86 which is caused by the foreign substance collected in the restriction portion 631.

<8-2>

As illustrated in FIGS. 103 and 104, the restriction recess portion 63 has an inner cylinder wall surface 632 which is a cylindrical wall surface formed inside in the radial direction, and an outer cylinder wall surface 633 which is a cylindrical wall surface formed outside in the radial direction.

Therefore, it is possible to prevent a possibility that the foreign substance inside the restriction recess portion 63 may enter the shaft insertion hole 62. In this manner, it is possible to ensure the sealing property of the shaft seal member 603.

<8-3>

As illustrated in FIGS. 103 and 104, the foreign substance collection portion 68 is formed on the outer cylinder wall surface 633 side with respect to at least a portion of the bottom surface 630 of the restriction recess portion 63.

Therefore, the foreign substance on the bottom surface 630 of the restriction recess portion 63 can be guided to the foreign substance collection portion 68 outside in the radial direction of the restriction recess portion 63, and the foreign substance can be kept away from the shaft insertion hole 62. In this manner, it is possible to ensure the sealing property of the shaft seal member 603.

<8-5>

As illustrated in FIG. 69, the inner cylinder wall surface 632 can guide the rotation of the valve body 31 by sliding on the first restriction projection portion 332 and the second restriction projection portion 342 as the restricted portions.

Therefore, the valve body 31 can be stably rotated. The foreign substance is collected in the foreign substance collection portion 68. In this manner, it is possible to prevent a possibility that the foreign substance may be caught in the inner cylinder wall surface 632, the first restriction projection portion 332, and the second restriction projection portion 342, and it is possible to prevent degradation of sliding performance among the inner cylinder wall surface 632, the first restriction projection portion 332, and the second restriction projection portion 342.

<8-6>

As illustrated in FIGS. 103 and 104, the restriction portion 631 is formed to extend from the inner cylinder wall surface 632 to the outer cylinder wall surface 633. Therefore, strength of the restriction portion 631 can be ensured.

<8-7>

As illustrated in FIGS. 103 and 104, a length L11 of the restriction portion 631 in the radial direction of the restriction recess portion 63 is longer than a length L12 of the foreign substance collection portion 68 in the radial direction of the restriction recess portion 63.

Therefore, strength of the restriction portion 631 can be ensured.

<8-12>

As illustrated in FIG. 104, the foreign substance collection portion 68 is formed in a C-shape in a cross section perpendicular to the axis of the shaft insertion hole 62.

Therefore, the partition wall through-hole 65 can be formed between end portions in the circumferential direction of the foreign substance collection portion 68.

<8-13>

As illustrated in FIGS. 103 and 104, the partition wall portion 60 has the partition wall through-hole 65 which extends outward from the shaft insertion hole 62 and which is open on the outer wall of the partition wall portion main body 61. The partition wall through-hole 65 is formed between the end portions in the circumferential direction of the foreign substance collection portion 68.

Therefore, the space can be effectively utilized, and the partition wall portion main body 61 can be downsized.

<8-14>

As illustrated in FIG. 104, the bottom surface 630 of the restriction recess portion 63 is formed so that the length L21 in the circumferential direction increases outward in the radial direction, between the end portions in the circumferential direction of the foreign substance collection portion 68.

Therefore, the strength of the portion on the outer cylinder wall surface 633 side of the partition wall portion main body 61 can be ensured between the end portions in the circumferential direction of the foreign substance collection portion 68.

<8-15>

As illustrated in FIGS. 103 and 104, the restriction portion 631 is formed to extend outward in the radial direction on the bottom surface 630 of the restriction recess portion 63.

<8-16>

As illustrated in FIG. 104, the restriction portion 631 is formed so that a length L22 in the circumferential direction increases outward in the radial direction of the restriction recess portion 63.

Therefore, it is possible to ensure the strength of the portion on the outer cylinder wall surface 633 side of the restriction portion 631.

<8-17>

As illustrated in FIGS. 67 and 103, in a state where the housing 20 is attached to the engine 2, the foreign substance collection portion 68 is located on the lower side of the valve body 31.

More specifically, the foreign substance collection portion 68 is located on the lower side of the valve body 31 in the vertical direction.

Therefore, the foreign substance collection portion 68 is located on the lower side of the bottom surface 630 of the restriction recess portion 63. In this manner, the foreign substance inside the restriction recess portion 63 can be effectively guided to the foreign substance collection portion 68.

As in the housing main body 21, the partition wall portion main body 61 is formed of "PPS-GF50", for example.

Therefore, heat resistance, water absorption resistance, strength, and dimensional accuracy of the partition wall portion main body 61 can be improved.

<9-1> Shaft Bearing Portion Flow Channel

According to the present embodiment, there is provided the valve device 10 capable of controlling the coolant water of the engine 2 of the vehicle 1. The valve device 10 includes the housing 20, the valve 30, and the shaft bearing portion 90.

The housing 20 has the housing main body 21 which internally forms the internal space 200, and the ports (220, 221, 222, and 223) which connect the internal space 200 and the outside of the housing main body 21 to each other.

The valve 30 has the valve body 31 rotatable around the rotation axis Axr1 inside the internal space 200, and the shaft 32 provided on the rotation axis Axr1, and can open and close the ports (221, 222, and 223) in accordance with the rotation position of the valve body 31.

Figure 105:
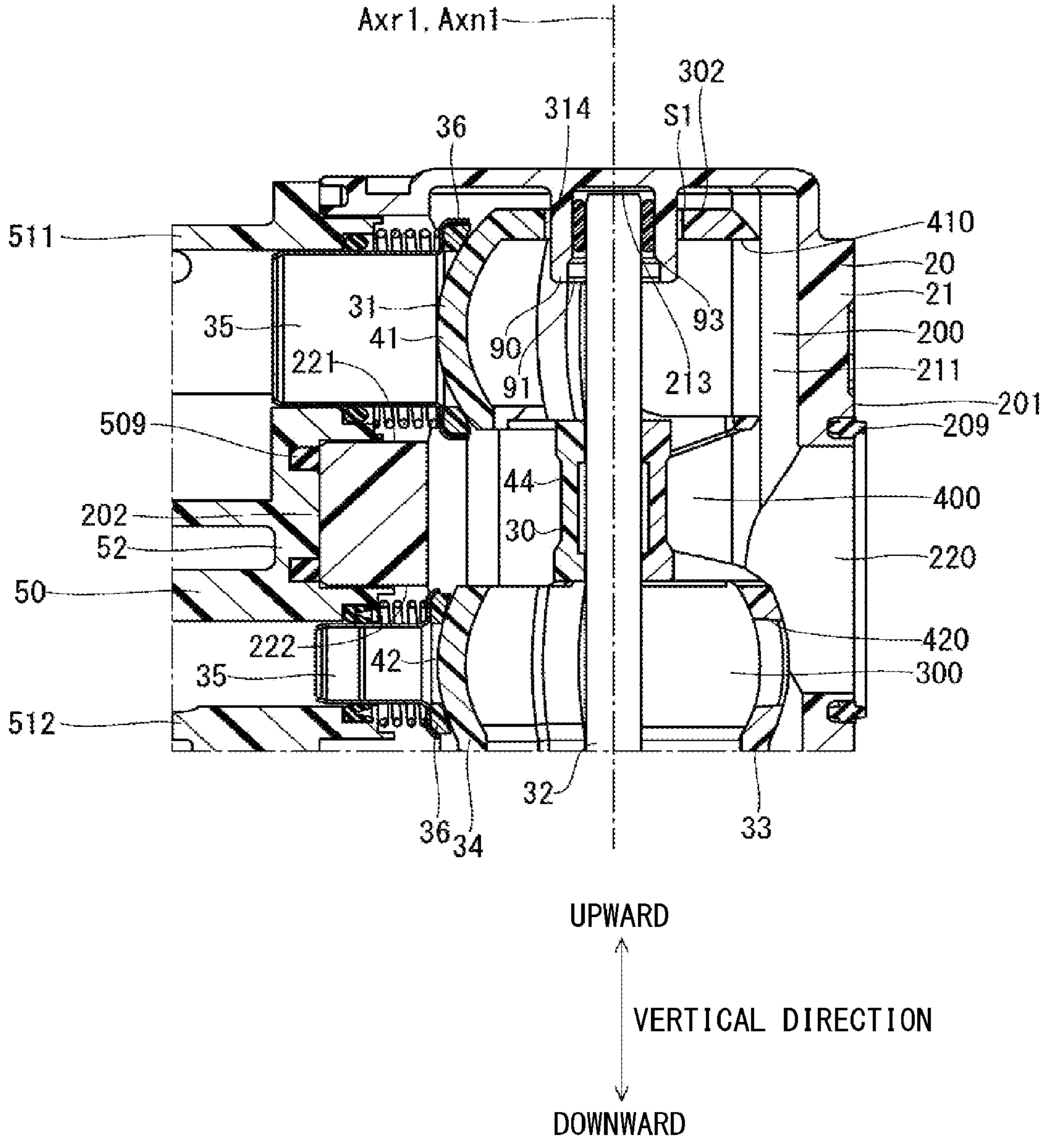
FIG. 105 is a cross-sectional view illustrating a shaft bearing portion and the vicinity of the valve device of the fourteenth embodiment.
Figure 106:
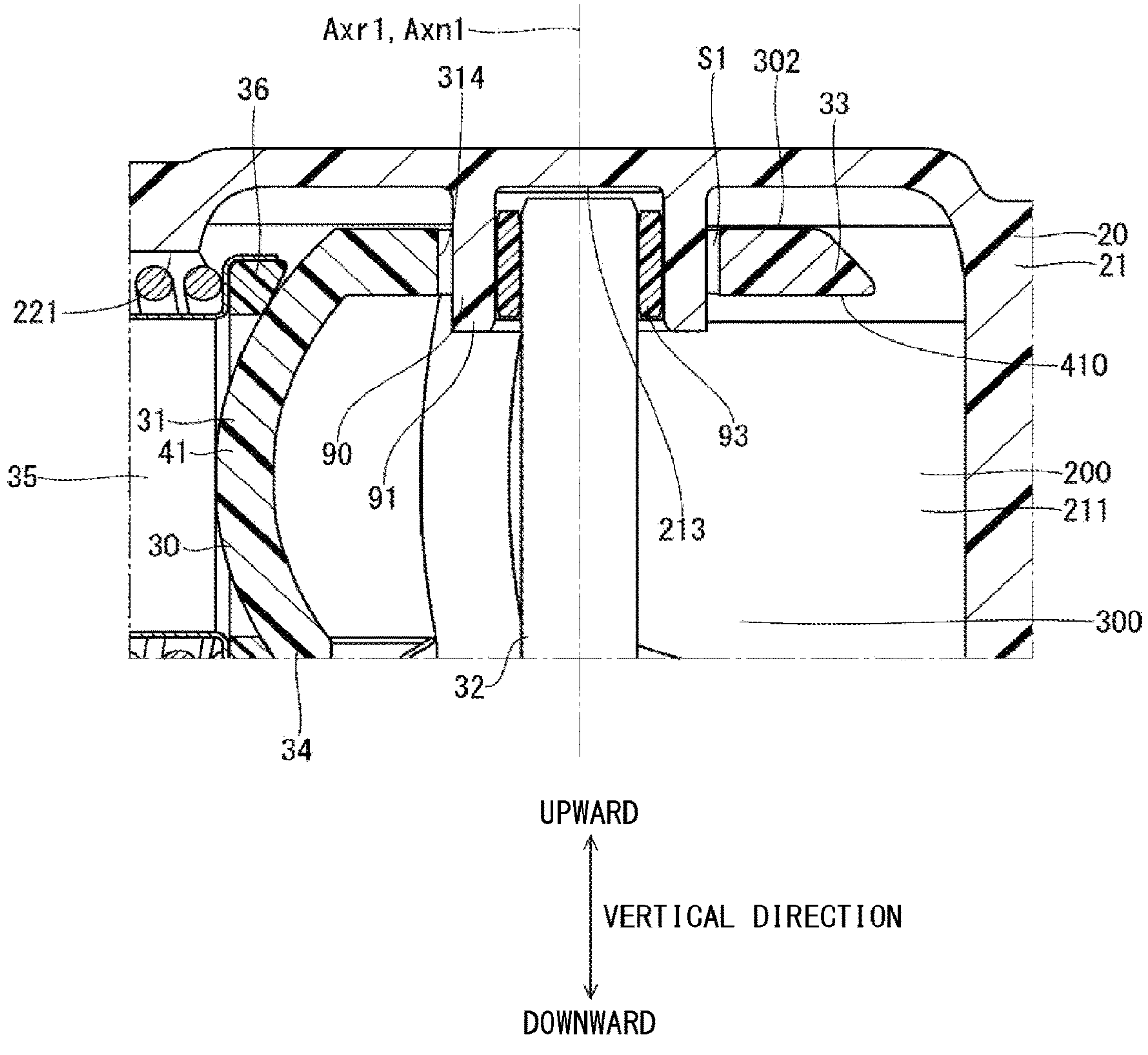
FIG. 106 is a cross-sectional view illustrating the shaft bearing portion and the vicinity of the valve device of the fourteenth embodiment.
Figure 107:
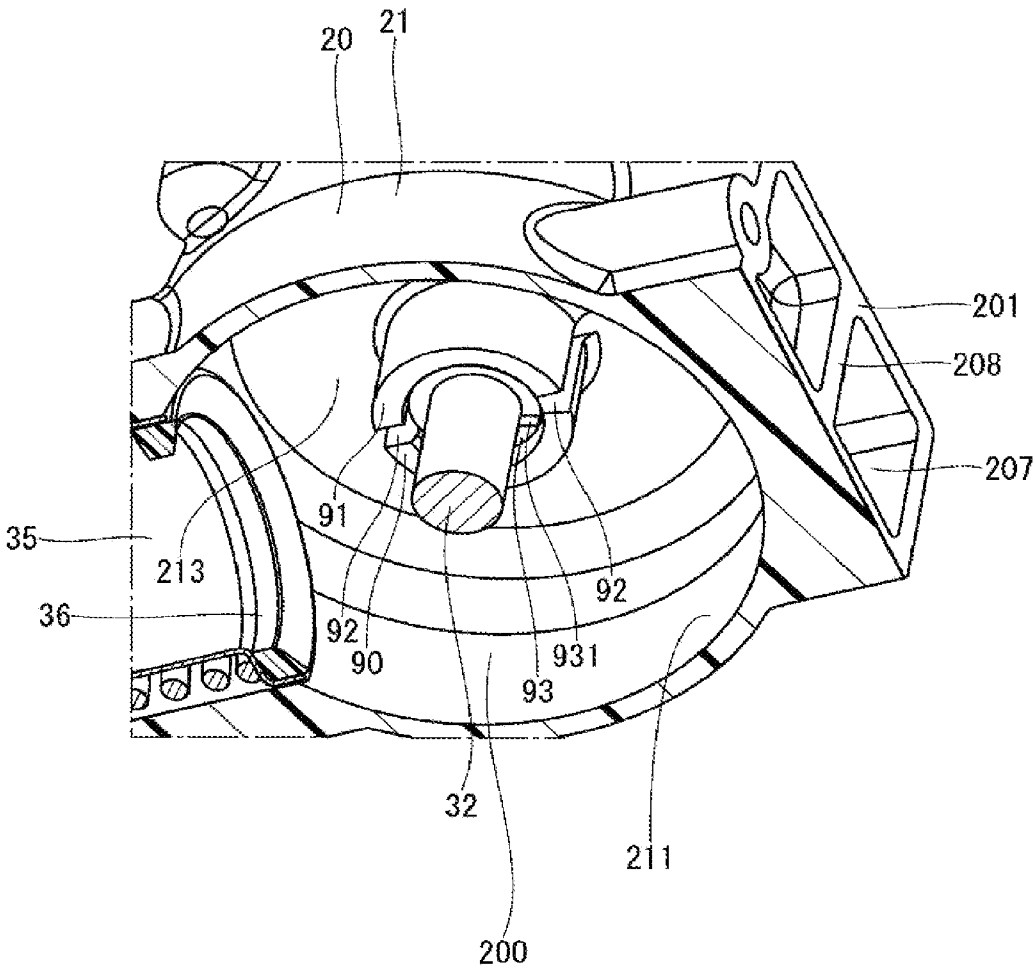
FIG. 107 is a cross-sectional perspective view illustrating the shaft bearing portion and the vicinity of the valve device of the fourteenth embodiment.

As illustrated in FIGS. 105 to 107, the shaft bearing portion 90 has a bearing portion main body 91 that extends in a cylindrical shape from a facing inner wall 213 which is an inner wall facing the end portion of the shaft 32 on the inner wall of the housing main body 21 forming the internal space 200 and that rotatably supports the end portion of the shaft 32, and a bearing portion flow channel 92 formed to fluidly connect the inner circumferential wall and the outer circumferential wall of the bearing portion main body 91 to each other.

Therefore, even when the air is accumulated inside the bearing portion main body 91, the air can be discharged outward from the bearing portion main body 91 via the bearing portion flow channel 92. In this manner, it is possible to prevent a possibility that the end portion of the shaft 32 and the shaft bearing portion 90 may slide in a dry state. Therefore, it is possible to prevent a possibility that the end portion or the shaft bearing portion 90 of the shaft 32 may suffer abrasion.

<9-2>

As illustrated in FIG. 107, the bearing portion flow channel 92 is formed to extend from the portion of the facing inner wall 213 side of the bearing portion main body 91 to the end portion opposite to the facing inner wall 213.

Therefore, even when the air is accumulated inside the bearing portion main body 91, the air can be quickly discharged outward from the bearing portion main body 91 via the bearing portion flow channel 92.

<9-3>

As illustrated in FIGS. 105 and 106, the valve body 31 has a valve body end portion hole 314 formed so that the end portion of the shaft 32 and the bearing portion main body 91 are internally located.

Therefore, the bearing portion main body 91 is disposed inside the valve body end portion hole 314. In this manner, it is possible to reduce the body size of the housing main body 21 in the direction of the rotation axis Axr1. In this manner, the valve device 10 can be downsized.

<9-4>

As illustrated in FIGS. 105 and 106, the shaft bearing portion 90 has a cylindrical inner bearing portion 93 which is provided inside the bearing portion main body 91 and can rotatably support the end portion of the shaft 32.

Therefore, it is possible to prevent abrasion of the bearing portion main body 91.

<9-5>

As illustrated in FIGS. 105 and 106, the valve body 31 has a valve body end portion hole 314 formed so that the end portion of the shaft 32 and the bearing portion main body 91 are internally located. The shaft bearing portion 90 has a cylindrical inner bearing portion 93 which is provided inside the bearing portion main body 91 and can internally bear the end portion of the shaft 32. A difference between the inner diameter of the valve body end portion hole 314 and the outer diameter of the bearing portion main body 91 is smaller than a difference between the inner diameter of the bearing portion main body 91 and the outer diameter of the end portion of and the shaft 32.

That is, a cylindrical gap S1 between the valve body end portion hole 314 and the bearing portion main body 91 is relatively small, and is not formed to such a size that the coolant water is allowed to positively circulate therethrough.

<9-6>

As illustrated in FIGS. 105 and 106, in a state where the housing 20 is attached to the engine 2, the shaft bearing portion 90 is located on the lower side of the facing inner wall 213.

More specifically, the shaft bearing portion 90 is located on the lower side of the facing inner wall 213 in the vertical direction.

Therefore, the shaft bearing portion 90 is located on the upper side in the vertical direction of the internal space 200, and the air in the coolant water inside the internal space 200 is easily accumulated inside the bearing portion main body 91. However, even when the air is accumulated inside the bearing portion main body 91, the air can be discharged outward from the bearing portion main body 91 via the bearing portion flow channel 92.

According to the present embodiment, the bearing portion main body 91 is formed in a substantially cylindrical shape. The bearing portion flow channel 92 is formed to extend from the end portion on the facing inner wall 213 side of the bearing portion main body 91 to the end portion opposite to the facing inner wall 213. Two bearing portion flow channels 92 are formed at an equal interval in the circumferential direction of the bearing portion main body 91 to interpose the axis of the bearing portion main body 91 therebetween (refer to FIG. 107).

As illustrated in FIG. 107, a bearing cutout portion 931 is formed in the inner bearing portion 93. For example, the inner bearing portion 93 is formed of a resin such as PPS, and is formed in a substantially cylindrical shape. The bearing cutout portion 931 is formed to extend from one end portion to the other end portion of the inner bearing portion 93 while connecting the inner circumferential wall and the outer circumferential wall of the inner bearing portion 93 to each other.

Therefore, even when the air is accumulated inside the inner bearing portion 93, the air can be discharged outward from the inner bearing portion 93 via the bearing cutout portion 931. The bearing cutout portion 931 is formed in the inner bearing portion 93. In this manner, the inner bearing portion 93 can be easily disposed between the end portion of the shaft 32 and the bearing portion main body 91.

The bearing cutout portion 931 is formed to extend from one end portion to the other end portion of the inner bearing portion 93 while being inclined with respect to the axis of the inner bearing portion 93.

Therefore, in any desired portion in the circumferential direction of the inner bearing portion 93, regardless of the position in the axial direction, the inner circumferential wall of the inner bearing portion 93 can come into contact with the outer circumferential wall of the end portion of the shaft 32. In this manner, in the configuration in which the bearing cutout portion 931 is formed in the inner bearing portion 93, it is possible to stably bear the shaft 32.

As illustrated in FIGS. 105 and 106, the bearing portion main body 91 is formed to extend to the lower side of the upper end portion in the vertical direction of the outlet port 221. That is, the tip portion of the bearing portion main body 91 is located on the lower side of the upper end portion in the vertical direction of the outlet port 221.

Therefore, the air inside the bearing portion main body 91 can be easily discharged outward from the housing main body 21 via the outlet port 221.

<10-1> Non-Perfect Circular Housing Inner Wall

According to the present embodiment, there is provided the valve device 10 capable of controlling the coolant water of the engine 2 of the vehicle 1. The valve device includes the housing 20 and the valve 30.

The housing 20 has the housing main body 21 having the cylindrical housing inner wall 211 which internally forms the internal space 200, and the ports (220, 221, 222, and 223) which are open on the housing inner wall 211 and connect the internal space 200 and the outside of the housing main body 21 to each other.

Figure 108:
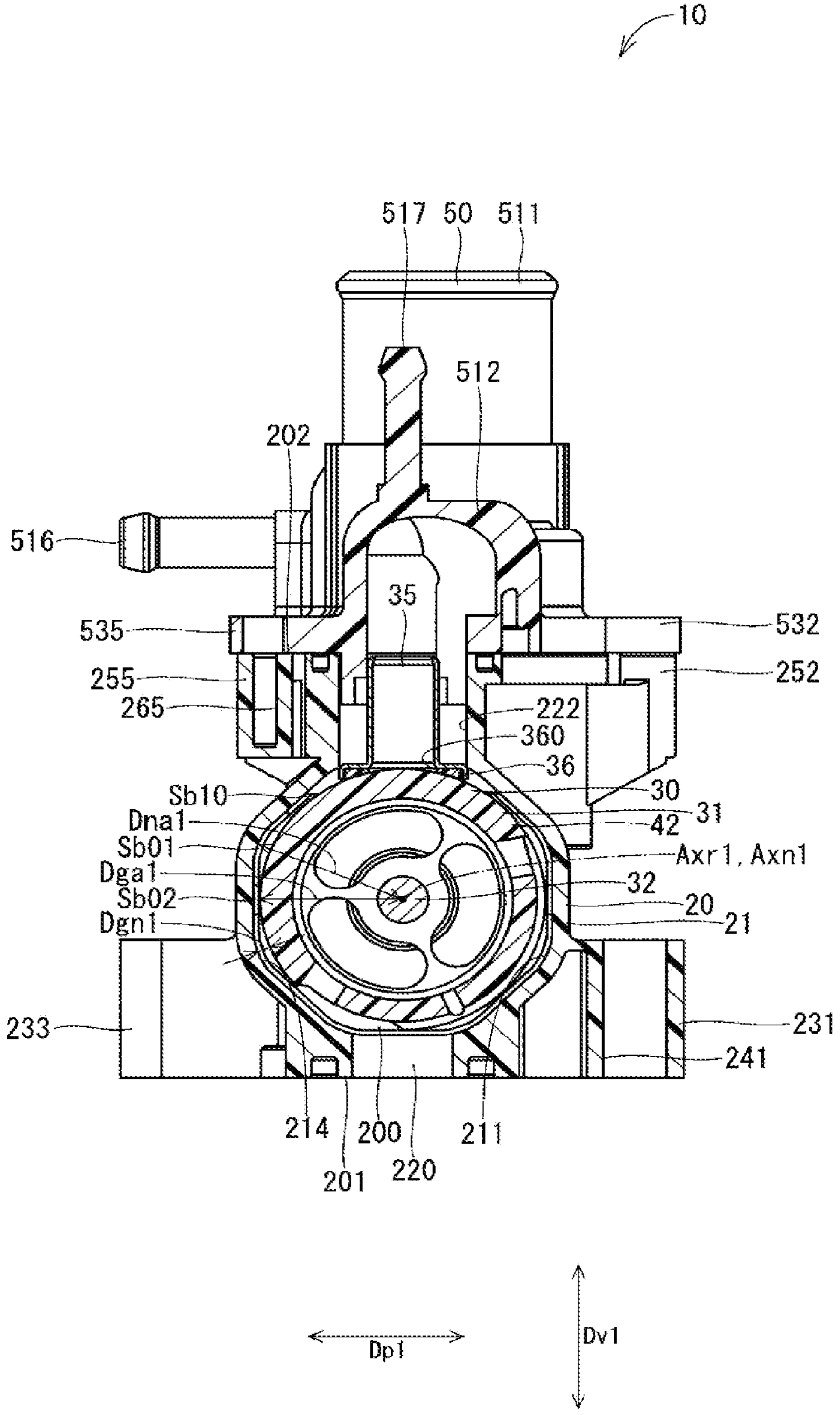
FIG. 108 is a cross-sectional view taken along line CVIII-CVIII in FIG. 67.

As illustrated in FIGS. 67 and 108, the valve 30 has the valve body 31 rotatable around the rotation axis Axr1 along the rotation axis Axn1 of the housing inner wall 211 inside the internal space 200, and the valve body opening portions (410, 420, and 430) formed to connect the outer circumferential wall and the inner circumferential wall of the valve body 31 to each other, and can open and close the ports in accordance with the rotation position of the valve body 31. According to the present embodiment, the axis Axn1 and the rotation axis Axr1 coincide with each other.

Figure 109:
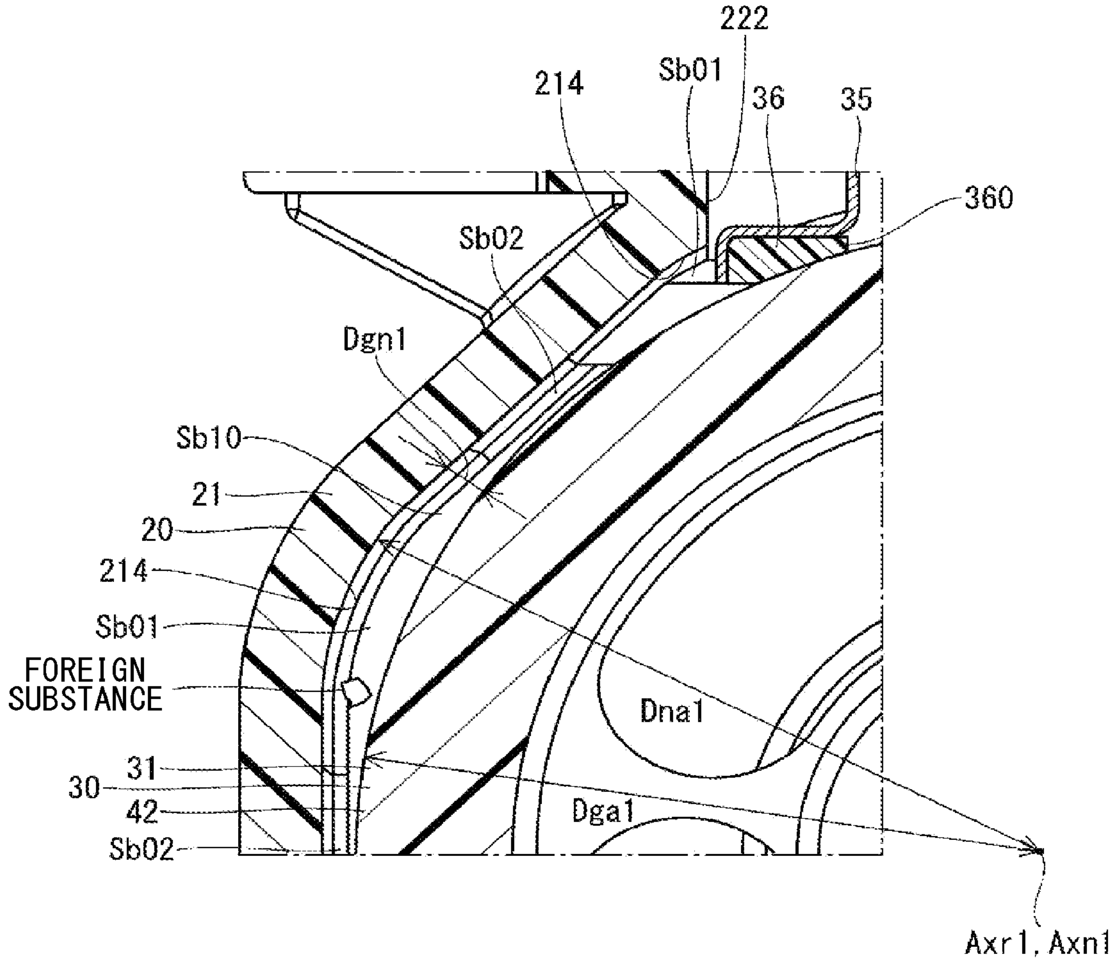
FIG. 109 is a cross-sectional view illustrating a gap between a valve body and a housing inner wall of the valve device of the fourteenth embodiment.

As illustrated in FIGS. 108 and 109, the housing inner wall 211 is formed so that the distances Dna1 from the axis Axn1 are different from each other in the circumferential direction.

Therefore, when the shape of the outer circumferential wall of the valve body 31 is circular in the cross section perpendicular to the rotation axis Axr1 of the valve body 31, distances Dgn1 between the outer circumferential wall of the valve body 31 and the housing inner wall 211 are different from each other in the circumferential direction. That is, the distance Dgn1 between the outer circumferential wall of the valve body 31 and the housing inner wall 211 is not constant in the circumferential direction. A gap Sb10 between the outer circumferential wall of the valve body 31 and the housing inner wall 211 has a large portion (gap Sb01) and a small portion (gap Sb02) in the circumferential direction (refer to FIG. 109). In this manner, even when the foreign substance in the coolant water of the internal space 200 enters the gap Sb10 between the outer circumferential wall of the valve body 31 and the housing inner wall 211, the valve body 31 is rotated so that the foreign substance moves to the large gap Sb01. Accordingly, the foreign substance can be easily discharged from the gap Sb01. Therefore, it is possible to prevent an operation failure of the valve body 31 which is caused by the foreign substance continuously accumulated in the gap Sb10 between the outer circumferential wall of the valve body 31 and the housing inner wall 211. In addition, it is possible to prevent an increase in load torques relating to the driving of the valve body 31, and an increase in pressure loss resistance.

<10-2>

As illustrated in FIGS. 108 and 109, the valve body 31 is formed so that a distance Dga1 from the rotation axis Axr1 to the outer circumferential wall is the same in the circumferential direction. That is, the outer circumferential wall of the valve body 31 is formed to be circular in the cross section perpendicular to the rotation axis Axr1.

Therefore, as described above, the distances Dgn1 between the outer circumferential wall of the valve body 31 and the housing inner wall 211 are different from each other in the circumferential direction. The gap Sb10 between the outer circumferential wall of the valve body 31 and the housing inner wall 211 has the large portion (gap Sb01) and the small portion (gap Sb02) in the circumferential direction. Therefore, it is possible to prevent an operation failure of the valve body 31 which is caused by the foreign substance continuously accumulated in the gap Sb10 between the outer circumferential wall of the valve body 31 and the housing inner wall 211.

<10-3>

As illustrated in FIG. 108, the housing inner wall 211 is formed to be non-perfect circular in the cross section perpendicular to the axis Axn1.

Therefore, the gap Sb10 between the outer circumferential wall of the valve body 31 and the housing inner wall 211 has the large portion (gap Sb01) and the small portion (gap Sb02) in the circumferential direction.

<10-4>

As illustrated in FIG. 108, the housing inner wall 211 is formed to be polygon in the cross section perpendicular to the axis Axn1.

Therefore, while the body size of the housing main body 21 in the radial direction is reduced by forming the cross section of the housing inner wall 211 in an approximately circular shape, the large portion (gap Sb01) and the small portion (gap Sb02) in the circumferential direction can be formed in the gap Sb10 between the outer circumferential wall of the valve body 31 and the housing inner wall 211.

According to the present embodiment, the housing inner wall 211 is formed to be octagon in the cross section perpendicular to the axis Axn1. In addition, a corner portion 214 which is a connection portion of respective sides of the housing inner wall 211 having the octagonal cross section has a smoothly curved shape (refer to FIGS. 108 and 109).

Therefore, it is possible to further reduce the body size of the housing main body 21 in the radial direction. In addition, it is possible to prevent a possibility that the foreign substance may be accumulated in the corner portion 214 of the housing inner wall 211.

<10-5>

As illustrated in FIG. 67, in "a cross section including the portion having the largest outer diameter of the valve body 31 and perpendicular to the axis Axn1 of the housing inner wall 211 (for example, a cross section taken along a plane indicated by Pd1 in FIG. 67)", the distances Dgn1 between the outer circumferential wall of the valve body 31 and the housing inner wall 211 are different from each other in the circumferential direction.

Therefore, in the "portion having the largest outer diameter of the valve body 31" greatly affected by of the foreign substance, the foreign substance can be discharged from the gap Sb10 between the outer circumferential wall of the valve body 31 and the housing inner wall 211.

<10-6>

As illustrated in FIG. 67, in "a cross section including a portion other than the portion where the ports (220, 221, 222, and 223) are open on the housing inner wall 211 and a portion other than the portion having the valve body opening portions (410, 420, and 430) of the valve body 31, and perpendicular to the axis Axn1 of the housing inner wall 211 (for example, a cross section taken along a plane indicated by Pd2 in FIG. 67)", the distances Dgn1 between the outer circumferential wall of the valve body 31 and the housing inner wall 211 are different from each other in the circumferential direction.

Therefore, the foreign substance can be discharged from the gap Sb10 in the "a portion of the gap Sb10 closed over the entire region in the circumferential direction of the valve body 31" which is greatly affected by the foreign substance.

<10-7>

Figure 68:
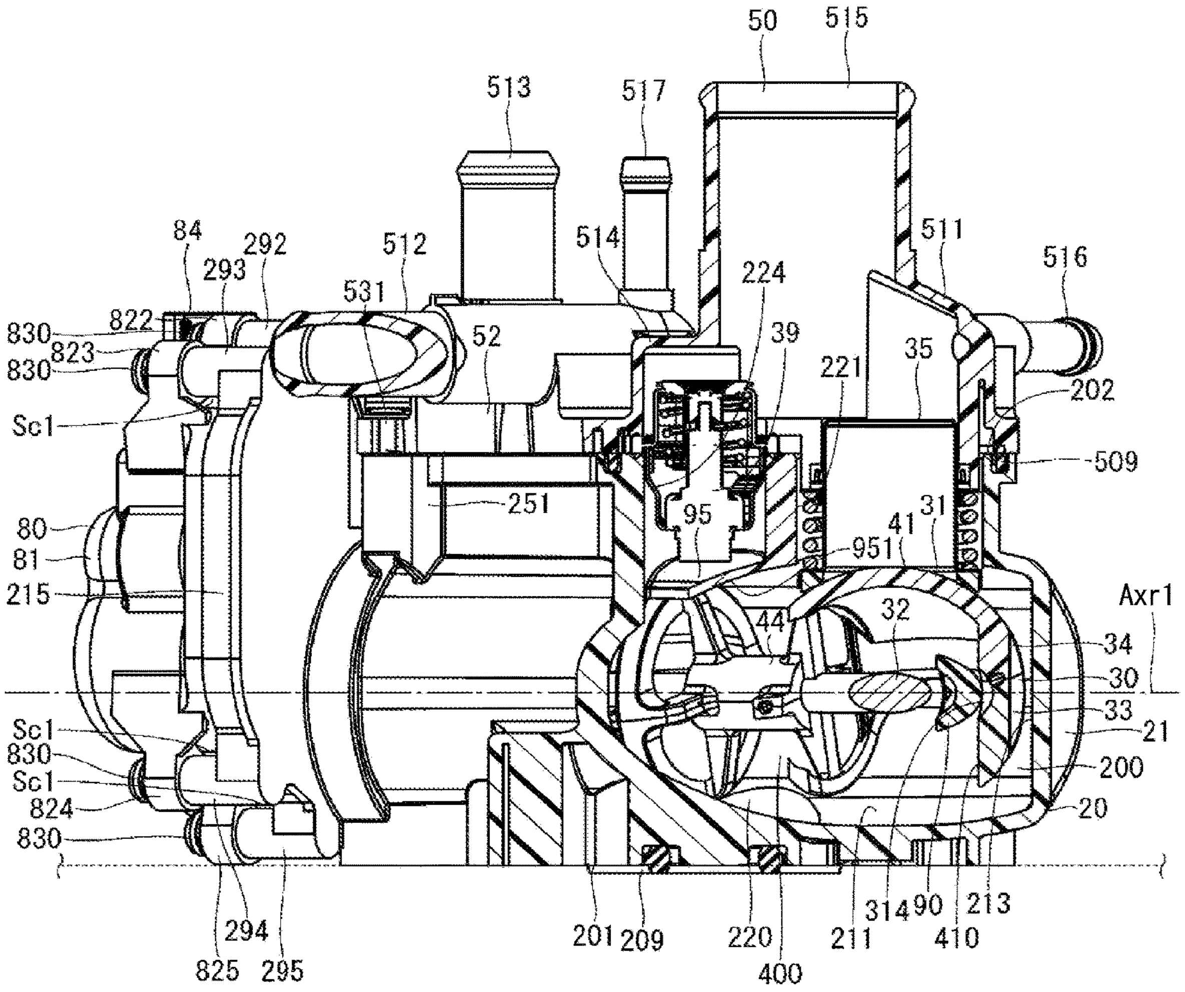
FIG. 68 is a cross-sectional view taken along line LXVIII-LXVIII in FIG. 64.

As illustrated in FIG. 68, the housing 20 has the relief port 224 which is open on the housing inner wall 211 and connects the internal space 200 and the outside of the housing main body 21 to each other.

The present embodiment further includes the relief valve 39. The relief valve 39 is provided in the relief port 224, and opens and closes the relief port 224 in response to conditions.

In a situation where the foreign substance cannot be removed along the flow of the coolant water, the foreign substance is accumulated in the internal space 200. When the relief valve 39 is opened, the foreign substance is caught therein, thereby causing a possibility that the relief valve 39 may remain in an open state.

Therefore, according to the present embodiment, the housing inner wall 211 is formed so that the distances Dna1 from the axis Axn1 are different from each other in the circumferential direction. In this manner, the distances Dgn1 between the outer circumferential wall of the valve body 31 and the housing inner wall 211 is set to be different from each other in the circumferential direction. Accordingly, the foreign substance can be easily discharged from the gap Sb10 between the outer circumferential wall of the valve body 31 and the housing inner wall 211. In this manner, it is possible to prevent a possibility that the foreign substance may be caught in the relief valve 39 and the relief valve 39 may remain in the open state.

<10-8>

As illustrated in FIG. 67, the present embodiment further includes the valve seal 36. The valve seal 36 is formed in an annular shape, is provided at a position corresponding to the ports (221, 222, and 223) to be slidable with the outer circumferential wall of the valve body 31, and can hold the portion with the outer circumferential wall of the valve body 31 in a liquid-tight manner.

In "the cross section Including the valve seal 36 and perpendicular to the axis Axn1 of the housing inner wall 211 (for example, the cross section taken along a plane indicated by Pd1 in FIG. 67)", the distances Dgn1 between the outer circumferential wall of the valve body 31 and the housing inner wall 211 are different from each other in the circumferential direction.

Therefore, it is possible to remove the foreign substance from the periphery of the valve seal 36 in the gap Sb10 between the outer circumferential wall of the valve body 31 and the housing inner wall 211. In this manner, it is possible to prevent damage to the outer circumferential wall of the valve body 31 which is caused by the foreign substance caught in between the outer circumferential wall of the valve body 31 and the valve seal 36.

<10-9>

As illustrated in FIG. 67, the housing 20 has the housing opening portion 210 whose inner peripheral surface is connected to the end portion in the direction of the axis Axn1 of the housing inner wall 211 and which connects the internal space 200 and the outside of the housing main body 21 to each other.

The valve 30 has the shaft 32 provided on the rotation axis Axr1.

The partition wall portion 60 has the partition wall portion main body 61 provided in the housing opening portion 210 to partition the internal space 200 and the outside of the housing main body 21 from each other, and the shaft insertion hole 62 formed in the partition wall portion main body 61 so that one end of the shaft 32 can be inserted.

The drive unit 70 is provided on the side opposite to the internal space 200 with respect to the partition wall portion main body 61, and can drive the valve body 31 to rotate via one end of the shaft 32.

The annular seal member 600 is provided between the housing opening portion 210 and the partition wall portion main body 61, and can hold the portion between the housing opening portion 210 and the partition wall portion main body 61 in a liquid-tight manner.

The inner peripheral surface of the housing opening portion 210 is formed in a cylindrical shape.

In this way, while the housing inner wall 211 is formed to have a non-perfect circular cross section, the inner peripheral surface of the housing opening portion 210 is formed in a cylindrical shape. In this manner, while the foreign substance is easily removed from the gap Sb10 between the outer circumferential wall of the valve body 31 and the housing inner wall 211, the sealing property between the housing opening portion 210 and the partition wall portion main body 61 can be ensured.

According to the present embodiment, the valve body 31 includes the ball valves 41, 42, and 43 whose inner circumferential wall and outer circumferential wall have a spherical shape. In contrast, in another embodiment, the valve body 31 may be formed in a cylindrical shape, for example. Even in this case, the housing inner wall 211 is formed as described above. In this manner, the foreign substance can be easily removed from the gap Sb10 between the outer circumferential wall of the valve body 31 and the housing inner wall 211.

<11-1> Relief Valve Covering portion

According to the present embodiment, there is provided the valve device 10 capable of controlling the coolant water of the engine 2 of the vehicle 1. The valve device 10 includes the housing 20, the valve 30, the relief valve 39, and a covering portion 95.

The housing 20 has the housing main body 21 which internally forms the internal space 200, the inlet port 220 which connects the internal space 200 and the outside of the housing main body 21 to each other and into which the coolant water flows, and the relief port 224 which connects the internal space 200 and the outside of the housing main body 21 to each other.

The valve 30 has the valve body 31 rotatable around the rotation axis Axr1 inside the internal space 200, and the shaft 32 provided on the rotation axis Axr1.

The relief valve 39 is provided in the relief port 224, is opened or closed in response to conditions, and allows or blocks the communication between the internal space 200 and the outside of the housing main body 21 via the relief port 224.

Here, for example, a valve opening condition of the relief valve 39 includes "when the ambient temperature is equal to or higher than a predetermined temperature". For example, the relief valve 39 is opened when the temperature of the coolant water is equal to or higher than the predetermined temperature, allows the communication between the internal space 200 and the outside of the housing main body 21, that is, the internal space of the pipe portion 515 via the relief port 224, and blocks the communication when the temperature of the coolant water is lower than the predetermined temperature. In this manner, when the temperature of the coolant water is excessively raised, such as when the vehicle 1 is overheated, the coolant water can flow from the internal space 200 to the external radiator 5 to cool the coolant water.

Figure 112:
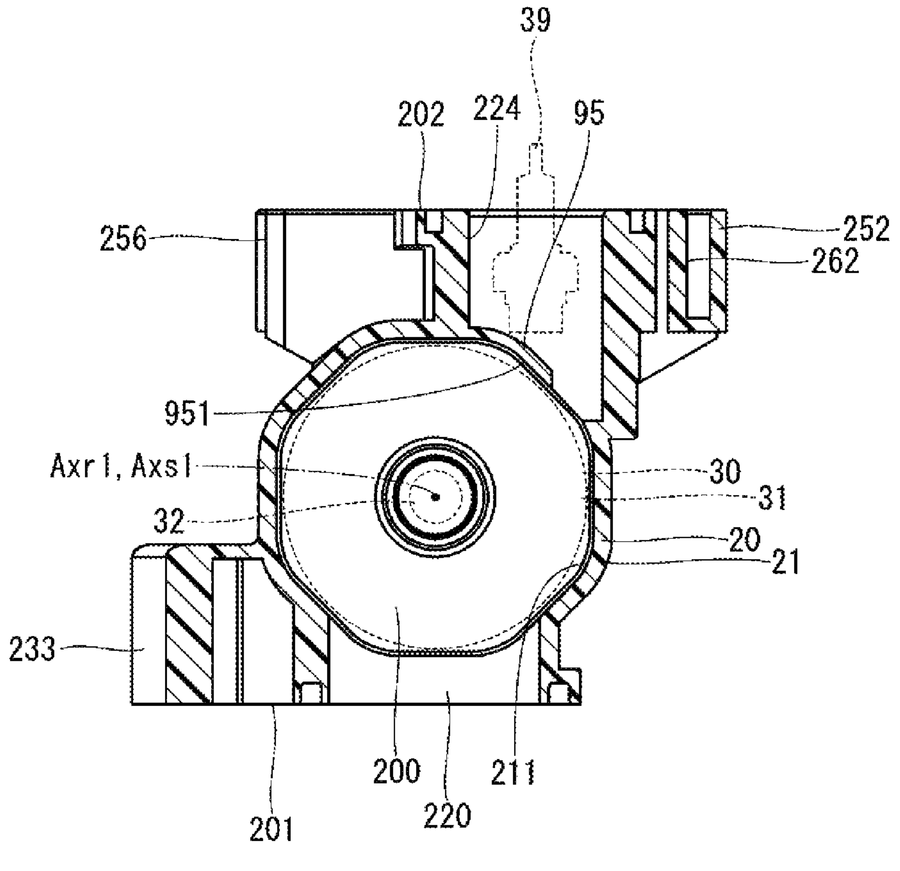
FIG. 112 is a cross-sectional view taken along line CXII-CXII in FIG. 64.

As illustrated in FIG. 112, the covering portion 95 can block the relief valve 39 so that the relief valve 39 is not visible from the inlet port 220. More specifically, when viewed in the axial direction of the inlet port 220, the relief valve 39 is covered by the covering portion 95, and the whole relief valve 39 is not visible.

Therefore, it is possible to prevent a possibility that the coolant water may flow into the internal space 200 from the inlet port 220 and may directly hit the relief valve 39. In this manner, when the coolant water having the high temperature instantaneously flows into the relief valve 39, or even when the coolant water having the high temperature locally flows into the relief valve 39, it is possible to prevent a possibility that the relief valve 39 may be opened due to a malfunction resulting from erroneous recognition that the relief valve 39 is overheated. Therefore, the relief valve 39 can properly prevent a possibility that the vehicle 1 may be overheated.

<11-2>

As illustrated in FIG. 112, the covering portion 95 is provided in the housing main body 21 at a position between the relief port 224 and the shaft 32.

Therefore, the covering portion 95 can be disposed close to the relief valve 39, and it is possible to more effectively prevent a possibility that the coolant water may directly hit the relief valve 39.

<11-4>

Figure 110:
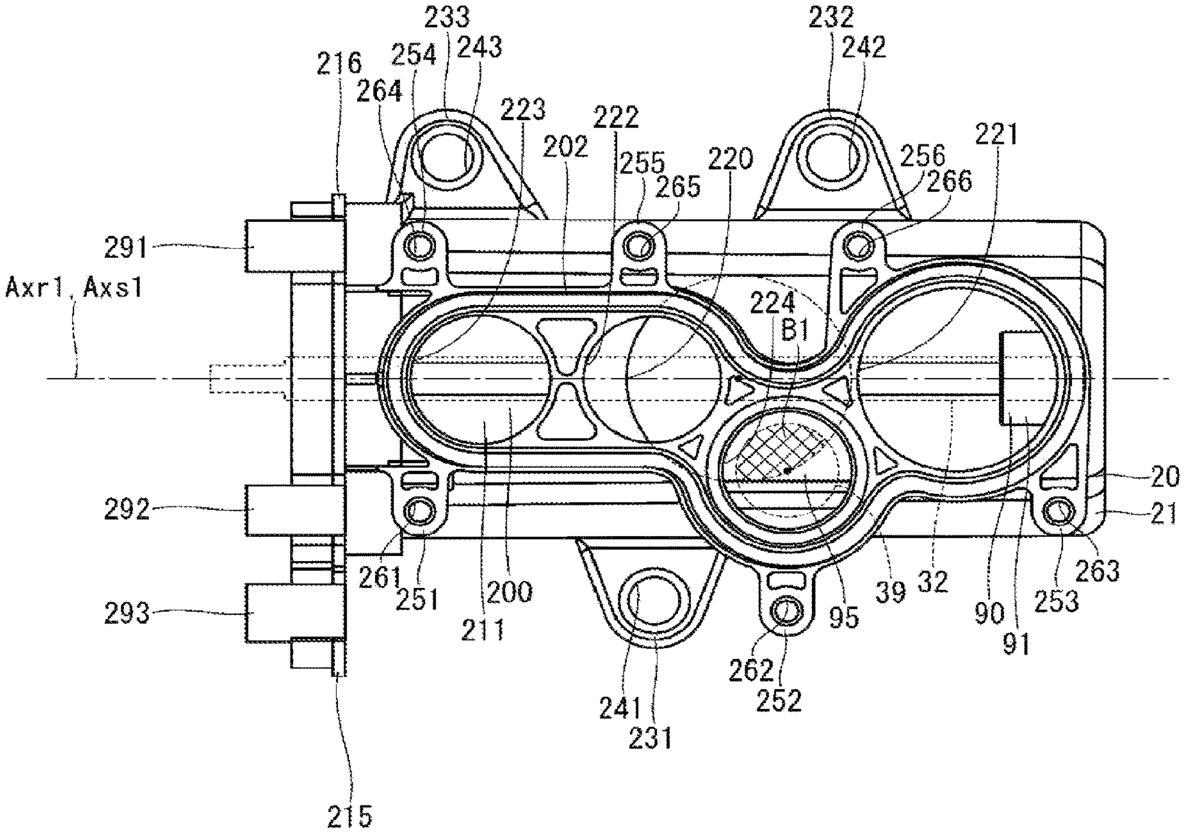
FIG. 110 is a view illustrating a housing of the valve device of the fourteenth embodiment.
Figure 111:
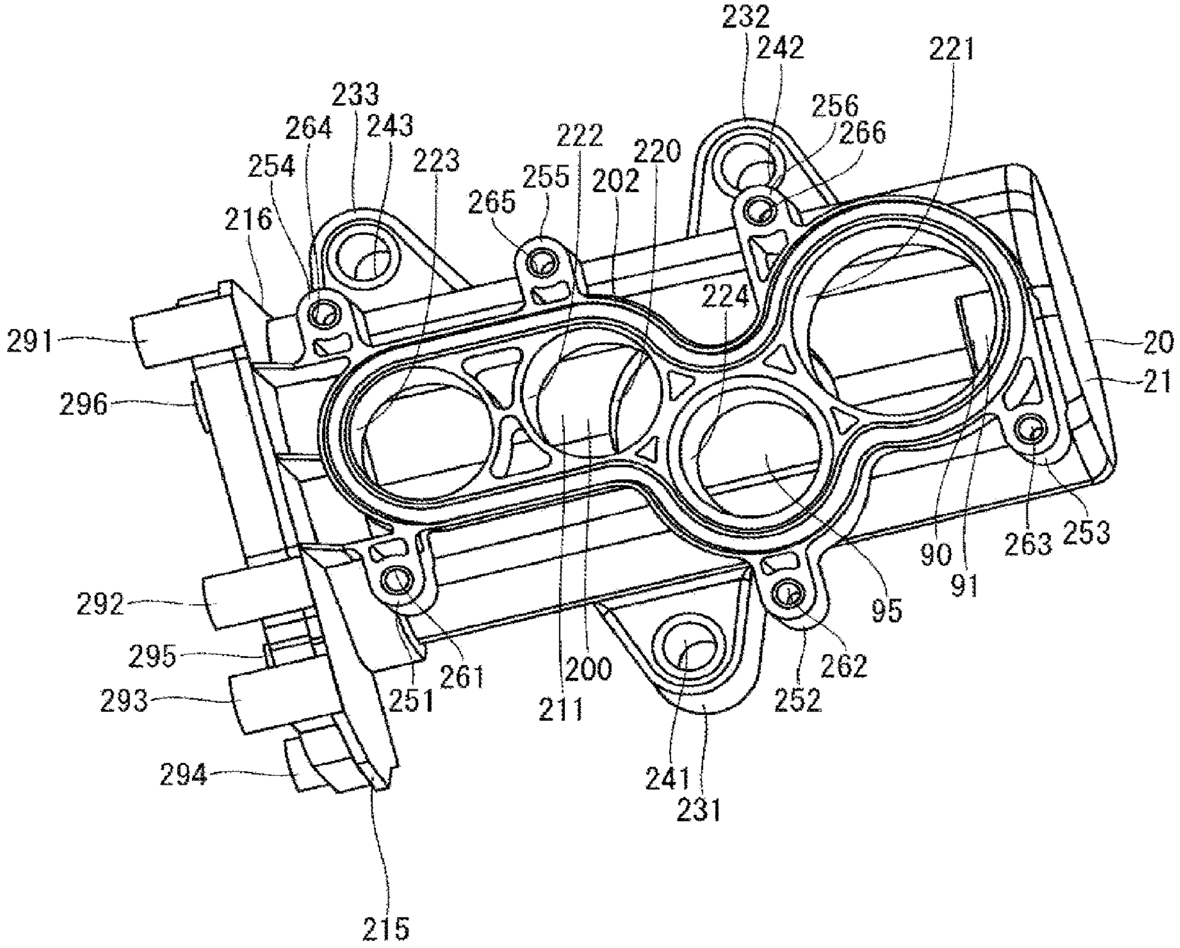
FIG. 111 is a perspective view illustrating the housing of the valve device of the fourteenth embodiment.

As illustrated in FIGS. 110 and 112, a projected area of the covering portion 95 is equal to or larger than an overlapped area of an overlapping portion B1 (portion illustrated by a grid in FIG. 110) between a projected area of the projected inlet port 220 and a projected area of the projected relief valve 39, when the inlet port 220, the relief valve 39, and the covering portion 95 are projected in the axial direction of the relief port 224 or in the axial direction of the inlet port 220.

Therefore, while the coolant water is reliably prevented from directly hitting the relief valve 39, it is possible to ensure water flow capability without squeezing the flow channel area more than necessary.

<11-5>

As illustrated in FIG. 112, a surface 951 of the covering portion 95 facing the valve 30 is formed in a shape conforming to a shape of the housing inner wall 211 which is the inner wall of the housing main body 21 forming the internal space 200.

Therefore, it is possible to prevent a possibility that the covering portion 95 may cause turbulence in the fluid flow inside the internal space 200. In addition, stress concentration on the covering portion 95 can be prevented, and durability of the housing main body 21 can be improved.

<11-6>

As illustrated in FIG. 112, the covering portion 95 is formed in a plate shape, and has a constant thickness.

Therefore, stress concentration on the covering portion 95 can be prevented, and durability of the housing main body 21 can be improved.

According to the present embodiment, the relief valve 39 is opened "when the ambient temperature is equal to or higher than the predetermined temperature". In contrast, in another embodiment, the relief valve 39 may be opened "when a pressure is equal to or higher than a predetermined pressure". Alternatively, the relief valve 39 may be opened "when the ambient temperature is equal to or higher than the predetermined temperature" and "when the pressure is equal to or higher than the predetermined pressure". Even in this case, the covering portion 95 prevents a possibility that the coolant water may directly hit the relief valve 39. In this manner, it is possible to prevent the malfunction of the relief valve 39.

Fifteenth Embodiment

A valve device according to a fifteenth embodiment will be described with reference to FIGS. 113 and 114. The fifteenth embodiment is different from the fourteenth embodiment in a configuration of the valve body 31.

According to the present embodiment, a forming position and a size of the valve body opening portions 410, 420, and 430 in the circumferential direction of the valve body 31 are different from those in the fourteenth embodiment.

According to the present embodiment, the alignment direction and the shape of the ball valve 41, the cylindrical connection portion 44, the ball valve 42, the cylindrical valve connection portion 45, and the ball valve 43 are the same as those in the fourteenth embodiment (refer to FIGS. 90 to 102). In addition, according to the present embodiment, the valve body opening portion 410 has the large opening portion 412 and the extension opening portion 413 as in the fourteenth embodiment (refer to FIGS. 93 and 94).

<12-1> Flow Diagram

According to the present embodiment, there is provided the valve device 10 capable of controlling the coolant water of the engine 2 of the vehicle 1. The valve device 10 includes the housing 20, the valve 30, the drive unit 70, and the ECU 8 as a control unit.

The housing 20 has the internal space 200, the outlet port 221 as a radiator port connected to the internal space 200 and connected to the radiator 5 of the vehicle 1, the outlet port 222 as a heater port connected to the internal space 200 and connected to the heater 6 of the vehicle 1, and the outlet port 223 as a device port connected to the internal space 200 and connected to the device 7 of the vehicle 1. Hereinafter, for simple description, the outlet ports 221, 222, and 223 are appropriately read as the radiator port 221, the heater port 222, and the device port 223, respectively.

The valve 30 has the valve body 31 rotatable around the rotation axis Axr1 inside the internal space 200, and can open and close the radiator port 221, the heater port 222, or the device port 223 in accordance with the rotation position of the valve body 31.

The drive unit 70 can drive the valve body 31 to rotate.

The ECU 8 controls an operation of the drive unit 70 to control the rotational drive of the valve body 31. In this manner, the ECU 8 can control the flow of the coolant water between the radiator port 221 and the radiator 5, between the heater port 222 and the heater 6, and between the device port 223 and the device 7.

Figure 113:
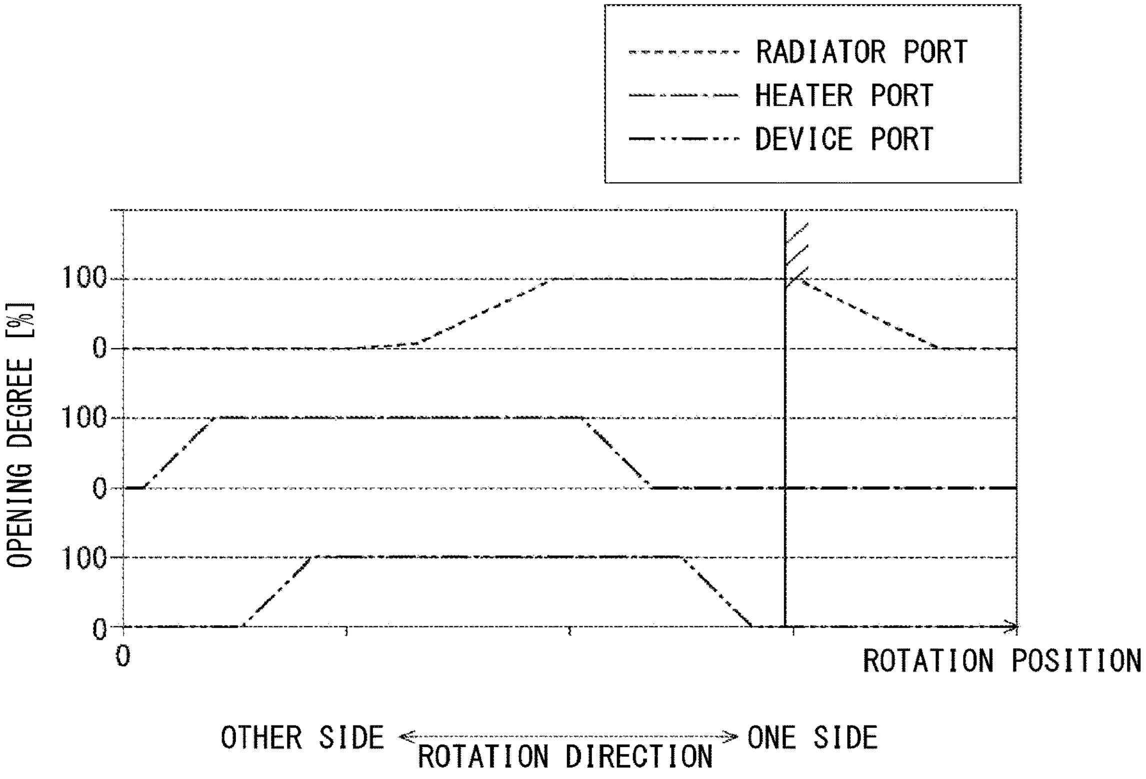
FIG. 113 is a view illustrating a relationship between a rotation position of a valve body and an opening degree of a port of a valve device of a fifteenth embodiment.
Figure 114:
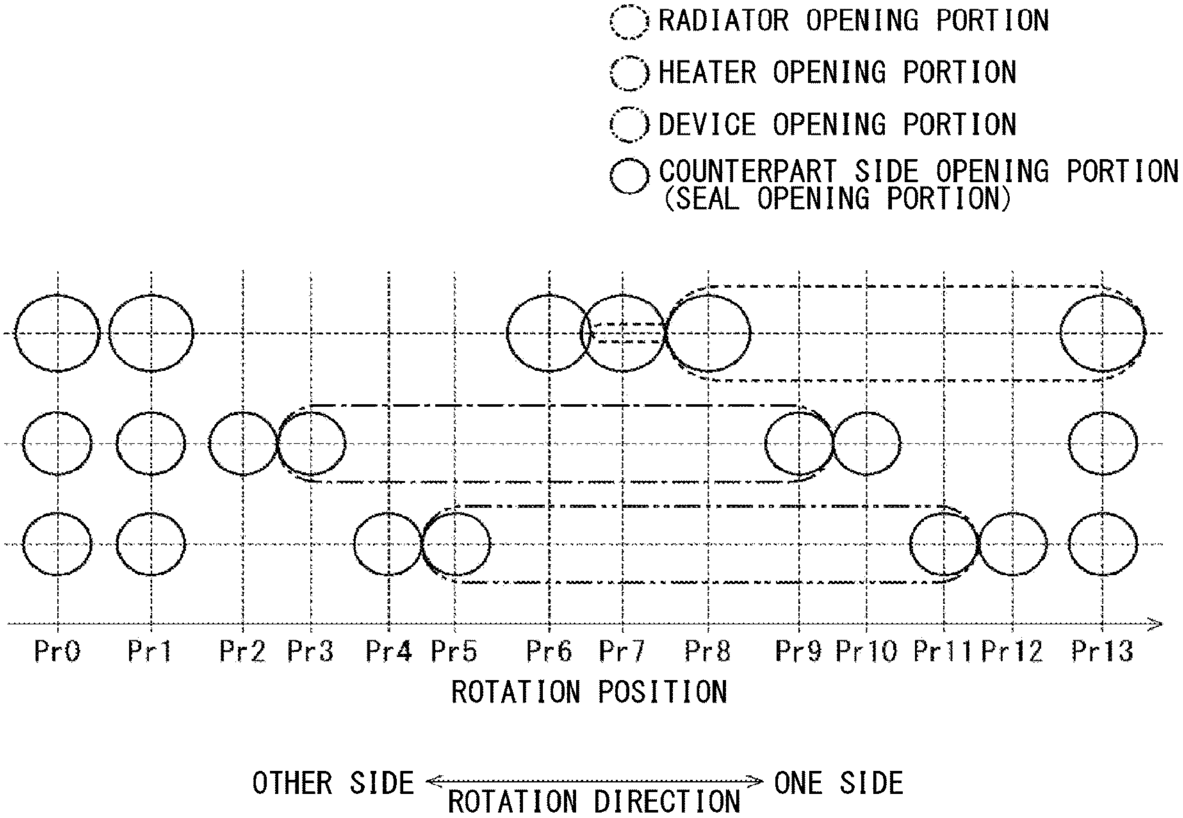
FIG. 114 is a view illustrating a relationship between a rotation position of the valve body and an overlapping ratio of a valve body opening portion and the port in the valve device of the fifteenth embodiment.

As illustrated in FIGS. 113 and 114, in accordance with the rotational drive of the valve body 31 rotating to one side in the rotation direction, after all opening degrees of the radiator port 221, the heater port 222, and the device port 223 reach a predetermined opening degree which is higher than 0, the ECU 8 closes the heater port 222 and the device port 223. In this way, the ECU 8 can control the drive unit 70 and the valve body 31 so that the opening degree of only the radiator port 221 reaches the predetermined opening degree.

Therefore, the predetermined opening is set to the opening degree to such an extent that cooling efficiency of the engine 2 can be improved. The drive unit 70 and the valve body 31 are controlled so that the opening degree of only the radiator port 221 reaches the predetermined opening degree. In this manner, it is possible to maximize the cooling efficiency when a high load is applied to the engine 2.

<12-2>

As illustrated in FIGS. 113 and 114, in accordance with the rotational drive of the valve body 31 rotating to one side in the rotation direction, after all opening degrees of the radiator port 221, the heater port 222, and the device port 223 reach the predetermined opening degree, the ECU 8 can control the drive unit 70 and the valve body 31 so that the heater port 222 and the device port 223 are closed in the order of the heater port 222 and the device port 223.

Therefore, the heat exchange from the heater 6 can be immediately blocked, and the cooling efficiency of the engine 2 can be improved.

<12-9>

The predetermined opening degree is set to 60% or more.

Therefore, the drive unit 70 and the valve body 31 are controlled so that the opening degree of only the radiator port 221 reaches the predetermined opening degree. In this manner, it is possible to properly maximize the cooling efficiency when the high load is applied to the engine 2.

According to the present embodiment, in order to improve the cooling efficiency of the engine 2 to the maximum, the predetermined opening degree is set to 100%.

Therefore, the drive unit 70 and the valve body 31 are controlled so that the opening degree of only the radiator port 221 reaches the predetermined opening degree. In this manner, it is possible to improve the cooling efficiency to the maximum when the high load is applied to the engine 2.

<12-10>

In the valve body 31, the outer circumferential wall and the inner circumferential wall are formed in a spherical shape (refer to FIG. 67).

The valve 30 has the valve body internal flow channel 300 formed inside the inner circumferential wall of the valve body 31, the valve body opening portion 410 as the radiator opening portion formed to connect the outer circumferential wall and the inner circumferential wall of the valve body 31 to each other, and whose radiator overlapping ratio which is a ratio of overlapping the radiator port 221 is changed in accordance with the rotation position of the valve body 31, the valve body opening portion 420 as the heater opening portion formed to connect the outer circumferential wall and the inner circumferential wall of the valve body 31 to each other, and whose heater overlapping ratio which is a ratio of overlapping the heater port 222 is changed in accordance with the rotation position of the valve body 31, and the valve body opening portion 430 as the device opening portion formed to connect the outer circumferential wall and the inner circumferential wall of the valve body 31 to each other, and whose device overlapping ratio which is a ratio of overlapping the device port 223 is changed in accordance with the rotation position of the valve body 31. Hereinafter, for simple description, the valve body opening portions 410, 420, and 430 are appropriately read as the radiator opening portions 410, the heater opening portion 420, and the device opening portion 430, respectively.

In this manner, the present embodiment can be realized by a rotary valve which is the valve body 31 having spherical outer circumferential wall and inner circumferential wall.

Here, more specifically, the radiator overlapping ratio is a ratio of an overlapping area between the seal opening portion 360 and the radiator opening portion 410 with respect to a maximum value of the overlapping area between the seal opening portion 360 of the valve seal 36 of the seal unit 35 provided in the radiator port 221 and the radiator opening portion 410, and corresponds to the opening degree of the radiator port 221.

More specifically, the heater overlapping ratio is a ratio of an overlapping area between the seal opening portion 360 and the heater opening portion 420 with respect to a maximum value of the overlapping area between the seal opening portion 360 of the valve seal 36 of the seal unit 35 provided in the heater port 222 and the heater opening portion 420, and corresponds to the opening degree of the heater port 222.

More specifically, the device overlapping ratio is a ratio of an overlapping area between the seal opening portion 360 and the device opening portion 430 with respect to a maximum value of the overlapping area between the seal opening portion 360 of the valve seal 36 of the seal unit 35 provided in the device port 223 and the device opening portion 430, and corresponds to the opening degree of the device port 223.

<12-11>

When the radiator overlapping ratio is higher than 0, the radiator port 221 is opened, and the valve body internal flow channel 300 and the radiator 5 communicate with each other via the radiator opening portion 410 and the radiator port 221. In this manner, at this time, the coolant water flows to the radiator 5 side from the valve body internal flow channel 300.

When the heater overlapping ratio is higher than 0, the heater port 222 is opened, and the valve body internal flow channel 300 and the heater 6 communicate with each other via the heater opening portion 420 and the heater port 222. In this manner, at this time, the coolant water flows to the heater 6 side from the valve body internal flow channel 300.

When the device overlapping ratio is higher than 0, the device port 223 is opened, and the valve body internal flow channel 300 and the device 7 communicate with each other via the device opening portion 430 and the device port 223. In this manner, at this time, the coolant water flows to the device 7 side from the valve body internal flow channel 300.

Next, a flow diagram of the coolant water in the valve device 10 of the present embodiment will be described in detail with reference to FIGS. 113 and 114.

As illustrated in FIGS. 113 and 114, when the rotation position of the valve body 31 is a reference position 0 (degree) (at the time of a rotation position Pr0 in FIG. 114), that is, when one of the first restriction projection portion 332 and the second restriction projection portion 342 comes into contact with the restriction portion 631 to restrict the rotation of the valve body 31, all opening degrees of the radiator port 221, the heater port 222, and the device port 223 are 0% (fully closed). Hereinafter, when described as Pr0 to 13, the description means rotation positions Pr0 to 13 in FIG. 114.

When the ECU 8 controls the drive unit 70 so that the valve body 31 is driven to rotate to one side in the rotation direction, and the rotation position of the valve body 31 increases from 0, the opening degree of the heater port 222 increases at a predetermined ratio from 0(%) between Pr2 and Pr3. In this manner, the amount of the coolant water corresponding to the opening degree of the heater port 222 flows to the heater 6 side. The opening degree of the heater port 222 reaches 100% (fully opened: the predetermined opening degree) at Pr3.

When the valve body 31 is further driven to rotate to one side in the rotation direction, the opening degree of the device port 223 increases at a predetermined ratio from 0(%) between Pr4 and Pr5. In this manner, the amount of the coolant water corresponding to the opening degree of the device port 223 flows to the device 7 side. The opening degree of the device port 223 reaches 100% (fully opened: the predetermined opening degree) at Pr5.

Here, an increase ratio in the opening degree of the heater port 222 between Pr2 and Pr3 per unit rotation angle of the valve body 31 is the same as an increase ratio in the opening degree of the device port 223 between Pr4 and Pr5 (refer to FIGS. 113 and 114).

When the valve body 31 is further driven to rotate to one side in the rotation direction, the opening degree of the radiator port 221 increases at a predetermined ratio from 0(%) between Pr6 and Pr7. In this manner, the amount of the coolant water corresponding to the opening degree of the radiator port 221 flows to the radiator 5 side.

When the valve body 31 is further driven to rotate to one side in the rotation direction, the opening degree of the radiator port 221 further increases at a predetermined ratio between Pr7 and Pr8. The opening degree of the radiator port 221 reaches 100% (fully opened: the predetermined opening degree) at Pr8. Therefore, at Pr8, all opening degrees of the radiator port 221, the heater port 222, and the device port 223 reach the predetermined opening degree, that is, 100%.

Here, an increase ratio in the opening degree of the radiator port 221 between Pr6 and Pr7 per unit rotation angle of the valve body 31 is lower than an increase ratio in the opening degree of the radiator port 221 between Pr7 and Pr8 (refer to FIGS. 113 and 114). The reason is that the radiator opening portion 410 is formed by the extension opening portion 413 and the large opening portion 412 (refer to FIGS. 93 and 94). That is, the increase ratio in the opening degree of the radiator port 221 is lower when the extension opening portion 413 and the seal opening portion 360 overlap each other, and is lower when the large opening portion 412 and the seal opening portion 360 overlap each other.

Therefore, at an initial valve opening stage of the radiator port 221, the flow rate of the coolant water flowing to the radiator 5 can be gradually increased. In this manner, it is possible to prevent a rapid temperature change in the coolant water which is caused by the heat exchange in the radiator 5.

The increase ratio in the opening degree of the radiator port 221 between Pr6 and Pr7 per unit rotation angle of the valve body 31 and the increase ratio in the opening degree of the radiator port 221 between Pr7 and Pr8 is lower than the increase ratio in the opening degree of the heater port 222 between Pr2 and Pr3 and the increase ratio in the opening degree of the device port 223 between Pr4 and Pr5 (refer to FIGS. 113 and 114).

Therefore, a change in the flow rate of the coolant water flowing to the radiator 5 at the initial valve opening stage can be gentler than a change in the flow rate of the coolant water flowing to the heater 6 and the device 7. In this manner, it is possible to prevent a rapid temperature change in the coolant water which is caused by the heat exchange in the radiator 5.

When the valve body 31 is further driven to rotate to one side in the rotation direction, the opening degree of the heater port 222 decreases at a predetermined ratio from 100% between Pr9 and Pr10. In this manner, the amount of the coolant water flowing to the heater 6 side decreases in accordance with the opening degree of the heater port 222. The opening degree of the heater port 222 is 0% at Pr10 (fully closed). In this manner, the heater port 222 is closed, the flow of the coolant water to the heater 6 side is blocked.

When the valve body 31 is further driven to rotate to one side in the rotation direction, the opening degree of the device port 223 decreases at a predetermined ratio from 100% between Pr11 and Pr12. In this manner, the amount of the coolant water flowing to the device 7 side decreases in accordance with the opening degree of the device port 223. The opening degree of the device port 223 is 0% at Pr12 (fully closed). In this manner, the device port 223 is closed, and the flow of the coolant water to the device 7 side is blocked.

Here, a decrease ratio in the opening degree of the heater port 222 between Pr9 and Pr10 per unit rotation angle of the valve body 31 is the same as a decrease ratio in the opening degree of the device port 223 between Pr11 and Pr12 (refer to FIGS. 113 and 114).

When the valve body 31 is further driven to rotate to one side in the rotation direction, at Pr13, the other one of the first restriction projection portion 332 and the second restriction projection portion 342 comes into contact with the restriction portion 631, and the rotational drive of the valve body 31 is stopped. At this time, the opening degree of the radiator port 221 remains at 100%. That is, at this time, the opening degree of only the radiator port 221 is 100% (fully opened: the predetermined opening degree).

According to the present embodiment, as described above, in accordance with the rotational drive of the valve body 31 rotating to one side in the rotation direction, the ECU 8 can control the drive unit 70 and the valve body 31 so that the heater port 222 and the device port 223 are closed at Pr10 and Pr12 and the opening degree of only the radiator port 221 reaches the predetermined opening degree (100%) at Pr13 after all opening degrees of the radiator port 221, the heater port 222, and the device port 223 reach the predetermined opening degree (100%) at Pr8.

In addition, according to the present embodiment, as described above, in accordance with the rotational drive of the valve body 31 rotating to one side in the rotation direction, after all opening degrees of the radiator port 221, the heater port 222, and the device port 223 reach the predetermined opening degree (100%) at Pr8, the ECU 8 can control the drive unit 70 and the valve body 31 so that the heater port 222 and the device port 223 are closed in the order (Pr10 and Pr12) of the heater port 222 and the device port 223.

Sixteenth Embodiment

Figure 115:
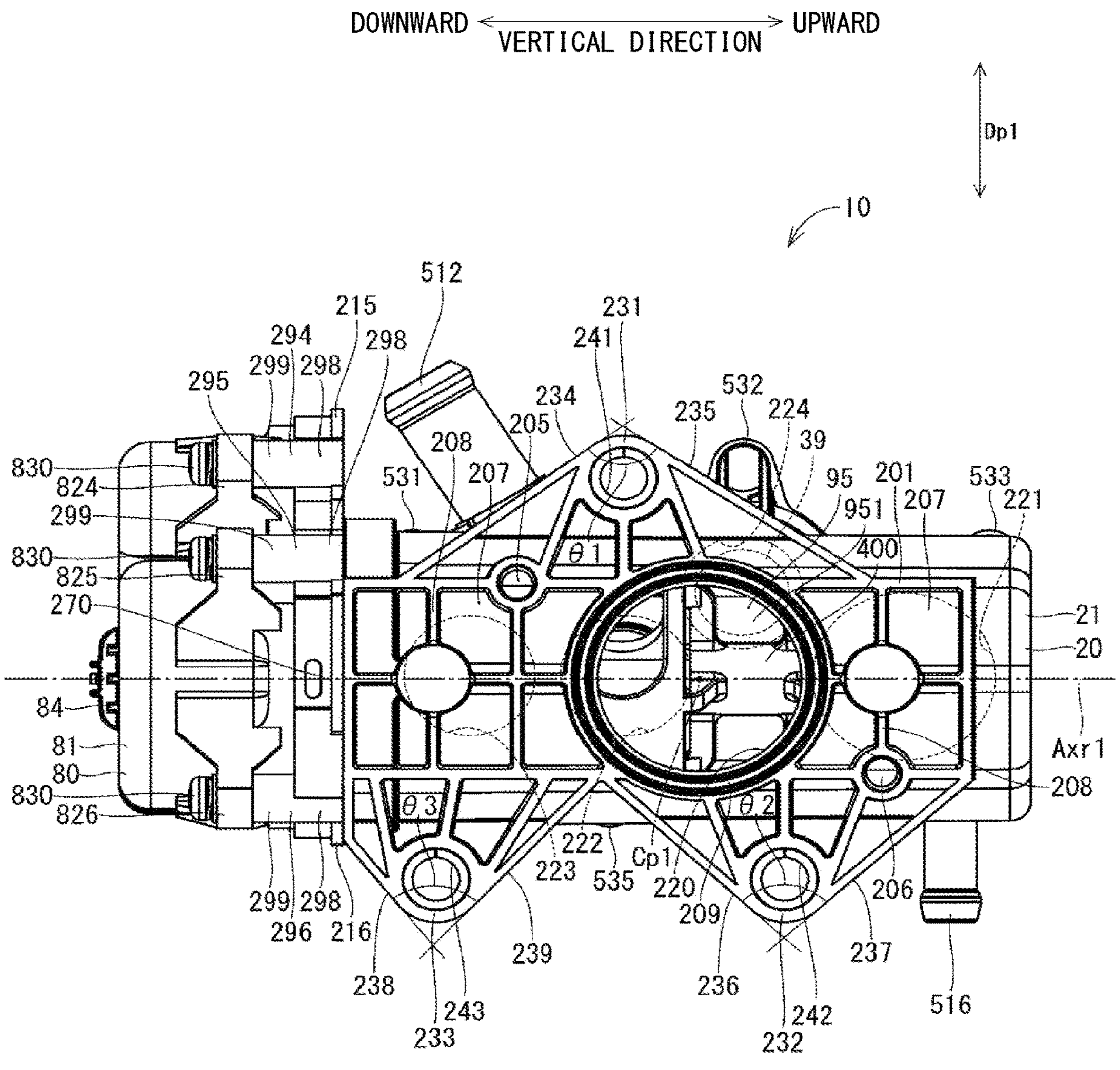
FIG. 115 is a view illustrating a valve device of a sixteenth embodiment.

A valve device according to a sixteenth embodiment is illustrated in FIG. 115. The sixteenth embodiment is different from the fourteenth embodiment in a shape of the fastening portions 231 to 233.

<1-11>

The fastening portion 231 has two outer walls (234 and 235) whose shape in a cross section taken along a plane perpendicular to the fastening hole 241 is a linear shape, and is formed so that an angle θ1 formed by the two outer walls (234 and 235) is an obtuse angle.

The fastening portion 232 has two outer walls (236 and 237) whose shape in a cross section taken along a plane perpendicular to the fastening hole 242 is a linear shape, and is formed so that an angle θ2 formed by the two outer walls (236 and 237) is an obtuse angle.

The fastening portion 233 has two outer walls (238 and 239) whose shape in a cross section taken along a plane perpendicular to the fastening hole 243 is a linear shape, and is formed so that an angle θ3 formed by the two outer walls (238 and 239) is an obtuse angle.

Therefore, the strength of the fastening portions 231 to 233 can be improved, and earthquake resistance of the valve device 10 can be improved. When in use, in the valve device 10, the coolant water flows into the internal space 200. Accordingly, the weight of the device including the coolant water is relatively heavy. Therefore, the valve device 10 can be reliably fixed in a limited mounting space (narrow space A1) by improving the strength of the fastening portions 231 to 233.

As illustrated in FIG. 115, in the direction of the rotation axis Axr1 of the valve body 31, a range in which the fastening portion 231 is formed overlaps a range in which the fastening portion 232 and the fastening portion 233 are formed.

Therefore, the housing main body 21 can be stably fixed to the engine 2.

The length of the fastening portions 231, 232, and 233 in the direction of the rotation axis Axr1 of the valve body 31 is larger than the diameter of the inlet port 220.

Therefore, the housing main body 21 can be stably fixed to the engine 2.

The length of the fastening portion 231 in the direction of the rotation axis Axr1 of the valve body 31 is longer than the length of the fastening portion 232 or the fastening portion 233 in the direction of the rotation axis Axr1 of the valve body 31.

Therefore, when the housing main body 21 is fixed to the engine 2 on the side having only one of the three fastening portions, it is possible to ensure a balance of the housing main body 21 in both rightward and leftward directions (width direction).

The center of the fastening portion 231 in the direction of the rotation axis Axr1 of the valve body 31 and the center of the fastening portion 233 in the direction of the rotation axis Axr1 of the valve body 31 are located on the drive unit 70 side from the center of the inlet port 220.

Therefore, it is possible to effectively prevent the vibrations caused by the drive unit 70.

The end portion on the drive unit 70 side of the outer wall 238 of the fastening portion 233 is located on the side opposite to the rotation axis Axr1 with respect to the end portion on the inlet port 220 side of the outer wall 239.

Therefore, it is possible to effectively prevent the vibrations caused by the drive unit 70.

The fastening portions 232 and 233 are formed over the other end from one end in the direction of the rotation axis Axr1 of the valve body 31 in a range where the attachment surface recess portion 207 is formed on the attachment surface 201.

Therefore, the housing main body 21 can be stably fixed to the engine 2.

Seventeenth Embodiment

Figure 116:
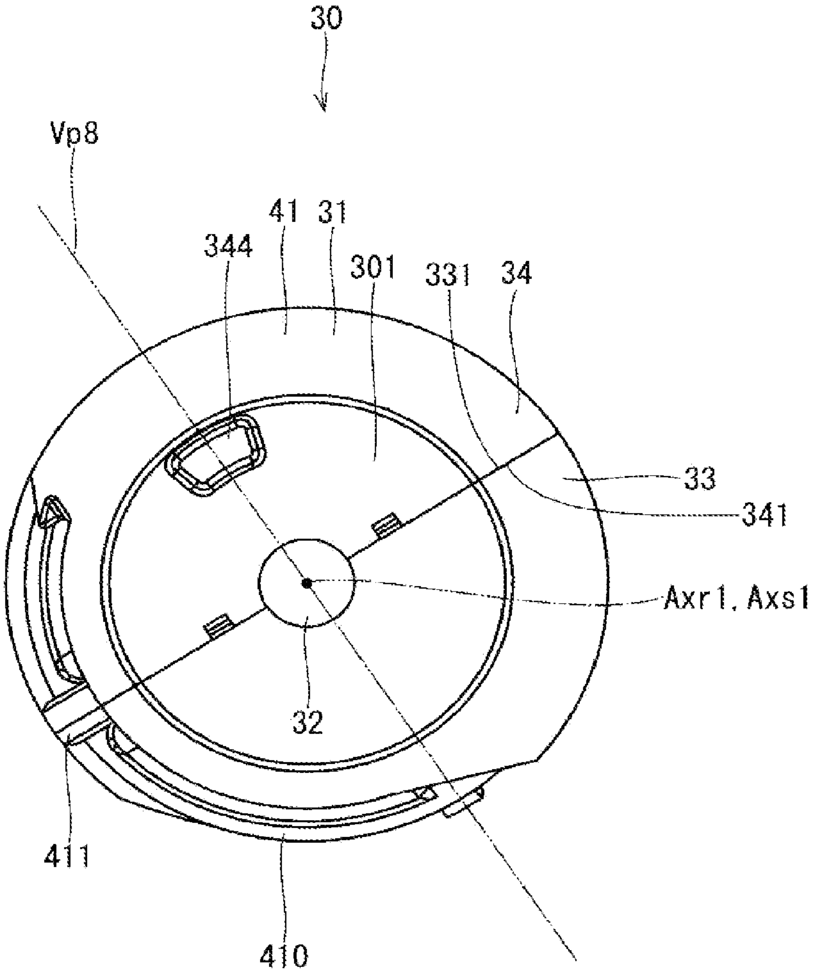
FIG. 116 is a view illustrating a valve of a valve device of a seventeenth embodiment.

A portion of a valve device according to a seventeenth embodiment is illustrated in FIG. 116. The seventeenth embodiment is different from the third embodiment in a configuration of the valve 30.

<3-30>

The partition wall portion 60 has the partition wall portion main body 61 which partitions the internal space 200 and the outside of the housing 20 from each other, the shaft insertion hole 62 formed in the partition wall portion main body 61 so that one end of the shaft 32 can be inserted, and the restriction recess portion 63 recessed to the side opposite to the internal space 200 from the surface on the internal space 200 side of the partition wall portion main body 61

The valve body 31 has the restriction projection portion 344 extending to the restriction recess portion 63 side from the first outermost end surface 301 which is the surface on the partition wall portion 60 side of the second divided body 34, the tip portion of which being located in the restriction recess portion 63.

In the third embodiment, an example has been described in which the first restriction projection portion 332 and the second restriction projection portion 342 come into contact with each other to form the restriction projection portion (refer to FIG. 23). In contrast, according to the present embodiment, as described above, one restriction projection portion 344 is formed to extend from the second divided body 34.

According to the present embodiment, when the rotation of the valve body 31 is restricted by the restriction portion 631, it is also possible to prevent a possibility that a force may act on the valve body 31 in a direction in which the first divided body 33 and the second divided body 34 are separated (peeled off) from the joint surfaces 331 and 341. Therefore, when the restriction projection portion 344 comes into contact with the restriction portion 631 of the restriction recess portion 63, it is possible to prevent a possibility that the first divided body 33 and the second divided body 34 are separated from the joint surfaces 331 and 341.

According to the present embodiment, the restriction projection portion 344 is formed on "a virtual plane Vp8 including the rotation axis Axr1 and perpendicular to the joint surfaces 331 and 341" (refer to FIG. 116).

Therefore, when the rotation of the valve body 31 is restricted by the restriction portion 631, it is possible to reliably prevent a possibility that the force may act on the valve body 31 in a direction in which the first divided body 33 and the second divided body 34 are separated from the joint surfaces 331 and 341.

Eighteenth Embodiment

Figure 117:
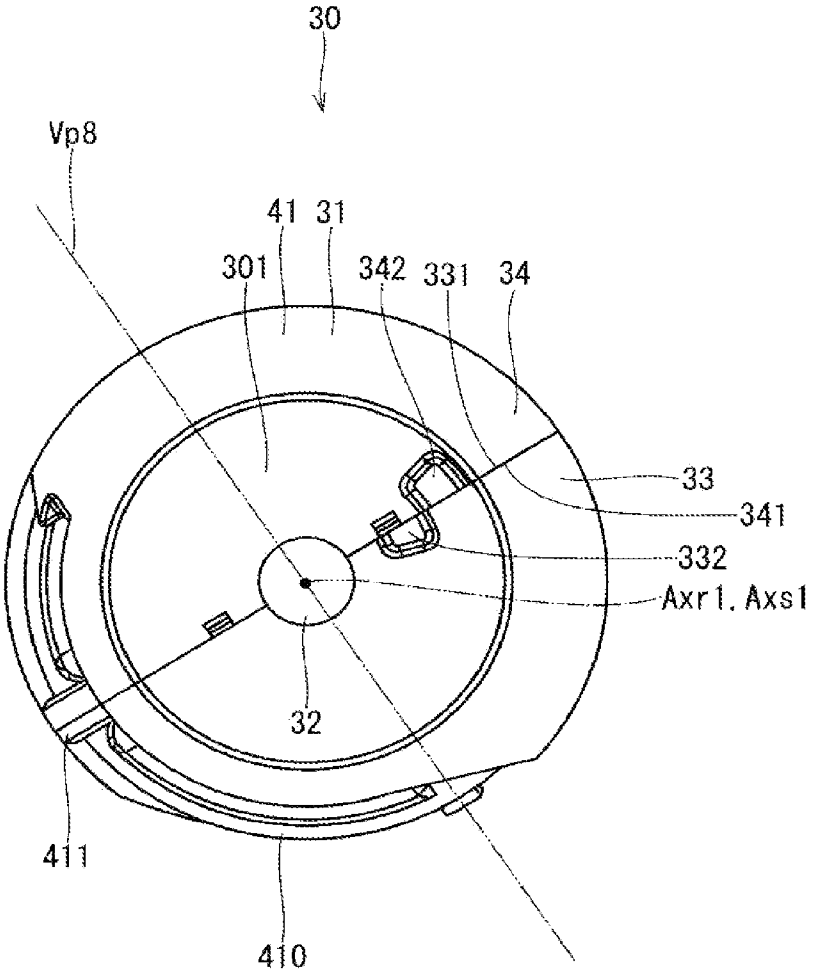
FIG. 117 is a view illustrating a valve of a valve device of an eighteenth embodiment.

A portion of a valve device according to an eighteenth embodiment is illustrated in FIG. 117. The eighteenth embodiment is different from the third embodiment in a configuration of the valve 30.

<3-31>

The first restriction projection portion 332 protrudes to the restriction recess portion 63 in the extending direction of the joint surface 331. The second restriction projection portion 342 does not come into contact with the first restriction projection portion 332, and protrudes toward the restriction recess portion 63 in the extending direction of the joint surface 341.

According to the present embodiment, as in the third embodiment, when the rotation of the valve body 31 is restricted by the restriction portion 631, the force does not in the direction in which the first divided body 33 and the second divided body 34 are separated from the joint surfaces 331 and 341. Therefore, when the first restriction projection portion 332 or the second restriction projection portion 342 comes into contact with the restriction portion 631 of the restriction recess portion 63, it is possible to prevent a possibility that the first divided body 33 and the second divided body 34 may be separated from the joint surfaces 331 and 341.

According to the present embodiment, when the valve body 31 is divided into two regions by "the virtual plane Vp8 including the rotation axis Axr1 and perpendicular to the joint surfaces 331 and 341", the first restriction projection portion 332 and the second restriction projection portion 342 are formed on one side of the two regions (refer to FIG. 117).

Therefore, when the rotation of the valve body 31 is restricted by the restriction portion 631, it is possible to reliably prevent a possibility that the force may act on the valve body 31 in a direction in which the first divided body 33 and the second divided body 34 are separated from the joint surfaces 331 and 341.

The distance between the rotation axis Axr1 and the first restriction projection portion 332 is shorter than the distance between the rotation axis Axr1 and the second restriction projection portion 342 (refer to FIG. 117).

Nineteenth Embodiment

Figure 118:
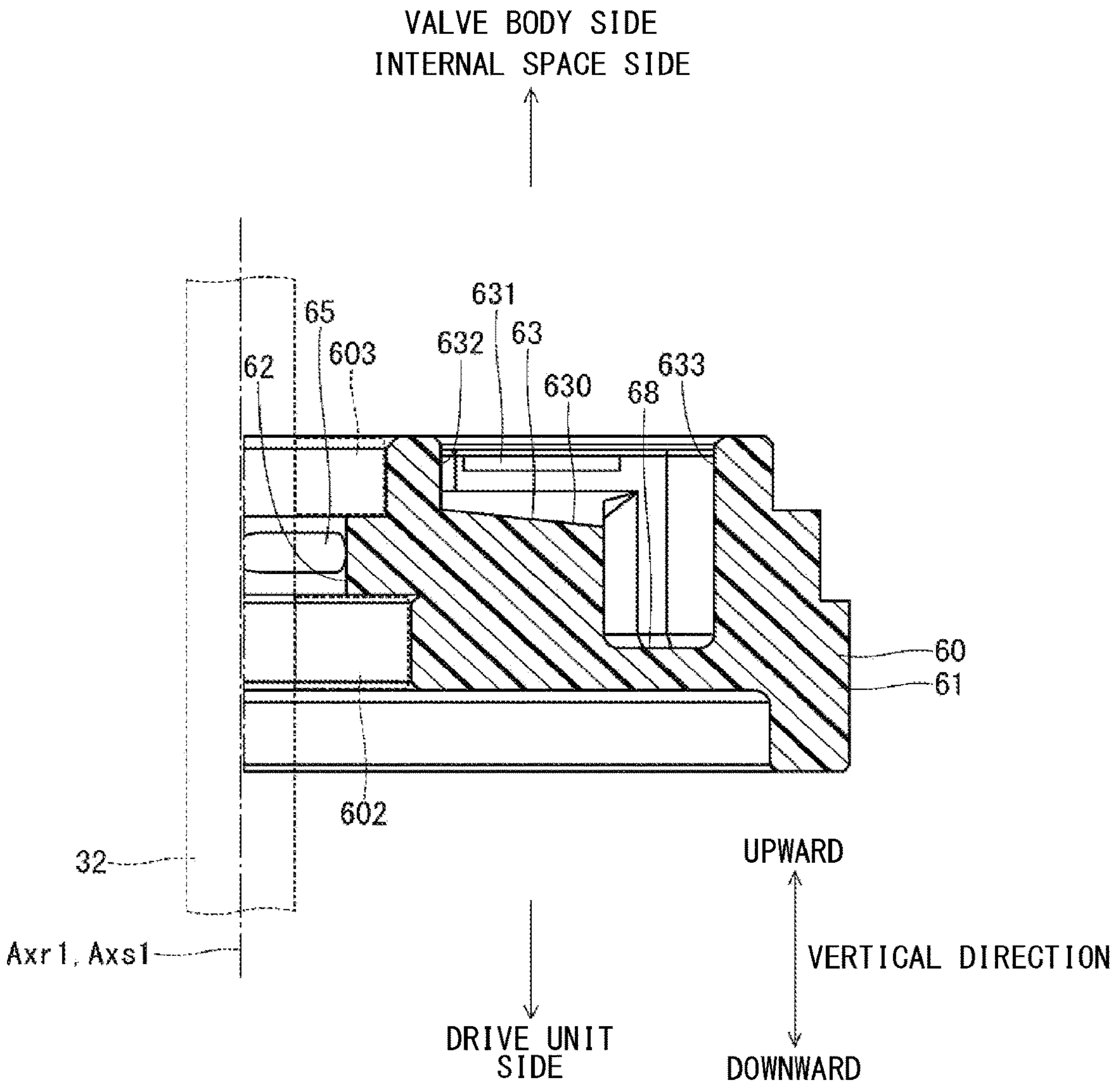
FIG. 118 is a cross-sectional view illustrating a part of a partition wall portion of a valve device of a nineteenth embodiment.

A portion of a valve device according to a nineteenth embodiment is illustrated in FIG. 118. The nineteenth embodiment is different from the fourteenth embodiment in a shape of the restriction recess portion 63.

<8-4>

As illustrated in FIG. 118, the bottom surface 630 of the restriction recess portion 63 is formed in a tapered shape to be closer the drive unit 70 toward the outer cylinder wall surface 633 side from the inner cylinder wall surface 632 side.

Therefore, the foreign substance on the bottom surface 630 of the restriction recess portion 63 can be positively guided to the foreign substance collection portion 68 outside in the radial direction of the restriction recess portion 63, and the foreign substance can be kept away from the shaft insertion hole 62. In this manner, the sealing property of the shaft seal member 603 can be effectively ensured.

Twentieth Embodiment

Figure 119:
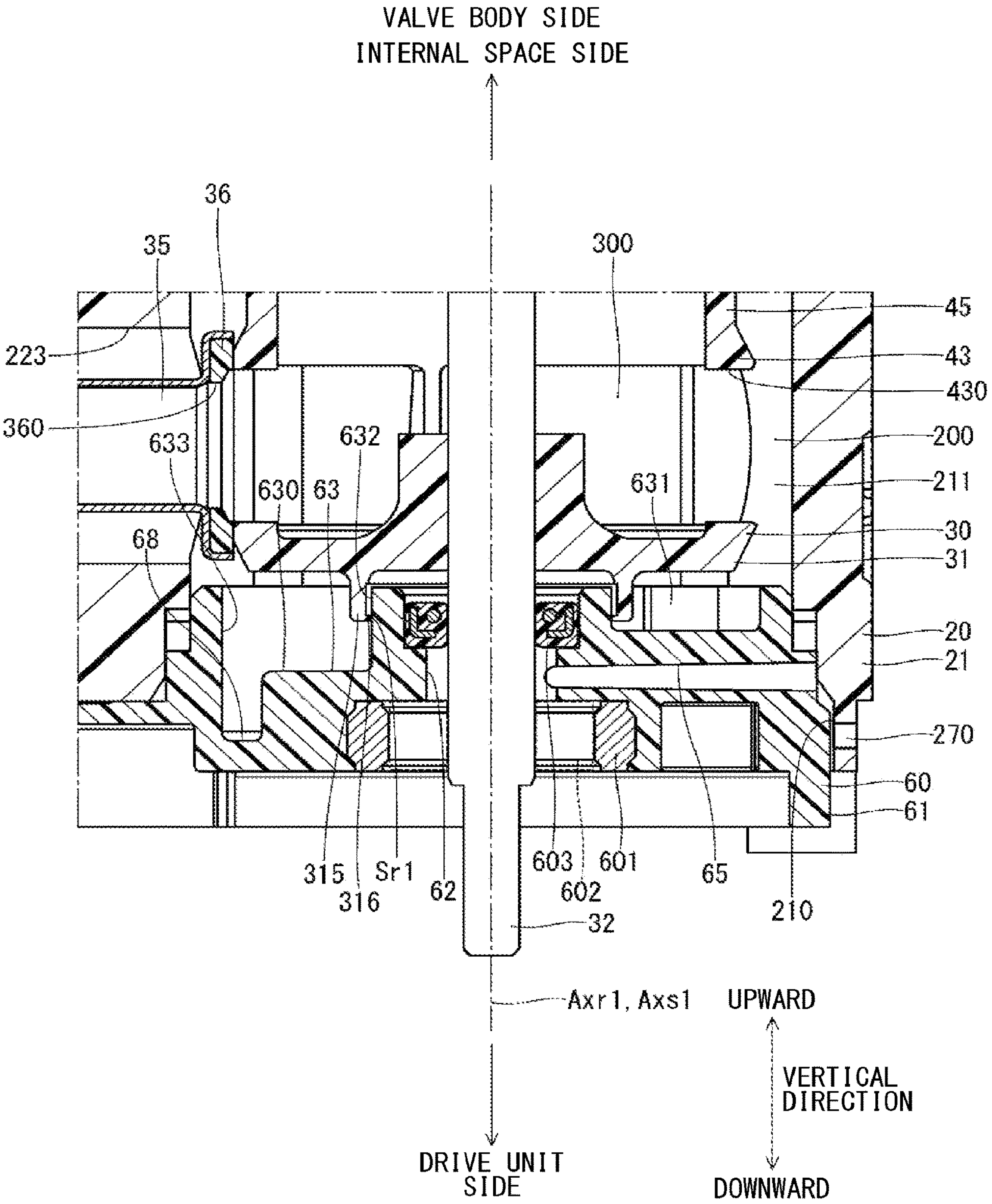
FIG. 119 is a cross-sectional view illustrating a partition wall portion and the vicinity of a valve device of a twentieth embodiment.

A portion of a valve device according to a twentieth embodiment is illustrated in FIG. 119. The twentieth embodiment is different from the fourteenth embodiment in a configuration of the valve 30 and the restriction portion 631.

<8-8>

As illustrated in FIG. 119, the valve 30 has a valve body cylindrical portion 315 extending in a cylindrical shape from the valve body 31 to the drive unit 70 side. The tip portion of the valve body cylindrical portion 315 is located outside in the radial direction of the inner cylinder wall surface 632.

Therefore, it is possible to prevent a possibility that the foreign substance in the restriction recess portion 63 may enter the shaft insertion hole 62. In this manner, it is possible to ensure the sealing property of the shaft seal member 603.

<8-9>

The valve 30 has a labyrinth forming portion 316 which is formed in the valve body cylindrical portion 315 and which can form a labyrinth-shaped space Sr1 with the inner cylinder wall surface 632.

Therefore, it is possible to effectively prevent a possibility that the foreign substance in the restriction recess portion 63 may enter the shaft insertion hole 62. In this manner, the sealing property of the shaft seal member 603 can be effectively ensured.

<8-10>

The labyrinth forming portion 316 is formed in an annular shape to project inward in the radial direction from the tip portion of the valve body cylindrical portion 315.

Therefore, a simple configuration can effectively prevent a possibility that the foreign substance in the restriction recess portion 63 may enter the shaft insertion hole 62.

<8-11>

The valve body cylindrical portion 315 is formed to be located on the inner cylinder wall surface 632 side with respect to the restriction portion 631 in the radial direction of the restriction recess portion 63.

Therefore, it is possible to prevent interference between the valve body cylindrical portion 315 and the restriction portion 631 when the valve body 31 rotates.

Twenty-First Embodiment

Figure 120:
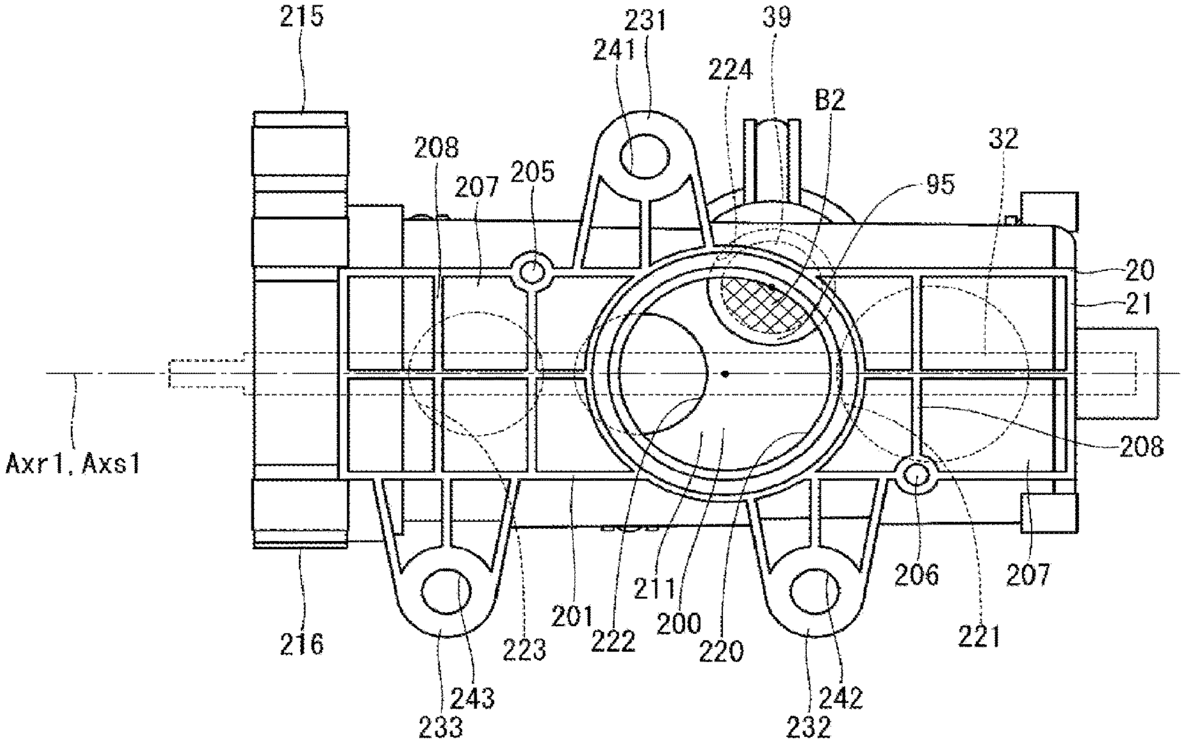
Figure 121:
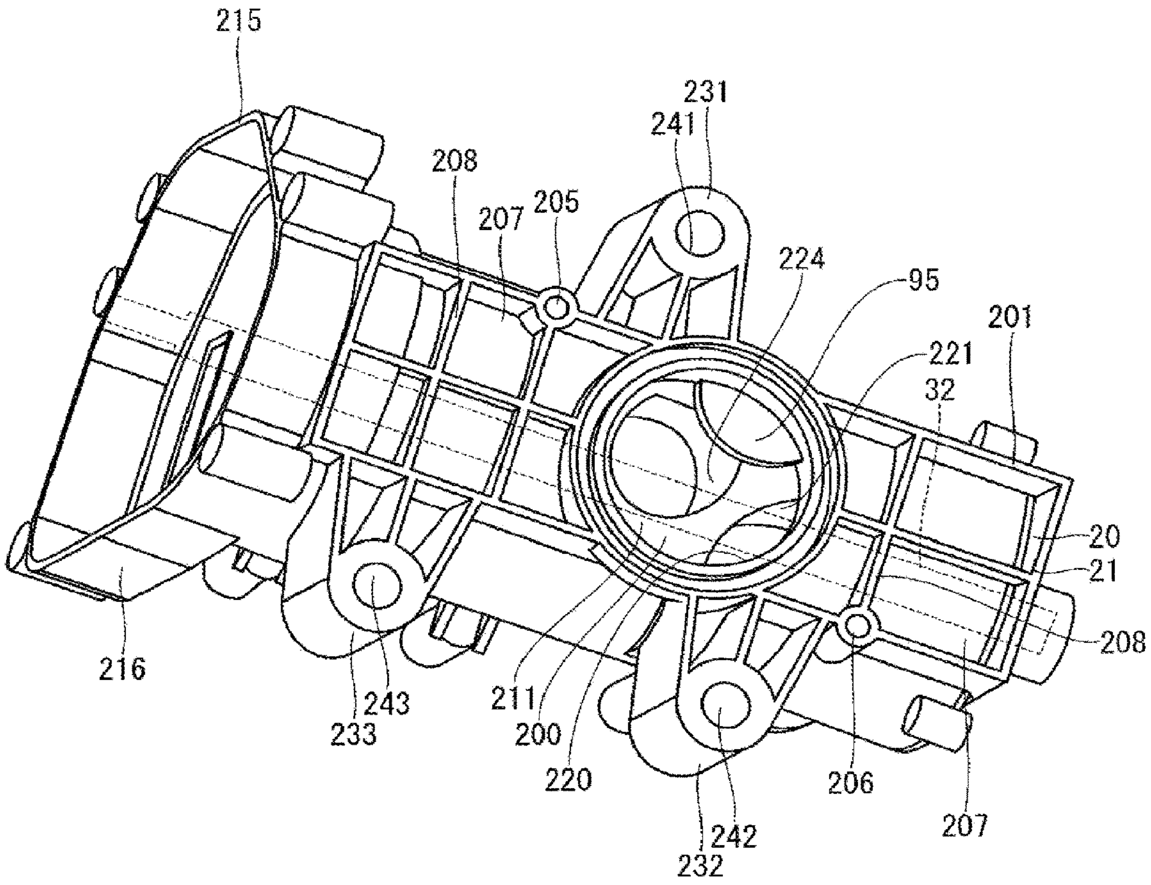

A portion of a valve device according to a twenty-first embodiment is illustrated in FIGS. 120 and 121. The twenty-first embodiment is different from the fourteenth embodiment in disposition of the covering portion 95.

<11-3>

The covering portion 95 is provided in the housing main body 21 at a position between the inlet port 220 and the shaft 32.

Therefore, the covering portion 95 can be properly disposed away from the relief valve 39. While preventing a possibility that the coolant water may directly hit the relief valve 39, responsiveness of the relief valve 39 can be ensured.

<11-4>

According to the present embodiment, the covering portion 95 is formed to be projected on an area which is equal to or larger than an area of an overlapping portion B2 between the projected inlet port 220 and the projected relief valve 39, when the inlet port 220, the relief valve 39, and the covering portion 95 are projected in the axial direction of the relief port 224 or in the axial direction of the inlet port 220.

Therefore, while the coolant water is reliably prevented from directly hitting the relief valve 39, it is possible to ensure water flow capability without squeezing the flow channel area more than necessary.

<11-6>

As illustrated in FIGS. 120 and 121, the covering portion 95 is formed in a plate shape, and has the constant thickness.

Therefore, stress concentration on the covering portion 95 can be prevented, and durability of the housing main body 21 can be improved.

Twenty-Second Embodiment

A valve device according to a twenty-second embodiment will be described with reference to FIG. 122. The twenty-second embodiment is different from the fifteenth embodiment in a configuration of the valve body 31, and a method of controlling the drive unit 70 and the valve body 31.

According to the present embodiment, a forming position and a size of the valve body opening portions 410, 420, and 430 in the circumferential direction of the valve body 31 are different from those in the fifteenth embodiment.

<12-3>

Figure 122:
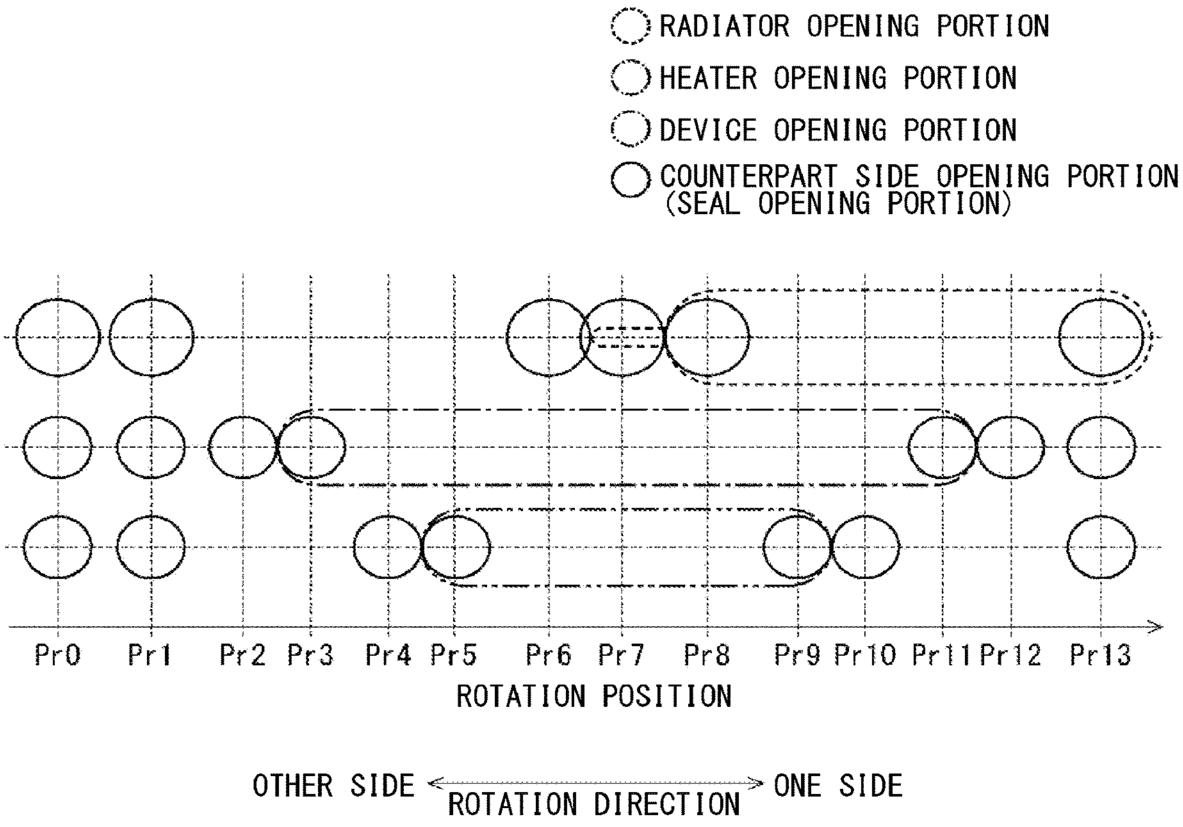

As illustrated in FIG. 122, in accordance with the rotational drive of the valve body 31 rotating to one side in the rotation direction, after all opening degrees of the radiator port 221, the heater port 222, and the device port 223 reach the predetermined opening degree, the ECU 8 can control the drive unit 70 and the valve body 31 so that the heater port 222 and the device port 223 are closed in the order of the heater port 222 and the device port 223.

Therefore, for example, while heating performance in winter is held, the cooling efficiency of the engine 2 can be improved.

Next, a flow diagram of the coolant water in the valve device 10 of the present embodiment will be described in detail with reference to FIG. 122.

As illustrated in FIG. 122, when the rotation position of the valve body 31 is the reference position 0 (at the time of the rotation position Pr0 in FIG. 122), that is, when one of the first restriction projection portion 332 and the second restriction projection portion 342 comes into contact with the restriction portion 631 to restrict the rotation of the valve body 31, all opening degrees of the radiator port 221, the heater port 222, and the device port 223 are 0% (fully closed). Hereinafter, when described as Pr0 to 13, the description means the rotation positions Pr0 to 13 in FIG. 122.

The way in which the opening degree of the radiator port 221, the heater port 222, and the device port 223 is changed in accordance with the rotation of the valve body 31 is the same as that according to the fifteenth embodiment until the rotation position of the valve body 31 is located at Pr0 to 8, and thus, description thereof will be omitted.

When the valve body 31 is further driven to rotate to one side in the rotation direction from Pr8, the opening degree of the device port 223 decreases at a predetermined ratio from 100% between Pr9 and Pr10. In this manner, the amount of the coolant water flowing to the device 7 side decreases in accordance with the opening degree of the device port 223. The opening degree of the device port 223 is 0% (fully closed) at Pr10. In this manner, the device port 223 is closed, and the flow of the coolant water to the device 7 side is blocked.

When the valve body 31 is further driven to rotate to one side in the rotation direction, the opening degree of the heater port 222 decreases at a predetermined ratio from 100% between Pr11 and Pr12. In this manner, the amount of the coolant water flowing to the heater 6 side decreases in accordance with the opening degree of the heater port 222. The opening degree of the heater port 222 is 0% (fully closed) at Pr12. In this manner, the heater port 222 is closed, the flow of the coolant water to the heater 6 side is blocked.

The decrease ratio in the opening degree of the device port 223 between Pr9 and Pr10 per unit rotation angle of the valve body 31 is the same as the decrease ratio in the opening degree of the heater port 222 between Pr11 and Pr12.

When the valve body 31 is further driven to rotate to one side in the rotation direction, at Pr13, the other one of the first restriction projection portion 332 and the second restriction projection portion 342 comes into contact with the restriction portion 631, and the rotational drive of the valve body 31 is stopped. At this time, the opening degree of the radiator port 221 remains at 100%. That is, at this time, the opening degree of only the radiator port 221 is 100% (fully opened: the predetermined opening degree).

According to the present embodiment, as described above, in accordance with the rotational drive of the valve body 31 rotating to one side in the rotation direction, after all opening degrees of the radiator port 221, the heater port 222, and the device port 223 reach the predetermined opening degree (100%) at Pr8, the ECU 8 can control the drive unit 70 and the valve body 31 so that the device port 223 and the heater port 222 are closed at Pr10 and Pr12, and so that the opening degree of only the radiator port 221 reaches the predetermined opening degree (100%) at Pr13.

In addition, according to the present embodiment, as described above, in accordance with the rotational drive of the valve body 31 rotating to one side in the rotation direction, after all opening degrees of the radiator port 221, the heater port 222, and the device port 223 reach the predetermined opening degree (100%) at Pr8, the ECU 8 can control the drive unit 70 and the valve body 31 so that the heater port 222 and the device port 223 are closed in the order of the device port 223 and the heater port 222 (Pr10 and Pr12).

Twenty-Third Embodiment

A valve device according to a twenty-third embodiment will be described with reference to FIG. 123. The twenty-third embodiment is different from the fifteenth embodiment in a configuration of the valve body 31 and a method of controlling the drive unit 70 and the valve body 31.

According to the present embodiment, a forming position and a size of the valve body opening portions 410, 420, and 430 in the circumferential direction of the valve body 31 are different from those in the fifteenth embodiment.

<12-4>

Figure 123:
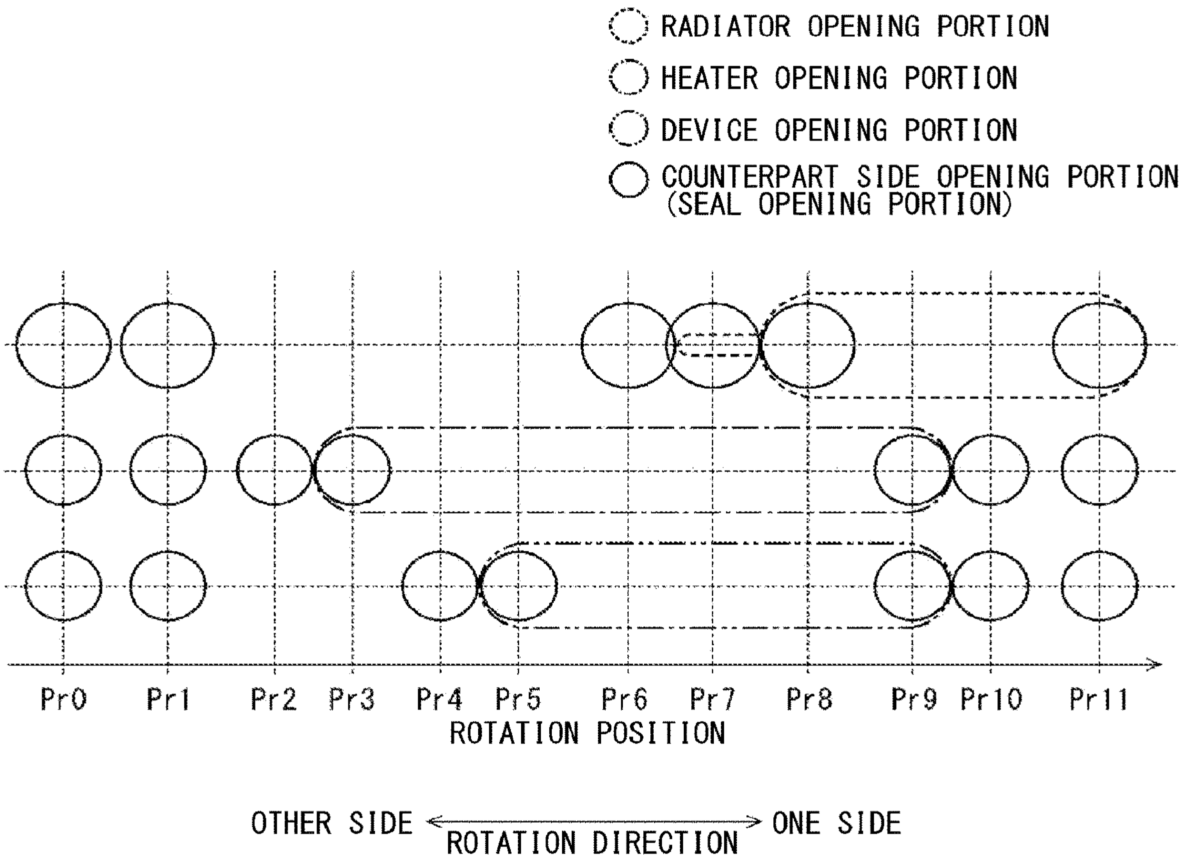

As illustrated in FIG. 123, in accordance with the rotational drive of the valve body 31 rotating to one side in the rotation direction, after all opening degrees of the radiator port 221, the heater port 222, and the device port 223 reach the predetermined opening degree, the ECU 8 can control the drive unit 70 and the valve body 31 so that the heater port 222 and the device port 223 are simultaneously closed.

Therefore, when the high load is applied the engine 2, the heat exchange from the heater 6 and the device 7 can be immediately blocked, and a cooling rate and cooling efficiency of the engine 2 can be improved.

Next, a flow diagram of the coolant water in the valve device 10 of the present embodiment will be described in detail with reference to FIG. 123.

As illustrated in FIG. 123, when the rotation position of the valve body 31 is the reference position 0 (at the time of the rotation position Pr0 in FIG. 123), that is, when one of the first restriction projection portion 332 and the second restriction projection portion 342 comes into contact with the restriction portion 631 to restrict the rotation of the valve body 31, all opening degrees of the radiator port 221, the heater port 222, and the device port 223 are 0% (fully closed). Hereinafter, when described as Pr0 to 11, the description means the rotation positions Pr0 to 11 in FIG. 123.

The way in which the opening degree of the radiator port 221, the heater port 222, and the device port 223 is changed in accordance with the rotation of the valve body 31 is the same as that according to the fifteenth embodiment until the rotation position of the valve body 31 is located at Pr0 to 8, and thus, description thereof will be omitted.

When the valve body 31 is further driven to rotate from Pr8 to one side in the rotation direction, the opening degree of the heater port 222 and the opening degree of the device port 223 decrease at a predetermined ratio from 100% between Pr9 and Pr10. In this manner, the amount of coolant water flowing to the heater 6 side and the device 7 side decreases in accordance with the opening degree of the heater port 222 and the opening degree of the device port 223. The opening degree of the heater port 222 and the opening degree of the device port 223 are 0% (fully closed) at Pr10. In this manner, the heater port 222 and the device port 223 are closed, and the flow of the coolant water to the heater 6 side and the device 7 side is blocked.

The decrease ratio in the opening degree of the heater port 222 between Pr9 and Pr10 per unit rotation angle of the valve body 31 is the same as the decrease ratio in the opening degree of the device port 223 between Pr9 and Pr10.

When the valve body 31 is further driven to rotate to one side in the rotation direction, at Pr11, the other one of the first restriction projection portion 332 and the second restriction projection portion 342 comes into contact with the restriction portion 631, and the rotational drive of the valve body 31 is stopped. At this time, the opening degree of the radiator port 221 remains at 100%. That is, at this time, the opening degree of only the radiator port 221 is 100% (fully opened: the predetermined opening degree).

According to the present embodiment, as described above, in accordance with the rotational drive of the valve body 31 rotating to one side in the rotation direction, after all opening degrees of the radiator port 221, the heater port 222, and the device port 223 reach the predetermined opening degree (100%) at Pr8, the ECU 8 can control the drive unit 70 and the valve body 31 so that the heater port 222 and the device port 223 are closed at Pr10, and so that the opening degree of only the radiator port 221 reaches the predetermined opening degree (100%) at Pr11.

In addition, according to the present embodiment, as described above, in accordance with the rotational drive of the valve body 31 rotating to one side in the rotation direction, after all opening degrees of the radiator port 221, the heater port 222, and the device port 223 reach the predetermined opening degree (100%) at Pr8, the ECU 8 can control the drive unit 70 and the valve body 31 so that the heater port 222 and the device port 223 are simultaneously closed (at Pr10).

Twenty-Fourth Embodiment

A valve device according to a twenty-fourth embodiment will be described with reference to FIGS. 124 and 125. The twenty-fourth embodiment is different from the fifteenth embodiment in a configuration of the valve body 31 and a method of controlling the drive unit 70 and the valve body 31.

According to the present embodiment, a forming position and a size of the valve body opening portions 410, 420, and 430 in the circumferential direction of the valve body 31 are different from those in the fifteenth embodiment.

<12-5> Flow Diagram

According to the present embodiment, there is provided the valve device 10 capable of controlling the coolant water of the engine 2 of the vehicle 1. The valve device 10 includes the housing 20, the valve 30, the drive unit 70, and the ECU 8 as a control unit.

Figure 124:
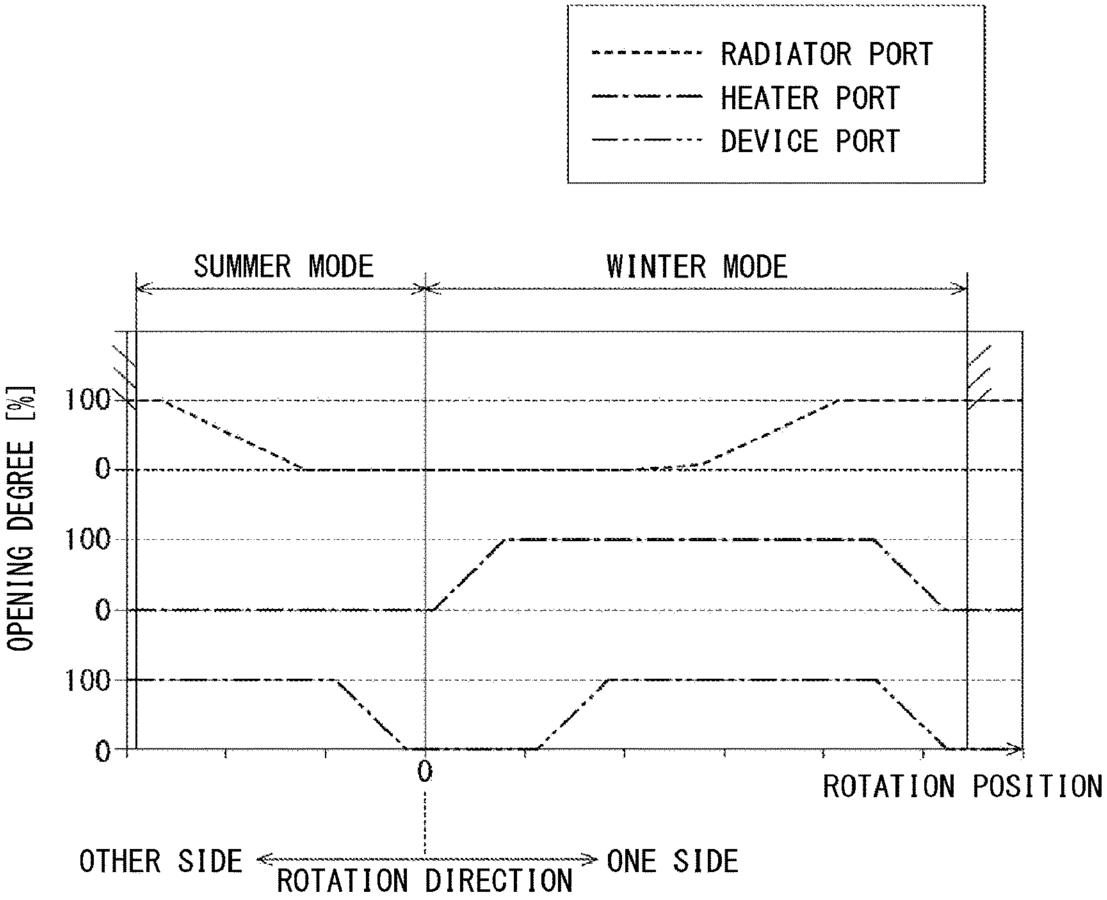
Figure 125:
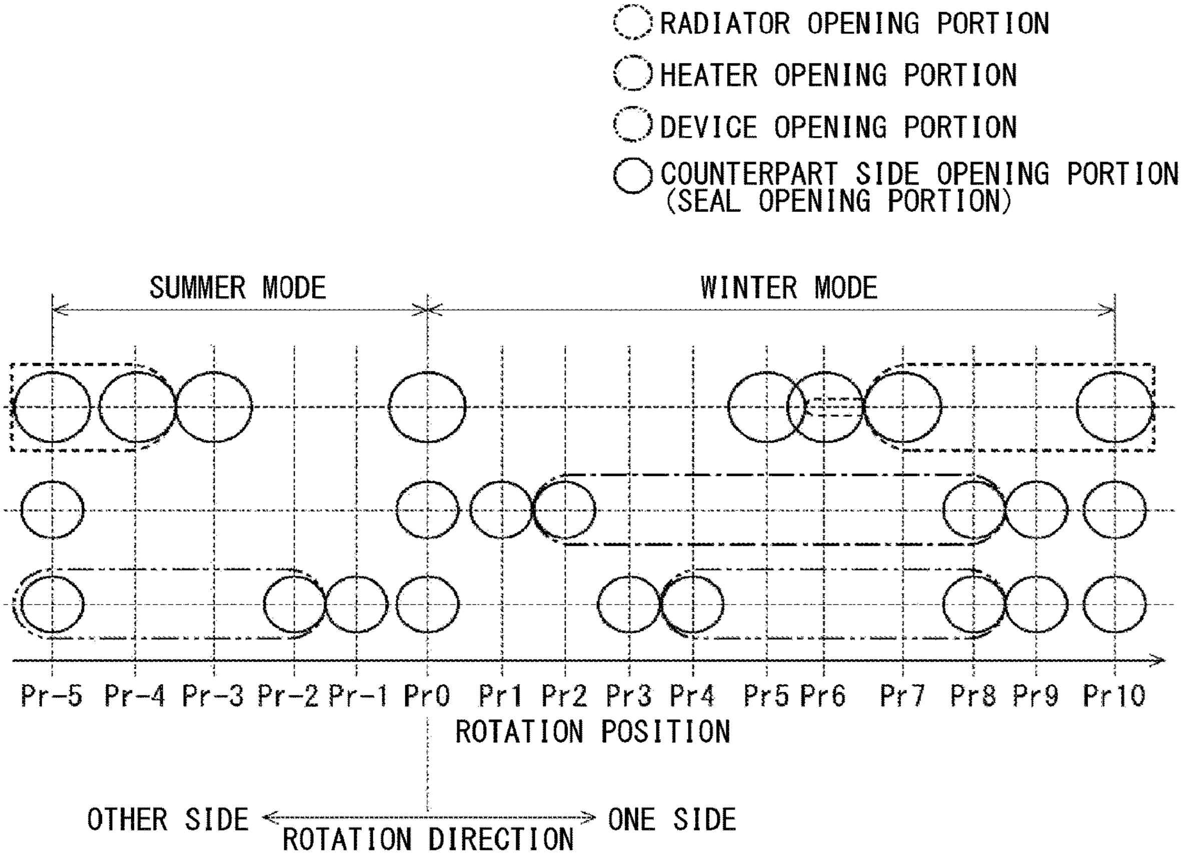

As illustrated in FIGS. 124 and 125, for example, in the winter when an environmental temperature is equal to or lower than a predetermined temperature, the ECU 8 drives the valve body 31 to rotate in a normal mode in which the valve body 31 is rotated to one side with respect to the reference position 0 (degree) in the rotation direction. For example, in the summer when the environmental temperature is higher than the predetermined temperature, the ECU 8 drives the valve body 31 to rotate in a cooling priority mode in which the valve body 31 is rotated to the other side with respect to the reference position in the rotation direction of the valve body 31. In another embodiment, for example, in the normal mode when an air conditioner is turned off, and in the cooling priority mode when the air conditioner is turned on, the ECU 8 may drive the valve body 31 to rotate. In this way, depending on an operation state of the air conditioner as a vehicle state, the ECU 8 may switch between the normal mode and the cooling priority mode. In addition, depending on both the vehicle environment and the vehicle state, the ECU 8 may switch between the normal mode and the cooling priority mode. Furthermore, the ECU 8 may switch between the normal mode and the cooling priority mode, depending on "the outside air temperature, the temperature inside the vehicle compartment, or the vehicle environment such as the temperature difference between the outside air temperature and the temperature inside the vehicle compartment" and/or "the load state of the engine 2 and the vehicle speed, or the acceleration state of the vehicle 1 and the vehicle state other than the operation state of the air conditioner".

At a specific rotation position of the valve body 31 in the normal mode, the ECU 8 can control the drive unit 70 and the valve body 31 so that the opening degree of only the radiator port 221 reaches the predetermined opening degree which is higher than 0.

Therefore, even in the normal mode, the predetermined opening degree is set to the opening degree to such an extent that the cooling efficiency of the engine 2 can be improved, and the drive unit 70 and the valve body 31 are controlled so that the opening degree of only the radiator port 221 reaches the predetermined opening degree. In this manner, it is possible to maximize the cooling efficiency when the high load is applied to the engine 2.

<12-6>

As illustrated in FIGS. 124 and 125, on both sides of the normal mode and the cooling priority mode, the ECU 8 can control the drive unit 70 and the valve body 31 so that the opening degree of the radiator port 221 reaches the predetermined opening degree.

Therefore, in either the normal mode or the cooling priority mode, it is possible to improve the cooling efficiency when the high load is applied to the engine 2.

<12-7>

As illustrated in FIGS. 124 and 125, the ECU 8 can control the drive unit 70 and the valve body 31 so that each opening degree of the radiator port 221, the heater port 222, or the device port 223 independently reaches the predetermined opening degree.

Therefore, the coolant water can be intensively circulated in required portions, and efficiency in the heat exchange can be improved.

<12-8>

As illustrated in FIGS. 124 and 125, in the normal mode, the ECU 8 can control the drive unit 70 and the valve body 31 so that all opening degrees of the radiator port 221, the heater port 222, and the device port 223 reach the predetermined opening degree.

Therefore, in the normal mode, the heat can be exchanged in all of the radiator 5, the heater 6, and the device 7. The engine 2 can be cooled while the heating performance is ensured.

<12-9>

The predetermined opening degree is set to 60% or more.

Therefore, at a specific rotation position of the valve body 31 in the normal mode, the drive unit 70 and the valve body 31 are controlled so that the opening degree of only the radiator port 221 reaches the predetermined opening degree. In this manner, even in the normal mode, it is possible to properly maximize the cooling efficiency when the high load is applied the engine 2.

In addition, on both sides of the normal mode and the cooling priority mode, the drive unit 70 and the valve body 31 are controlled so that the opening degree of the radiator port 221 reaches the predetermined opening. In this manner, in either the normal mode or the cooling priority mode, it is also possible to properly improve the cooling efficiency when the high load is applied to the engine 2.

The drive unit 70 and the valve body 31 are controlled so that each opening degree of the radiator port 221, the heater port 222, or the device port 223 independently reaches the predetermined opening degree. In this manner, the coolant water can be intensively circulated in the required portions, and efficiency in the heat exchange can be properly improved.

In addition, in the normal mode, the drive unit 70 and the valve body 31 are controlled so that all opening degrees of the radiator port 221, the heater port 222, and the device port 223 reach the predetermined opening degree. In this manner, in the normal mode, the heat can be exchanged in all of the radiator 5, the heater 6, and the device 7. Accordingly, the engine 2 can be properly cooled while the heating performance is ensured.

According to the present embodiment, in order to improve the cooling efficiency of the engine 2 to the maximum, the predetermined opening degree is set to 100%.

Therefore, the cooling efficiency can be improved to the maximum when the high load is applied to the engine 2.

Next, a flow diagram of the coolant water in the valve device 10 of the present embodiment will be described in detail with reference to FIGS. 124 and 125.

As illustrated in FIGS. 124 and 125, when the rotation position of the valve body 31 is the reference position 0 (degree) (at the time of the rotation position Pr0 in FIG. 125), all opening degrees of the radiator port 221, the heater port 222, and the device port 223 are 0% (fully closed). Hereinafter, when described as Pr-5 to 10, the description means the rotation positions Pr-5 to 10 in FIG. 125.

As described above, depending on the vehicle environment and/or the vehicle state, the ECU 8 drives the valve body 31 to rotate in the normal mode in which the valve body 31 is rotated to one side (Pr0 to 10) with respect to the reference position 0 (degree) in the rotation direction, or in the cooling priority mode in which the valve body 31 is rotated to the other side (Pr0 to 5) with respect to the reference position in the rotation direction.

The ECU 8 controls the valve body 31 in the normal mode, thereby driving the valve body 31 to rotate to one side in the rotation direction. When the rotation position of the valve body 31 increases from 0, the opening degree of the heater port 222 increases at a predetermined ratio from 0(%) between Pr1 and Pr2. In this manner, the amount of the coolant water corresponding to the opening degree of the heater port 222 flows to the heater 6 side. The opening degree of the heater port 222 reaches 100% (full opened: the predetermined opening degree) at Pr2.

When the valve body 31 is further driven to rotate to one side in the rotation direction, the opening degree of the device port 223 increases at a predetermined ratio from 0(%) between Pr3 and Pr4. In this manner, the amount of the coolant water corresponding to the opening degree of the device port 223 flows to the device 7 side. The opening degree of the device port 223 reaches 100% (fully opened: the predetermined opening degree) at Pr4.

The increase ratio in the opening degree of the heater port 222 between Pr1 and Pr2 per unit rotation angle of the valve body 31 is the same as the increase ratio in the opening degree of the device port 223 between Pr3 and Pr4 (refer to FIGS. 124 and 125).

When the valve body 31 is further driven to rotate to one side in the rotation direction, the opening degree of the radiator port 221 increases at a predetermined ratio from 0(%) between Pr5 and Pr6. In this manner, the amount of the coolant water corresponding to the opening degree of the radiator port 221 flows to the radiator 5 side.

When the valve body 31 is further driven to rotate to one side in the rotation direction, the opening degree of the radiator port 221 further increases at a predetermined ratio between Pr6 and Pr7. The opening degree of the radiator port 221 reaches 100% (fully opened: the predetermined opening degree) at Pr7. Therefore, at Pr7, all opening degrees of the radiator port 221, the heater port 222, and the device port 223 reach the predetermined opening degree, that is, 100%.

The increase ratio in the opening degree of the radiator port 221 between Pr5 and Pr6 per unit rotation angle of the valve body 31 is smaller than the increase ratio in the opening degree of the radiator port 221 between Pr6 and Pr7 (refer to FIGS. 124 and 125). The reason is that the radiator opening portion 410 is formed by the extension opening portion 413 and the large opening portion 412 (refer to FIGS. 93 and 94).

Therefore, at an initial valve opening stage of the radiator port 221, the flow rate of the coolant water flowing to the radiator 5 can be gradually increased. In this manner, in the normal mode, it is possible to prevent the rapid temperature change in the coolant water which is caused by the heat exchange in the radiator 5.

The increase ratio in the opening degree of the radiator port 221 between Pr5 and Pr6 per unit rotation angle of the valve body 31 and the increase ratio in the opening degree of the radiator port 221 between Pr6 and Pr7 is smaller than the increase ratio in the opening degree of the heater port 222 between Pr1 and Pr2 and the increase ratio in the opening degree of the device port 223 between Pr3 and Pr4 (refer to FIGS. 124 and 125).

Therefore, a change in the flow rate of the coolant water flowing to the radiator 5 at the initial valve opening stage can be gentler than a change in the flow rate of the coolant water flowing to the heater 6 and the device 7. In this manner, in the normal mode, it is possible to prevent the rapid temperature change in the coolant water which is caused by the heat exchange in the radiator 5.

When the valve body 31 is further driven to rotate to one side in the rotation direction, the opening degree of the heater port 222 and the opening degree of the device port 223 decrease at a predetermined ratio from 100% between Pr8 and Pr9. In this manner, the amount of coolant water flowing to the heater 6 side and the device 7 side decreases in accordance with the opening degree of the heater port 222 and the opening degree of the device port 223. The opening degree of the heater port 222 and the opening degree of the device port 223 is 0% at Pr9 (fully closed). In this manner, the heater port 222 and the device port 223 are closed, and the flow of the coolant water to the heater 6 side and the device 7 side is blocked.

The decrease ratio in the opening degree of the heater port 222 between Pr8 and Pr9 per unit rotation angle of the valve body 31 is the same as the decrease ratio in the opening degree of the device port 223 between Pr8 and Pr9 (refer to FIGS. 124 and 125).

When the valve body 31 is further driven to rotate to one side in the rotation direction, at Pr10, one of the first restriction projection portion 332 and the second restriction projection portion 342 comes into contact with the restriction portion 631, and the rotational drive of the valve body 31 is stopped. At this time, the opening degree of the radiator port 221 remains at 100%. That is, at this time, the opening degree of only the radiator port 221 is 100% (fully opened: the predetermined opening degree).

The ECU 8 controls the valve body 31 in the cooling priority mode, thereby driving the valve body 31 to rotate to the other side in the rotation direction. When the rotation position of the valve body 31 decreases from 0, the opening degree of the device port 223 increases at a predetermined ratio from 0(%) between Pr-1 and Pr-2. In this manner, the amount of the coolant water corresponding to the opening degree of the device port 223 flows to the device 7 side. The opening degree of the device port 223 reaches 100% (fully opened: the predetermined opening degree) at Pr-2.

The increase ratio in the opening degree of the device port 223 between Pr-1 and Pr-2 per unit rotation angle of the valve body 31 is the same as the increase ratio in the opening degree of the device port 223 between Pr3 and Pr4 (refer to FIGS. 124 and 125).

When the valve body 31 is further driven to rotate to the other side in the rotation direction, the opening degree of the radiator port 221 increases at a predetermined ratio from 0(%) between Pr-3 and Pr-4. In this manner, the amount of the coolant water corresponding to the opening degree of the radiator port 221 flows to the radiator 5 side. The opening degree of the radiator port 221 reaches 100% (fully opened: the predetermined opening degree) at Pr-4. Therefore, at Pr-4, the opening degree of the radiator port 221 and the device port 223 reaches the predetermined opening degree, that is, 100%.

The increase ratio in the opening degree of the radiator port 221 between Pr-3 and Pr-4 per unit rotation angle of the valve body 31 is the same as the increase ratio in the opening degree of the radiator port 221 between Pr6 and Pr7 (refer to FIGS. 124 and 125).

When the valve body 31 is further driven to rotate to the other side in the rotation direction, at Pr-5, the other one of the first restriction projection portion 332 and the second restriction projection portion 342 comes into contact with the restriction portion 631, and the rotational drive of the valve body 31 is stopped. At this time, the opening degree of the radiator port 221 and the opening degree of the device port 223 remain at 100%. That is, at this time, the opening degree of the radiator port 221 and the opening degree of the device port 223 are 100% (fully opened: the predetermined opening degree). According to the present embodiment, as described above, at Pr9 to 10 which are specific rotation positions of the valve body 31 in the normal mode, the ECU 8 can control the drive unit 70 and the valve body 31 so that the opening degree of only the radiator port 221 reaches the predetermined opening degree which is higher than 0.

At Pr7 to 10 of the normal mode and at Pr-4 to −5 of the cooling priority mode, the ECU 8 can control the drive unit 70 and the valve body 31 so that the opening degree of the radiator port 221 reaches the predetermined opening degree.

The ECU 8 can control the drive unit 70 and the valve body 31 so that each opening degree of the radiator port 221, the heater port 222, or the device port 223 independently reaches the predetermined opening degree at Pr9 to 10, Pr2 to 3, and Pr-2 to −3.

In addition, in the normal mode, the ECU 8 can control the drive unit 70 and the valve body 31 so that all opening degrees of the radiator port 221, the heater port 222, and the device port 223 reach the predetermined opening degree at Pr7 to 8.

Twenty-Fifth Embodiment

Figure 126:
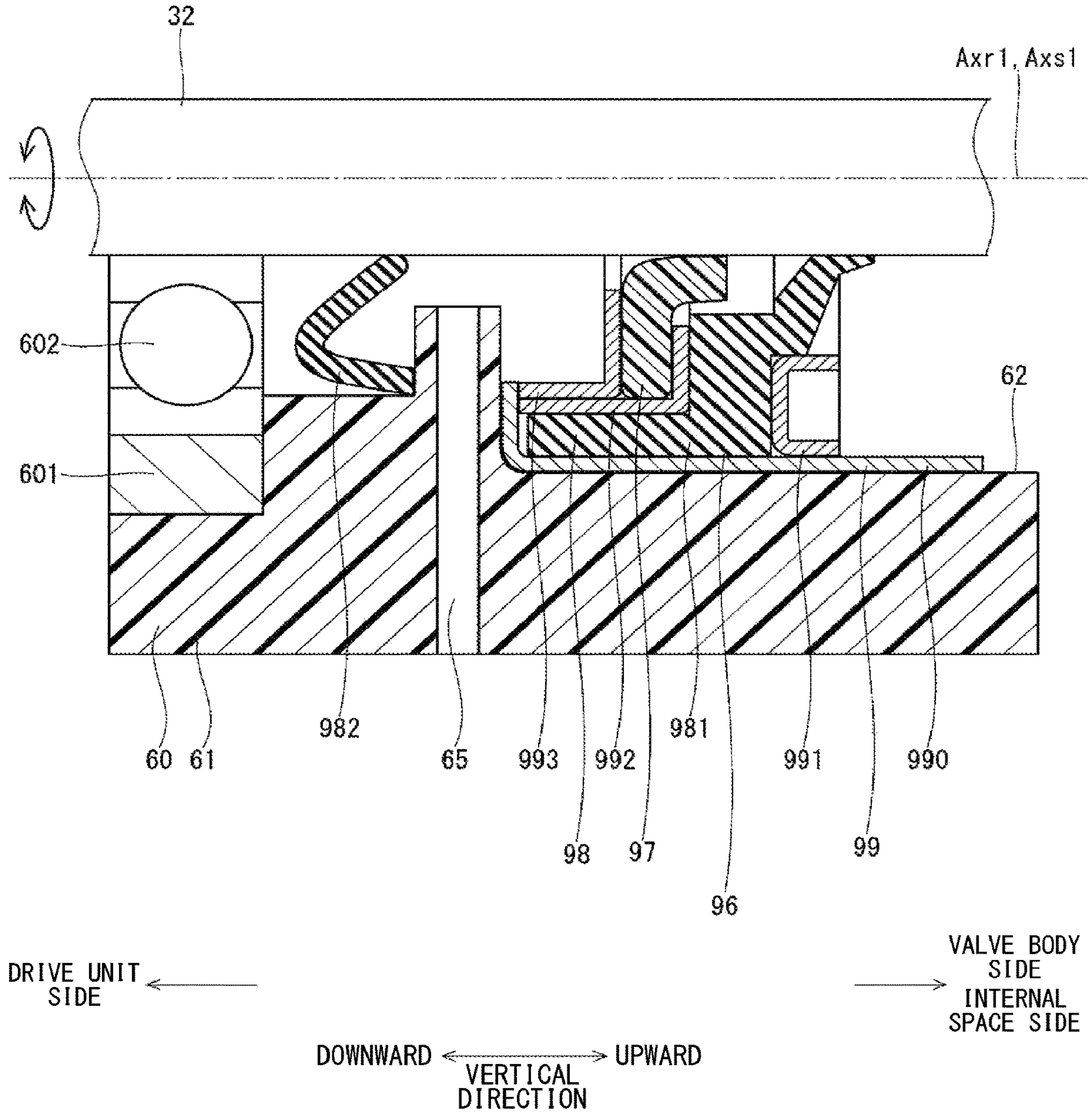

A portion of a valve device according to a twenty-fifth embodiment is illustrated in FIG. 126. The twenty-fifth embodiment is different from the first embodiment in a configuration in the vicinity of the bearing portion 602.

<6-23>

As illustrated in FIG. 126, the present embodiment includes a shaft seal portion 96 instead of the shaft seal member 603.

The shaft seal portion 96 has an annular shaft seal member 98 provided in the shaft insertion hole 62 whose inner edge portion can come into contact with the outer circumferential wall of the shaft 32, and an annular seal portion annular member 97 whose inner edge portion softer than the seal portion annular member 97 comes into contact with the outer circumferential wall of the shaft 32 and which can hold the portion with the shaft 32 in a liquid-tight manner.

According to the present embodiment, the inlet port 220 is formed outside in the radial direction of the shaft 32. Therefore, the coolant water flowing into the internal space 200 from the inlet port 220 collides with the outer circumferential wall of the shaft 32, and the shaft 32 is likely to axially deviate. When the shaft 32 axially deviates, there is a possibility that the load applied to the shaft seal member 98 may increase.

Therefore, according to the present embodiment, the shaft seal portion 96 having the above-described configuration is provided to prevent the axial deviation of the shaft 32 by the seal portion annular member 97. In this manner, the above-described configuration reduces the load applied to the shaft seal member 98 which is caused by the axial deviation. In this manner, it is possible to prevent the degradation of the sealing property which is caused by deterioration, abrasion, or deformation of the shaft seal member 98.

<6-24>

The shaft seal portion 96 further has a seal portion holding member 99 which can hold the seal portion annular member 97 and the shaft seal member 98 in the shaft insertion hole 62 harder than the seal portion annular member 97.

Therefore, it is possible to stabilize the position of the seal portion annular member 97 and the shaft seal member 98 in the shaft insertion hole 62. Therefore, the axial deviation of the shaft 32 is effectively prevented by the seal portion annular member 97, and it is possible to effectively reduce the load applied to the shaft seal member 98 which is caused by the axial deviation.

<6-25>

The seal portion annular member 97 is formed of a resin. The shaft seal member 98 is formed of rubber. The seal portion holding member 99 is formed of metal.

Therefore, the seal portion annular member 97 effectively prevents the axial deviation of the shaft 32, and ensures the sealing property of the shaft seal member 98. Accordingly, the seal portion holding member 99 can stably hold the seal portion annular member 97 and the shaft seal member 98.

<6-26>

The shaft seal member 98 has a first shaft seal member 981 which comes into contact with the outer circumferential wall of the shaft 32 on the valve body 31 side with respect to the contact portion between the seal portion annular member 97 and the outer circumferential wall of the shaft 32, and a second shaft seal member 982 which comes into contact with the outer circumferential wall of the shaft 32 on the drive unit 70 side with respect to the contact portion between the seal portion annular member 97 and the outer circumferential wall of the shaft 32.

Therefore, one seal portion annular member 97 prevents the axial deviation of the shaft 32. In this manner, it is possible to reduce the load applied to the first shaft seal member 981 and the second shaft seal member 982 which is caused by the axial deviation of the shaft 32. The sealing property of the outer periphery of the shaft 32 can be further improved by the first shaft seal member 981 and the second shaft seal member 982 which come into contact with the outer circumferential wall of the shaft 32 on the valve body 31 side and on the drive unit 70 side of the seal portion annular member 97. Hereinafter, a configuration of the shaft seal portion 96 will be described in more detail.

For example, the seal portion annular member 97 is formed a resin such as polytetrafluoroethylene (PTFE) in an annular shape. The seal portion annular member 97 is provided so that the inner edge portion can come into contact with and slide on the outer circumferential wall of the shaft 32. Since the seal portion annular member 97 is formed of the PTFE having a low friction coefficient, the shaft 32 can smoothly rotate inside the seal portion annular member 97. The seal portion annular member 97 is provided on the valve body 31 side with respect to the partition wall through-hole 65 (refer to FIG. 126).

For example, the first shaft seal member 981 is formed of rubber such as ethylene-propylene-diene terpolymer (EPDM) in an annular shape to be elastically deformable. In the first shaft seal member 981, the inner edge portion on the valve body 31 side closely comes into contact with the outer circumferential wall of the shaft 32 with respect to the contact portion between the seal portion annular member 97 and the outer circumferential wall of the shaft 32. The inner edge portion of the first shaft seal member 981 is slidable with the outer circumferential wall of the shaft 32. The seal portion annular member 97 is located inside the first shaft seal member 981 (refer to FIG. 126).

For example, the second shaft seal member 982 is formed of rubber such as nitrile rubber (NBR) in an annular shape to be elastically deformable. In the second shaft seal member 982, the inner edge portion on the drive unit 70 side closely comes into contact with the outer circumferential wall of the shaft 32 with respect to the contact portion between the seal portion annular member 97 and the outer circumferential wall of the shaft 32. The inner edge portion of the second shaft seal member 982 is slidable with the outer circumferential wall of the shaft 32. The second shaft seal member 982 is provided between the partition wall through-hole 65 and the bearing portion 602 in the axial direction of the shaft 32 (refer to FIG. 126).

The seal portion holding member 99 has an outer seal portion holding member 990 and inner seal portion holding members 991, 992, and 993. For example, the outer seal portion holding member 990 and the inner seal portion holding members 991, 992, and 993 are formed of metal.

The outer seal portion holding member 990 is formed in a cylindrical shape, and is provided so that the outer circumferential wall is fitted to the shaft insertion hole 62. The outer seal portion holding member 990 holds the first shaft seal member 981 so that the inner circumferential wall comes into contact with the outer circumferential wall of the first shaft seal member 981.

The inner seal portion holding member 991 is formed in an annular shape, and is provided between the end portion on the valve body 31 side of the first shaft seal member 981 and the outer seal portion holding member 990 so that the outer edge portion is fitted to the inner circumferential wall of the outer seal portion holding member 990. The inner seal portion holding member 991 holds the end portion on the valve body 31 side of the first shaft seal member 981.

The inner seal portion holding member 992 is formed in a cylindrical shape, and is provided inside the end portion on the drive unit 70 side of the outer seal portion holding member 990 and the first shaft seal member 981 so that the outer circumferential wall comes into contact with the inner circumferential wall of the end portion on the drive unit 70 side of the first shaft seal member 981. The inner seal portion holding member 992 holds the seal portion annular member 97 so that the inner circumferential wall comes into contact with the outer edge portion of the seal portion annular member 97.

The inner seal portion holding member 993 is formed in an annular shape, and is provided inside the end portion on the drive unit 70 side of the inner seal portion holding member 992 so that the outer edge portion is fitted to the inner circumferential wall of the inner seal portion holding member 992. The inner seal portion holding member 993 holds the seal portion annular member 97 so that the end portion on the valve body 31 side comes into contact with the surface on the drive unit 70 side of the seal portion annular member 97.

The seal portion annular member 97 and the inner seal portion holding members 992 and 993 are provided inside the first shaft seal member 981 which is elastically deformable, thereby integrally movable inside the shaft insertion hole 62 in the radial direction. Therefore, the seal portion annular member 97 can more effectively prevent the axial deviation of the shaft 32.

As described above, in the present embodiment, an example has been described in which the first shaft seal member 981 is formed of the EPDM, and the second shaft seal member 982 is formed of the NBR. In contrast, in another embodiment, the first shaft seal member 981 may be formed of the NBR, and the second shaft seal member 982 may be formed of the EPDM. In addition, in another embodiment, both the first shaft seal member 981 and the second shaft seal member 982 may be formed of the NBR. In still another embodiment, both the first shaft seal member 981 and the second shaft seal member 982 may be formed of the EPDM.

In addition, in the present embodiment, an example has been described in which the valve device 10 is attached to the engine 2 so that the shaft 32 extends along the vertical direction. In contrast, in another embodiment, the valve device 10 may be attached to the engine 2 so that the shaft 32 is perpendicular to or inclined to the vertical direction. In this case, although there is a possibility of the axial deviation of the shaft 32 which is caused by gravity, the seal portion annular member 97 can prevent the axial deviation of the shaft 32 which is caused by gravity.

(Twenty-Sixth Embodiment)

Figure 127:
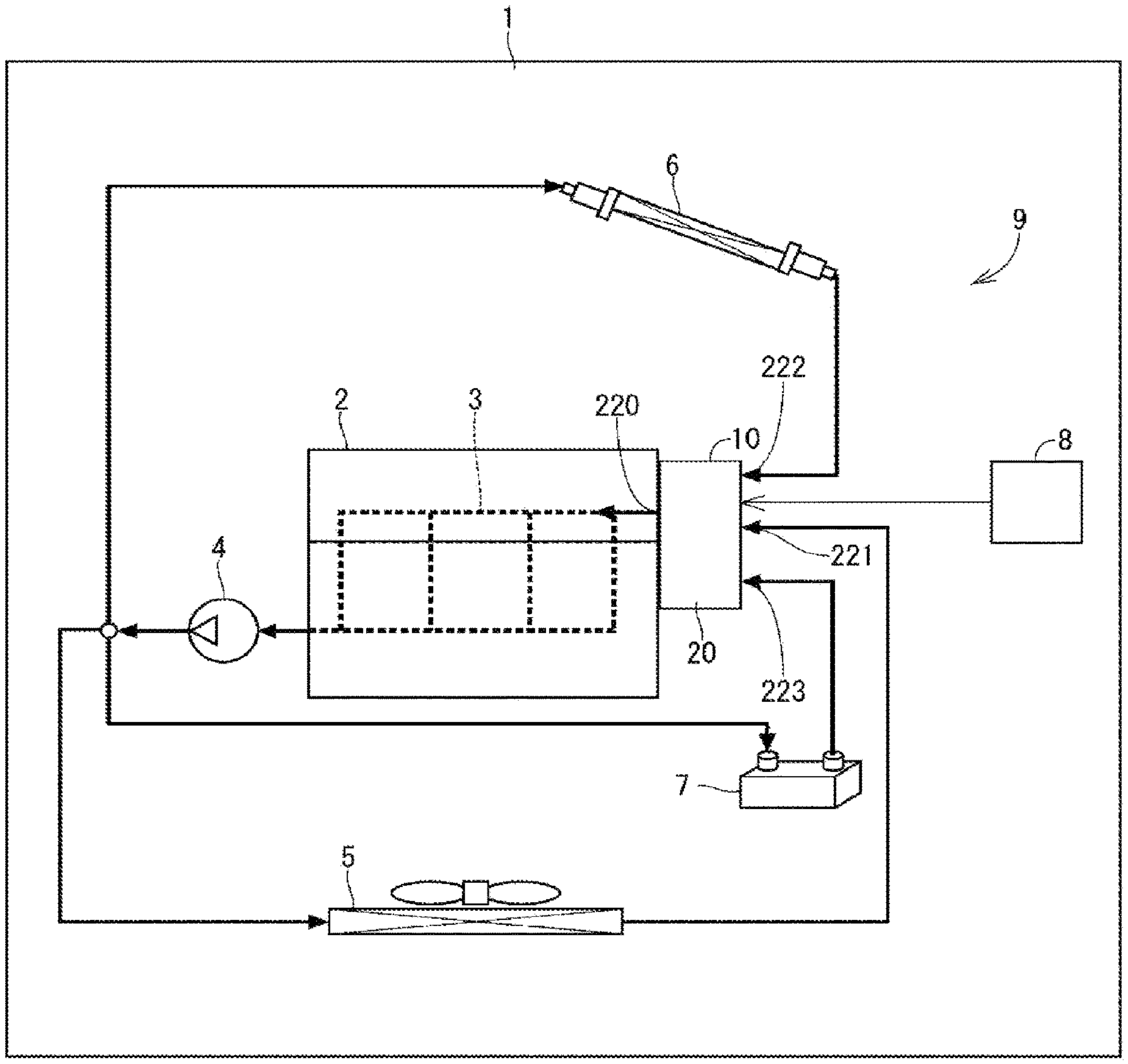

A valve device and a cooling system according to a twenty-sixth embodiment is illustrated in FIG. 127. The twenty-sixth embodiment is different from the first embodiment in disposition of the water pump 4 and a flowing direction of the coolant water.

According to the present embodiment, an intake port and a discharge port of the water pump 4 are provided to be reverse to those of the first embodiment. The water pump 4 is provided on the outlet side of the water jacket 3, suctions the coolant water flowing through the water jacket 3, and pumps the suctioned coolant water toward the radiator 5, the heater 6, and the device 7.

The outlet of radiator 5 is connected to the outlet port 221 of the valve device 10. The outlet of heater 6 is connected to the outlet port 222 of the valve device 10. The outlet of device 7 is connected to the outlet port 223 of the valve device 10. The valve device 10 is attached to the engine 2 so that inlet port 220 is connected to the inlet of the water jacket 3.

The coolant water flowing through the radiator 5, the heater 6, and the device 7 flows from the outlet ports 221, 222, and 223 to the valve device 10, and flows to the water jacket 3 from the inlet port 220. The valve device 10 adjusts the flow rate of the coolant water flowing to the water jacket 3 from the radiator 5, the heater 6, and the device 7.

In this way, the valve device 10 can also be used in such a way that the coolant water flows into one inlet port (220) from three outlet ports (221 to 223), and the coolant water flows out from one inlet port (220).

In the above-described embodiments, an example has been described in which the valve device 10 is attached to the engine 2 so that the inlet port 220 is connected to the inlet of the water jacket 3. In contrast, in another embodiment, the inlet port 220 and the water jacket 3 may be connected to each other via a member such as a pipe, and the housing 20 of the valve device 10 may be provided away from the engine 2.

Other Embodiments

<3-7-1>

In contrast to the third embodiment, the first restriction projection portion 332 may be formed at a position away from the second restriction projection portion 342.

<3-7-2>

The distance between the first restriction projection portion 332 and the rotation axis Axr1 may be the same as or may be different from the distance between the second restriction projection portion 342 and the rotation axis Axr1.

When the distance between the first restriction projection portion 332 and the rotation axis Axr1 is the same as the distance between the second restriction projection portion 342 and the rotation axis Axr1, contact loads can be the same as each other, when the first restriction projection portion 332 and the second restriction projection portion 342 come into contact with the restriction portion 631 so that the rotation of the valve body 31 is restricted.

<6-1-16-1>

In contrast to the thirteenth embodiment, the partition wall through-hole 65 may be formed so that the cross-sectional area gradually increases inward in the radial direction from the outside in the radial direction of the shaft insertion hole 62.

In this case, even when the water enters from the outside via the housing through-hole 270, it is possible to prevent a possibility that the water may flow to the shaft insertion hole 62 via the partition wall through-hole 65.

In the above-described embodiments, an example has been described in which the housing main body 21 and the partition wall portion 60 are separately formed. In contrast, in another embodiment, the housing main body 21 and the partition wall portion 60 may be integrally formed.

In addition, in the above-described embodiments, an example has been described in which the inlet port 220, the outlet ports 221 to 223, and the relief port 224 are formed in the direction orthogonal to the axis of the shaft 32. In contrast, in another embodiments, the inlet port 220, the outlet ports 221 to 223, and the relief port 224 may be formed in the axial direction of the shaft 32. The valve device 10 may be used so that the coolant water flows in from the outlet ports 221 to 223 and the coolant water flows out from the inlet port 220. In addition, any desired number of the inlet ports, the outlet ports, and the relief ports may be formed in the housing main body 21.

In the above-described embodiments, an example has been described in which the valve device 10 is applied to the engine 2 as a heating element. In contrast, in another embodiment, the valve device 10 may be adopted as a valve device for controlling the coolant water of the battery as the heating element mounted on a hybrid vehicle or an electric vehicle.

The valve device 10 may be attached to the heating element in any desired posture.

In the above-described embodiments, an example has been described in which the drive unit cover 80 has six cover fixing portions. In contrast, in another embodiment, the number of the cover fixing portions is not limited to six, and any number such as five may be formed in the cover main body 81.

<12-10>

In the above-described fifteenth embodiment, an example has been described in which the outer circumferential wall and the inner circumferential wall of the valve body 31 are formed in a spherical shape. In contrast, in another embodiment, the outer circumferential wall and the inner circumferential wall of the valve body 31 may be formed in a cylindrical shape. In addition, at least a portion of the outer circumferential wall of the valve body 31 may be formed in a spherical shape or in a cylindrical shape. The rotary valve having the shape in this way can achieve an advantageous effect the same as that of the fifteenth embodiment.

The control unit and the methods which are described in the present disclosure may be realized by a dedicated computer provided by forming a processor and a memory which are programmed to cause a computer program to execute one or more embodied functions. Alternatively, the control unit and the method which are described in the present disclosure may be realized by a dedicated computer provided by forming the processor with one or more dedicated hardware logic circuits. Alternatively, the control unit and the method which are described in the present disclosure may be realized by one or more dedicated computers configured to include a combination of a processor and a memory which are programmed to execute one or more functions and a processor configured to include one or more hardware logic circuits. The computer program may be stored in a computer readable and non-transitive tangible recording medium as instructions executed by the computer.

As described above, the present disclosure is not limited to the above-described embodiments, and can be implemented in various forms within the scope not departing from the concept of the present disclosure.

<1><Task>

For example, in the valve device described in Patent Literature 1, the inlet port or the outlet port is connected to the internal combustion engine of the vehicle via the hose. Here, when the inlet port or the outlet port is directly connected to the internal combustion engine without using the hose, the sealing property is degraded between the inlet port or the outlet port and the internal combustion engine, due to the disposition of the fastening location between the valve device and the internal combustion engine, thereby causing a possibility that the coolant water may leak outward.

An object of the present disclosure is to provide the valve device which can prevent the leakage of the coolant water from between the valve device and the heating element of the vehicle.

<1><Means>

<1-1>

According to a first aspect of the present disclosure, there is provided a valve device capable of controlling coolant water of a heating element of a vehicle. The valve device includes a housing and a valve. A housing main body is fixed to the heating element by a fastening member screwed to the heating element through the fastening hole. At least three fastening holes are formed. An opening of a port is formed inside a triangle formed by connecting three fastening holes to each other.

Therefore, in a case where a seal member formed of an annular elastic member is provided around the port, when the housing main body is fixed to the heating element by the fastening member passing through the three fastening holes, the seal member can be compressed in a balanced manner. In this manner, the sealing property around the port can be effectively ensured.

<1-2>

According to a second aspect of the present disclosure, there is provided a valve device capable of controlling coolant water of a heating element of a vehicle. The valve device includes a housing, a valve, a partition wall portion, and a drive unit. A housing main body is fixed to the heating element by a fastening member screwed to the heating element through the fastening hole. The fastening hole includes a first fastening hole formed outside in a radial direction of an opening of a port, a second fastening hole formed to interpose the opening of the port with the first fastening hole, and a third fastening hole formed on the drive unit side with respect to the first fastening hole and the second fastening hole.

Therefore, in a case where a seal member made of an annular elastic member is provided around the port, when a housing main body is fixed to the heating element by the fastening member passing through the first fastening hole and the second fastening hole, the seal member can be compressed in a balanced manner. In this manner, the sealing property around the port can be effectively ensured.

In addition, since the fastening portion is fixed to the heating element by the fastening member passing through the third fastening hole, it is possible to prevent a possibility that the drive unit may be affected by vibrations of the heating element.

Hereinafter, technical ideas other than those described in the appended claims understood from the respective embodiments will be described.

<1-2-1>

In the valve device, a center of the opening of the port is located on a straight line connecting the first fastening hole and the second fastening hole to each other.

<1-2-2>

In the valve device, a distance between the center of the opening of the port and the first fastening hole is the same as a distance between the center of the opening of the port and the second fastening hole.

<1-2-3>

In the valve device, a distance between the third fastening hole and the drive unit is shorter valve device than a distance between the third fastening hole and the center of the opening of the port.

<1-2-4>

In the valve device, the third fastening hole is formed so that the center is located on the drive unit 70 side with respect to a virtual plane passing through the center of the outlet port 223 and orthogonal to the rotation axis Axr1.

<1-3-1>

In the valve device, the first fastening hole and the second fastening hole which are point-symmetrical with respect to the center of the opening of the port are formed so that the straight line perpendicular to the opening surface of the port and passing through the center of the opening of the port passes through the rotation axis.

<1-4-1>

In the valve device, the first positioning portion and the second positioning portion are formed so that a second straight line connecting the first positioning portion and the second positioning portion to each other is orthogonal to a first straight line connecting the first fastening hole and the second fastening hole to each other.

<1-4-2>

In the valve device, the center of the first straight line and the center of the second straight line coincide with each other.

<1-5-1>

In the valve device, the multiple attachment surface recess portions are formed, and an inter-recess portion rib is formed between the multiple attachment surface recess portions.

<1-1-5-1>

In the valve device, the housing main body is formed of a polyphenylene sulfide resin containing a filler.

<2-1-1>

The valve device further includes an annular seal member provided between the housing opening portion and the partition wall portion, and capable of holding a portion between the housing opening portion and the partition wall portion in a liquid-tight manner. The partition wall portion has a partition wall portion main body having an inner wall formed in a cylindrical shape, located inside the housing opening portion, and having an outer wall formed in a cylindrical shape. The annular seal member is provided between the housing opening portion and the partition wall portion main body. A difference between an inner diameter of the housing opening portion and an outer diameter of the partition wall portion main body is smaller than a difference between an inner diameter and an outer diameter of the annular seal member in a free state.

<2-2-1>

In the valve device, a gap in the axial direction is formed in at least one of the housing main body and the partition wall portion in the axial direction of the annular seal member.

<3-4-1>

In the valve device, in the valve body, in a fully closed state where all of the seal opening portions are closed by the outer circumferential wall of the valve body, in at least a range corresponding to the seal opening portion in the direction of the rotation axis and in a circumferential direction, distances between the inner circumferential wall and the outer circumferential wall are the same as each other.

<3-7-1>

In the valve device, the first restriction projection portion is formed at a position away from the second restriction projection portion.

<3-7-2>

In the valve device, a distance between the first restriction projection portion and the rotation axis is the same as a distance between the second restriction projection portion and the rotation axis.

<3-9-1>

In the valve device, the valve body opening rib is formed in an arc shape at a predetermined distance from the virtual spherical surface.

<3-12-1>

In the valve device, the specific shape portion is formed so that the outer wall projects outward from the outer circumferential wall of the cylindrical portion.

<3-12-2>

In the valve device, the specific shape portion is formed so that the outer wall is recessed inward from the outer circumferential wall of the cylindrical portion.

<3-12-3>

In the valve device, the outer wall of the specific shape portion is formed in a planar shape.

<3-17-1>

The valve device further includes a drive unit capable of driving the valve body to rotate via one end of the shaft. In the valve, the second outermost end surface is provided to face the drive unit side, and an area of the second outermost end surface is larger than an area of the first outermost end surface.

<3-19-1>

In the valve device, the first end surface opening rib, the second end surface opening rib, the second valve body opening rib, and the third valve body opening rib are formed at the same position in the circumferential direction of the valve body.

<Mar. 22, 2023-1>

There is provided a manufacturing method of a valve. The first mold has a first outer mold having a first recess surface corresponding to a shape of the outer circumferential wall of the first divided body, and a first inner mold having a first projection surface corresponding to a shape of the inner circumferential wall of the first divided body. The second mold has a second outer mold having a second recess surface corresponding to a shape of the outer circumferential wall of the second divided body, and a second inner mold having a second projection surface corresponding to a shape of the inner circumferential wall of the second divided body. When the first divided body and the second divided body are resin-molded in the first molding step, in at least a partial area in the direction of the rotation axis and the circumferential direction, a distance between the first recess surface and the first projection surface, and a distance between the second recess surface and the second projection surface are the same as each other.

<3-25-1>

In the manufacturing method of a valve, the outer mold has a recess surface corresponding to a shape of the outer circumferential wall of the valve body. The inner mold has a projection surface corresponding to a shape of the inner circumferential wall of the valve body. When the valve body is resin-molded in the resin molding step, in at least a partial area in the direction of the rotation axis and the circumferential direction, distances between the recess surface and the projection surface are the same as each other.

<4-1-1>

In the valve device, the multiple cover fixing portions are formed, and the multiple cover fixing portions are located on a virtual plane perpendicular to the attachment surface.

<4-2-1>

In the valve device, the partition wall portion is formed separately from the housing main body. The housing main body has a cutout portion to such an extent that the partition wall portion is exposed in an end portion on a side opposite to the attachment surface.

<4-3-1>

In the valve device, the connector portion is formed to project in a direction other than the direction perpendicular to the attachment surface from an outer edge portion of the cover main body.

<4-3-2>

In the valve device, the connector portion is formed to project in a direction parallel to the attachment surface from an outer edge portion of the cover main body.

<5-2-1>

In the valve device, the ports having at least the seal unit out of the multiple ports are formed so that axes are parallel to each other.

<5-13-1>

The valve device includes an annular seal member provided between the housing opening portion and the partition wall portion, and are capable of holding a portion between the housing opening portion and the partition wall portion in a liquid-tight manner.

<6-1-1>

In the valve device, the partition wall through-hole is formed so that the cross-sectional shape is oval or rectangular.

<6-2-1>

In the valve device, the housing through-hole is formed so that the cross-sectional shape is oval or rectangular.

<6-2-2>

In the valve device, the partition wall through-hole and the housing through-hole are coaxially formed.

<6-11-1>

In the valve device, when the distance between the axis of the partition wall through-hole and the axis of the housing through-hole is defined as L, and the size of the housing through-hole in the axial direction of the shaft insertion hole is defined as D, the partition wall through-hole and the housing through-hole are formed to satisfy a relationship of D≤L≤10D.

<6-1-16-1>

In the valve device, the partition wall through-hole is formed so that the cross-sectional area gradually increases inward in the radial direction from the outside in the radial direction of the shaft insertion hole.

A minimum basic configuration of each embodiment is illustrated below.

There is provided a valve device (10) capable of controlling a coolant water of a heating element (2) of a vehicle (1). The valve device (10) includes an internal space (200) formed inside, a housing (20) having ports (220, 221, 222, and 223) connecting the internal space and an outside, and a valve (30) having a valve body (31) provided inside the internal space to be rotatable around a rotation axis (Axr1), and capable of opening and closing the ports in accordance with a rotation position of the valve body.

That is, configuration elements other than configuration elements described in the above-described minimum basic configuration are not essential elements of each embodiment.

In order to solve the problems described in each embodiment, technical ideas described in the embodiments can be appropriately combined with the above-described minimum basic configuration.

Hereinafter, representative technical ideas understood from each embodiment will be described.

<1>

[A01]

There is provided a valve device (10) capable of controlling coolant water of a heating element (2) of a vehicle (1). The valve device (10) includes a housing (20) having a housing main body (21) internally forming an internal space (200), an attachment surface (201) formed on an outer wall of the housing main body to face the heating element in a state of being attached to the heating element, a port (220) which is open on the attachment surface and connects the internal space and an outside of the housing main body to each other, multiple fastening portions (231, 232, and 233) formed integrally with the housing main body, and multiple fastening holes (241, 242, and 243) formed corresponding to each of the multiple fastening portions, and a valve (30) having a valve body (31) rotatable around a rotation axis (Axr1) inside the internal space, and a valve body internal flow channel (300) formed inside the valve body and capable of communicating with the port. The housing main body is fixed to the heating element by a fastening member (240) screwed to the heating element through the fastening hole. At least three fastening holes are formed, and an opening of the port is formed inside a triangle (Ti1) formed by connecting the three fastening holes.

[A02]

There is provided a valve device (10) capable of controlling coolant water of a heating element (2) of a vehicle (1). The valve device (10) includes a housing main body (21) internally forming an internal space (200), an attachment surface (201) formed on an outer wall of the housing main body to face the heating element in a state of being attached to the heating element, a port (220) which is open on the attachment surface and connects the internal space and an outside of the housing main body to each other, a housing (20) having multiple fastening portions (231, 232, and 233) formed integrally with the housing main body, and multiple fastening holes (241, 242, and 243) formed corresponding to each of the multiple fastening portions, and a valve (30) having a valve body (31) rotatable around a rotation axis (Axr1) inside the internal space, a valve body internal flow channel (300) formed inside the valve body and capable of communicating with the port, and a shaft (32) provided in the rotation direction, a partition wall portion (60) which partitions the internal space and the outside of the housing main body from each other, and a drive unit (70) provided on a side opposite to the internal space with respect to the partition wall portion, and capable of driving the valve body to rotate via the shaft. The housing main body is fixed to the heating element by a fastening member (240) screwed to the heating element through the fastening hole. The fastening hole includes a first fastening hole (241) formed outside in the radial direction of an opening of the port, a second fastening hole formed to interpose the opening of the port with the first fastening hole (242), and a third fastening hole (243) formed on the drive unit side with respect to the first fastening hole and the second fastening hole.

[A03]

In the valve device according to [A02], the first fastening hole and the second fastening hole are formed to be point-symmetrical with respect to center (Cp1) of the opening of the port.

[A04]

In the valve device according to [A02] or [A03], the housing has positioning portions (205 and 206) formed on the attachment surface and capable of positioning the housing main body by engaging with the other member. The positioning portion includes a first positioning portion (205) formed outside in the radial direction of the opening of the port, and a second positioning portion (206) formed to interpose the opening of the port with the first positioning portion.

[A05]

In the valve device according to any one of [A01] to [A04], the housing has an attachment surface recess portion (207) recessed from the attachment surface to a side opposite to the heating element.

[A06]

In the valve device according to any one of [A02] to [A04], the fastening portion (233) having the third fastening hole is formed at a position adjacent to the partition wall portion.

[A07]

In the valve device according to [A05], the fastening portion has the attachment surface on the heating element side, and has the attachment surface recess portion recessed from the attachment surface to the side opposite to the heating element.

[A08]

In the valve device according to [A07], the housing has positioning portions (205 and 206) formed on the attachment surface and capable of positioning the housing main body by engaging with the other member, and an inter-recess portion rib (208) formed between the multiple attachment surface recess portions. The positioning portion is formed in a lattice point (204) of the inter-recess portion rib.

[A09]

The valve device according to any one of [A01] to [A08], the housing has positioning portions (205 and 206) formed on the attachment surface and capable of positioning the housing main body by engaging with another member. One fastening portion is formed on one side of the housing main body in the width direction, and two fastening portions are formed on the other side of the housing main body in the width direction. The positioning portion is formed on one side of the housing main body in the width direction of the housing main body in which one fastening portion is formed.

[A10]

In the valve device according to [A09], the port is formed between the fastening portion farthest away from the port out of the multiple fastening portions and the positioning portion.

[A11]

In the valve device according to any one of [A01] to [A10], the fastening portion has two outer walls whose shape in a cross section taken along a plane perpendicular to the fastening hole is a linear shape, and is formed so that an angle formed by the two outer walls is an obtuse angle.

<2>

[B01]

There is provided a valve device (10) capable of controlling coolant water of a heating element (2) of a vehicle (1). The valve device (10) includes a housing (20) having a housing main body (21) internally forming an internal space (200), ports (220, 221, 222, and 223) connecting the internal space and an outside of the housing main body to each other, and a housing opening portion (210) connecting the internal space and the outside of the housing main body to each other, a valve (30) having a valve body (31) formed rotatable around a rotation axis (Axr1) inside the internal space, a valve body internal flow channel (300) formed inside the valve body, valve body opening portions (410, 420, and 430) connecting the valve body internal flow channel and an outside of the valve body to each other, and a shaft (32) provided on the rotation axis, capable of changing a communication state between the valve body internal flow channel and the port via the valve body opening portion in accordance with a rotation position of the valve body, a partition wall portion (60) provided in the housing opening portion to partition the internal space and the outside of the housing main body from each other, and capable of bearing the shaft, a drive unit cover (80) provided on a side opposite to the internal space with respect to the partition wall portion, and forming a drive unit space (800) between the drive unit cover and the partition wall portion, and a drive unit (70) provided in the drive unit space, and capable of driving the valve body to rotate via the shaft.

[B02]

The valve device according to [B01] further includes an annular seal member (600) provided between the housing opening portion and the partition wall portion, and capable of holding a portion between the housing opening portion and the partition wall portion in a liquid-tight manner. The annular seal member is compressed in the radial direction between the housing opening portion and the partition wall portion.

[B03]

The valve device according to [B01] or [B02] further includes a fixing member (830) capable of fixing the housing main body and the drive unit cover in a state where the partition wall portion is interposed between the housing main body and the drive unit cover.

[B04]

In the valve device according to any one of [B01] to [B03], the partition wall portion has a shaft insertion hole (62) into which one end of the shaft is insertable, and further includes a metal ring (601) insert-molded to the partition wall portion in the shaft insertion hole; and a bearing portion (602) provided inside the metal ring to bear one end of the shaft.

[B05]

In the valve device according to [B04], the partition wall portion has a partition wall recess portion (64) recessed to a side opposite to the drive unit cover from a surface (609) on the drive unit cover side outside in the radial direction of the metal ring.

[B06]

In the valve device according to any one of [B01] to [B05], the drive unit has a motor (71) capable of driving the shaft to drive.

[B07]

The valve device according to [B06] further includes an elastic member (74) provided in a state of being compressed between the motor and the partition wall portion.

[B08]

In the valve device according to [B06] or [B07], the motor is provided so that an axis (Axm1) is orthogonal to an axis (Axs1) of the shaft.

[B09]

The valve device according to any one of [B06] to [B08] further includes a U-shaped power supply terminal (85) provided in the drive unit cover so that an opening side end portion faces the partition wall portion side, and through which a current supplied to the motor flows. The motor has a motor side terminal (713) connected to an opening of the power supply terminal in an end portion in the axial direction, and is provided so that the axis (Axm1) is parallel to a surface (808) facing the partition wall portion side of the drive unit cover.

[B10]

In the valve device according to any one of [B06] to [B09], the drive further includes a holding member (73) having a gear portion (72) capable of transmitting a driving force of the motor to the shaft, having a snap-fit portion (731) capable of snap-fit coupling with the drive unit cover, and holding the motor and the gear portion with the drive unit cover.

[B11]

In the valve device according to any one of [B06] to [B10], the housing has an attachment surface (201) formed on an outer wall of the housing main body to face the heating element in a state of being attached to the heating element. The motor has a motor shaft (711) for outputting a driving force, and a worm gear (712) provided in a tip of the motor shaft, and is provided so that the motor shaft is perpendicular to the attachment surface and the worm gear faces a side opposite to the attachment surface.

[B12]

In the valve device according to [B10], the motor has a motor shaft (711) for outputting a driving force, and a worm gear (712) provided in a tip of the motor shaft. The holding member is formed so that the snap-fit portion is located outside in the radial direction of the worm gear.

[B13]

The valve device according to [B12] further includes a pipe member (50) having cylindrical pipe portions (511, 512, and 513), an internal space of which communicating with the port, and attached to the housing main body. The holding member is formed so that the snap-fit portion is located on the pipe member side with respect to the rotation axis.

<3>

[C01]

There is provided a valve device (10) capable of controlling coolant water of a heating element (2) of a vehicle (1). The valve device (10) includes a housing (20) having ports (220, 221, 222, and 223) which connect an internal space (200) and an outside to each other, a valve (30) having a valve body (31) rotatable around a rotation axis (Axr1) inside the internal space, a valve body internal flow channel (300) formed inside the valve body, valve body opening portions (410, 420, and 430) which connect the valve body internal flow channel and an outside of the valve body to each other, and a shaft (32) provided on the rotation axis, the valve being capable of changing a communication state between the valve body internal flow channel and the port via the valve body opening portion in accordance with a rotation position of the valve body, and an annular valve seal (36) that is provided at a position corresponding to the port to be capable of coming into contact with an outer circumferential wall of the valve body, that internally forms a seal opening portion (360) capable of communicating with the valve body opening portion in accordance with the rotation position of the valve body, and that is capable of holding a portion between the valve seal and the outer circumferential wall of the valve body in a liquid-tight manner. In the valve body, at least a portion of the outer circumferential wall is formed in a spherical shape, and at least a portion of an inner circumferential wall is recessed outward.

[C02]

In the valve device according to [C01], at least a portion of the inner circumferential wall of the valve body is formed in a spherical shape.

[C03]

In the valve device according to [C02], in the valve body, in at least a partial area in the direction of the rotation axis and the circumferential direction, distances between the inner circumferential wall and the outer circumferential wall are the same as each other.

[C04]

In the valve device according to [C03], in the valve body, in a range corresponding to at least the seal opening portion in the direction of the rotation axis and the circumferential direction, the distances between the inner circumferential wall and the outer circumferential wall are the same as each other.

[C05]

In the valve device according to any one of [C01] to [C04], the valve body is formed of a resin, and the shaft is formed integrally with the valve body by insert molding.

[C06]

In the valve device according to any one of [C01] to [C05], the valve body has a first divided body (33) and a second divided body (34) which are divided into two in a virtual plane (Vp1) including the rotation axis. The first divided body and the second divided body are joined to each other on respective joint surfaces (331 and 341). [C07]

The valve device according to [C06] further includes a partition wall portion (60) having a partition wall portion main body (61) that partitions the internal space and the outside of the housing from each other, a shaft insertion hole (62) formed in the partition wall portion main body so that one end of the shaft is insertable, and a restriction recess portion (63) recessed from a surface on the internal space side of the partition wall portion main body to a side opposite to the internal space. The first divided body has a first restriction projection portion (332) which extends from a surface on the partition wall portion side to the restriction recess portion side, and a tip portion of which is located in the restriction recess portion. The second divided body has a second restriction projection portion (342) which extends from a surface on the partition wall portion side to the restriction recess portion side, and a tip end portion of which is located in the restriction recess portion.

[C08]

In the valve device according to [C07], the first restriction projection portion protrudes toward the restriction recess portion in an extending direction of the joint surface. While coming into contact with the first restriction projection portion, the second restriction projection portion protrudes toward the restriction recess portion in the extending direction of the joint surface.

[C09]

In the valve device according to any one of [C06] to [C08], the valve body has valve body opening ribs (411, 421, 422, 431, and 432) which connect an inner edge end of the valve body opening portion. The valve body opening rib is formed at a position radially inside of a virtual spherical surface (Vs1) along the outer circumferential wall of the valve body.

[C10]

In the valve device according to [C09], the valve body opening rib is formed in a linear shape.

[C11]

In the valve device according to any one of [C06] to [C10], the joint surface is located at a position away from the valve seal in a fully closed state where all of the seal opening portions are closed by the outer circumferential wall of the valve body.

[C12]

The valve device according to any one of [C06] to [C11], the valve body has ball valves (41, 42, and 43) having an outer circumferential wall formed in a spherical shape, a cylindrical portion (44, 45) offset from the ball valves toward the rotation axis and having an outer circumferential wall formed in a cylindrical shape, and specific shape portions (441 and 451) formed in the cylindrical portion on the joint surface and having an outer wall whose curvature is different from a curvature of the outer circumferential wall of the cylindrical portion.

[C13]

In the valve device according to any one of [C06] to [C12], the valve body has a first ball valve (41) having the outer circumferential wall formed in a spherical shape, a cylindrical connection portion (44) arranged on a side of the first ball valve in the direction of the rotation axis and having the outer circumferential wall formed in a cylindrical shape, a second ball valve (42) connected to a side of the cylindrical connection portion opposite to the first ball valve and having the outer circumferential wall formed in a spherical shape, a first end surface opening portion (415) formed on an end surface of the first ball valve in the direction along the rotation axis of the first ball valve to connect an inter-valve space (400) formed between the first ball valve and the second ball valve radially outside of the cylindrical connection portion and the valve body internal flow channel of the first ball valve to each other, and a second end surface opening portion (425) formed on an end surface of the second ball valve in the direction along the rotation axis to fluidly connect the inter-valve space and the valve body internal flow channel of the second ball valve. The port (220) is in communication with the inter-valve space.

[C14]

The valve device according to [C13], the valve body is formed of a resin, and the shaft is formed integrally with the valve body by insert molding in the cylindrical connection portion.

[C15]

In the valve device according to [C14], the shaft has a detent portion (321) capable of restricting relative rotation with the cylindrical connection portion, and the detent portion is formed so that a cross-sectional shape is polygonal or non-perfect circular.

[C16]

The valve device according to any one of [C13] to [C15], the valve body has a cylindrical valve connection portion (45) connected to a side of the second ball valve opposite to the cylindrical connection portion and having an outer circumferential wall and an inner circumferential wall which are formed in a cylindrical shape to define the valve body internal flow channel therein, and a third ball valve (43) connected to a side of the cylindrical valve connection portion opposite to the second ball valve and having the outer circumferential wall formed in a spherical shape.

[C17]

In the valve device according to [C16], an outer diameter of the outer circumferential wall of the first ball valve has a same value as an outer diameter of the outer circumferential wall of the third ball valve. An area of a first outermost end surface (301) which is an end surface of the first ball valve opposite to the third ball valve in the direction along the rotation axis has a different value from an area of a second outermost end surface (302) which is an end surface of the third ball valve opposite to the first ball valve in the direction of the rotation axis.

[C18]

In the valve device according to [C16] or [C17], the valve body has a second valve body opening rib (422) connecting inner edge ends of the valve body opening portion of the second ball valve, and a third valve body opening rib (432) connecting inner edge ends of the valve body opening portion of the third ball valve. The second valve body opening rib and the third valve body opening rib are formed at the same position in a circumferential direction of the valve body.

[C19]

In the valve device according to any one of [C13] to [C18], the valve body has first end surface opening ribs (416 and 417) connecting the cylindrical connection portion and the first ball valve to each other over the first end surface opening portion, and second end surface opening rib (426 and 427) connecting the cylindrical connection portion and the second ball valve to each other over the second end surface opening portion.

[C20]

In the valve device according to [C19], the first end surface opening rib forms a first rib end surface gap (418) between the first end surface opening rib and an end surface of the first ball valve in the direction of the rotation axis, and the second end surface opening rib forms a second rib end surface gap (428) between the second end surface opening rib and an end surface of the second ball valve in the direction of the rotation axis.

[C21]

The valve device according to [C19] or [C20], the first end surface opening rib is formed so that a surface on the second ball valve side is inclined with respect to the rotation axis, and the second end surface opening rib is formed so that a surface on the first ball valve side is inclined with respect to the rotation axis.

[C22]

There is provided a manufacturing method of a valve (30) having a valve body (31) rotatable around a rotation axis (Axr1) and a valve body internal flow channel (300) formed inside the valve body. In the valve body, at least a portion of an outer circumferential wall is formed in a spherical shape, and at least a portion of an inner circumferential wall is recessed outward, and the valve body has a first divided body (33) and a second divided body (34) which are divided into two by a virtual plane (Vp1) including the rotation axis. The first divided body and the second divided body are joined to each other on respective joint surfaces (331 and 341). The manufacturing method includes a first molding step of respectively performing resin-molding on the first divided body and the second divided body by a first mold (110) and a second mold (120), and a second molding step of injecting a resin to a portion between a welding portion on the joint surface of the first divided body and a welding portion on the joint surface of the second divided body, and welding the first divided body and the second divided body to each other.

[C23]

The manufacturing method of a valve according to [C22] further includes a sliding step in which the first divided body or the second divided body is slid together with the first mold or the second mold so that the respective joint surfaces of the first divided body and the second divided body face each other, between the first molding step and the second molding step.

[C24]

In the manufacturing method of a valve according to [C22] or [C23], the valve has a shaft (32) provided on the rotation axis. The manufacturing method further includes a shaft disposition step of disposing the shaft in the rotation axis, between the first molding step and the second molding step.

[C25]

There is provided a manufacturing method of a valve (30) having a valve body (31) rotatable around a rotation axis (Axr1) and a valve body internal flow channel (300) formed inside the valve body. In the valve body, at least a portion of an outer circumferential wall is formed in a spherical shape, and at least a portion of an inner circumferential wall is recessed outward. The manufacturing method includes a resin molding step in which the valve body is resin-molded between an outer mold (180) and inner molds (160 and 170) disposed inside the outer mold, and a mold movement step in which the inner mold is moved inward of the valve body after the resin molding step.

[C26]

In the valve manufacturing method according to [C25], the inner mold has projection surfaces (161 and 171) corresponding to a shape of an inner circumferential wall of the valve body. A projection height (H1) of the projection surface is set to be smaller than a distance (Dm1) at which the inner mold is movable in the mold movement step.

[C27]

In the valve device according to any one of [C01] to [C21], the valve body is formed so that at least a facing portion of the inner circumferential wall, which is a portion facing the port into which coolant water flows is recessed outward.

[C28]

In the valve device according to [C27], the valve seal comes into contact with a portion corresponding to at least the facing portion of the outer circumferential wall of the valve body.

[C29]

In the valve device according to any one of [C16] to [C18], the size of the valve body opening portion of the first ball valve is larger than the size of the valve body opening portion of the second ball valve and the size of the valve body opening portion of the third ball valve.

[C30]

The valve device according to [C06] further includes a partition wall portion (60) having a partition wall portion main body (61) that partitions the internal space and the outside of the housing, a shaft insertion hole (62) formed in the partition wall portion main body so that one end of the shaft is insertable, and a restriction recess portion (63) recessed from a surface on the internal space side of the partition wall portion main body to a side opposite to the internal space. The valve body has a restriction projection portion (343) extending from a surface on the partition wall portion side of the first divided body or the second divided body to the restriction recess portion side, and having a tip portion located in the restriction recess portion.

[C31]

In the valve device according to [C07], the first restriction projection portion protrudes toward the restriction recess portion in an extending direction of the joint surface. The second restriction projection portion protrudes toward the restriction recess portion in the extending direction of the joint surface without coming into contact with the first restriction projection portion.

<4>

[D01]

There is provided a valve device (10) capable of controlling coolant water of a heating element (2) of a vehicle (1). The valve device (10) includes a housing (20) having a housing main body (21) internally forming an internal space (200), an attachment surface (201) formed on an outer wall of the housing main body to face the heating element in a state of being attached to the heating element, and ports (220, 221, 222, and 223) which connect the internal space and an outside of the housing main body to each other, and a valve (30) having a valve body (31) rotatable around a rotation axis (Axr1) inside the internal space, a valve body internal flow channel (300) formed inside the valve body, valve body opening portions (410, 420, and 430) which connect the valve body internal flow channel and an outside of the valve body to each other, and a shaft (32) provided on the rotation axis, the valve being capable of changing a communication state between the valve body internal flow channel and the port via the valve body opening portion in accordance with a rotation position of the valve body, a partition wall portion (60) provided to partition the internal space and the outside of the housing main body from each other, and having a shaft insertion hole (62) formed so that one end of the shaft is insertable, a drive unit cover (80) provided on a side opposite to the internal space with respect to the partition wall portion, and forming a drive unit space (800) between the drive unit cover and the partition wall portion, a drive unit (70) provided in the drive unit space, and capable of driving the valve body to rotate via one end of the shaft. The drive unit cover has a cover main body (81) forming the drive unit space, and cover fixing portions (821 to 826) formed in the outer edge portion of the cover main body and fixed to the housing main body. The cover fixing portion is formed not to project outward from at least one of both end portions (215 and 216) in a direction (Dv1) perpendicular to the attachment surface of the housing main body.

[D02]

In the valve device according to [D01], an end portion (215) on a side opposite to the attachment surface of the housing main body is formed not to project outward from an end portion (815) on a side opposite to the attachment surface of the cover main body.

[D03]

In the valve device according to [D01] or [D02], the drive unit cover has a connector portion (84) having a terminal (841) formed in an outer edge portion of the cover main body, and electrically connected to the outside. The connector portion is formed not to project outward from at least one of both end portions (815 and 816) in a direction perpendicular to the attachment surface of the cover main body.

[D04]

There is provided a valve device (10) capable of controlling coolant water of a heating element (2) of a vehicle (1). The valve device (10) includes a housing (20) having a housing main body (21) internally forming an internal space (200), housing-side cover fixing portions (291 to 296) formed as portions different from the housing main body to project from an outer wall of the housing main body, an attachment surface (201) formed on an outer wall of the housing main body to face the heating element in a state of being attached to the heating element, and ports (220, 221, 222, and 223) which connect the internal space and an outside of the housing main body to each other, a valve (30) having a valve body (31) rotatable around a rotation axis (Axr1) inside the internal space, a valve body internal flow channel (300) formed inside the valve body, valve body opening portions (410, 420, and 430) which connect the valve body internal flow channel and an outside of the valve body to each other, and a shaft (32) provided on the rotation axis, the valve being capable of changing a communication state between the valve body internal flow channel and the port via the valve body opening portion in accordance with a rotation position of the valve body, a partition wall portion (60) provided to partition the internal space and the outside of the housing main body from each other, and having a shaft insertion hole (62) formed so that one end of the shaft is insertable, a drive unit cover (80) provided on a side opposite to the internal space with respect to the partition wall portion, and forming a drive unit space (800) between the drive unit cover and the partition wall portion, and a drive unit (70) provided in the drive unit space, and capable of driving the valve body to rotate via one end of the shaft. The drive unit cover has a cover main body (81) forming the drive unit space, and cover fixing portions (821 to 826) formed as portions different from the cover main body to project from the outer wall of the cover main body, and fixed to the housing-side cover fixing portion. The cover fixing portion is formed not to project outward from at least one of both end portions (215 and 216) in a direction (Dv1) perpendicular to the attachment surface of the housing main body, or is formed not to project outward from at least one of both end portions (215 and 216) in a direction (Dp1) parallel to the attachment surface of the housing main body.

[D05]

In the valve device according to [D04], in a state where the housing main body is attached to the heating element, the cover fixing portion is formed not to project outward from at least one of both end portions (215 and 216) in the direction (Dv1) perpendicular to the attachment surface of the housing main body and in a horizontal direction, or is formed not to project outward from at least one of both end portions (215 and 216) in the direction parallel (Dp1) to the attachment surface of the housing main body and in the horizontal direction.

[D06]

In the valve device according to [D04] or [D05], the housing has the multiple ports. In a state where the housing main body is attached to the heating element, the port connected to a heater (6) of the vehicle is formed not to be located on an uppermost side in a vertical direction out of the multiple ports.

<5>

[E01]

There is provided a valve device (10) capable of controlling coolant water of a heating element (2) of a vehicle (1). The valve device (10) includes a housing (20) having a housing main body (21) internally forming an internal space (200), housing-side fixing portions (251 to 256) formed integrally with the housing main body, housing-side fastening holes (261 to 266) formed in the housing-side fixing portions, and ports (220, 221, 222, 223, and 224) which connect the internal space and an outside of the housing main body to each other, a valve (30) having a valve body (31) rotatable around a rotation axis (Axr1) inside the internal space, a valve body internal flow channel (300) formed inside the valve body, and valve body opening portions (410, 420, and 430) which connect the valve body internal flow channel and an outside of the valve body to each other, the valve being capable of changing a communication state between the valve body internal flow channel and the port via the valve body opening portion in accordance with a rotation position of the valve body, cylindrical pipe portions (511, 512, 513, and 514) whose internal spaces communicate with the ports (221, 222, 223, and 224), pipe-side fixing portions (531 to 536) formed integrally with the pipe portions, and fixed to the housing-side fixing portion, a pipe member (50) having pipe-side fastening holes (541 to 546) formed in the pipe-side fixing portion; and a pipe fastening member (540) which fixes the pipe-side fixing portion and the housing-side fixing portion to each other by being screwed into the housing-side fastening holes through the pipe-side fastening holes. The housing-side fixing portion forms a gap (Sh1) with an outer wall of the housing main body.

[E02]

In the valve device according to [E01], the housing has the multiple ports, and the pipe member has the multiple pipe portions which are coupled to each other, and includes multiple seal units (35) provided in each of the multiple pipe portions (511 to 513), and capable of holding a portion between the multiple seal units and the outer circumferential wall of the valve body in a liquid-tight manner.

[E03]

The valve device according to [E02] includes a gasket (509) provided between the pipe member and the housing main body outside in the radial direction of each of the multiple pipe portions, and capable of holding the portion between the pipe member and the housing main body in a liquid-tight manner.

[E04]

In the valve device according to any one of [E01] to [E03], the housing has the multiple housing-side fastening holes, and the port is formed so that the center of the port is located on a straight line (Lo1) connecting two of the multiple housing-side fastening holes, or inside triangles (To1 and To2) formed by connecting three of the housing-side fastening holes.

[E05]

In the valve device according to any one of [E01] to [E04], the housing has a pipe attachment surface (202) formed on the outer wall of the housing main body to face the pipe member in a state where the pipe member is attached to the housing main body. The port includes three outlet ports (221 to 223) which are open on the pipe attachment surface, and one relief port (224), and includes a relief valve (39) provided in the relief port, and allowing or blocking communication between the internal space and the outside of the housing main body via the relief port in response to conditions. At least two of the three outlet ports are formed so that the center of each opening is located on a port array straight line (Lp1) which is one straight line on the pipe attachment surface. The relief port is formed so that the center of the opening is located at a position away from the port array straight line.

[E06]

In the valve device according to [E05], when viewed in a direction of the port array straight line, at least two of the three outlet ports and the relief port are formed to partially overlap each other.

[E07]

In the valve device according to [E05] or [E06], the relief port is formed so that the center of the opening is located on a relief array straight line (Lr1) which is a straight line on the pipe attachment surface parallel to the port array straight line. When viewed in the direction of the port array straight line, a portion on the relief array straight line side with respect to at least two of the port array straight lines of the three outlet ports and a portion on the port array straight line side with respect to the relief array straight line of the relief port are formed to partially overlap each other.

[E08]

In the valve device according to any one of [E05] to [E07], the housing has the multiple housing-side fastening holes. At least two of the multiple housing-side fastening holes are formed on a fastening hole straight line (Lh1) which is a straight line located on the relief port side with respect to the port array line. The relief port is formed to overlap a portion of the fastening hole straight line.

[E09]

In the valve device according to any one of [E01] to [E08], The pipe portion has a pipe portion main body (501) and a pipe portion end portion (502) formed on a side opposite to the port of the pipe portion main body, whose inner diameter is larger than the inner diameter of the pipe portion main body, and whose outer diameter is larger than the outer diameter of the pipe portion main body.

[E10]

In the valve device according to any one of [E01] to [E09], the pipe portion has a pipe portion main body (501), and a pipe portion projection (503) projecting outward from an outer wall of the pipe portion main body.

[E11]

In the valve device according to [E10], the housing has an attachment surface (201) formed on the outer wall of the housing main body to face the heating element in a state of being attached to the heating element. The pipe portion projection is formed on a virtual plane (Vp5) parallel to the attachment surface.

[E12]

In the valve device according to any one of [E01] to [E11], the pipe member has the multiple pipe portions and a pipe coupling portion (52) which couples portions on the housing main body side of the multiple pipe portions.

[E13]

In the valve device according to any one of [E01] to E12), the housing has a housing opening portion (210) connecting the internal space and the outside of the housing main body to each other, and a cylindrical housing inner wall (211), one end of which is connected to the housing opening portion to form the internal space. The valve has a shaft (32) provided on the rotation axis, and includes a partition wall portion (60) having a partition wall portion main body (61) provided in the housing opening portion to partition the internal space and the outside of the housing main body from each other, and a shaft insertion hole (62) formed in the partition wall portion main body so that one end of the shaft is insertable. The inner diameter of the housing opening portion is larger than the inner diameter of an end portion on a side opposite to the housing opening portion of the housing inner wall.

[E14]

The valve device according to [E13], the housing inner wall is formed in a tapered shape so that the inner diameter decreases from the housing opening portion side toward a side opposite to the housing opening portion.

[E15]

The valve device according to any one of [E01] to [E14], the housing has the multiple ports, and an attachment surface (201) formed on the outer wall of the housing main body to face the heating element in a state of being attached to the heating element. At least two of the multiple ports are formed to be aligned in a direction parallel to the attachment surface.

[E16] In the valve device according to any one of [E01] to [E15], the pipe fastening member is a tapping screw which can be screwed to the housing-side fastening hole by tapping.

<6>

[F01]

There is provided a valve device (10) capable of controlling coolant water of a heating element (2) of a vehicle (1). The valve device (10) includes a housing (20) having a housing main body (21) internally forming an internal space (200), ports (220, 221, 222, and 223) which connect the internal space and an outside of the housing main body to each other, and a housing opening portion (210) connecting the internal space and an outside of the housing main body, a valve (30) having a valve body (31) rotatable around a rotation axis (Axr1) inside the internal space, a valve body internal flow channel (300) formed inside the valve body, valve body opening portions (410, 420, and 430) which connect the valve body internal flow channel and an outside of the valve body to each other, and a shaft (32) provided on the rotation axis, the valve being capable of changing a communication state between the valve body internal flow channel and the port via the valve body opening portion in accordance with a rotation position of the valve body, a partition wall portion (60) having a partition wall portion main body (61) provided in the housing opening portion to partition the internal space and the outside of the housing main body from each other, and a shaft insertion hole (62) formed in the partition wall portion main body so that one end of the shaft is insertable, and a drive unit (70) provided on a side opposite to the internal space with respect to the partition wall portion, and capable of driving the valve body to rotate via one end of the shaft. The partition wall portion has a partition wall through-hole (65) which extends outward from the shaft insertion hole and is open on the outer wall of the partition wall portion main body.

[F02]

In the valve device according to [F01], the housing a housing through-hole (270) which extends outward from an inner wall of the housing opening portion, is open on the outer wall of the housing main body, and is formed to be capable of communicating with the partition wall through-hole.

[F03]

The valve device according to [F02] further includes a first seal member (603) provided on the internal space side with respect to the partition wall through-hole, and capable of holding a portion between the shaft and the shaft insertion hole in a liquid-tight manner, and a second seal member (600) provided on the internal space side with respect to the housing through-hole, and capable of holding a portion between the partition wall portion main body and the inner wall of the housing opening portion in a liquid-tight manner.

[F04]

In the valve device according to [F03], a distance (Ds1) between the first seal member and the partition wall through-hole is shorter than a distance (Ds2) between the second seal member and the housing through-hole.

[F05]

In the valve device according to [F03] or [F04], the partition wall portion has a partition wall inner step surface (661) forming a step between the partition wall through-hole of the shaft insertion hole and the first seal member. The housing has a housing step surface (281) forming a step between the housing through-hole of the inner wall of the housing opening portion and the second seal member.

[F06]

In the valve device according to [F05], the housing step surface is formed in a tapered shape so that the inner diameter increases toward the drive unit side from the internal space side.

[F07]

In the valve device according to any one of [F02] to [F06], the housing has an attachment surface (201) formed on the outer wall of the housing main body to face the heating element in a state of being attached to the heating element. The housing through-hole is open on the attachment surface.

[F08]

In the valve device according to any one of [F02] to [F07], in a state where the housing is attached to the heating element, the partition wall through-hole is located on a lower side of the shaft in a vertical direction.

[F09]

In the valve device according to any one of [F02] to [F08], in a state where the housing is attached to the heating element, the housing through-hole is located on a lower side of the shaft in a vertical direction.

[F10]

In the valve device according to any one of [F02] to [F09], the partition wall through-hole and the housing through-hole have cross-sectional areas which are different from each other.

[F11]

In the valve device according to any one of F02] to [F10], in the partition wall through-hole and the housing through-hole, positions of mutual axes in a direction of an axis (Axh1) of the shaft insertion hole are different from each other.

[F12]

In the valve device according to [F11], the partition wall portion has a partition wall outer step surface (671) forming a step between the partition wall through-hole of the outer wall of the partition wall portion main body and the housing through-hole. [F13]

The valve device according to any one of [F02] to [F12] further includes a bearing portion (602) provided on the drive unit side with respect to the partition wall through-hole of the shaft insertion hole, and bearing one end of the shaft.

[F14]

In the valve device according to [F13], the shaft insertion hole has a small diameter portion (621) internally provided with the bearing portion, a large diameter portion (622) whose inner diameter is larger than that of the small diameter portion, and in which the partition wall through-hole is open, and an insertion hole inner step surface (623) formed between the small diameter portion and the large diameter portion.

[F15]

In the valve device according to any one of [F02] to [F14], the partition wall portion has a partition wall through-hole inner step surface (651) forming a step between one end and the other end of the partition wall through-hole.

[F16]

In the valve device according to any one of [F02] to [F15], the partition wall through-hole and the housing through-hole are formed so that respective axes are not orthogonal to the axis of the shaft insertion hole.

[F17]

In the valve device according to any one of [F01] to [F16], the partition wall through-hole is formed so that a cross-sectional area thereof gradually increases outward in the radial direction from the inside of the shaft insertion hole in the radial direction.

[F18]

In the valve device according to any one of [F02] to [F07], in a state where the housing is attached to the heating element, the partition wall through-hole is located on a lower side of the shaft.

[F19]

In the valve device according to any one of [F02] to [F07] and [F18], in a state where the housing is attached to the heating element, the housing through-hole is located on a lower side of the shaft.

[F20]

In the valve device according to [F18], when a directly downward direction of the axis of the shaft is set to 0 degrees, the partition wall through-hole is formed in a range of 0 to 80 degrees in the circumferential direction of the shaft.

[F21]

In the valve device according to [F19], when the directly downward direction of the axis of the shaft is set to 0 degrees, the housing through-hole is formed in a range of 0 to 80 degrees in the circumferential direction of the shaft.

[F22]

In the valve device according to any one of [F02] to [F06], the housing has an attachment surface (201) formed on the outer wall of the housing main body to face the heating element in a state of being attached to the heating element. The housing through-hole is open on the attachment surface side.

[F23]

The valve device according to any one of [F01] to [F22] further includes an annular seal portion (97) provided in the shaft insertion hole, and having an annular shaft seal member (98) whose inner edge portion is capable of coming into contact with the outer circumferential wall of the shaft, and an annular shaft seal portion (96) which is softer than the seal portion annular member, whose inner edge portion is capable of coming into contact with the outer circumferential wall of the shaft, and which is capable of holding a portion between the shaft seal portion and the shaft in a liquid-tight manner.

[F24]

In the valve device according to [F23], the shaft seal portion further includes a seal portion holding member (99) harder than the seal portion annular member, and capable of holding the seal portion annular member and the shaft seal member in the shaft insertion hole.

[F25]

In the valve device according to [F24], the seal portion annular member is formed of a resin, the shaft seal member is formed of rubber, and the seal portion holding member is formed of metal.

[F26]

In the valve device according to any one of [F23] to [F25], the shaft seal member has a first shaft seal member (981) coming into contact with the outer circumferential wall of the shaft on the valve body side with respect to a contact portion between the seal portion annular member and the outer circumferential wall of the shaft, and a second shaft seal member (982) coming into contact with the outer circumferential wall of the shaft on the drive unit side with respect to a contact portion between the seal portion annular member and the outer circumferential wall of the shaft.

<7>

[G01]

There is provided a valve device (10) capable of controlling coolant water of a heating element (2) of a vehicle (1). The valve device (10) includes a housing (20) having a housing main body (21) internally forming an internal space (200), ports (220, 221, 222, 223, and 224) which connect the internal space and an outside of the housing main body to each other, housing-side cover fixing portions (291 to 296) formed as portions different from the housing main body to project from an outer wall of the housing main body, and a housing-side cover fastening hole (290) formed in the housing-side cover fixing portion, a valve (30) having a valve body (31) rotatable around a rotation axis (Axr1) inside the internal space, and a shaft (32) provided on the rotation axis, the valve being capable of opening and closing the ports in accordance with a rotation position of the valve body, a pipe member (50) having cylindrical pipe portions (511, 512, 513, and 514) whose internal spaces communicate with the ports (221, 222, 223, and 224), and which is attached to the housing main body, a partition wall portion (60) provided to partition the internal space and the outside of the housing main body from each other, and having a shaft insertion hole (62) formed so that one end of the shaft is insertable, a drive unit cover (80) provided on a side opposite to the internal space with respect to the partition wall portion, and having a cover main body (81) forming a drive unit space (800) between the drive unit cover and the partition wall portion, cover fixing portions (821 to 826) formed as portions different from the cover main body to project from the outer wall of the cover main body, and cover fastening holes (831 to 836) formed in the cover fixing portions, a drive unit (70) provided in the drive unit space, and capable of driving the valve body to rotate via one end of the shaft, and a fixing member (830) fixing the cover fixing portion and the housing-side cover fixing portion by being screwed into the housing-side cover fastening hole through the cover fastening hole. The housing-side cover fixing portion has a cover fixing base portion (298) projecting from the outer wall of the housing main body, and a cover fixing projection portion (299) projecting from the cover fixing base portion to the cover fixing portion side, and fixed to the cover fixing portion. At least a portion of the pipe member is located on a side opposite to the cover fixing projection portion with respect to the cover fixing base portion.

[G02]

In the valve device according to [G01], the cover fixing projection portion forms a gap (Sc1) with the outer wall of the cover main body.

[G03]

In the valve device according to [G01] or [G02], a length in the axial direction of the housing-side cover fastening hole is shorter than a combined length of the cover fixing base portion and the cover fixing projection portion in the axial direction of the housing-side cover fastening hole.

[G04]

In the valve device according to [G03], a length in the axial direction of the fixing member inside the housing-side cover fastening hole is shorter than a length in the axial direction of the housing-side cover fastening hole.

[G05] In the valve device according to any one of [G01] to [G04], the fixing member is a tapping screw which can be screwed to the housing-side cover fastening hole by tapping.

<8>

[H01]

There is provided a valve device (10) capable of controlling coolant water of a heating element (2) of a vehicle (1). The valve device (10) includes a housing (20) having a housing main body (21) internally forming an internal space (200), ports (220, 221, 222, and 223) which connect the internal space and an outside of the housing main body to each other, and a housing opening portion (210) connecting the internal space and an outside of the housing main body, a valve (30) having a valve body (31) rotatable around a rotation axis (Axr1) inside the internal space, and a shaft (32) provided on the rotation axis, the valve being capable of opening and closing the ports in accordance with a rotation position of the valve body, a partition wall portion (60) having a partition wall portion main body (61) provided in the housing opening portion to partition the internal space and the outside of the housing main body from each other, and a shaft insertion hole (62) formed in the partition wall portion main body so that one end of the shaft is insertable, and a drive unit (70) provided on a side opposite to the internal space with respect to the partition wall portion, and capable of driving the valve body to rotate via one end of the shaft. The valve has restricted portions (332 and 342) formed in the valve body. The partition wall portion has an annular restriction recess portion (63) recessed to the drive unit side from a surface on the internal space side of the partition wall portion main body outside in the radial direction of the shaft insertion hole, a restriction portion (631) formed in a portion in the circumferential direction of the restriction recess portion, and capable of restricting the rotation of the valve body by coming into contact with the restricted portion (631) can restrict the rotation of the valve body, and a foreign substance collection portion (68) recessed to the drive unit side from a bottom surface (630) of the restriction recess portion.

[H02]

In the valve device according to [H01], the restriction recess portion has an inner cylinder wall surface (632) which is a cylindrical wall surface formed inside in the radial direction, and an outer cylinder wall surface (633) which is a cylindrical wall surface formed outside in the radial direction.

[H03]

In the valve device according to [H02], the foreign substance collection portion is formed on the outer cylinder wall surface side with respect to at least a portion of the bottom surface (630) of the restriction recess portion.

[H04]

In the valve device according to [H02] or [H03], the bottom surface (630) of the restriction recess portion is formed in a tapered shape to be closer to the drive unit from the inner cylinder wall surface side toward the outer cylinder wall surface side.

[H05]

In the valve device according to any one of [H02] to [H04], the inner cylinder wall surface is capable of guiding the rotation of the valve body by sliding with the restricted portion.

[H06]

In the valve device according to any one of [H02] to [H05], the restriction portion is formed to extend from the inner cylinder wall surface to the outer cylinder wall surface.

[H07]

In the valve device according to [H06], a length of the restriction portion in the radial direction of the restriction recess portion is longer than a length of the foreign substance collection portion in the radial direction of the restriction recess portion.

[H08]

In the valve device according to any one of [H02] to [H07], the valve has a valve body cylindrical portion (315) extending in a cylindrical shape from the valve body to the drive unit side, and a tip portion of the valve body cylindrical portion is located outside in the radial direction of the inner cylinder wall surface.

[H09]

In the valve device according to [H08], the valve has a labyrinth forming portion (316) formed in the valve body cylindrical portion, and capable of forming a labyrinth-shaped space (Sr1) with the inner cylinder wall surface.

[H10]

In the valve device according to [H09], the labyrinth forming portion is formed to project inward in the radial direction from the tip portion of the valve body cylindrical portion.

[H11]

In the valve device according to any one of [H08] to [H10], the valve body cylindrical portion is formed to be located on the inner cylinder wall surface side with respect to the restriction portion in the radial direction of the restriction recess portion.

[H12]

In the valve device according to any one of [H01] to [H11], the foreign substance collection portion is formed in a C-shape in a cross section perpendicular to the axis of the shaft insertion hole.

[H13]

In the valve device according to [H12], the partition wall portion has a partition wall through-hole (65) which extends outward from the shaft insertion hole and is open on the outer wall of the partition wall portion main body. The partition wall through-hole is formed between end portions in the circumferential direction of the foreign substance collection portion.

[H14]

In the valve device according to [H12] or [H13], the bottom surface of the restriction recess portion is formed so that a length in the circumferential direction increases outward in the radial direction, between the end portions in the circumferential direction of the foreign substance collection portion.

[H15]

In the valve device according to any one of [H01] to [H14], the restriction portion is formed to extend outward in the radial direction on the bottom surface of the restriction recess portion.

[H16]

In the valve device according to [H15], the restriction portion is formed so that a length in the circumferential direction increases outward in the radial direction of the restriction recess portion.

[H17]

In the valve device according to any one of [H01] to [H16], in a state where the housing is attached to the heating element, the foreign substance collection portion is located on a lower side of the valve body.

<9>

There is provided a valve device (10) capable of controlling coolant water of a heating element (2) of a vehicle (1). The valve device (10) includes a housing (20) having a housing main body (21) internally forming an internal space (200), and ports (220, 221, 222, and 223) which connect the internal space and an outside of the housing main body to each other, a valve (30) having a valve body (31) rotatable around a rotation axis (Axr1) inside the internal space, and a shaft (32) provided on the rotation axis, the valve being capable of opening and closing the ports in accordance with a rotation position of the valve body, and a shaft bearing portion (90) having a bearing portion main body (91) extending in a cylindrical shape from a facing inner wall (213) which is an inner wall facing an end portion of the shaft on an inner wall of the housing main body forming the internal space, and capable of internally bearing an end portion of the shaft, and a bearing portion flow channel (92) formed to connect an inner circumferential wall and an outer circumferential wall of the bearing portion main body to each other.

In the valve device according to [I01], the bearing portion flow channel is formed to extend from a portion of the bearing portion main body close to the facing inner wall to an end portion of the bearing portion main body opposite to the facing inner wall.

In the valve device according to [I01] or [I02], the valve body has a valve body end portion hole (314) formed so that an end portion of the shaft and the bearing portion main body are internally located.

In the valve device according to any one of [I01] to [I03], the shaft bearing portion has a cylindrical inner bearing portion (93) provided inside the bearing portion main body, and capable of internally bearing an end portion of the shaft.

In the valve device according to [I01] or [I02], the valve body has a valve body end portion hole (314) formed so that an end portion of the shaft and the bearing portion main body are internally located. The shaft bearing portion has a cylindrical inner bearing portion (93) provided inside the bearing portion main body, and capable of internally bearing an end portion of the shaft. A difference between the inner diameter of the valve body end portion hole and the outer diameter of the bearing portion main body is smaller than a difference between the inner diameter of the bearing portion main body and the outer diameter of the end portion of the shaft.

In the valve device according to any one of [I01] to [I05], in a state where the housing is attached to the heating element, the shaft bearing portion is located on a lower side of the facing inner wall.

<10>

[J01]

There is provided a valve device (10) capable of controlling coolant water of a heating element (2) of a vehicle (1). The valve device (10) includes a housing (20) having a housing main body (21) having a cylindrical housing inner wall (211) internally forming an internal space (200), and ports (220, 221, 222, and 223) which are open on the housing inner wall and connect the internal space and an outside of the housing main body to each other, a valve (30) having a valve body (31) rotatable around a rotation axis (Axr1) along an axis (Axn1) of the housing inner wall inside the internal space, and valve body opening portions (410, 420, and 430) formed to connect the outer circumferential wall and the inner circumferential wall of the valve body 31 to each other, the valve being capable of opening and closing the ports in accordance with a rotation position of the valve body. The housing inner wall is formed so that distances from the axis are different from each other in a circumferential direction.

[J02]

In the valve device according to [J01], the valve body is formed so that distances from the rotation axis to the outer circumferential wall are the same as each other in the circumferential direction.

[J03]

In the valve device according to [J01] or [J02], the housing inner wall is formed to be non-perfect circular in a cross section perpendicular to the axis.

[J04]

In the valve device according to [J03], the housing inner wall is formed to be polygon in a cross section perpendicular to the axis.

[J05]

The valve device according to any one of [J01] to [J04], in "a cross section including a portion having a largest outer diameter of the valve body and perpendicular to an axis of the housing inner wall", distances between the outer circumferential wall of the valve body and the housing inner wall are different from each other in the circumferential direction.

[J06]

In the valve device according to any one of [J01] to [J05], in "a cross section including a portion on the housing inner wall other than a portion in which the port is open and a portion of the valve body other than a portion in which the valve body opening portion is formed, and perpendicular to the axis of the housing inner wall", distances between the outer circumferential wall of the valve body and the housing inner wall are different from each other in the circumferential direction.

[J07]

In the valve device according to any one of [J01] to [J06], the housing further includes a relief valve (39) having a relief port (224) which is open on the housing inner wall and connects the internal space and the outside of the housing main body to each other, and provided in the relief port to open and close the relief port in response to conditions.

[J08]

The valve device according to any one of [J01] to [J07] further includes an annular valve seal (36) provided at a position corresponding to the port to be slidable with the outer circumferential wall of the valve body, and capable of holding a portion between the valve seal and the outer circumferential wall of the valve body in a liquid-tight manner. In “a cross section including the valve seal and perpendicular to the axis of the housing inner wall”, distances between the outer circumferential wall of the valve body and the housing inner wall are different from each other in the circumferential direction.

[J09]

In the valve device according to any one of [J01] to [J08], the housing a has a housing opening portion (210) whose inner peripheral surface is connected to an end portion in the axial direction of the housing inner wall to connect the internal space and the outside of the housing main body to each other. The valve has a shaft (32) provided on the rotation axis. The housing further includes a partition wall portion main body (61) provided in the housing opening portion to partition the internal space and the outside of the housing main body from each other, a partition wall portion (60) having a shaft insertion hole (62) formed in the partition wall portion main body so that one end of the shaft is insertable, a drive unit (70) provided on a side opposite to the internal space with respect to the partition wall portion main body, and capable of driving the valve body to rotate via one end of the shaft, and an annular seal member (600) provided between the housing opening portion and the partition wall portion main body, and capable of holding a portion between the housing opening portion and the partition wall portion main body in a liquid-tight manner. An inner peripheral surface of the housing opening portion is formed in a cylindrical shape.

<11>

[K01]

There is provided a valve device (10) capable of controlling coolant water of a heating element (2) of a vehicle (1). The valve device (10) includes a housing (20) having a housing main body (21) internally forming an internal space (200), an inlet port (220) which connects the internal space and an outside of the housing main body to each other, and into which coolant water flows, and a relief port (224) which connects the internal space and the outside of the housing main body to each other, a valve (30) having a valve body (31) rotatable around a rotation axis (Axr1) inside the internal space, and a shaft (32) provided on the rotation axis, a relief valve (39) provided in the relief port, opened or closed in response to conditions, and allowing or blocking communication between the internal space and the outside of the housing main body via the relief port, and a covering portion (95) capable of blocking the relief valve not to be visible from the inlet port.

[K02]

In the valve device according to [K01], the covering portion is provided in the housing main body at a position between the relief port and the shaft.

[K03]

In the valve device according to [K01], the covering portion is provided in the housing main body at a position between the inlet port and the shaft.

[K04]

In the valve device according to any one of [K01] to [K03], the covering portion is formed to be projected on an area which is equal to or larger than an area of an overlapping portion between the projected inlet port and the projected relief valve, when the inlet port, the relief valve, and the covering portion are projected in an axial direction of the inlet port or in an axial direction of the relief port.

[K05]

In the valve device according to any one of [K01] to [K04], a surface (951) on the valve side of the covering portion is formed in a shape conforming to a shape of an inner wall (211) of the housing main body forming the internal space.

[K06]

In the valve device according to any one of [K01] to [K05], the covering portion is formed in a plate shape, and has a constant thickness.

<12>

[L01]

There is provided a valve device (10) capable of controlling coolant water of a heating element (2) of a vehicle (1). The valve device (10) includes a housing (20) having an internal space (200), a radiator port (221) connected to the internal space and connected to a radiator (5) of the vehicle, a heater port (222) connected to the internal space and connected to a heater (6) of the vehicle, and a device port (223) connected to the internal space and connected to a device (7) of the vehicle, a valve (30) having a valve body (31) rotatable around a rotation axis (Axr1) inside the internal space, and capable of opening and closing the radiator port, the heater port, or the device port in accordance with a rotation position of the valve body, a drive unit (70) capable of driving the valve body to rotate, and a control unit (8) capable of controlling a flow of the coolant water between the radiator port and the radiator, between the heater port and the heater, and between the device port and the device by controlling an operation of the drive unit and controlling rotational drive of the valve body. In accordance with the rotational drive of the valve body rotating to one side in a rotation direction, after all opening degrees of the radiator port, the heater port, and the device port reach a predetermined opening degree, the control unit closes the heater port and the device port, and is capable of controlling the drive unit and the valve body so that the opening degree of only the radiator port reaches the predetermined opening degree.

[L02]

In the valve device according to [L01], in accordance with the rotational drive of the valve body rotating to one side in the rotation direction, after all opening degrees of the radiator port, the heater port, and the device port reach the predetermined opening degree, the control unit is capable of controlling the drive unit and the valve body so that the heater port and the device port are closed in the order of the heater port and the device port.

[L03]

In the valve device according to [L01], in accordance with the rotational drive of the valve body rotating to one side in the rotation direction, after all opening degrees of the radiator port, the heater port, and the device port reach the predetermined opening degree, the control unit is capable of controlling the drive unit and the valve body so that the heater port and the device port are closed in the order of the device port and the heater port.

[L04]

In the valve device according to [L01], in accordance with the rotational drive of the valve body rotating to one side in the rotation direction, after all opening degrees of the radiator port, the heater port, and the device port reach the predetermined opening degree, the control unit is capable of controlling the drive unit and the valve body so that the heater port and the device port are simultaneously closed.

[L05]

There is provided a valve device (10) capable of controlling coolant water of a heating element (2) of a vehicle (1). The valve device (10) includes a housing (20) having an internal space (200), a radiator port (221) connected to the internal space and connected to a radiator (5) of the vehicle, a heater port (222) connected to the internal space and connected to a heater (6) of the vehicle, and a device port (223) connected to the internal space and connected to a device (7) of the vehicle, a valve (30) having a valve body (31) rotatable around a rotation axis (Axr1) inside the internal space, and capable of opening and closing the radiator port, the heater port, or the device port in accordance with a rotation position of the valve body, a drive unit (70) capable of driving the valve body to rotate, and a control unit (8) capable of controlling a flow of the coolant water between the radiator port and the radiator, between the heater port and the heater, and between the device port and the device by controlling by controlling an operation of the drive unit and controlling rotational drive of the valve body. Depending on a vehicle environment and/or a vehicle state, the control unit drives the valve body to rotate in a normal mode in which the valve body is rotated to one side with respect to a reference position in a rotation direction, or in a cooling priority mode in which the valve body is rotated to the other side, and is capable of controlling the drive unit and the valve body so that the opening degree of only the radiator port reaches the predetermined opening degree at a specific rotation position of the valve body in the normal mode.

[L06]

In the valve device according to [L05], on both sides of the normal mode and the cooling priority mode, the control unit is capable of controlling the drive unit and the valve body so that the opening degree of the radiator port reaches the predetermined opening degree.

[L07]

In the valve device according to [L06], the control unit is capable of controlling the drive unit and the valve body so that the opening degree of each of the radiator port, the heater port, and the device port independently reaches the predetermined opening degree.

[L08]

In the valve device according to any one of [L05] to [L07], in the normal mode, the control unit is capable of controlling the drive unit and the valve body so that all opening degrees of the radiator port, the heater port, and the device port reach the predetermined opening degrees.

[L09]

In the valve device according to any one of [L01] to [L08], the predetermined opening degree is set to 60% or more.

[L10]

In the valve device according to any one of [L01] to [L09], an outer circumferential wall or an inner circumferential wall of the valve body is formed in a spherical or cylindrical shape. The valve has a valve body internal flow channel (300) formed inside the inner circumferential wall of the valve body, a radiator opening portion (410) which is formed to connect the outer circumferential wall and the inner circumferential wall of the valve body to each other, and whose radiator overlapping ratio which is a ratio of overlapping the radiator port is changed in accordance with the rotation position of the valve body, a heater opening portion (420) which is formed to connect the outer circumferential wall and the inner circumferential wall of the valve body to each other, and whose heater overlapping ratio which is a ratio of overlapping the heater port is changed in accordance with the rotation position of the valve body, and a device opening portion (430) formed to connect the outer circumferential wall and the inner circumferential wall of the valve body to each other, and whose device overlapping ratio which is a ratio of overlapping the device port is changed in accordance with the rotation position of the valve body.

[L11]

In the valve device according to [L10], when the radiator overlapping ratio is higher than 0, the radiator port is opened so that the valve body internal flow channel and the radiator communicate with each other via the radiator opening portion and the radiator port. When the heater overlapping ratio is higher than 0, the heater port is opened so that the valve body internal flow channel and the heater communicate with each other via the heater opening portion and the heater port. When the device overlapping ratio is higher than 0, the device port is opened so that the valve body internal flow channel and the device communicate with each other via the device opening portion and the device port.

The present disclosure has been described, based on the embodiments. However, the present disclosure is not limited to the embodiments and the structures. The present disclosure also includes various modification examples and modifications within the scope of equivalents. In addition, various combinations and forms, and further, other combinations and forms which include only one element, more elements, or less elements are included in the scope and the spirit of the present disclosure.

The invention claimed is:

1. A valve device configured to control coolant water of a heating element of a vehicle, the valve device comprising:

a housing having a housing main body defining therein an internal space, an attachment surface formed on an outer wall of the housing main body to face the heating element in a state of being attached to the heating element, a port which is open on the attachment surface and connects the internal space and an outside of the housing main body to each other, a plurality of fastening portions formed integrally with the housing main body, and a plurality of fastening holes each of which is formed corresponding to a respective one of the plurality of fastening portions; and a valve having a valve body rotatable about a rotation axis inside the internal space and a valve body internal flow channel formed inside the valve body and capable of communicating with the port, wherein the housing main body is fixed to the heating element by a fastening member screwed into the heating element through the fastening hole, the fastening hole are at least three fastening holes, and an opening of the port is positioned entirely within a triangle formed by connecting the three fastening holes.

2. A valve device configured to control coolant water of a heating element of a vehicle, the valve device comprising:

a housing having a housing main body internally forming an internal space, an attachment surface formed on an outer wall of the housing main body to face the heating element in a state of being attached to the heating element, a port which is open on the attachment surface and connects the internal space and an outside of the housing main body to each other, a plurality of fastening portions formed integrally with the housing main body, and a plurality of fastening holes each of which is formed corresponding to a respective one of the plurality of fastening portions; and a valve having a valve body rotatable about a rotation axis inside the internal space, a valve body internal flow channel formed inside the valve body and capable of communicating with the port, and a shaft provided in a rotation direction;

a partition wall portion which partitions the internal space and the outside of the housing main body from each other; and a drive unit provided on a side opposite to the internal space with respect to the partition wall portion, and capable of driving the valve body to rotate via the shaft, wherein the housing main body is fixed to the heating element by a fastening member screwed to the heating element through the fastening hole, and the fastening hole includes a first fastening hole formed outside in a radial direction of an opening of the port, a second fastening hole formed to interpose the opening of the port with the first fastening hole, and a third fastening hole formed on a side of the first fastening hole and the second fastening hole close to the drive unit, wherein the opening of the port has a center that is position on a straight line connecting a first point of the first fastening hole and a second point of the second fastening hole;

the housing has a positioning portion formed on the attachment surface and capable of positioning the housing main body by engaging with another member; and the positioning portion includes a first positioning portion formed outside in the radial direction of the opening of the port and a second positioning portion formed to interpose the opening of the port with the first positioning portion.

3. The valve device according to claim 2, wherein the first fastening hole and the second fastening hole are formed to be point-symmetrical with respect to center of the opening of the port.

4. The valve device according to claim 1, wherein the housing has an attachment surface recess portion recessed from the attachment surface in a direction away from the heating element.

5. The valve device according to claim 2, wherein the fastening portion having the third fastening hole is formed at a position adjacent to the partition wall portion.

6. The valve device according to claim 4, wherein the fastening portion has the attachment surface on the heating element side, and has the attachment surface recess portion recessed from the attachment surface in the direction away from the heating element.

7. The valve device according to claim 6, wherein the attachment surface recess portion are a plurality of attachment surface recess portions, and the housing has a positioning portion formed on the attachment surface and capable of positioning the housing main body by engaging with another member, and an inter-recess portion rib formed between the plurality of attachment surface recess portions, and the positioning portion is formed in a lattice point of the inter-recess portion rib.

8. The valve device according to claim 1, wherein the housing has a positioning portion formed on the attachment surface and capable of positioning the housing main body by engaging with another member, one fastening portion is formed on one side of the housing main body in a width direction, and two fastening portions are formed on another side of the housing main body in the width direction, and the positioning portion is formed on one side of the housing main body in the width direction of the housing main body in which one fastening portion is formed.

9. The valve device according to claim 8, wherein the port is formed between the fastening portion farthest away from the port among the plurality of fastening portions and the positioning portion.

10. The valve device according to claim 1, wherein the fastening portion has two outer walls whose shape in a cross-section taken along a plane perpendicular to the fastening hole is a linear shape, and is formed so that an angle formed by the two outer walls is an obtuse angle.

11. A valve device configured to control coolant water of a heating element of a vehicle, the valve device comprising:

a housing having a housing main body internally forming an internal space, an attachment surface formed on an outer wall of the housing main body to face the heating element in a state of being attached to the heating element, a port which is open on the attachment surface and connects the internal space and an outside of the housing main body to each other, a plurality of fastening portions formed integrally with the housing main body, and a plurality of fastening holes each of which is formed corresponding to a respective one of the plurality of fastening portions; and a valve having a valve body rotatable about a rotation axis inside the internal space, a valve body internal flow channel formed inside the valve body and capable of communicating with the port, and a shaft provided in a rotation direction;

a partition wall portion which partitions the internal space and the outside of the housing main body from each other; and a drive unit provided on a side opposite to the internal space with respect to the partition wall portion, and capable of driving the valve body to rotate via the shaft, wherein the housing main body is fixed to the heating element by a fastening member screwed to the heating element through the fastening hole, the fastening hole includes a first fastening hole formed outside in a radial direction of an opening of the port, a second fastening hole formed to interpose the opening of the port with the first fastening hole, and a third fastening hole formed on a side of the first fastening hole and the second fastening hole close to the drive unit, the housing has a positioning portion formed on the attachment surface and capable of positioning the housing main body by engaging with an other member, and the positioning portion includes a first positioning portion formed outside in the radial direction of the opening of the port and a second positioning portion formed to interpose the opening of the port with the first positioning portion.

* * * * *